United States Patent
Zhang et al.

(10) Patent No.: US 12,552,811 B2
(45) Date of Patent: Feb. 17, 2026

(54) IMMUNOSUPPRESSANT, AND PREPARATION METHOD THEREFOR AND USE THEREOF

(71) Applicant: Abbisko Therapeutics Co., Ltd., Shanghai (CN)

(72) Inventors: Mingming Zhang, Shanghai (CN); Baowei Zhao, Shanghai (CN); Fei Yang, Shanghai (CN); Yongxian Zhang, Shanghai (CN); Hongping Yu, Shanghai (CN); Zhui Chen, Shanghai (CN); Yaochang Xu, Shanghai (CN)

(73) Assignee: ABBISKO THERAPEUTICS CO., LTD., Shanghai (CN)

( * ) Notice: Subject to any disclaimer, the term of this patent is extended or adjusted under 35 U.S.C. 154(b) by 573 days.

(21) Appl. No.: 18/010,920

(22) PCT Filed: Apr. 30, 2021

(86) PCT No.: PCT/CN2021/091383
§ 371 (c)(1),
(2) Date: Dec. 16, 2022

(87) PCT Pub. No.: WO2021/254005
PCT Pub. Date: Dec. 23, 2021

(65) Prior Publication Data
US 2023/0234970 A1    Jul. 27, 2023

(30) Foreign Application Priority Data
Jun. 17, 2020    (CN) .................. 202010553412.3

(51) Int. Cl.
*C07D 471/04* (2006.01)
*C07D 519/00* (2006.01)

(52) U.S. Cl.
CPC ......... *C07D 519/00* (2013.01); *C07D 471/04* (2013.01)

(58) Field of Classification Search
CPC .................................. C07D 519/00
USPC .................................. 514/300
See application file for complete search history.

(56) References Cited

U.S. PATENT DOCUMENTS

2008/0293712 A1* 11/2008 Wissner .................. A61P 37/00
544/126

FOREIGN PATENT DOCUMENTS

| CN | 111039942 A | 4/2020 |
|---|---|---|
| WO | 2019192506 A1 | 10/2019 |
| WO | 2019217821 A1 | 11/2019 |
| WO | 2021067217 A1 | 4/2021 |
| WO | 2021236771 A1 | 11/2021 |

OTHER PUBLICATIONS

Office Action issued Jan. 9, 2024 in JP Application No. 2022-577776.
International Search Report issued Jul. 22, 2021 in PCT/CN2021/091383.

* cited by examiner

*Primary Examiner* — Niloofar Rahmani
(74) *Attorney, Agent, or Firm* — Panitch Schwarze Belisario & Nadel LLP

(57) ABSTRACT

An immunosuppressant having the structure of formula (I), and a preparation method therefor and the use thereof are provided. The series of compounds can be widely used in the preparation of drugs for preventing and/or treating cancers or tumors, immune-related diseases and disorders, communicable diseases, infectious diseases or metabolic diseases mediated by PD-1/PD-L1 signal pathways, which drugs are expected to be developed into a new generation of PD-1/PD-L1 inhibitors.

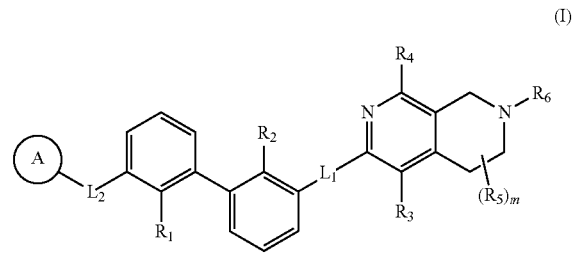

11 Claims, No Drawings

IMMUNOSUPPRESSANT, AND PREPARATION METHOD THEREFOR AND USE THEREOF

CROSS-REFERENCE TO RELATED APPLICATIONS

This application is a Section 371 of International Application No. PCT/CN2021/091383, filed Apr. 30, 2021, which was published in the Chinese language on Dec. 23, 2021 under International Publication No. WO 2021/254005 A1, which claims priority under 35 U.S.C. § 119(b) to Chinese Application No. 202010553412.3, filed Jun. 17, 2020, the disclosures of which are incorporated herein by reference in their entireties.

TECHNICAL FIELD

The present invention belongs to the field of medicament synthesis, and in particular relates to immunosuppressant, and preparation method therefor and use thereof.

BACKGROUND

The immune system plays a very important role in controlling and eliminating diseases, such as cancer. However, tumor cells are often able to develop a strategy for escaping or suppressing the monitoring of the immune system to promote their malignant growth. One very important mechanism is to change the expression of co-stimulatory and co-inhibitory immune checkpoint molecules on immunocytes. Blocking the signal pathway of immune checkpoint molecules, such as PD1, has been proved to be an extremely promising and effective therapy.

Programmed cell death protein 1 (PD-1), also known as CD279, is a receptor expressed on the surfaces of activated T cells, natural killer T cells, B cells and macrophages. The structure of PD-1 contains an extracellular domain similar to an immunoglobulin variable region, a transmembrane domain and an intracellular domain, wherein the intracellular domain contains two phosphorylation sites located in an immunoreceptor tyrosine kinase-based inhibitory domain and an immunoreceptor tyrosine kinase-based transduction domain, suggesting that PD1 can down-regulate T cell receptor-mediated signal pathways.

PD1 has two ligands: PD-L1 and PDL2, and they are different in their expression profile. The expression of PDL1 will be up-regulated in macrophages and dendritic cells after treatment with lipopolysaccharide (LPS) and granulocyte-macrophage colony-stimulating factor (GM-CSF), and will also be up-regulated in T cells and B cells after stimulation of T cell receptor and B cell receptor signal pathways. PD-L1 is also highly expressed in almost all tumor cells, and the expression will be up-regulated after stimulation of interferon (IFN) gamma. As a matter of fact, the expression of PDL1 in a variety of tumors is considered to have prognostic relevance, but the expression of PD-L2 is relatively concentrated, and mainly on dendritic cells.

When T cells expressing PD-1 come into contact with cells expressing the ligands of PD-1, those antigen-stimulated functional activities, such as cell proliferation, cytokine release and cell lysis activity, are all inhibited. Therefore, the interaction between PD1 and its ligands thereof can function as an intrinsic negative feedback regulation mechanism to prevent T cell hyperactivation during infection, immune tolerance or tumorigenesis, thus reducing the occurrence of autoimmune diseases and promoting self tolerance. Long-term antigen stimulation, e.g., in tumor or long-term infection, will cause T cells to express high level of PD-1, gradually lose activities in response to these long-term antigens, and eventually become nonfunctional, namely, the so-called T cell exhaustion. B cells also have the inhibitory effect caused by PD1 and ligands thereof and corresponding functional exhaustion.

Some evidence from preclinical animal studies have indicated that PD-1 and its ligands thereof can down-regulate the immunoreaction. PD-1-deficient mice will develop lupus erythematosus-like acute proliferative glomerulonephritis and dilated cardiomyopathy. Utilizing the antibody of PDL1 to block the interaction between PD-1 and PDL1 has been proved to be able to restore and enhance T cell activation in many systems. The monoclonal antibody of PDL1 can also benefit patients with advanced cancers. In some preclinical animal tumor models, it was also shown that blocking the signal pathway of PD-1/PD-L1 with a monoclonal antibody can enhance the immunoreaction and lead to immunoreactions to a series of histologically different tumors. With the long-term infection LCMV model, the interaction between PD-1 and PD-L1 has been found to be able to inhibit the activation and proliferation of virus-specific CD8 T cells and the acquisition of effector cell functions. Besides being capable of enhancing the immunoreaction to long-term antigens, blocking the pathway of PD-1/PDL1 was also discovered to be able to enhance response to vaccines, including response to a therapeutic vaccine in long-term infection.

To sum up, if, besides the existing monoclonal antibody, a compound for blocking the interaction between PD1 and PDL1 can be developed, it can serve as an effective therapeutic means for blocking the PD-1/PDL1-mediated inhibitory signal pathway to enhance or restore the function of T cells. Therefore, the compound specifically blocking the interaction between PD-1 and PD-L1 will achieve a good therapeutic effect in immunotherapies for a variety of cancers and other immunity-associated diseases.

SUMMARY OF THE INVENTION

The object of the present invention is to provide an immunosuppressive agent for blocking the interaction between PD-1 and PD-L1, and thus to hopefully develop a new generation of PD-1/PD-L1 inhibitors.

The first aspect of the present invention provides a compound of formula (I), a stereoisomer, prodrug or pharmaceutically acceptable salt thereof:

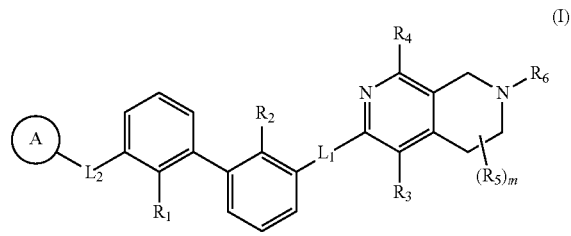

wherein, m is 0, 1, 2, 3 or 4;

$L_1$ and $L_2$ are each independently —$CR_7$=$CR_8$—, —NH—C(O)—, —$NR_9$—C($R_{10}R_{11}$)—, —$NR_{12}$— or a bond, group attachment directions defined by "$L_1$ or $L_2$" include two directions, for example, the "nitrogen atom" in "—NH—C(O)—" can be either attached to ring A or pyridine ring, or attached to benzene ring;
ring A is

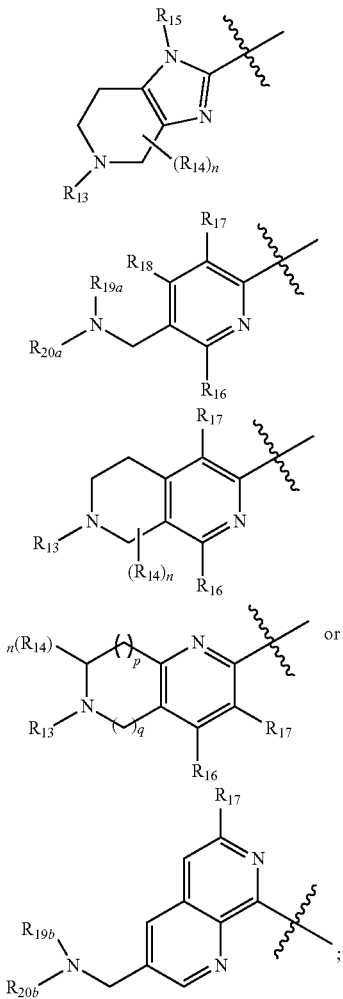

R$_1$ and R$_2$ are each independently selected from the group consisting of hydrogen, deuterium, halogen, cyano, hydroxy, carboxyl, C$_{1-10}$ alkyl, C$_{3-10}$ cycloalkyl and C$_{1-10}$ alkoxy, above groups are optionally further substituted by one or more substituents selected from the group consisting of deuterium, halogen, cyano, cyclopropyl, hydroxy and C$_{1-4}$ alkoxy;

R$_3$ and R$_4$ are each independently selected from the group consisting of hydrogen, deuterium, halogen, cyano, hydroxy, carboxyl, C$_{1-10}$ alkyl, C$_{3-10}$ cycloalkyl, 3-10 membered heterocyclyl, C$_{1-10}$ alkoxy and C$_{3-10}$ cycloalkoxy, above groups are optionally further substituted by one or more substituents selected from the group consisting of deuterium, halogen, cyano, cyclopropyl, hydroxy and C$_{1-4}$ alkoxy;

each R$_5$ is independently selected from the group consisting of hydrogen, deuterium, halogen, cyano, hydroxy, carboxyl, C$_{1-10}$ alkyl, C$_{3-10}$ cycloalkyl and C$_{1-10}$ alkoxy, or, when m≥2, two of R$_5$, together with the carbon atom directly attached thereto, form carbonyl, C$_{3-10}$ cycloalkyl or 3-10 membered heterocyclyl, above groups are optionally further substituted by one or more substituents selected from the group consisting of deuterium, halogen, cyano, cyclopropyl, hydroxy and C$_{1-4}$ alkoxy;

R$_6$ is selected from the group consisting of hydrogen, deuterium, hydroxy, C$_{1-10}$ alkyl, C$_{2-10}$ alkenyl, C$_{2-10}$ alkynyl, C$_{3-10}$ cycloalkyl, 3-10 membered heterocyclyl, C$_{5-10}$ aryl and 5-10 membered heteroaryl, above groups are optionally further substituted by one or more substituents selected from the group consisting of deuterium, halogen, cyano, nitro, azido, C$_{1-10}$ alkyl, C$_{2-10}$ alkenyl, C$_{2-10}$ alkynyl, C$_{1-10}$ haloalkyl, C$_{1-10}$ deuterioalkyl, C$_{3-10}$ cycloalkyl, 3-10 membered heterocyclyl, C$_{5-10}$ aryl, 5-10 membered heteroaryl, =O, —C$_{0-8}$—S(O)$_r$NR$_{21}$, —C$_{0-8}$—O—R$_{22}$, —C$_{0-8}$—C(O)OR$_{22}$, —C$_{0-8}$—C(O)R$_{23}$, —C$_{0-8}$—O—C(O)R$_{23}$, —C$_{0-8}$—NR$_{24}$R$_{25}$, —C$_{0-8}$—C(=NR$_{24}$)R$_{23}$, —C$_{0-8}$—N(R$_{24}$)—C(=NR$_{25}$)R$_{23}$, —C$_{0-8}$—C(O)NR$_{24}$R$_{25}$ and —C$_{0-8}$—N(R$_{24}$)—C(O)R$_{23}$, above groups are optionally more further substituted by one or more substituents selected from the group consisting of deuterium, halogen, cyano, nitro, azido, C$_{1-10}$ alkyl, C$_{2-10}$ alkenyl, C$_{2-10}$ alkynyl, C$_{1-10}$ haloalkyl, C$_{1-10}$ deuterioalkyl, C$_{3-10}$ cycloalkyl, 3-10 membered heterocyclyl, C$_{5-10}$ aryl, 5-10 membered heteroaryl, =O, —C$_{0-8}$—S(O)$_r$R$_{21}$, —C$_{0-8}$—O—R$_{22}$, —C$_{0-8}$—C(O)OR$_{22}$, —C$_{0-8}$—C(O)R$_{23}$, —C$_{0-8}$—O—C(O)R$_{23}$, —C$_{0-8}$—NR$_{24}$R$_{25}$, —C$_{0-8}$—C(=NR$_{24}$)R$_{23}$, —C$_{0-8}$—N(R$_{24}$)—C(=NR$_{25}$)R$_{23}$, —C$_{0-8}$—C(O)NR$_{24}$R$_{25}$ and —C$_{0-8}$—N(R$_{24}$)—C(O)R$_{23}$;

R$_7$ and R$_8$ are each independently selected from the group consisting of hydrogen, deuterium, fluorine, cyano, hydroxy, C$_{1-10}$ alkyl and C$_{3-10}$ cycloalkyl, above groups are optionally further substituted by one or more substituents selected from the group consisting of deuterium, halogen, cyano, cyclopropyl, hydroxy and C$_{1-4}$ alkoxy;

R$_9$ and R$_{12}$ are each independently selected from the group consisting of hydrogen, deuterium, hydroxy, C$_{1-10}$ alkyl and C$_{3-10}$ cycloalkyl, above groups are optionally further substituted by one or more substituents selected from the group consisting of deuterium, halogen, cyano, cyclopropyl, hydroxy and C$_{1-4}$ alkoxy;

R$_{10}$ and R$_{11}$ are each independently selected from the group consisting of hydrogen, deuterium, halogen, cyano, nitro, azido, C$_{1-10}$ alkyl, C$_{2-10}$ alkenyl, C$_{2-10}$ alkynyl, C$_{3-12}$ cycloalkyl, 3-12 membered heterocyclyl, C$_{5-10}$ aryl, 5-10 membered heteroaryl, —C$_{0-8}$—S(O)$_r$R$_{21}$, —C$_{0-8}$—O—R$_{22}$, —C$_{0-8}$—C(O)OR$_{22}$, —C$_{0-8}$—C(O)R$_{23}$, —C$_{0-8}$—O—C(O)R$_{23}$, —C$_{0-8}$—NR$_{24}$R$_{25}$, —C$_{0-8}$—C(=NR$_{24}$)R$_{23}$, —C$_{0-8}$—N(R$_{24}$)—C(=NR$_{25}$)R$_{23}$, —C$_{0-8}$—C(O)NR$_{24}$R$_{25}$ and —C$_{0-8}$—N(R$_{24}$)—C(O)R$_{23}$, or, R$_{10}$ and R$_{11}$, together with the carbon atom directly attached thereto, form 3-12 membered cycloalkyl or 3-12 membered heterocyclyl, above groups are optionally further substituted by one or more substituents selected from the group consisting of deuterium, halogen, cyano, nitro, azido, C$_{1-10}$ alkyl, C$_{1-10}$ haloalkyl, C$_{1-10}$ deuterioalkyl, C$_{2-10}$ alkenyl, C$_{2-10}$ alkynyl, C$_{3-12}$ cycloalkyl, 3-12 membered heterocyclyl, C$_{5-10}$ aryl, 5-10 membered heteroaryl, =O, —C$_{0-8}$—S(O)$_r$R$_{21}$, —C$_{0-8}$—O—R$_{22}$, —C$_{0-8}$—C(O)OR$_{22}$, —C$_{0-8}$—C(O)R$_{23}$, —C$_{0-8}$—O—C(O)R$_{23}$, —C$_{0-8}$—NR$_{24}$R$_{25}$, —C$_{0-8}$—C(=NR$_{24}$)R$_{23}$, —C$_{0-8}$—N(R$_{24}$)—C(=NR$_{25}$)R$_{23}$, —C$_{0-8}$—C(O)NR$_{24}$R$_{25}$ and —C$_{0-8}$—N(R$_{24}$)—C(O)R$_{23}$;

each R$_{13}$ is independently selected from the group consisting of hydrogen, deuterium, hydroxy, C$_{1-10}$ alkyl, $C_{2-10}$ alkenyl, $C_{2-10}$ alkynyl, $C_{3-10}$ cycloalkyl, 3-10 membered heterocyclyl, $C_{5-10}$ aryl and 5-10 membered heteroaryl, above groups are optionally further substituted by one or more substituents selected from the group consisting of deuterium, halogen, cyano, nitro, azido, $C_{1-10}$ alkyl, $C_{2-10}$ alkenyl, $C_{2-10}$ alkynyl, $C_{3-10}$ cycloalkyl, 3-10 membered heterocyclyl, $C_{5-10}$ aryl, 5-10 membered heteroaryl, =O, —$C_{0-8}$—S(O)$_r$R$_{21}$, —$C_{0-8}$—O—R$_{22}$, —$C_{0-8}$—C(O)OR$_{22}$, —$C_{0-8}$—C(O)R$_{23}$, —$C_{0-8}$—O—C(O)R$_{23}$, —$C_{0-8}$—NR$_{24}$R$_{25}$, —$C_{0-8}$—C(=NR$_{24}$)R$_{23}$, —$C_{0-8}$—N(R$_{24}$)—C(=NR$_{25}$)R$_{23}$, —$C_{0-8}$—C(O)NR$_{24}$R$_{25}$ and —$C_{0-8}$—N(R$_{24}$)—C(O)R$_{23}$, above groups are optionally more further substituted by one or more substituents selected from the group consisting of deuterium, halogen, cyano, nitro, azido, $C_{1-10}$ alkyl, $C_{2-10}$ alkenyl, $C_{2-10}$ alkynyl, $C_{1-10}$ haloalkyl, $C_{1-10}$ deuterioalkyl, $C_{3-10}$ cycloalkyl, 3-10 membered heterocyclyl, $C_{5-10}$ aryl, 5-10 membered heteroaryl, =O, —$C_{0-8}$—S(O)$_r$R$_{21}$, —$C_{0-8}$—O—R$_{22}$, —$C_{0-8}$—C(O)OR$_{22}$, —$C_{0-8}$—C(O)R$_{23}$, —$C_{0-8}$—O—C(O)R$_{23}$, —$C_{0-8}$—NR$_{24}$R$_{25}$, —$C_{0-8}$—C(=NR$_{24}$)R$_{23}$, —$C_{0-8}$—N(R$_{24}$)—C(=NR$_{25}$)R$_{23}$, —$C_{0-8}$—C(O)NR$_{24}$R$_{25}$ and —$C_{0-8}$—N(R$_{24}$)—C(O)R$_{23}$;

p is 0 or 1;

q is 1 or 2;

each n is independently 0, 1, 2, 3 or 4;

each $R_{14}$ is independently selected from the group consisting of hydrogen, deuterium, halogen, cyano, hydroxy, carboxyl, $C_{1-10}$ alkyl, $C_{3-10}$ cycloalkyl and $C_{1-10}$ alkoxy, or, when n≥2, two of $R_{14}$, together with the carbon atom directly attached thereto, form carbonyl, $C_{3-10}$ cycloalkyl or 3-10 membered heterocyclyl, above groups are optionally further substituted by one or more substituents selected from the group consisting of deuterium, halogen, cyano, cyclopropyl, hydroxy and $C_{1-4}$ alkoxy;

$R_{15}$ is selected from the group consisting of hydrogen, deuterium, hydroxy, $C_{1-10}$ alkyl, $C_{2-10}$ alkenyl, $C_{2-10}$ alkynyl, $C_{3-10}$ cycloalkyl, 3-10 membered heterocyclyl, $C_{5-10}$ aryl and 5-10 membered heteroaryl, above groups are optionally further substituted by one or more substituents selected from the group consisting of deuterium, halogen, cyano, cyclopropyl, hydroxy and $C_{1-4}$ alkoxy;

each $R_{16}$, and each $R_{17}$ are independently selected from the group consisting of hydrogen, deuterium, halogen, cyano, hydroxy, carboxyl, $C_{1-10}$ alkyl, $C_{3-10}$ cycloalkyl and $C_{1-10}$ alkoxy, above groups are optionally further substituted by one or more substituents selected from the group consisting of deuterium, halogen, cyano, cyclopropyl, hydroxy and $C_{1-4}$ alkoxy;

$R_{18}$ is selected from the group consisting of hydrogen, deuterium, halogen, cyano, hydroxy, carboxyl, $C_{1-10}$ alkyl, $C_{3-10}$ cycloalkyl, 3-10 membered heterocyclyl, $C_{1-10}$ alkoxy and $C_{3-10}$ cycloalkoxy, above groups are optionally further substituted by one or more substituents selected from the group consisting of deuterium, halogen, cyano, cyclopropyl, hydroxy and $C_{1-4}$ alkoxy;

$R_{19a}$ and $R_{20a}$ are each independently selected from the group consisting of hydrogen, deuterium, hydroxy, $C_{1-10}$ alkyl, $C_{2-10}$ alkenyl, $C_{2-10}$ alkynyl, $C_{3-10}$ cycloalkyl, $C_{3-10}$ cycloalkyl $C_{1-8}$ alkyl, 3-10 membered heterocyclyl, 3-10 membered heterocyclyl $C_{1-8}$ alkyl, $C_{5-10}$ aryl, $C_{5-10}$ aryl $C_{1-8}$ alkyl and 5-10 membered heteroaryl, or, $R_{19a}$ and $R_{20a}$, together with the nitrogen atom directly attached thereto, form 3-10 membered heterocyclyl, above groups are optionally further substituted by one or more substituents selected from the group consisting of deuterium, halogen, cyano, nitro, azido, $C_{1-10}$ alkyl, $C_{2-10}$ alkenyl, $C_{2-10}$ alkynyl, $C_{1-10}$ haloalkyl, $C_{1-10}$ deuterioalkyl, $C_{3-10}$ cycloalkyl, 3-10 membered heterocyclyl, $C_{1-10}$ aryl, 5-10 membered heteroaryl, =O, —$C_{0-8}$—S(O)$_r$R$_{21}$, —$C_{0-8}$—O—R$_{22}$, —$C_{0-8}$—C(O)OR$_{22}$, —$C_{0-8}$—C(O)R$_{23}$, —$C_{0-8}$—O—C(O)R$_{23}$, —$C_{0-8}$—NR$_{24}$R$_{25}$, —$C_{0-8}$—C(=NR$_{24}$)R$_{23}$, —$C_{0-8}$—N(R$_{24}$)—C(=NR$_{25}$)R$_{23}$, —$C_{0-8}$—C(O)NR$_{24}$R$_{25}$ and —$C_{0-8}$—N(R$_{24}$)—C(O)R$_{23}$;

$R_{19b}$ and $R_{20b}$ are each independently selected from the group consisting of hydrogen, deuterium, hydroxy, $C_{1-10}$ alkyl, $C_{2-10}$ alkenyl, $C_{2-10}$ alkynyl, $C_{3-10}$ cycloalkyl, $C_{3-10}$ cycloalkyl $C_{1-8}$ alkyl, 3-10 membered heterocyclyl, 3-10 membered heterocyclyl $C_{1-8}$ alkyl, $C_{5-10}$ aryl, $C_{5-10}$ aryl $C_{1-8}$ alkyl and 5-10 membered heteroaryl, or, $R_{19b}$ and $R_{20b}$, together with the nitrogen atom directly attached thereto, form 3-10 membered heterocyclyl, above groups are optionally further substituted by one or more substituents selected from the group consisting of deuterium, halogen, cyano, nitro, azido, $C_{1-10}$ alkyl, $C_{2-10}$ alkenyl, $C_{2-10}$ alkynyl, $C_{3-10}$ cycloalkyl, 3-10 membered heterocyclyl, $C_{5-10}$ aryl, 5-10 membered heteroaryl, =O, —$C_{0-8}$—S(O)$_r$R$_{21}$, —$C_{0-8}$—O—R$_{22}$, —$C_{0-8}$—C(O)OR$_{22}$, —$C_{0-8}$—C(O)R$_{23}$, —$C_{0-8}$—O—C(O)R$_{23}$, —$C_{0-8}$—NR$_{24}$R$_{25}$, —$C_{0-8}$—C(=NR$_{24}$)R$_{23}$, —$C_{0-8}$—N(R$_{24}$)—C(=NR$_{25}$)R$_{23}$, —$C_{0-8}$—C(O)NR$_{24}$R$_{25}$ and —$C_{0-8}$—N(R$_{24}$)—C(O)R$_{23}$, above groups are optionally more further substituted by one or more substituents selected from the group consisting of deuterium, halogen, cyano, nitro, azido, $C_{1-10}$ alkyl, $C_{2-10}$ alkenyl, $C_{2-10}$ alkynyl, $C_{1-10}$ haloalkyl, $C_{1-10}$ deuterioalkyl, $C_{3-10}$ cycloalkyl, 3-10 membered heterocyclyl, $C_{5-10}$ aryl, 5-10 membered heteroaryl, =O, —$C_{0-8}$—S(O)$_r$R$_{21}$, —$C_{0-8}$—O—R$_{22}$, —$C_{0-8}$—C(O)OR$_{22}$, —$C_{0-8}$—C(O)R$_{23}$, —$C_{0-8}$—O—C(O)R$_{23}$, —$C_{0-8}$—NR$_{24}$R$_{25}$, —$C_{0-8}$—C(=NR$_{24}$)R$_{23}$, —$C_{0-8}$—N(R$_{24}$)—C(=NR$_{25}$)R$_{23}$, —$C_{0-8}$—C(O)NR$_{24}$R$_{25}$ and —$C_{0-8}$—N(R$_{24}$)—C(O)R$_{23}$;

each $R_{21}$ is independently selected from the group consisting of hydrogen, deuterium, hydroxy, $C_{1-10}$ alkyl, $C_{2-10}$ alkenyl, $C_{3-10}$ cycloalkyl, 3-10 membered heterocyclyl, $C_{5-10}$ aryl, 5-10 membered heteroaryl and —NR$_{24}$R$_{25}$, above groups are optionally further substituted by one or more substituents selected from the group consisting of deuterium, halogen, hydroxy, carbonyl, cyano, $C_{1-10}$ alkyl, $C_{1-10}$ alkoxy, $C_{3-10}$ cycloalkyl, $C_{3-10}$ cycloalkoxy, 3-10 membered heterocyclyl, 3-10 membered heterocyclyloxy, $C_{5-10}$ aryl, $C_{5-10}$ aryloxy, 5-10 membered heteroaryl, 5-10 membered heteroaryloxy and —NR$_{24}$R$_{25}$;

each $R_{22}$ is independently selected from the group consisting of hydrogen, deuterium, $C_{1-10}$ alkyl, $C_{2-10}$ alkenyl, $C_{3-10}$ cycloalkyl, 3-10 membered heterocyclyl, $C_{5-10}$ aryl and 5-10 membered heteroaryl, above groups are optionally further substituted by one or more substituents selected from the group consisting of deuterium, halogen, hydroxy, carbonyl, cyano, $C_{1-10}$ alkyl, $C_{1-10}$ alkoxy, $C_{3-10}$ cycloalkyl, $C_{3-10}$ cycloalkoxy, 3-10 membered heterocyclyl, 3-10 membered heterocyclyloxy, $C_{5-10}$ aryl, $C_{5-10}$ aryloxy, 5-10 membered heteroaryl, 5-10 membered heteroaryloxy and —NR$_{24}$R$_{25}$;

each $R_{23}$ is independently selected from the group consisting of hydrogen, deuterium, hydroxy, $C_{1-10}$ alkyl, $C_{1-10}$ alkoxy, $C_{2-10}$ alkenyl, $C_{2-10}$ alkynyl, $C_{3-10}$ cycloalkyl, $C_{3-10}$ cycloalkoxy, 3-10 membered heterocyclyl, 3-10 membered heterocyclyloxy, $C_{5-10}$ aryl, $C_{5-10}$ aryloxy, 5-10 membered heteroaryl, 5-10 membered heteroaryloxy and $-NR_{24}R_{25}$, above groups are optionally further substituted by one or more substituents selected from the group consisting of deuterium, halogen, hydroxy, cyano, $C_{1-10}$ alkyl, $C_{1-10}$ alkoxy, $C_{3-10}$ cycloalkyl, $C_{3-10}$ cycloalkoxy, 3-10 membered heterocyclyl, 3-10 membered heterocyclyloxy, $C_{5-10}$ aryl, $C_{5-10}$ aryloxy, 5-10 membered heteroaryl, 5-10 membered heteroaryloxy and $-NR_{24}R_{25}$;

each $R_{24}$ and each $R_{25}$ are independently selected from the group consisting of hydrogen, deuterium, hydroxy, $C_{1-10}$ alkyl, $C_{2-10}$ alkenyl, $C_{2-10}$ alkynyl, $C_{3-10}$ cycloalkyl, 3-10 membered heterocyclyl, $C_{5-10}$ aryl, 5-10 membered heteroaryl, sulfonyl, methylsulfonyl, isopropylsulfonyl, cyclopropylsulfonyl, p-toluenesulfonyl, amino, monoalkylamino, dialkylamino and $C_{1-10}$ alkanoyl, above groups are optionally further substituted by one or more substituents selected from the group consisting of deuterium, halogen, hydroxy, $C_{1-8}$ alkyl, $C_{1-10}$ alkoxy, $C_{3-10}$ cycloalkyl, $C_{3-10}$ cycloalkoxy, 3-10 membered heterocyclyl, 3-10 membered heterocyclyloxy, $C_{5-10}$ aryl, $C_{5-10}$ aryloxy, 5-10 membered heteroaryl, 5-10 membered heteroaryloxy, amino, monoalkylamino, dialkylamino and $C_{1-10}$ alkanoyl;

or, $R_{24}$ and $R_{25}$, together with the nitrogen atom directly attached thereto, form 4-10 membered heterocyclyl, above group is optionally further substituted by one or more substituents selected from the group consisting of deuterium, halogen, hydroxy, $C_{1-10}$ alkyl, $C_{1-10}$ alkoxy, $C_{3-10}$ cycloalkyl, $C_{3-10}$ cycloalkoxy, 3-10 membered heterocyclyl, 3-10 membered heterocyclyloxy, $C_{5-10}$ aryl, $C_{5-10}$ aryloxy, 5-10 membered heteroaryl, 5-10 membered heteroaryloxy, amino, monoalkylamino, dialkylamino and $C_{1-10}$ alkanoyl;

each r is independently 0, 1 or 2.

In a further preferred embodiment, in the compound of formula (I), the stereoisomer, prodrug or pharmaceutically acceptable salt thereof, $L_1$ and $L_2$ are each independently $-CR_7=CR_8-$, $-NH-$ or $-NH-C(O)-$;

$R_1$ and $R_2$ are each independently selected from the group consisting of hydrogen, deuterium, halogen, cyano, hydroxy, carboxyl, $C_{1-4}$ alkyl, $C_{3-6}$ cycloalkyl and $C_{1-4}$ alkoxy, above groups are optionally further substituted by one or more substituents selected from the group consisting of deuterium, halogen, cyano, cyclopropyl, hydroxy and $C_{1-4}$ alkoxy;

$R_3$ and $R_4$ are each independently selected from the group consisting of hydrogen, deuterium, halogen, cyano, hydroxy, carboxyl, $C_{1-4}$ alkyl, $C_{3-6}$ cycloalkyl, 3-6 membered heterocyclyl, $C_{1-4}$ alkoxy and $C_{3-6}$ cycloalkoxy, above groups are optionally further substituted by one or more substituents selected from the group consisting of deuterium, halogen, cyano, cyclopropyl, hydroxy and $C_{1-4}$ alkoxy;

wherein, $R_7$ and $R_8$ are defined as in the compound of formula (I).

In a further preferred embodiment, in the compound of formula (I), the stereoisomer, prodrug or pharmaceutically acceptable salt thereof, each $R_5$ is independently selected from the group consisting of hydrogen, deuterium, halogen, cyano, hydroxy, carboxyl, $C_{1-4}$ alkyl, $C_{3-6}$ cycloalkyl and $C_{1-4}$ alkoxy, or, when m≥2, two of $R_5$, together with the carbon atom directly attached thereto, form carbonyl, $C_{3-6}$ cycloalkyl or 3-6 membered heterocyclyl, above groups are optionally further substituted by one or more substituents selected from the group consisting of deuterium, halogen, cyano, cyclopropyl, hydroxy and $C_{1-4}$ alkoxy.

In a further preferred embodiment, in the compound of formula (I), the stereoisomer, prodrug or pharmaceutically acceptable salt thereof, $R_6$ is selected from the group consisting of hydrogen, deuterium, hydroxy, $C_{1-4}$ alkyl, $C_{2-4}$ alkenyl, $C_{2-4}$ alkynyl, $C_{3-6}$ cycloalkyl, 3-6 membered heterocyclyl, $C_{5-8}$ aryl and 5-8 membered heteroaryl, above groups are optionally further substituted by one or more substituents selected from the group consisting of deuterium, halogen, cyano, $C_{1-4}$ alkyl, $C_{2-4}$ alkenyl, $C_{2-4}$ alkynyl, $C_{1-4}$ haloalkyl, $C_{1-4}$ deuterioalkyl, $C_{3-8}$ cycloalkyl, 3-6 membered heterocyclyl, $C_{5-8}$ aryl, 5-8 membered heteroaryl, =O, $-C_{0-4}-S(O)_rR_{21}$, $-C_{0-4}-O-R_{22}$, $-C_{0-4}-C(O)OR_{22}$, $-C_{0-4}-C(O)R_{23}$, $-C_{0-4}-O-C(O)R_{23}$, $-C_{0-4}-NR_{24}R_{25}$, $-C_{0-4}-C(=NR_{24})R_{23}$, $-C_{0-4}-N(R_{24})-C(=NR_{25})R_{23}$, $-C_{0-4}-C(O)NR_{24}R_{25}$ and $-C_{0-4}-N(R_{24})-C(O)R_{23}$, above groups are optionally more further substituted by one or more substituents selected from the group consisting of deuterium, halogen, cyano, $C_{1-4}$ alkyl, $C_{2-4}$ alkenyl, $C_{2-4}$ alkynyl, $C_{1-4}$ haloalkyl, $C_{1-4}$ deuterioalkyl, $C_{3-6}$ cycloalkyl, 3-6 membered heterocyclyl, $C_{5-8}$ aryl, 5-8 membered heteroaryl, =O, $-C_{0-4}-S(O)_rR_{21}$, $-C_{0-4}-O-R_{22}$, $-C_{0-4}-C(O)OR_{22}$, $-C_{0-4}-C(O)R_{23}$, $-C_{0-4}-O-C(O)R_{23}$, $-C_{0-4}-NR_{24}R_{25}$, $-C_{0-4}-C(=NR_{24})R_{23}$, $-C_{0-4}-N(R_{24})-C(=NR_{25})R_{23}$, $-C_{0-4}-C(O)NR_{24}R_{25}$ and $-C_{0-4}-N(R_{24})-C(O)R_{23}$;

wherein, $R_{21}$, $R_{22}$, $R_{23}$, $R_{24}$, $R_{25}$ and r are defined as in the compound of formula (I).

In a further preferred embodiment, in the compound of formula (I), the stereoisomer, prodrug or pharmaceutically acceptable salt thereof, the ring A is

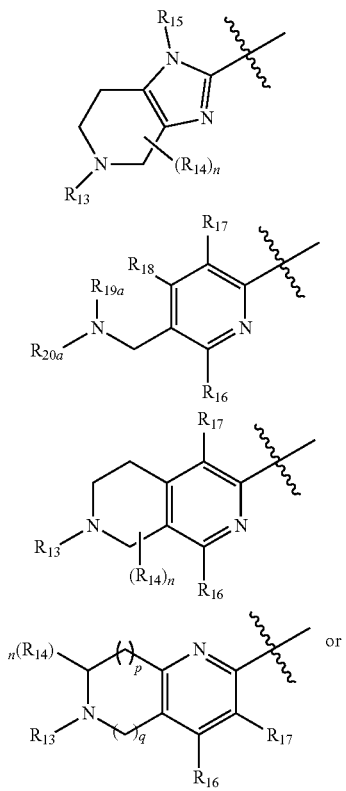

-continued

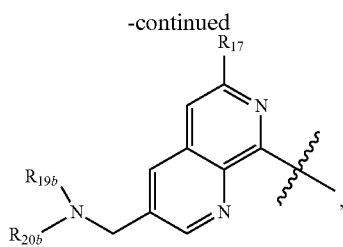

wherein, each $R_{13}$ is independently selected from the group consisting of hydrogen, deuterium, hydroxy, $C_{1-4}$ alkyl, $C_{2-4}$ alkenyl, $C_{2-4}$ alkynyl, $C_{3-6}$ cycloalkyl, 3-6 membered heterocyclyl, $C_{5-8}$ aryl and 5-8 membered heteroaryl, above groups are optionally further substituted by one or more substituents selected from the group consisting of deuterium, halogen, cyano, $C_{1-4}$ alkyl, $C_{3-8}$ cycloalkyl, 3-6 membered heterocyclyl, $C_{5-8}$ aryl, 5-8 membered heteroaryl, =O, —$C_{0-4}$—S(O)$_r$R$_{21}$, —$C_{0-4}$—O—R$_{22}$, —$C_{0-4}$—C(O)OR$_{22}$, —$C_{0-4}$—C(O)R$_{23}$, —$C_{0-4}$—O—C(O)R$_{23}$, —$C_{0-4}$—NR$_{24}$R$_{25}$, —$C_{0-4}$—C(=NR$_{24}$)R$_{23}$, —$C_{0-4}$—N(R$_{24}$)—C(=NR$_{25}$)R$_{23}$, —$C_{0-4}$—C(O)NR$_{24}$R$_{25}$ and —$C_{0-4}$—N(R$_{24}$)—C(O)R$_{23}$, above groups are optionally more further substituted by one or more substituents selected from the group consisting of deuterium, halogen, cyano, $C_{1-4}$ alkyl, $C_{2-4}$ alkenyl, $C_{2-4}$ alkynyl, $C_{1-4}$ haloalkyl, $C_{1-4}$ deuterioalkyl, $C_{3-6}$ cycloalkyl, 3-6 membered heterocyclyl, $C_{5-8}$ aryl, 5-8 membered heteroaryl, =O, —$C_{0-4}$—S(O)$_r$R$_{21}$, —$C_{0-4}$—O—R$_{22}$, —$C_{0-4}$—C(O)OR$_{22}$, —$C_{0-4}$—C(O)R$_{23}$, —$C_{0-4}$—O—C(O)R$_{23}$, —$C_{0-4}$—NR$_{24}$R$_{15}$, —$C_{0-4}$—C(=NR$_{24}$)R$_{23}$, —$C_{0-4}$—N(R$_{24}$)—C(=NR$_{25}$)R$_{23}$, —$C_{0-4}$—C(O)NR$_{24}$R$_{25}$ and —$C_{0-4}$—N(R$_{24}$)—C(O)R$_{23}$;

each $R_{14}$ is independently selected from the group consisting of hydrogen, deuterium, halogen, cyano, hydroxy, carboxyl, $C_{1-4}$ alkyl, $C_{3-6}$ cycloalkyl and $C_{1-4}$ alkoxy, or, when n≥2, two of $R_{14}$, together with the carbon atom directly attached thereto, form carbonyl, $C_{3-6}$ cycloalkyl or 3-6 membered heterocyclyl, above groups are optionally further substituted by one or more substituents selected from the group consisting of deuterium, halogen, cyano, cyclopropyl, hydroxy and $C_{1-4}$ alkoxy;

$R_{15}$ is selected from the group consisting of hydrogen, deuterium, hydroxy, $C_{1-4}$ alkyl, $C_{2-4}$ alkenyl, $C_{2-4}$ alkynyl, $C_{3-6}$ cycloalkyl, 3-6 membered heterocyclyl, $C_{5-8}$ aryl and 5-8 membered heteroaryl, above groups are optionally further substituted by one or more substituents selected from the group consisting of deuterium, halogen, cyano, cyclopropyl, hydroxy and $C_{1-4}$ alkoxy;

each $R_{16}$ and each $R_{17}$ are independently selected from the group consisting of hydrogen, deuterium, halogen, cyano, hydroxy, carboxyl, $C_{1-4}$ alkyl, $C_{3-6}$ cycloalkyl and $C_{1-4}$ alkoxy, above groups are optionally further substituted by one or more substituents selected from the group consisting of deuterium, halogen, cyano, cyclopropyl, hydroxy and $C_{1-4}$ alkoxy;

$R_{18}$ is selected from the group consisting of hydrogen, deuterium, halogen, cyano, hydroxy, carboxyl, $C_{1-4}$ alkyl, $C_{3-6}$ cycloalkyl, 3-6 membered heterocyclyl, $C_{1-4}$ alkoxy and $C_{3-6}$ cycloalkoxy, above groups are optionally further substituted by one or more substituents selected from the group consisting of deuterium, halogen, cyano, cyclopropyl, hydroxy and $C_{1-4}$ alkoxy;

$R_{19a}$ and $R_{20a}$ are each independently selected from the group consisting of hydrogen, deuterium, hydroxy, $C_{1-4}$ alkyl, $C_{2-4}$ alkenyl, $C_{2-4}$ alkynyl, $C_{3-6}$ cycloalkyl, $C_{3-6}$ cycloalkyl $C_{1-4}$ alkyl, 3-6 membered heterocyclyl, 3-6 membered heterocyclyl $C_{1-4}$ alkyl, $C_{5-8}$ aryl, $C_{5-8}$ aryl $C_{1-4}$ alkyl and 5-8 membered heteroaryl, or, $R_{19a}$ and $R_{20a}$, together with the nitrogen atom directly attached thereto, form 3-6 membered heterocyclyl, above groups are optionally further substituted by one or more substituents selected from the group consisting of deuterium, halogen, cyano, $C_{1-4}$ alkyl, $C_{2-4}$ alkynyl, $C_{1-4}$ haloalkyl, $C_{1-4}$ deuterioalkyl, $C_{3-6}$ cycloalkyl, 3-6 membered heterocyclyl, $C_{5-8}$ aryl, 5-8 membered heteroaryl, =O, —$C_{0-4}$—S(O)R$_{21}$, —$C_{0-4}$—O—R$_{22}$, —$C_{0-4}$—C(O)OR$_{22}$, —$C_{0-4}$—C(O)R$_{23}$, —$C_{0-4}$—O—C(O)R$_{23}$, —$C_{0-4}$—NR$_{24}$R$_{25}$, —$C_{0-4}$—C(=NR$_{24}$)R$_{23}$, —$C_{0-4}$—N(R$_{24}$)—C(=NR$_{25}$)R$_{23}$, —$C_{0-4}$—C(O)NR$_{24}$R$_{25}$ and —$C_{0-4}$—N(R$_{24}$)—C(O)R$_{23}$;

$R_{19b}$ and $R_{20b}$ are each independently selected from the group consisting of hydrogen, deuterium, hydroxy, $C_{1-4}$ alkyl, $C_{2-4}$ alkenyl, $C_{2-4}$ alkynyl, $C_{3-6}$ cycloalkyl, $C_{3-6}$ cycloalkyl $C_{1-4}$ alkyl, 3-6 membered heterocyclyl, 3-6 membered heterocyclyl $C_{1-4}$ alkyl, $C_{5-8}$ aryl, $C_{5-8}$ aryl $C_{1-4}$ alkyl and 5-8 membered heteroaryl, or, $R_{19b}$ and $R_{20b}$, together with the nitrogen atom directly attached thereto, form 3-6 membered heterocyclyl, above groups are optionally further substituted by one or more substituents selected from the group consisting of deuterium, halogen, cyano, nitro, azido, $C_{1-4}$ alkyl, $C_{2-4}$ alkenyl, $C_{2-4}$ alkynyl, $C_{3-6}$ cycloalkyl, 3-6 membered heterocyclyl, $C_{5-8}$ aryl, 5-8 membered heteroaryl, =O, —$C_{0-4}$—S(O)$_r$R$_{21}$, —$C_{0-4}$—O—R$_{22}$, —$C_{0-4}$—C(O)OR$_{22}$, —$C_{0-4}$—C(O)R$_{23}$, —$C_{0-4}$—O—C(O)R$_{23}$, —$C_{0-4}$—NR$_{24}$R$_{25}$, —$C_{0-4}$—C(=NR$_{24}$)R$_{23}$, —$C_{0-4}$—N(R$_{24}$)—C(=NR$_{25}$)R$_{23}$, —$C_{0-4}$—C(O)NR$_{24}$R$_{25}$ and —$C_{0-4}$—N(R$_{24}$)—C(O)R$_{23}$, above groups are optionally more further substituted by one or more substituents selected from the group consisting of deuterium, halogen, cyano, nitro, azido, $C_{1-4}$ alkyl, $C_{2-4}$ alkenyl, $C_{2-4}$ alkynyl, $C_{1-4}$ haloalkyl, $C_{1-4}$ deuterioalkyl, $C_{3-6}$ cycloalkyl, 3-6 membered heterocyclyl, $C_{5-8}$ aryl, 5-8 membered heteroaryl, =O, —$C_{0-4}$—S(O)$_r$R$_{21}$, —$C_{0-4}$—O—R$_{22}$, —$C_{0-4}$—C(O)OR$_{22}$, —$C_{0-4}$—C(O)R$_{23}$, —$C_{0-4}$—O—C(O)R$_{23}$, —$C_{0-4}$—NR$_{24}$R$_{25}$, —$C_{0-4}$—C(=NR$_{24}$)R$_{23}$, —$C_{0-4}$—N(R$_{24}$)—C(=NR$_{25}$)R$_{23}$, —$C_{0-4}$—C(O)NR$_{24}$R$_{25}$ and —$C_{0-4}$—N(R$_{24}$)—C(O)R$_{23}$;

wherein, $R_{21}$, $R_{22}$, $R_{23}$, $R_{24}$, $R_{25}$, r, n, p, and q are defined as in the compound of formula (I).

In a further preferred embodiment, in the compound of formula (I), the stereoisomer, prodrug or pharmaceutically acceptable salt thereof, the compound of formula (I) is a compound of formula (II a), formula (II b), formula (II c), formula (II d) or formula (II e):

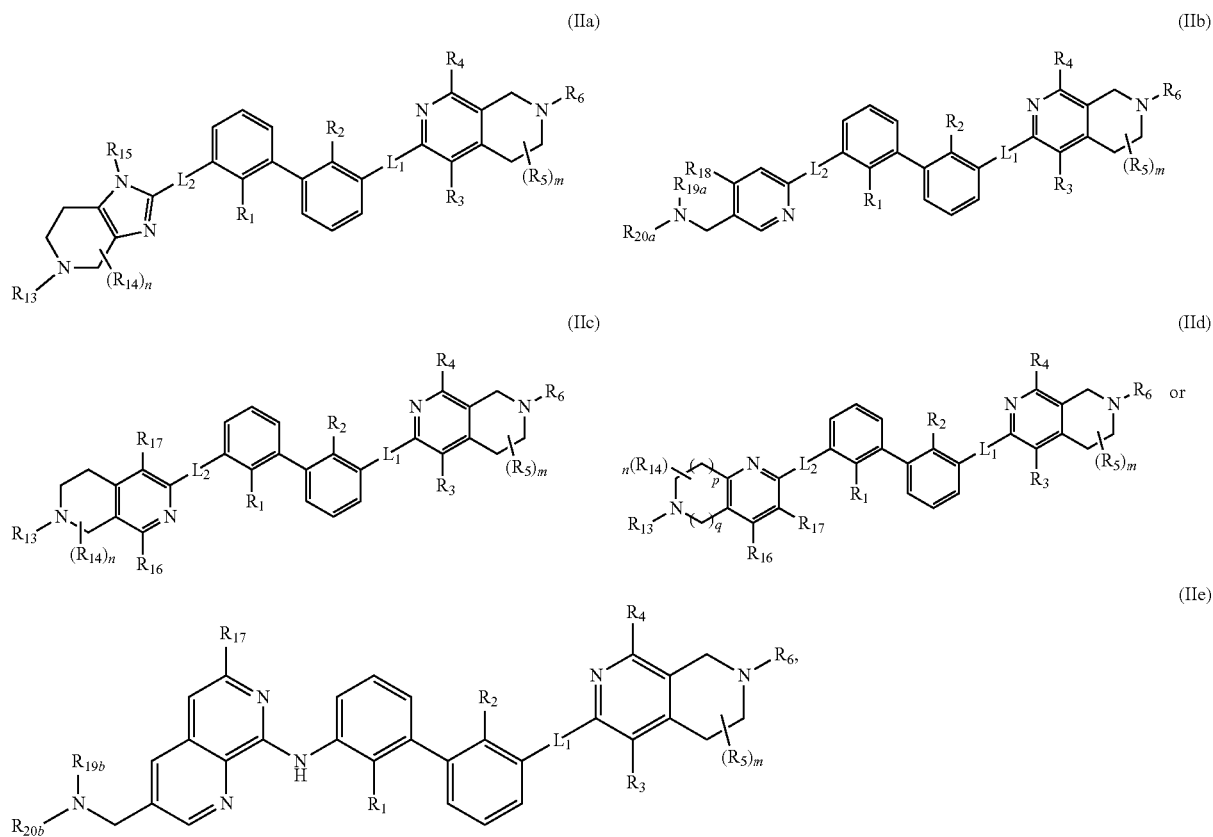

wherein, L₁ and L₂ are each independently —CR₇=CR₈— or —NH—C(O)—;

each R₁ and each R₂ are independently selected from the group consisting of hydrogen, deuterium, halogen, cyano, hydroxy, carboxyl, $C_{1-4}$ alkyl, $C_{1-4}$ haloalkyl, $C_{1-4}$ deuterioalkyl, $C_{3-6}$ cycloalkyl and $C_{1-4}$ alkoxy;

each R₃ and each R₄ are independently selected from the group consisting of hydrogen, deuterium, halogen, cyano, hydroxy, carboxyl, $C_{1-4}$ alkyl, $C_{1-4}$ haloalkyl, $C_{1-4}$ deuterioalkyl, $C_{3-6}$ cycloalkyl, 3-6 membered heterocyclyl, $C_{1-4}$ alkoxy and $C_{3-6}$ cycloalkoxy;

each R₅ is independently selected from the group consisting of hydrogen, deuterium, halogen, cyano, hydroxy, carboxyl, $C_{1-4}$ alkyl, $C_{3-6}$ cycloalkyl and $C_{1-4}$ alkoxy, above groups are optionally further substituted by one or more substituents selected from the group consisting of deuterium, halogen, cyano, cyclopropyl, hydroxy and $C_{1-4}$ alkoxy;

each R₆ is independently selected from hydrogen, deuterium, hydroxy, $C_{1-4}$ alkyl, $C_{3-6}$ cycloalkyl and 3-6 membered heterocyclyl, above groups are optionally further substituted by one or more substituents selected from the group consisting of deuterium, halogen, cyano, $C_{1-4}$ alkyl, $C_{1-4}$ haloalkyl, $C_{1-4}$ deuterioalkyl, $C_{3-8}$ cycloalkyl, 3-6 membered heterocyclyl, =O, —O—R₂₂, —C(O)OR₂₂, —C(O)R₂₃, —O—C(O)R₂₃, —NR₂₄R₂₅, —C(O)NR₂₄R₂₅ and —N(R₂₄)—C(O)R₂₃, above groups are optionally more further substituted by one or more substituents selected from the group consisting of deuterium, halogen, cyano, $C_{1-4}$ alkyl, $C_{2-4}$ alkenyl, $C_{2-4}$ alkynyl, $C_{1-4}$ haloalkyl, $C_{1-4}$ deuterioalkyl, $C_{3-6}$ cycloalkyl, 3-6 membered heterocyclyl, $C_{5-8}$ aryl, 5-8 membered heteroaryl, =O, —O—R₂₂, —C(O)OR₂₂, —C(O)R₂₃, —O—C(O)R₂₃, —NR₂₄R₂₅, —C(O)NR₂₄R₂₅ and —N(R₂₄)—C(O)R₂₃;

R₇ and R₈ are each independently selected from the group consisting of hydrogen, deuterium, fluorine, cyano, hydroxy, $C_{1-4}$ alkyl, $C_{1-4}$ haloalkyl, $C_{1-4}$ deuterioalkyl and $C_{3-6}$ cycloalkyl;

each R₁₃ is independently selected from hydrogen, deuterium, hydroxy, $C_{1-4}$ alkyl, $C_{3-6}$ cycloalkyl and 3-6 membered heterocyclyl, above groups are optionally further substituted by one or more substituents selected from the group consisting of deuterium, halogen, cyano, $C_{1-4}$ alkyl, $C_{3-8}$ cycloalkyl, 3-6 membered heterocyclyl, =O, —O—R₂₂, —C(O)OR₂₂, —C(O)R₂₃, —O—C(O)R₂₃ and —NR₂₄R₂₅, above groups are optionally more further substituted by one or more substituents selected from the group consisting of deuterium, halogen, cyano, $C_{1-4}$ alkyl, $C_{1-4}$ haloalkyl, $C_{1-4}$ deuterioalkyl, $C_{3-6}$ cycloalkyl, 3-6 membered heterocyclyl, =O, —O—R₂₂, —C(O)OR₂₂, —C(O)R₂₃, —O—C(O)R₂₃ and —NR₂₄R₂₅;

each R₁₄ is independently selected from the group consisting of hydrogen, deuterium, halogen, cyano, hydroxy, carboxyl, $C_{1-4}$ alkyl, $C_{3-6}$ cycloalkyl and $C_{1-4}$ alkoxy, above groups are optionally further substituted by one or more substituents selected from the group consisting of deuterium, halogen, cyano, cyclopropyl, hydroxy and $C_{1-4}$ alkoxy;

R₁₅ is selected from the group consisting of hydrogen, deuterium, hydroxy, $C_{1-4}$ alkyl, $C_{3-6}$ cycloalkyl, $C_{1-4}$ haloalkyl, $C_{1-4}$ deuterioalkyl, 3-6 membered heterocyclyl, $C_{5-8}$ aryl and 5-8 membered heteroaryl;

$R_{16}$ is selected from the group consisting of hydrogen, deuterium, halogen, cyano, hydroxy, carboxyl, $C_{1-4}$ alkyl, $C_{3-6}$ cycloalkyl and $C_{1-4}$ alkoxy, above groups are optionally further substituted by one or more substituents selected from the group consisting of deuterium, halogen, cyano, cyclopropyl, hydroxy and $C_{1-4}$ alkoxy;

each $R_{17}$ is independently selected from the group consisting of hydrogen, deuterium, halogen, cyano, hydroxy, carboxyl, $C_{1-4}$ alkyl, $C_{3-6}$ cycloalkyl and $C_{1-4}$ alkoxy, above groups are optionally further substituted by one or more substituents selected from the group consisting of deuterium, halogen, cyano, cyclopropyl, hydroxy and $C_{1-4}$ alkoxy;

$R_{18}$ is selected from the group consisting of hydrogen, deuterium, halogen, cyano, hydroxy, carboxyl, $C_{1-4}$ alkyl, $C_{3-6}$ cycloalkyl, $C_{1-4}$ haloalkyl, $C_{1-4}$ deuterioalkyl, 3-6 membered heterocyclyl, $C_{1-4}$ alkoxy and $C_{3-6}$ cycloalkoxy;

$R_{19a}$ and $R_{20a}$ are each independently selected from the group consisting of hydrogen, deuterium, hydroxy, $C_{1-4}$ alkyl, $C_{3-6}$ cycloalkyl, $C_{3-6}$ cycloalkyl $C_{1-4}$ alkyl, 3-6 membered heterocyclyl and 3-6 membered heterocyclyl $C_{1-4}$ alkyl, or, $R_{19a}$ and $R_{20a}$, together with the nitrogen atom directly attached thereto, form 3-6 membered heterocyclyl, above groups are optionally further substituted by one or more substituents selected from the group consisting of deuterium, halogen, cyano, $C_{1-4}$ alkyl, $C_{2-4}$ alkynyl, $C_{1-4}$ haloalkyl, $C_{1-4}$ deuterioalkyl, $C_{3-6}$ cycloalkyl, 3-6 membered heterocyclyl, =O, —O—$R_{22}$, —C(O)O$R_{22}$, —C(O)$R_{23}$, —O—C(O)$R_{23}$, —NR$_{24}$R$_{25}$, —C(=NR$_{24}$)R$_{23}$, —N(R$_{24}$)—C(=NR$_{25}$)R$_{23}$, —C(O)NR$_{24}$R$_{25}$ and —N(R$_{24}$)—C(O)R$_{23}$;

$R_{19b}$ and $R_{20b}$ are each independently selected from the group consisting of hydrogen, deuterium, hydroxy, $C_{1-4}$ alkyl, $C_{3-6}$ cycloalkyl, $C_{3-6}$ cycloalkyl $C_{1-4}$ alkyl, 3-6 membered heterocyclyl, 3-6 membered heterocyclyl $C_{1-4}$ alkyl, $C_{5-8}$ aryl, $C_{5-8}$ aryl $C_{1-4}$ alkyl and 5-8 membered heteroaryl, or, $R_{19b}$ and $R_{20b}$, together with the nitrogen atom directly attached thereto, form 3-6 membered heterocyclyl, above groups are optionally further substituted by one or more substituents selected from the group consisting of deuterium, halogen, cyano, $C_{1-4}$ alkyl, $C_{2-4}$ alkenyl, $C_{2-4}$ alkynyl, $C_{3-6}$ cycloalkyl, 3-6 membered heterocyclyl, $C_{5-8}$ aryl, 5-8 membered heteroaryl, =O, —S(O)$_r$R$_{21}$, —O—R$_{22}$, —C(O)OR$_{22}$, —C(O)R$_{23}$, —O—C(O)R$_{23}$, —NR$_{24}$R$_{25}$, —C(=NR$_{24}$)R$_{23}$, —N(R$_{24}$)—C(=NR$_{25}$)R$_{23}$, —C(O)NR$_{24}$R$_{25}$ and —N(R$_{24}$)—C(O)R$_{23}$, above groups are optionally more further substituted by one or more substituents selected from the group consisting of deuterium, halogen, cyano, $C_{1-4}$ alkyl, $C_{2-4}$ alkenyl, $C_{2-4}$ alkynyl, $C_{1-4}$ haloalkyl, $C_{1-4}$ deuterioalkyl, $C_{3-6}$ cycloalkyl, 3-6 membered heterocyclyl, $C_{5-8}$ aryl, 5-8 membered heteroaryl, =O, —S(O)$_r$R$_{21}$, —O—R$_{22}$, —C(O)OR$_{22}$, —C(O)R$_{23}$, —O—C(O)R$_{23}$, —NR$_{24}$R$_{25}$, —C(=NR$_{24}$)R$_{23}$, —N(R$_{24}$)—C(=NR$_{25}$)R$_{23}$, —C(O)NR$_{24}$R$_{25}$ and —N(R$_{24}$)—C(O)R$_{23}$;

wherein, $R_{21}$, $R_{22}$, $R_{23}$, $R_{24}$, $R_{25}$, m, n, r, p and q are defined as in the compound of formula (I).

In a more further preferred embodiment, in the compound of formula (I), the stereoisomer, prodrug or pharmaceutically acceptable salt thereof, the compound of formula (I) is a compound of formula (IIIa), formula (IIIb), formula (IIIc), formula (IIId) or formula (IIIe):

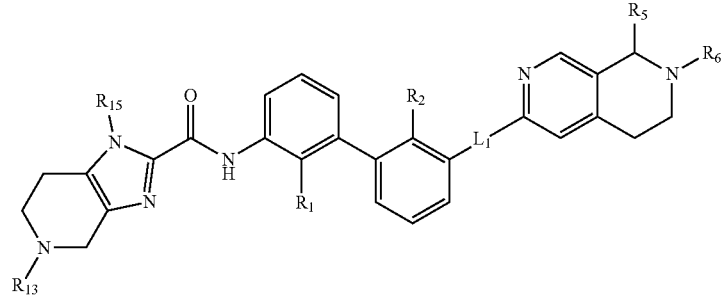

(IIIa)

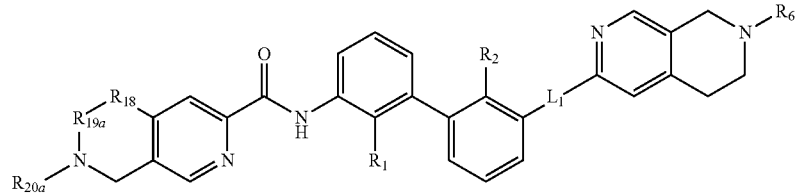

(IIIb)

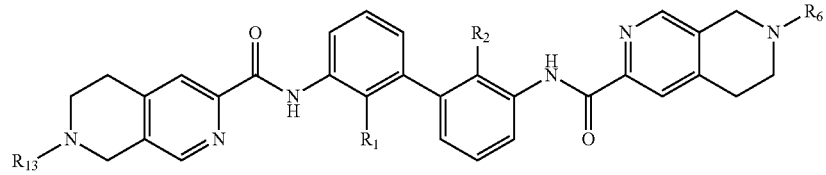

(IIIc)

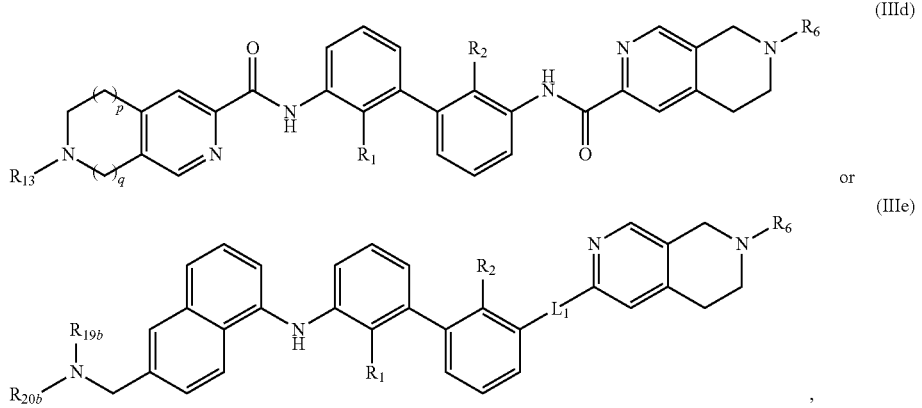

wherein, each $L_1$ is independently —CH=CF— or —NH—C(O)—;

each $R_1$ and each $R_2$ are independently selected from the group consisting of hydrogen, deuterium, fluorine, chlorine, cyano, hydroxy, carboxyl, $C_{1-4}$ alkyl, $C_{1-4}$ haloalkyl, $C_{1-4}$ deuterioalkyl, $C_{3-6}$ cycloalkyl and $C_{1-4}$ alkoxy;

$R_5$ is selected from the group consisting of hydrogen, deuterium, halogen, cyano, hydroxy, carboxyl, $C_{1-4}$ alkyl, $C_{1-4}$ haloalkyl, $C_{1-4}$ deuterioalkyl, $C_{3-6}$ cycloalkyl and $C_{1-4}$ alkoxy;

each $R_6$ is independently selected from the group consisting of hydrogen, deuterium, hydroxy, $C_{1-4}$ alkyl, $C_{3-6}$ cycloalkyl and 3-6 membered heterocyclyl, above groups are optionally further substituted by one or more substituents selected from the group consisting of deuterium, halogen, cyano, $C_{1-4}$ alkyl, $C_{1-4}$ haloalkyl, $C_{1-4}$ deuterioalkyl, $C_{3-8}$ cycloalkyl, 3-6 membered heterocyclyl, =O, —O—$R_{22}$, —C(O)O$R_{22}$, —C(O)$R_{23}$, —O—C(O)$R_{23}$, —N$R_{24}R_{25}$, —C(O)N$R_{24}R_{25}$ and —N($R_{24}$)—C(O)$R_{23}$, above groups are optionally more further substituted by one or more substituents selected from the group consisting of deuterium, halogen, cyano, $C_{1-4}$ alkyl, $C_{2-4}$ alkenyl, $C_{2-4}$ alkynyl, $C_{1-4}$ haloalkyl, $C_{1-4}$ deuterioalkyl, $C_{3-6}$ cycloalkyl, 3-6 membered heterocyclyl, $C_{5-8}$ aryl, 5-8 membered heteroaryl, =O, —O—$R_{22}$, —C(O)O$R_{22}$, —C(O)$R_{23}$, —O—C(O)$R_{23}$, —N$R_{24}R_{25}$, —C(O)N$R_{24}R_{25}$ and —N($R_{24}$)—C(O)$R_{23}$;

each $R_{13}$ is independently hydrogen, deuterium, hydroxy, $C_{1-4}$ alkyl, $C_{3-6}$ cycloalkyl or 3-6 membered heterocyclyl, above groups are optionally further substituted by one or more substituents selected from the group consisting of deuterium, halogen, cyano, $C_{1-4}$ alkyl, $C_{3-8}$ cycloalkyl, 3-6 membered heterocyclyl, =O, —O—$R_{22}$, —C(O)O$R_{22}$, —C(O)$R_{23}$, —O—C(O)$R_{23}$ and —N$R_{24}R_{25}$, above groups are optionally more further substituted by one or more substituents selected from the group consisting of deuterium, halogen, cyano, $C_{1-4}$ alkyl, $C_{1-4}$ haloalkyl, $C_{1-4}$ deuterioalkyl, $C_{3-6}$ cycloalkyl, 3-6 membered heterocyclyl, =O, —O—$R_{22}$, —C(O)O$R_{22}$, —C(O)$R_{23}$, —O—C(O)$R_{23}$ and —N$R_{24}R_{25}$;

$R_{15}$ is selected from the group consisting of hydrogen, deuterium, hydroxy, $C_{1-4}$ alkyl, $C_{3-6}$ cycloalkyl, $C_{1-4}$ haloalkyl, $C_{1-4}$ deuterioalkyl, 3-6 membered heterocyclyl, $C_{5-8}$ aryl and 5-8 membered heteroaryl;

$R_{18}$ is selected from the group consisting of hydrogen, deuterium, halogen, cyano, hydroxy, carboxyl, $C_{1-4}$ alkyl, $C_{3-6}$ cycloalkyl, $C_{1-4}$ haloalkyl, $C_{1-4}$ deuterioalkyl, 3-6 membered heterocyclyl, $C_{1-4}$ alkoxy and $C_{3-6}$ cycloalkoxy;

$R_{19a}$ and $R_{20a}$ are each independently selected from the group consisting of hydrogen, deuterium, hydroxy, $C_{1-4}$ alkyl, $C_{3-6}$ cycloalkyl, $C_{3-6}$ cycloalkyl $C_{1-4}$ alkyl, 3-6 membered heterocyclyl and 3-6 membered heterocyclyl $C_{1-4}$ alkyl, or, $R_{19a}$ and $R_{20a}$, together with the nitrogen atom directly attached thereto, form 3-6 membered heterocyclyl, above groups are optionally further substituted by one or more substituents selected from the group consisting of deuterium, halogen, cyano, $C_{1-4}$ alkyl, $C_{2-4}$ alkynyl, $C_{1-4}$ haloalkyl, $C_{1-4}$ deuterioalkyl, $C_{3-6}$ cycloalkyl, 3-6 membered heterocyclyl, =O, —O—$R_{22}$, —C(O)O$R_{22}$, —C(O)$R_{23}$, —O—C(O)$R_{23}$, —N$R_{24}R_{25}$, —C(O)N$R_{24}R_{25}$ and —N($R_{24}$)—C(O)$R_{23}$;

$R_{19b}$ and $R_{20b}$ are each independently selected from the group consisting of hydrogen, deuterium, hydroxy, $C_{1-4}$ alkyl, $C_{3-6}$ cycloalkyl, 3-6 membered heterocyclyl, $C_{5-8}$ aryl and 5-8 membered heteroaryl, or, $R_{19b}$ and $R_{20b}$, together with the nitrogen atom directly attached thereto, form 3-6 membered heterocyclyl, above groups are optionally further substituted by one or more substituents selected from the group consisting of deuterium, halogen, cyano, $C_{1-4}$ alkyl, $C_{2-4}$ alkenyl, $C_{2-4}$ alkynyl, $C_{3-6}$ cycloalkyl, 3-6 membered heterocyclyl, $C_{1-8}$ aryl, 5-8 membered heteroaryl, =O, —O—$R_{22}$, —C(O)O$R_{22}$, —C(O)$R_{23}$, —O—C(O)$R_{23}$, —N$R_{24}R_{25}$, —C(O)N$R_{24}R_{25}$ and —N($R_{24}$)—C(O)$R_{23}$, above groups are optionally more further substituted by one or more substituents selected from the group consisting of deuterium, halogen, cyano, $C_{1-4}$ alkyl, $C_{2-4}$ alkenyl, $C_{2-4}$ alkynyl, $C_{1-4}$ haloalkyl, $C_{1-4}$ deuterioalkyl, $C_{3-6}$ cycloalkyl, 3-6 membered heterocyclyl, $C_{5-8}$ aryl, 5-8 membered heteroaryl, =O, —O—$R_{22}$, —C(O)O$R_{22}$, —C(O)$R_{23}$, —O—C(O)$R_{23}$, —N$R_{24}R_{25}$, —C(O)N$R_{24}R_{25}$ and —N($R_{24}$)—C(O)$R_{23}$;

wherein, $R_{22}$, $R_{23}$, $R_{24}$, $R_{25}$, p and q are defined as in the compound of formula (I).

In a more further preferred embodiment, in the compound of formula (I), the stereoisomer, prodrug or pharmaceutically acceptable salt thereof, each $R_{22}$ is independently selected from the group consisting of hydrogen, deuterium, $C_{1-4}$ alkyl, $C_{2-4}$ alkenyl, $C_{3-6}$ cycloalkyl, 3-6 membered heterocyclyl, $C_{5-8}$ aryl and 5-8 membered heteroaryl, above groups are optionally further substituted by one or more substituents selected from the group consisting of deuterium, halogen, hydroxy, carbonyl, cyano, $C_{1-4}$ alkyl, $C_{1-4}$ alkoxy, $C_{3-6}$ cycloalkyl, $C_{3-6}$ cycloalkoxy, 3-6 membered heterocyclyl, 3-6 membered heterocyclyloxy, $C_{5-8}$ aryl, $C_{5-8}$ aryloxy, 5-8 membered heteroaryl, 5-8 membered heteroaryloxy and $-NR_{24}R_{25}$;

- each $R_{23}$ is independently selected from the group consisting of hydrogen, deuterium, hydroxy, $C_{1-4}$ alkyl, $C_{1-4}$ alkoxy, $C_{2-4}$ alkenyl, $C_{2-4}$ alkynyl, $C_{3-6}$ cycloalkyl, $C_{3-6}$ cycloalkoxy, 3-6 membered heterocyclyl, 3-6 membered heterocyclyloxy, $C_{5-8}$ aryl, $C_{5-8}$ aryloxy, 5-8 membered heteroaryl, 5-8 membered heteroaryloxy and $-NR_{24}R_{25}$, above groups are optionally further substituted by one or more substituents selected from the group consisting of deuterium, halogen, hydroxy, cyano, $C_{1-4}$ alkyl, $C_{1-4}$ alkoxy, $C_{3-6}$ cycloalkyl, $C_{3-6}$ cycloalkoxy, 3-6 membered heterocyclyl, 3-6 membered heterocyclyloxy, $C_{5-8}$ aryl, $C_{5-8}$ aryloxy, 5-8 membered heteroaryl, 5-8 membered heteroaryloxy and $-NR_{24}R_{25}$;
- each $R_{24}$ and each $R_{25}$ are independently selected from the group consisting of hydrogen, deuterium, hydroxy, $C_{1-4}$ alkyl, $C_{2-4}$ alkenyl, $C_{2-4}$ alkynyl, $C_{3-6}$ cycloalkyl, 3-6 membered heterocyclyl, $C_{5-8}$ aryl, 5-8 membered heteroaryl, sulfonyl, methylsulfonyl, isopropylsulfonyl, cyclopropylsulfonyl, p-toluenesulfonyl, amino, monoalkylamino, dialkylamino and $C_{1-4}$ alkanoyl, above groups are optionally further substituted by one or more substituents selected from the group consisting of deuterium, halogen, hydroxy, $C_{1-4}$ alkyl, $C_{1-4}$ alkoxy, $C_{3-6}$ cycloalkyl, $C_{3-6}$ cycloalkoxy, 3-6 membered heterocyclyl, 3-6 membered heterocyclyloxy, $C_{5-8}$ aryl, $C_{5-8}$ aryloxy, 5-8 membered heteroaryl, 5-8 membered heteroaryloxy, amino, monoalkylamino, dialkylamino and $C_{1-4}$ alkanoyl;
- or, $R_{24}$ and $R_{25}$, together with the nitrogen atom directly attached thereto, form 4-8 membered heterocyclyl, above group is optionally further substituted by one or more substituents selected from the group consisting of deuterium, halogen, hydroxy, $C_{1-4}$ alkyl, $C_{1-4}$ alkoxy, $C_{3-6}$ cycloalkyl, $C_{3-6}$ cycloalkoxy, 3-6 membered heterocyclyl, 3-6 membered heterocyclyloxy, $C_{5-8}$ aryl, $C_{5-8}$ aryloxy, 5-8 membered heteroaryl, 5-8 membered heteroaryloxy, amino, monoalkylamino, dialkylamino and $C_{1-4}$ alkanoyl.

In a most preferred embodiment, the compound of formula (I), the stereoisomer, prodrug or pharmaceutically acceptable salt thereof comprises, but is not limited to, the following compounds:

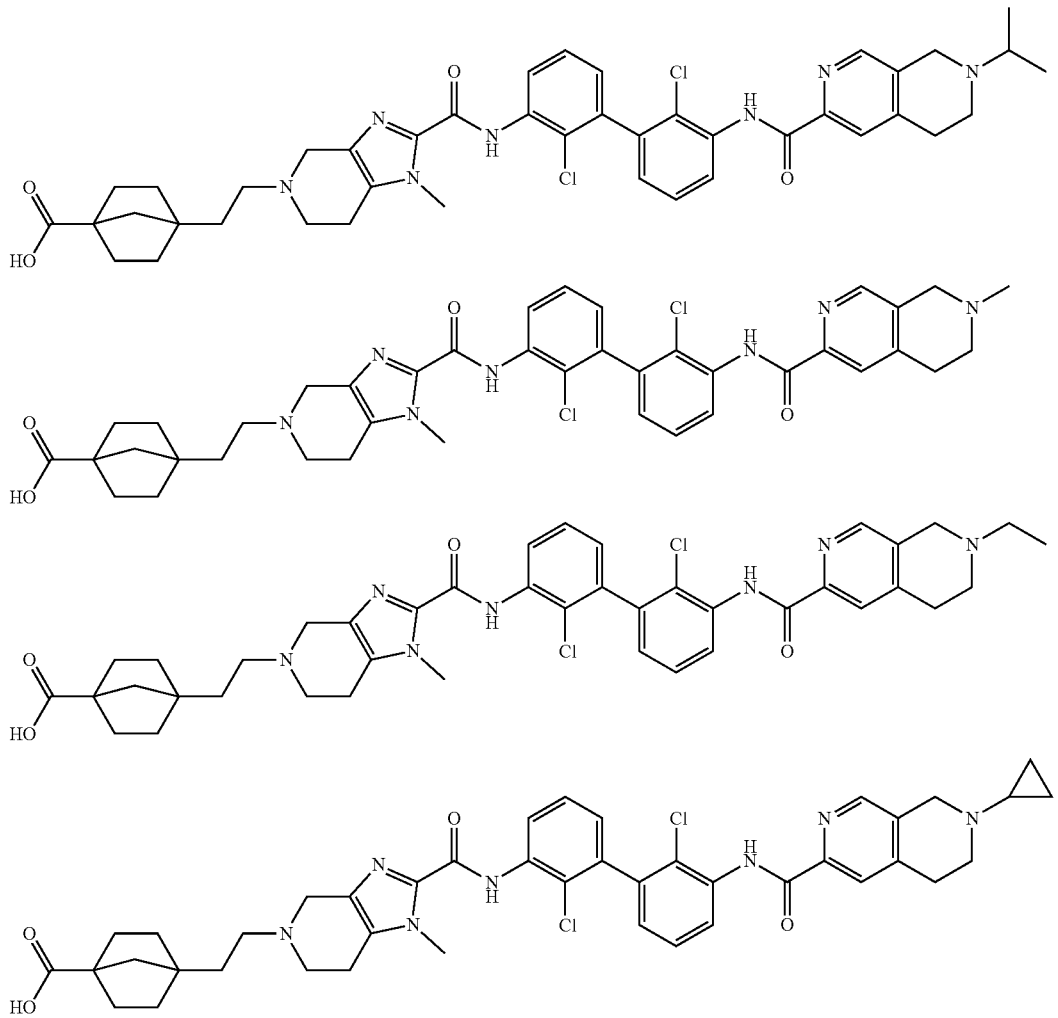

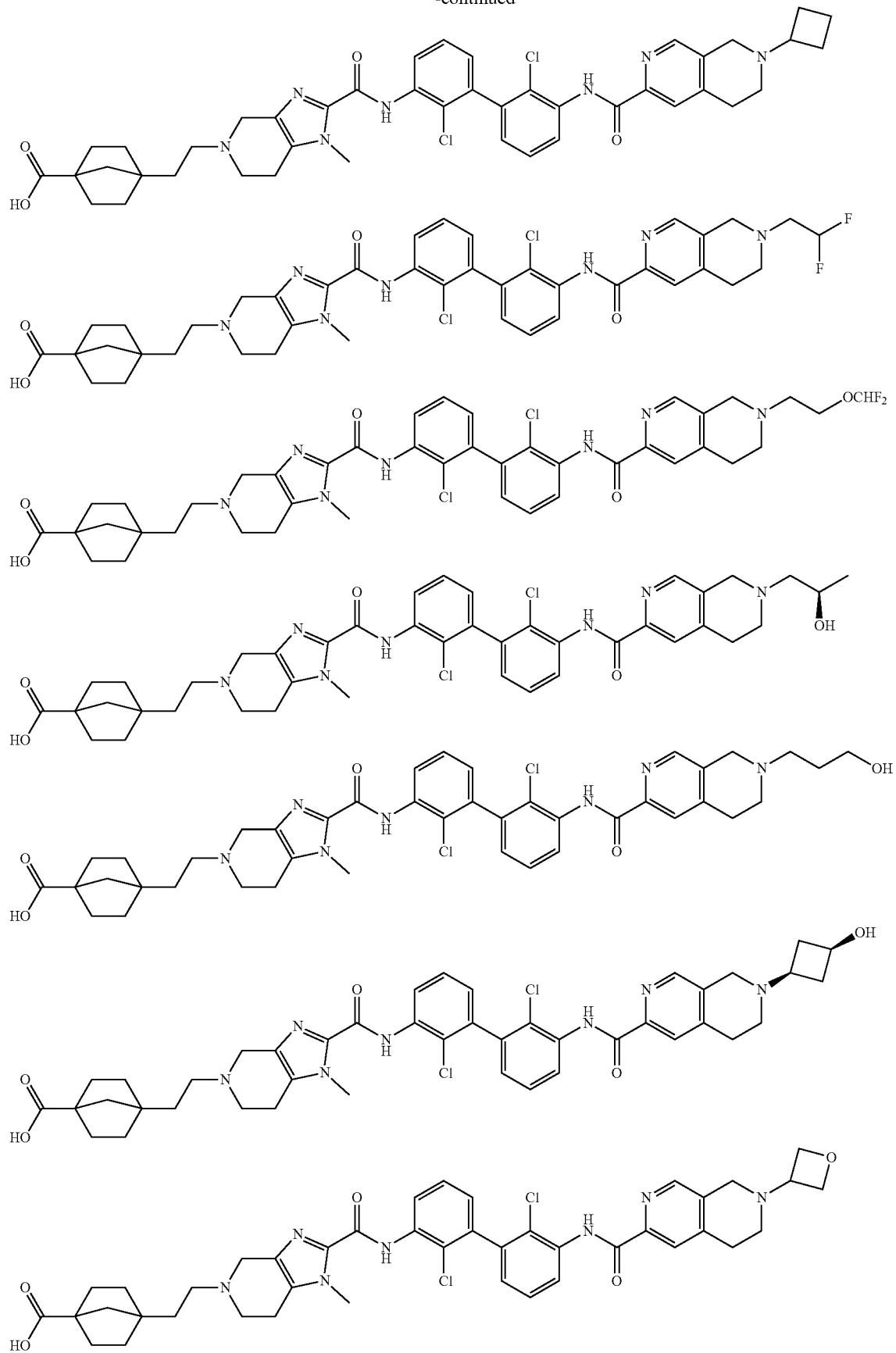

-continued
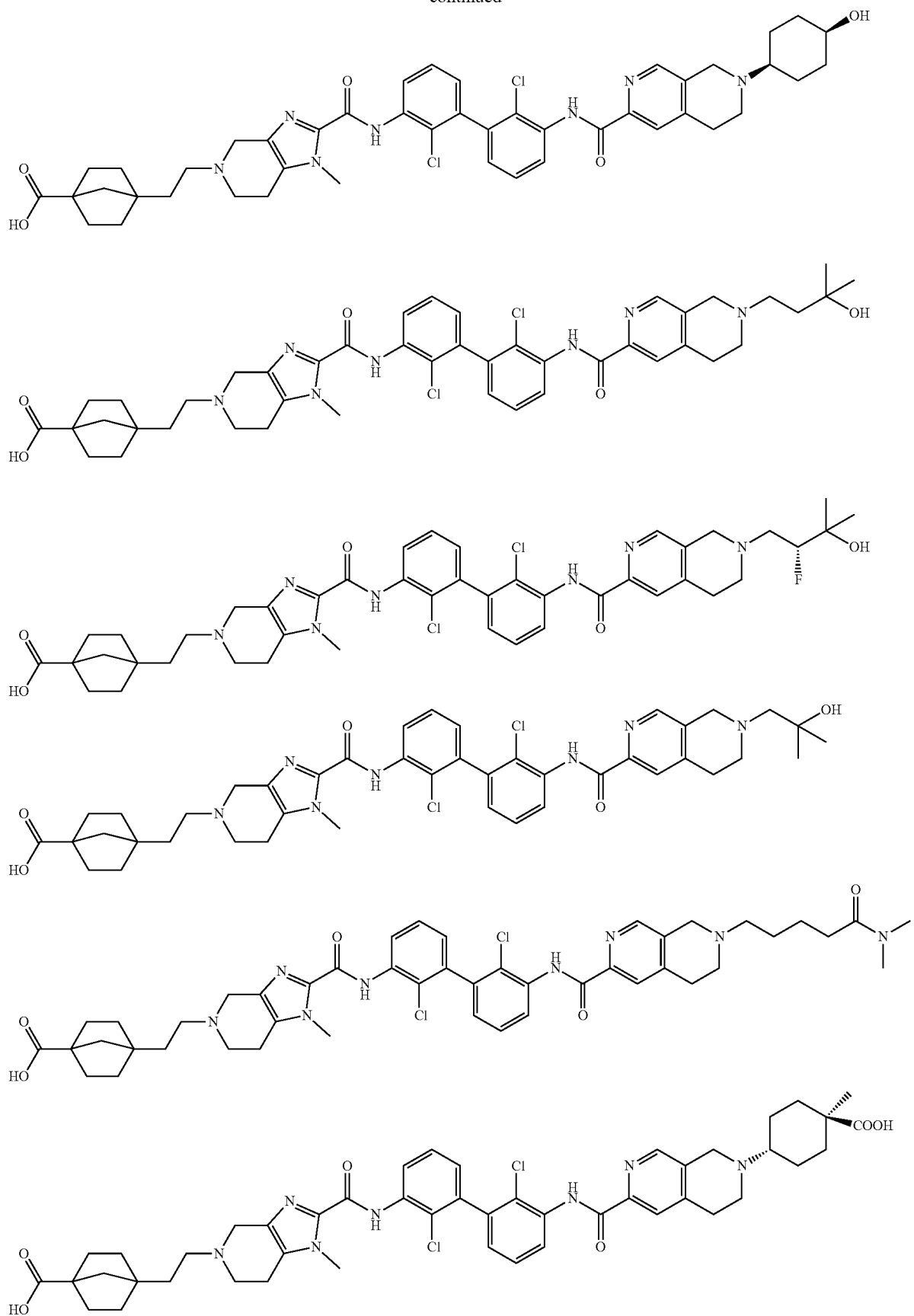

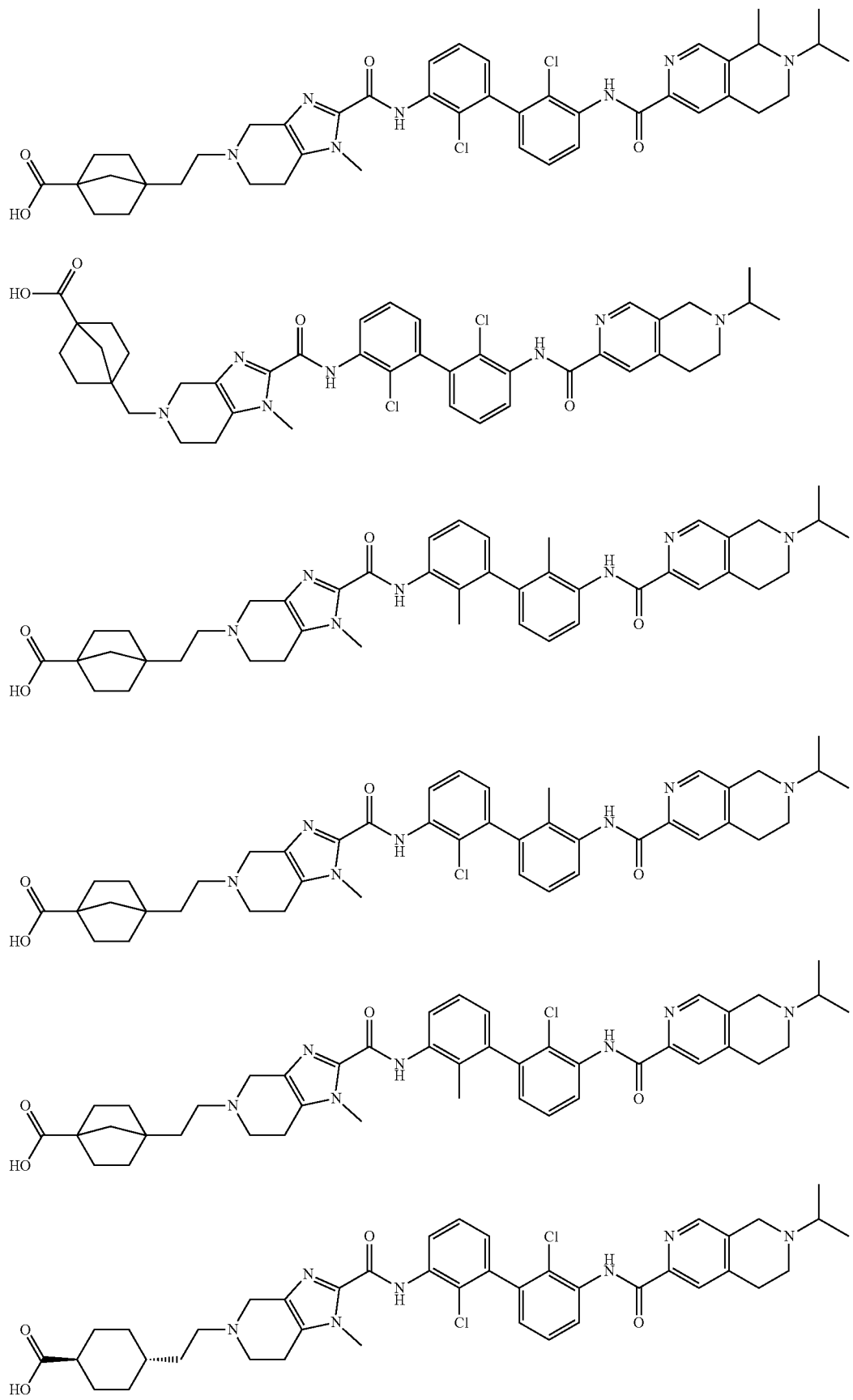

-continued
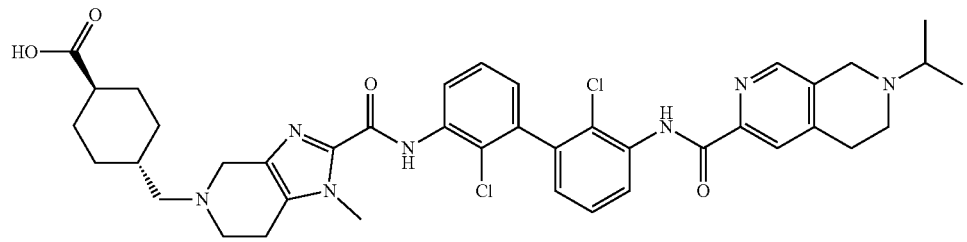
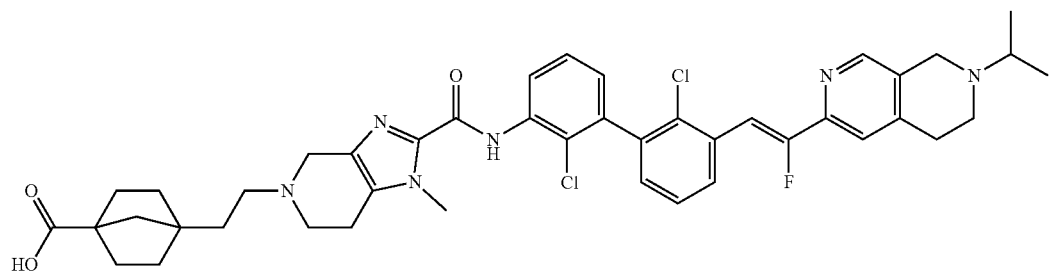
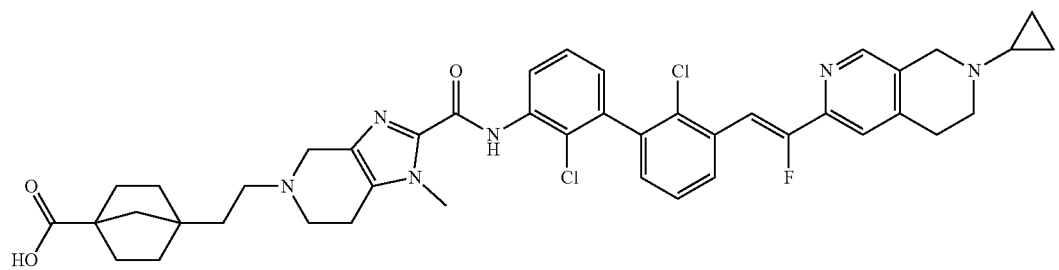
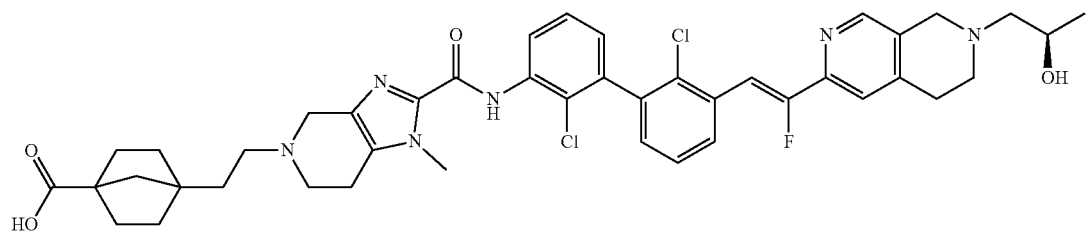
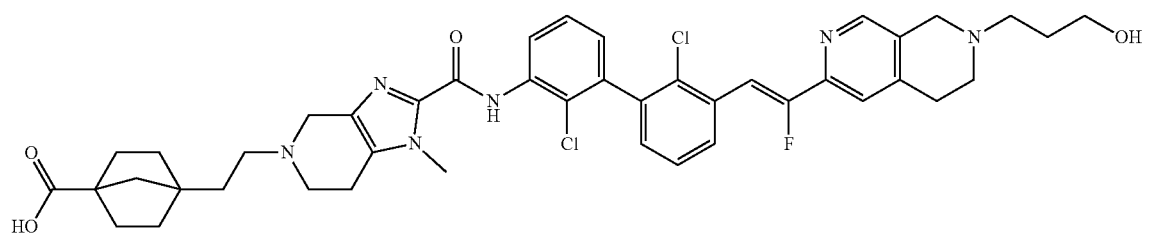
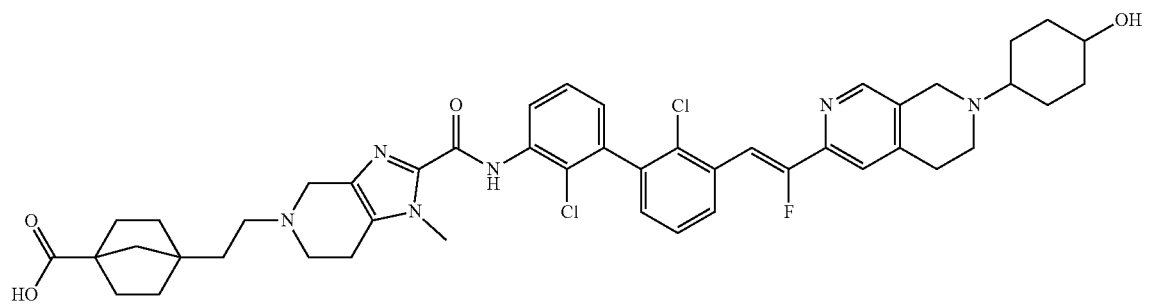

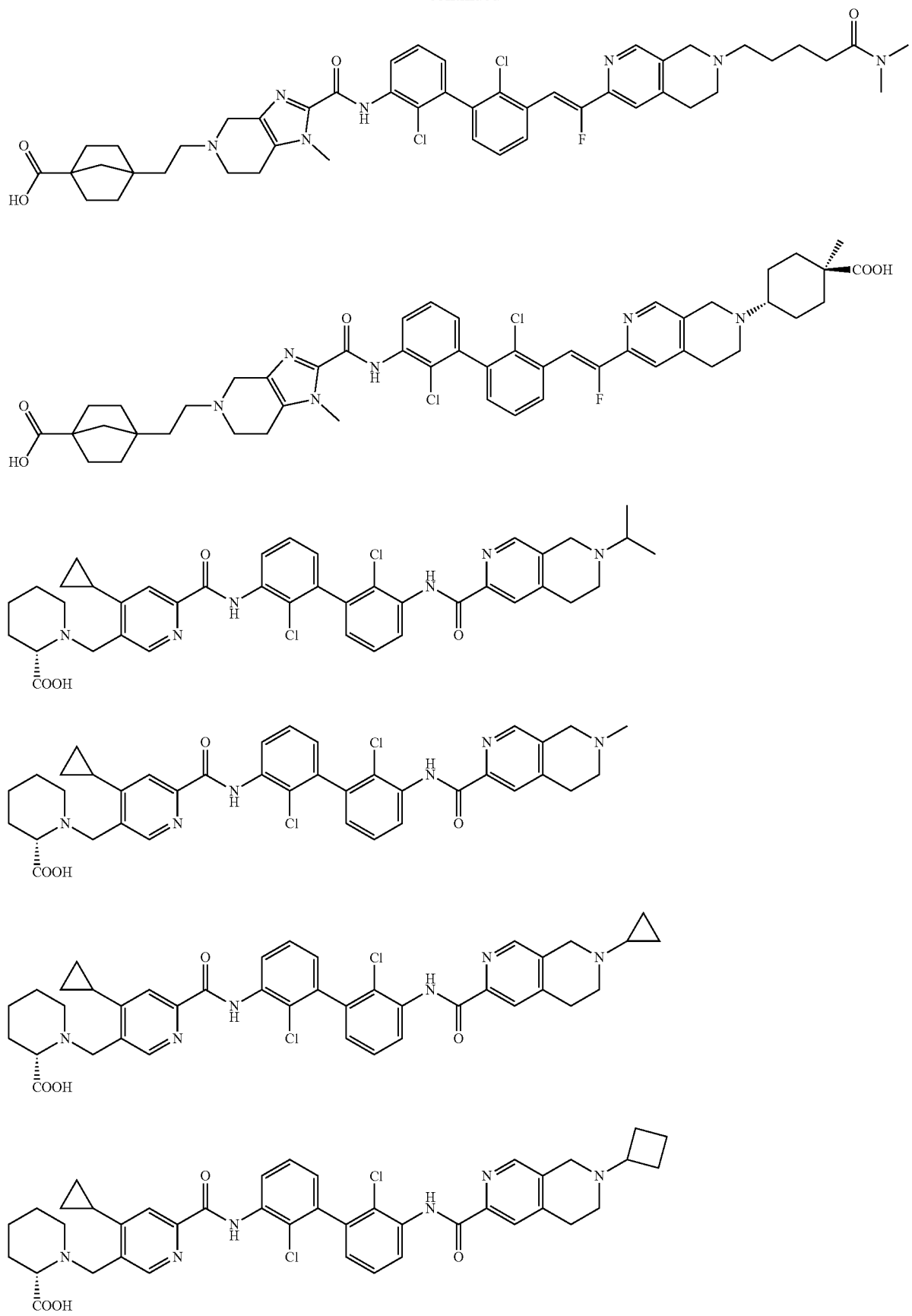

-continued
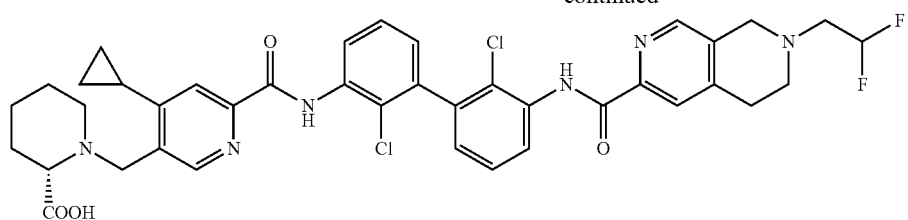
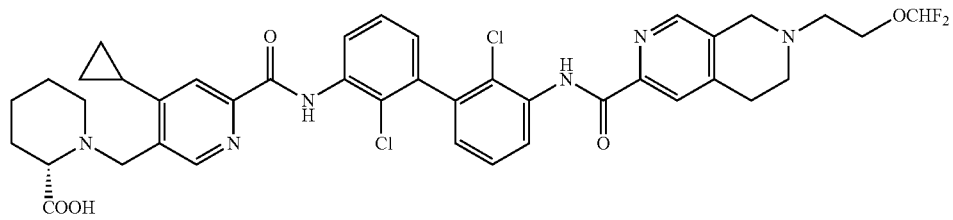
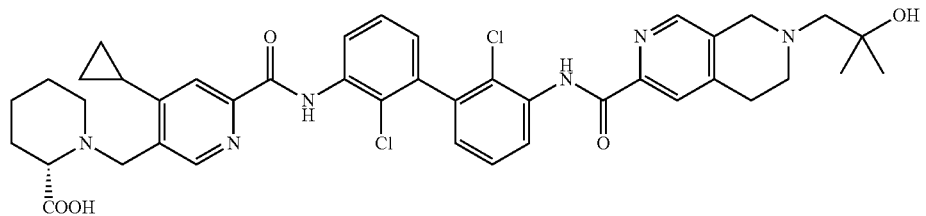
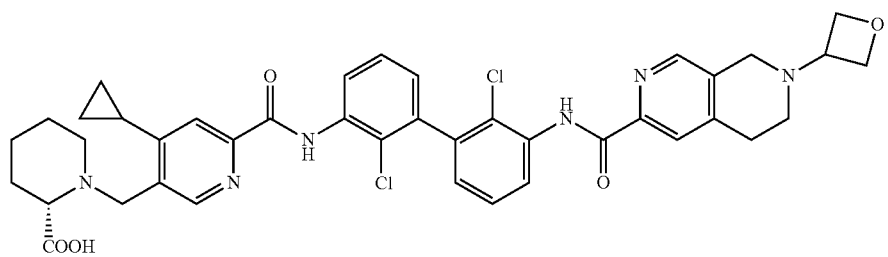
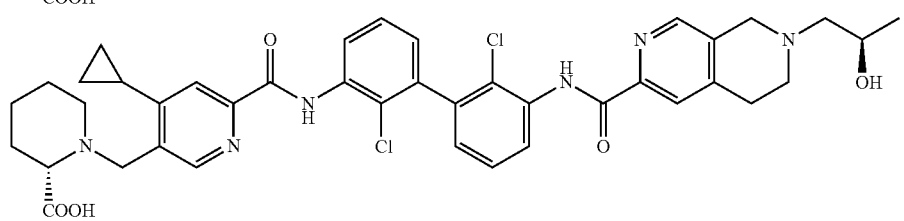
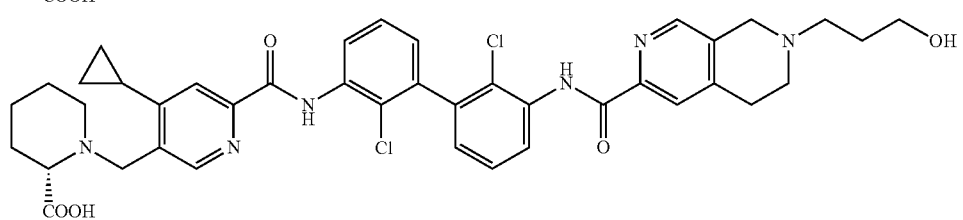
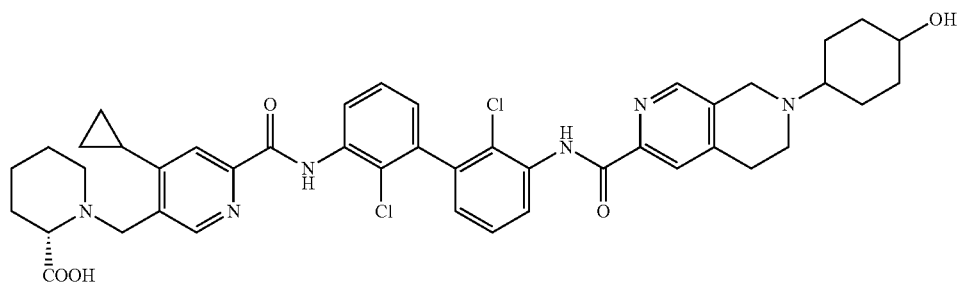

-continued
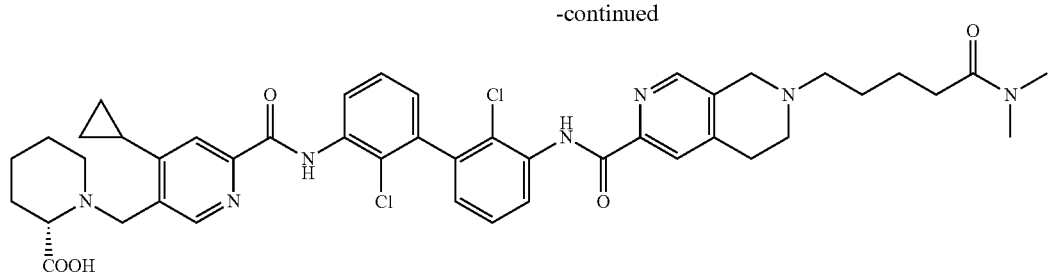
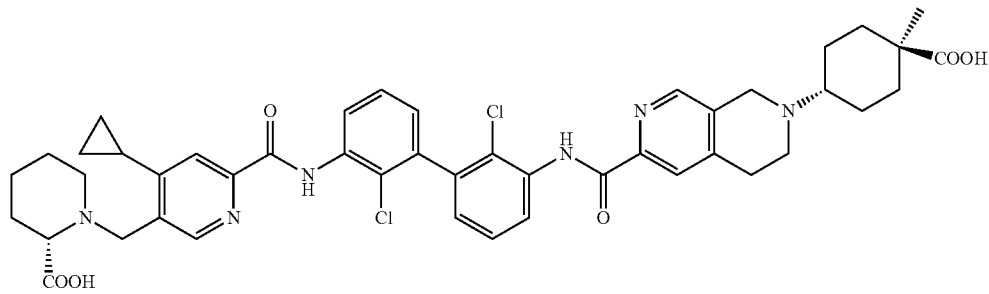
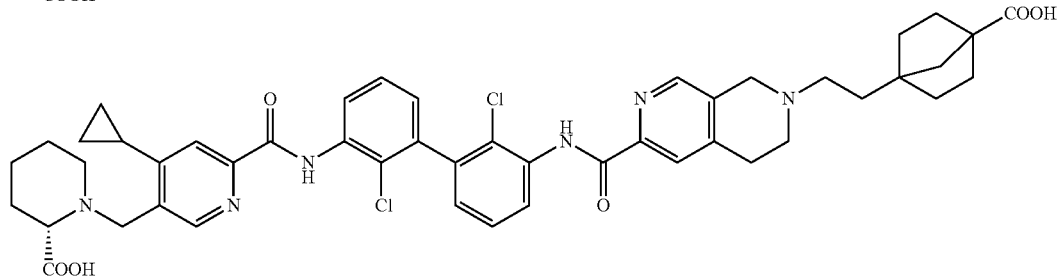
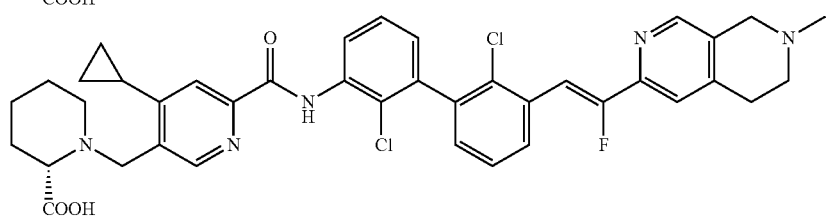
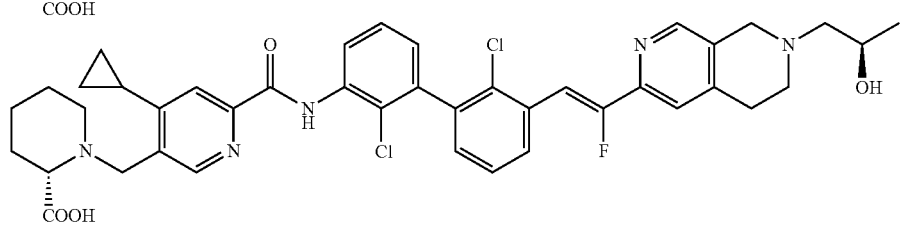
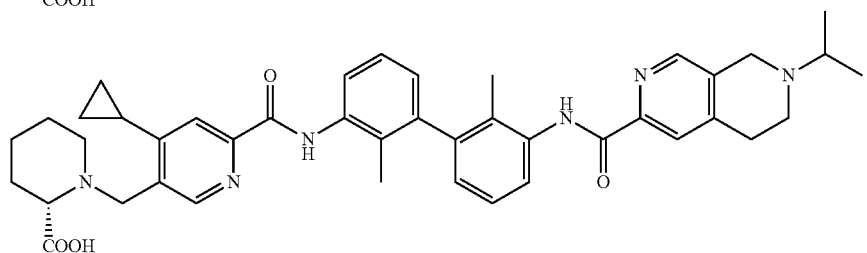
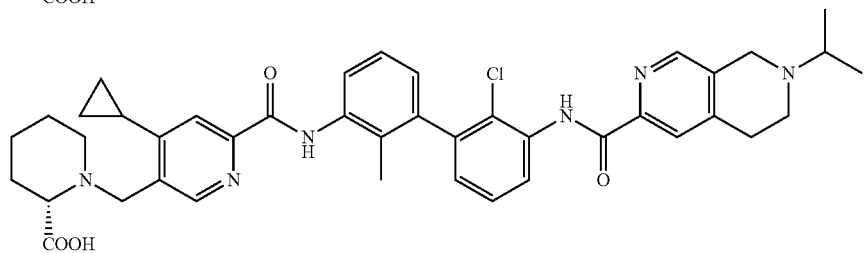

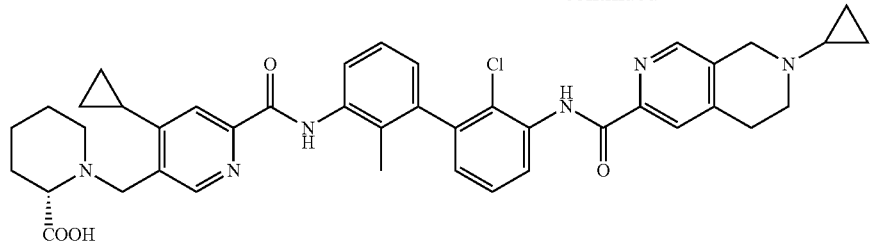
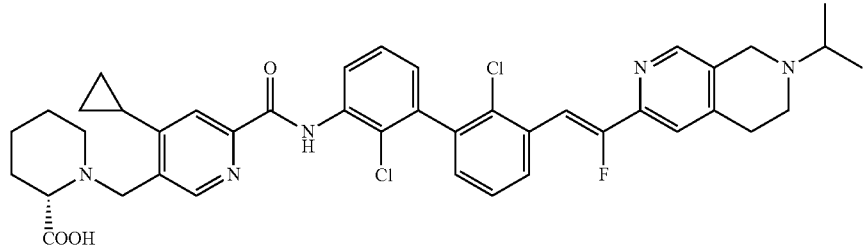
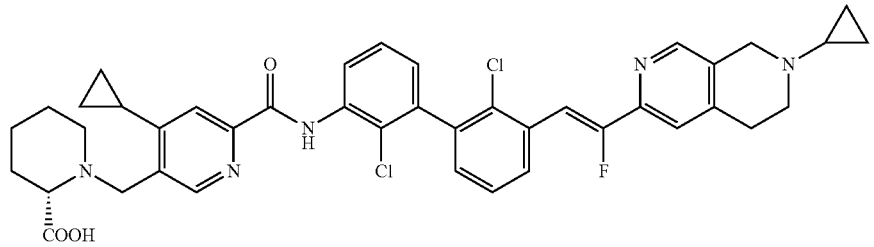
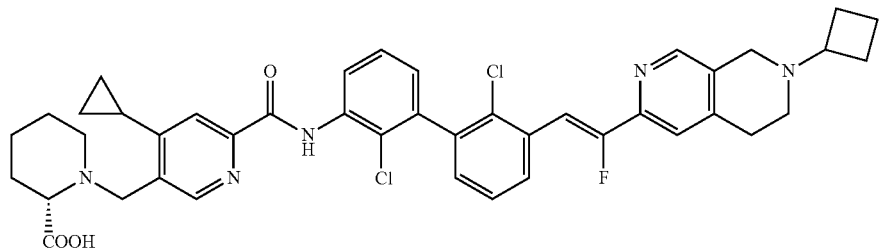
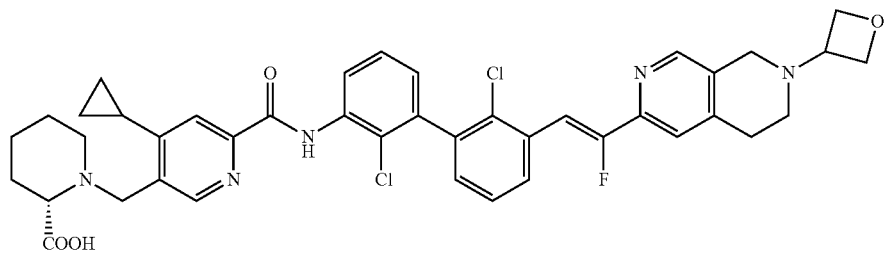
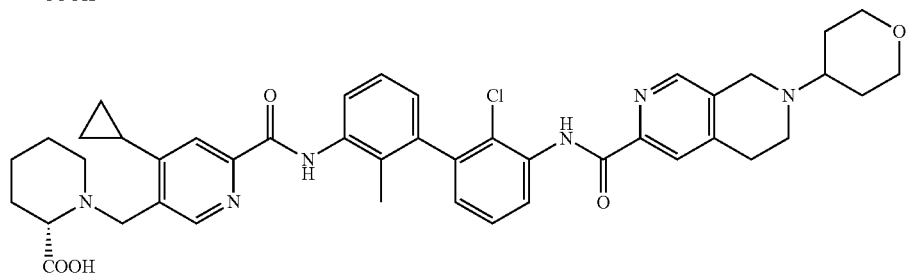
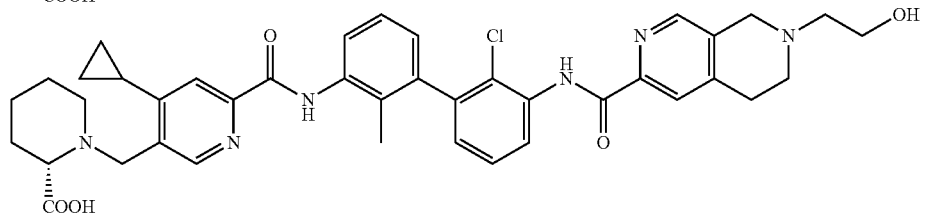

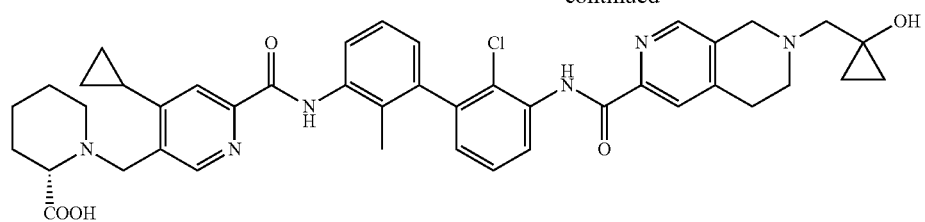
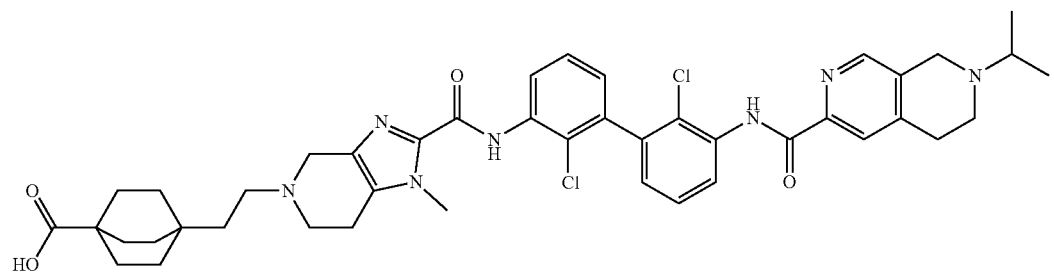
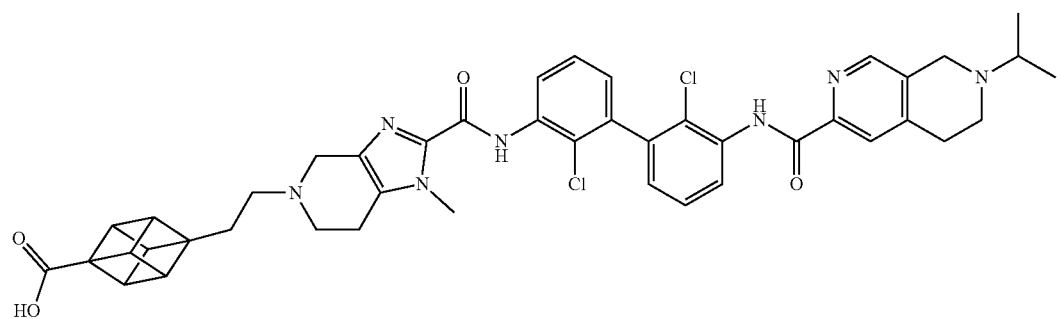
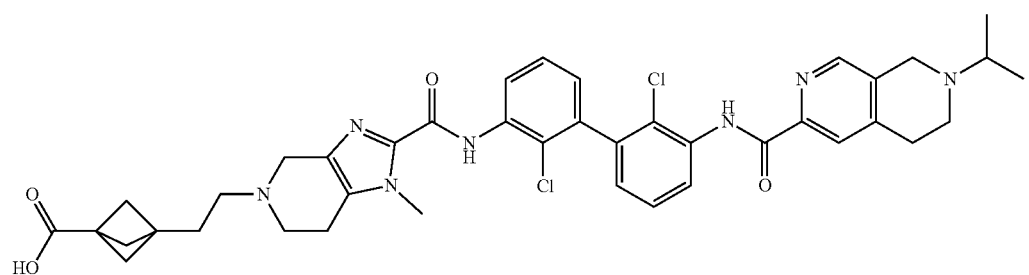
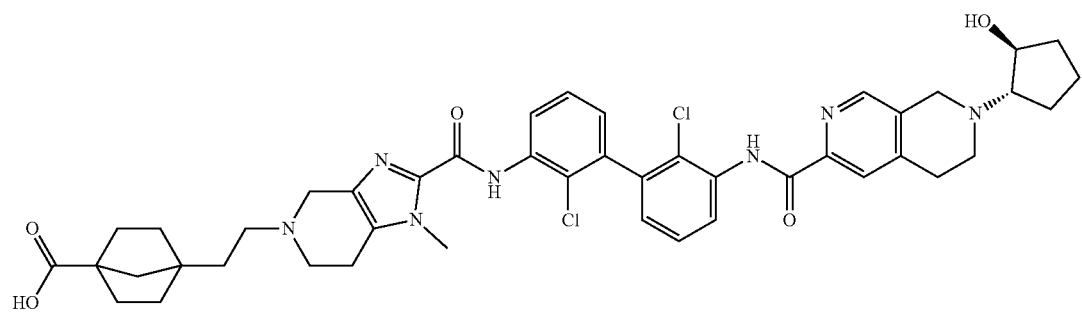
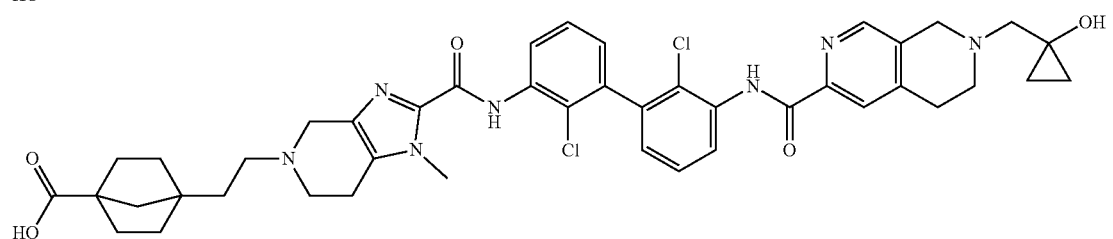

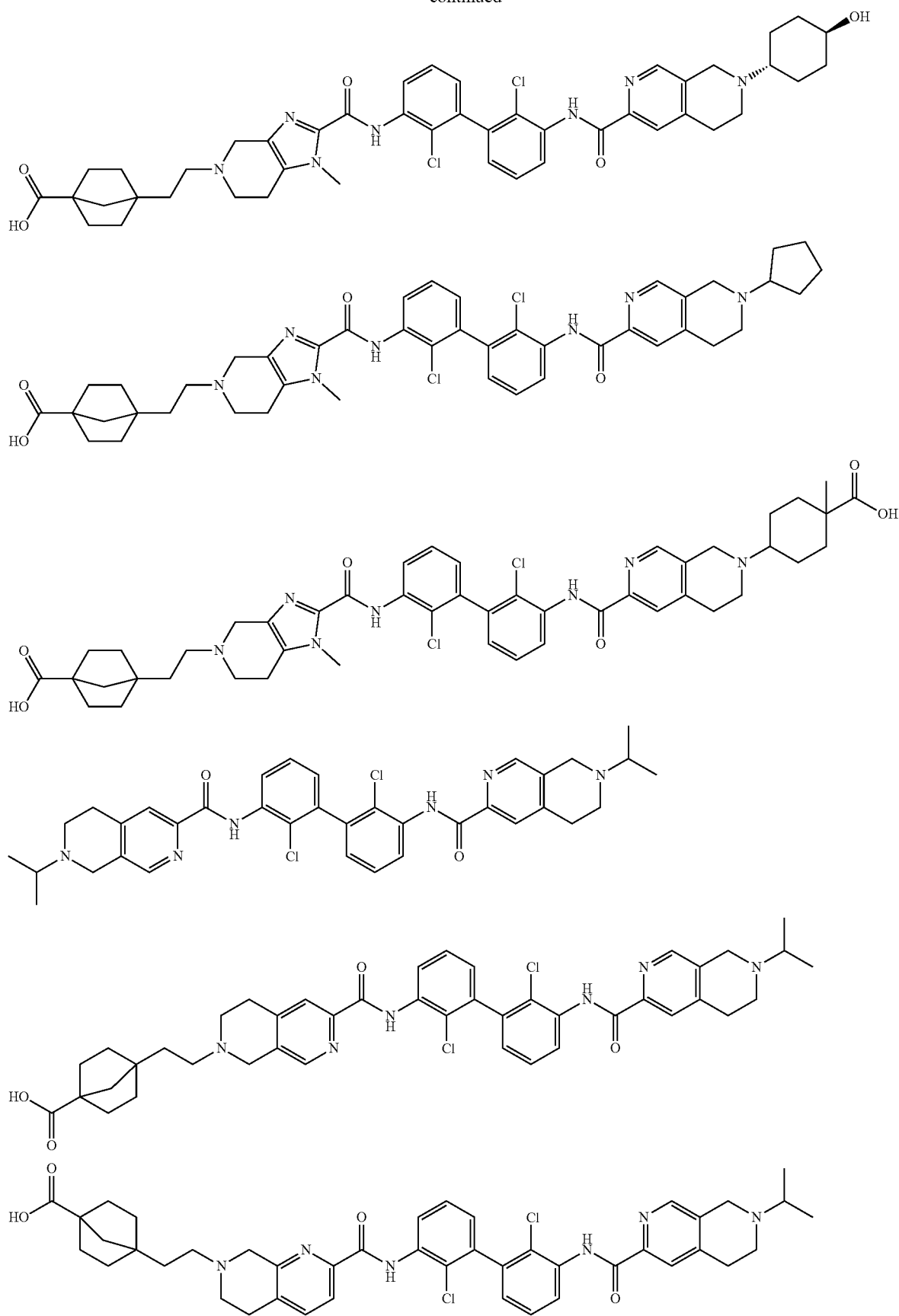

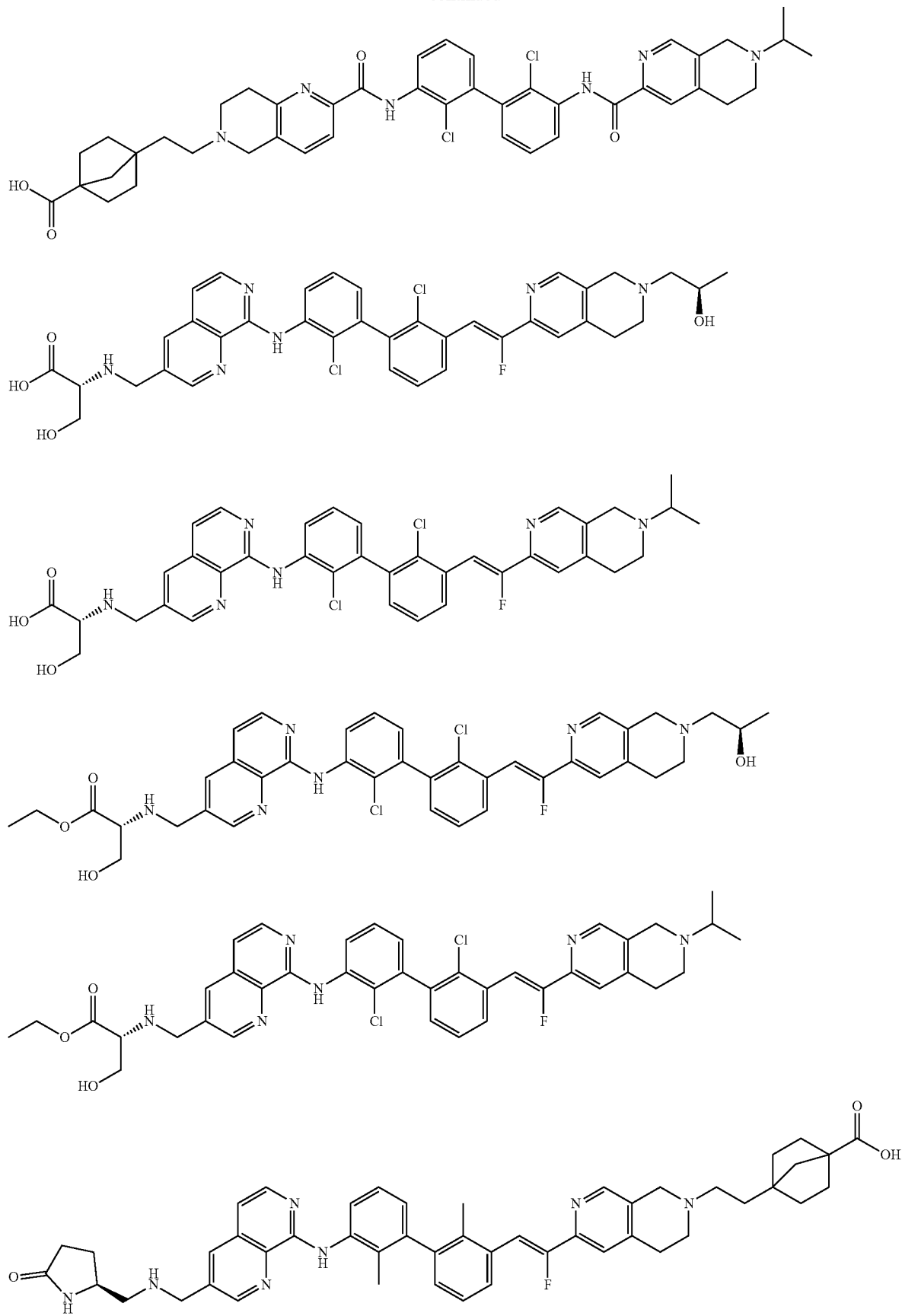

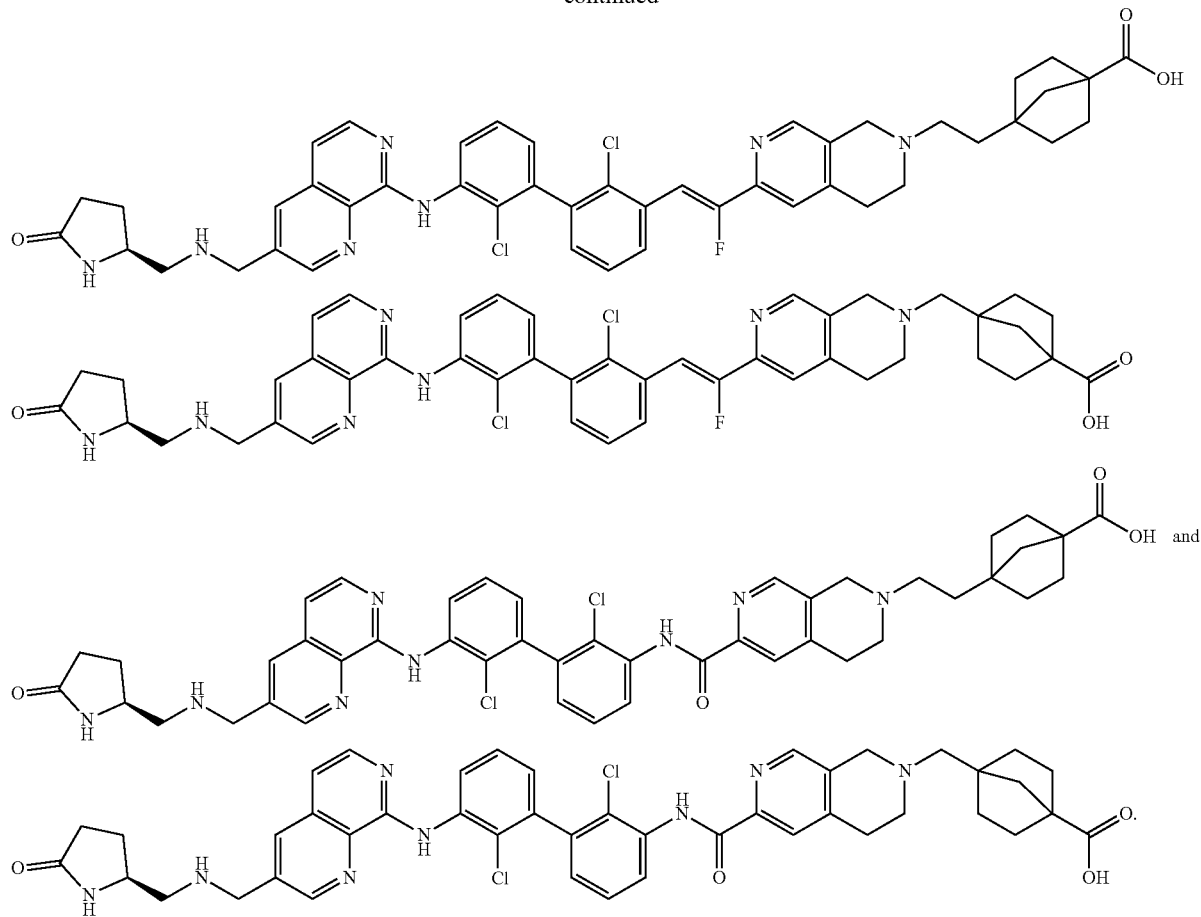
The second aspect of the present invention provides a process for preparing the compound of formula (I), the stereoisomer, prodrug or pharmaceutically acceptable salt thereof, comprising the following step:
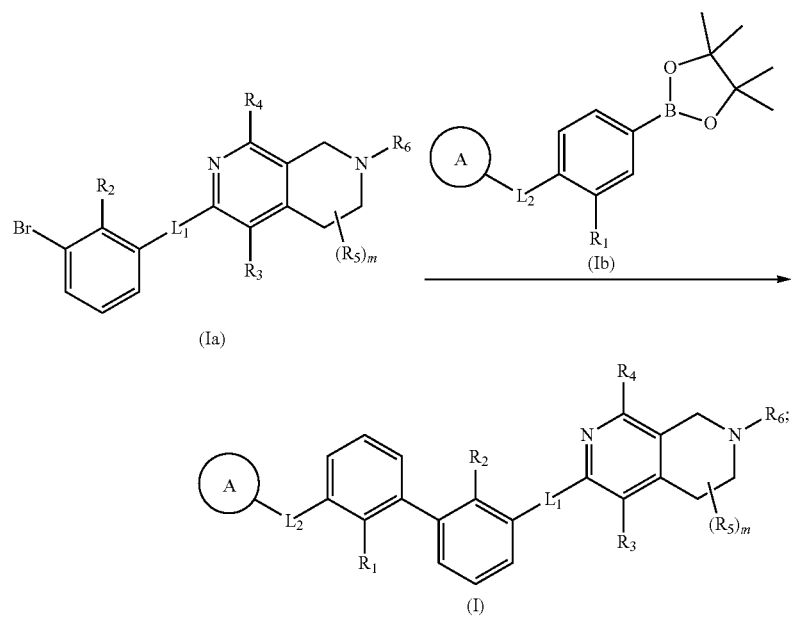

optionally, a further reaction is carried out according to the different substituents to obtain the corresponding compound of formula (I);

wherein, ring A, $L_1$, $L_2$, $R_1$, $R_2$, $R_3$, $R_4$, $R_5$, $R_6$ and m are defined as in the compound of formula (I).

The third aspect of the present invention provides a pharmaceutical composition, comprising the aforementioned compound of formula (I), the stereoisomer, prodrug or pharmaceutically acceptable salt thereof, and a pharmaceutically acceptable carrier.

The fourth aspect of the present invention provides use of the compound of formula (I), the stereoisomer, prodrug or pharmaceutically acceptable salt thereof in the preparation of a medicament for preventing and/or treating PD-1/PD-L1 signal pathway-mediated disease.

In a preferred embodiment, the PD-1/PD-L1 signal pathway-mediated disease is cancer or tumor, immune-related disease and disorder, communicable disease, infectious disease or metabolic disease.

In a further preferred embodiment, the infectious disease is bacterial infectious disease, viral infectious disease, or fungal infectious disease; the cancer or tumor is selected from the group consisting of lymphoma (including but not limited to lymphocytic lymphoma, primary central nervous system lymphoma, T cell lymphoma, diffuse large B cell lymphoma, follicle center lymphoma, Hodgkin lymphoma, non-Hodgkin lymphoma or primary mediastinal large B cell lymphoma), sarcoma (including but not limited to Kaposi's sarcoma, fibrosarcoma, liposarcoma, chondrosarcoma, osteosarcoma, leiomyosarcoma, rhabdomyosarcoma, soft tissue sarcoma, angiosarcoma or lymphangiosarcoma), melanoma, glioblastoma, synovioma, meningioma, biliary tract tumor, thymic tumor, neuroma, seminoma, nephroblastoma, pleomorphic adenoma, hepatocellular papilloma, renal tubule adenoma, cystadenoma, papilloma, adenoma, leiomyoma, rhabdomyoma, hemangioma, lymphangioma, osteoma, chondroma, lipoma, fibroma, central nervous system tumor, rhachiophyma, brain stem glioma, pituitary adenoma, multiple myeloma, ovarian tumor, myelodysplastic syndrome or mesothelioma, prostate cancer, recurrent prostate cancer or prostate cancer having resistance to existing medicaments, thyroid cancer, parathyroid cancer, anal cancer, testicular cancer, urethral carcinoma, penile cancer, bladder cancer, ureteral cancer, uterine cancer, ovarian cancer, fallopian tube cancer, endometrial cancer, cervical cancer, vaginal cancer, vulvar cancer, adrenal cancer, Merkel cell carcinoma, embryonal carcinoma, chronic or acute leukemia (including but not limited to acute myeloid leukemia, chronic myeloid leukemia, acute lymphoblastic leukemia, chronic granulocytic leukemia and chronic lymphoblastic leukemia), bronchial carcinoma, esophageal cancer, nasopharyngeal carcinoma, hepatocellular carcinoma, renal cell carcinoma, small cell lung cancer, basal cell carcinoma, lung cancer, breast cancer, adenocarcinoma, papillary carcinoma, cystadenocarcinoma, squamous non-small cell lung cancer, non-squamous non-small cell lung cancer, rectal cancer, colon cancer, colorectal cancer, gastric cancer, pancreatic cancer, head and neck squamous cell carcinoma, head and neck cancer, gastrointestinal cancer, bone cancer, skin cancer, small intestine cancer, endocrine cancer, renal pelvic carcinoma, epidermoid carcinoma, abdominal wall carcinoma, renal cell carcinoma, transitional cell carcinoma, choriocarcinoma, or metastatic tumor, especially metastatic tumor expressing PD-L1.

The immune-related disease and disorder is selected from the group consisting of rheumatic arthritis, renal failure, lupus erythematosus, asthma, psoriasis, ulcerative colitis, pancreatitis, allergy, fibrosis, anemia, fibromyalgia, Alzheimer's disease, congestive heart failure, stroke, aortic valve stenosis, arteriosclerosis, osteoporosis, Parkinson's disease, infection, Crohn's disease, ulcerative colitis, allergic contact dermatitis and eczema, systemic sclerosis or multiple sclerosis.

The communicable disease or infectious disease is selected from the group consisting of sepsis, liver infection, HIV, hepatitis A, hepatitis B, hepatitis C, hepatitis D, herpes virus, papillomavirus or influenza.

The metabolic disease is selected from the group consisting of diabetes, diabetic ketoacidosis, hyperglycemic hyperosmolar syndrome, hypoglycemia, gout, malnutrition, vitamin A deficiency, scurvy, vitamin D deficiency or osteoporosis.

The fifth aspect of the present invention provides the compound of formula (I), the stereoisomer, prodrug or pharmaceutically acceptable salt thereof for use as a medicament for preventing and/or treating PD-1/PD-L1 signal pathway-mediated cancer or tumor, immune-related disease and disorder, communicable disease, infectious disease or metabolic disease.

The sixth aspect of the present invention provides a method for preventing and/or treating PD-1/PD-L1 signal pathway-mediated cancer or tumor, immune-related disease and disorder, communicable disease, infectious disease or metabolic disease, comprising administering the compound of formula (I), the stereoisomer, prodrug or pharmaceutically acceptable salt thereof to a patient in need thereof.

DETAILED DESCRIPTION OF THE INVENTION

After an extensive and intensive research, the inventors of the present invention, for the first time, developed an immunosuppressive agent with a structure of formula (I). With a strong inhibitory effect on the interaction between PD-1 and PD-L1, the series of compounds of the present invention can be widely applied in the preparation of medicaments for preventing and/or treating cancer or tumor, immune-related disease and disorder, communicable disease, infectious disease or metabolic disease that is mediated by the PD-1/PD-L1 signal pathway, and are expected to be developed into a new generation of PD-1/PD-L1 inhibitors. The present invention is achieved on this basis.

Detailed description: Unless otherwise stated to the contrary or specifically noted, the following terms used in the specification and claims have the following meanings.

"Alkyl" refers to a straight or branched saturated aliphatic hydrocarbon group, preferably a straight or branched alkyl containing 1 to 10 carbon atoms or 1 to 6 carbon atoms or 1 to 4 carbon atoms, which includes, but is not limited to methyl, ethyl, n-propyl, isopropyl, n-butyl, isobutyl, tert-butyl, sec-butyl, n-pentyl, 1,1-dimethylpropyl, 1,2-dimethylpropyl, 2,2-dimethylpropyl, 1-ethylpropyl, 2-methylbutyl, 3-methylbutyl, n-hexyl, 1-ethyl-2-methylpropyl, 1,1,2-trimethylpropyl, 1,1-dimethylbutyl, 1,2-dimethylbutyl, 2,2-dimethylbutyl, 1,3-dimethylbutyl, 2-ethylbutyl, 2-methylpentyl, 3-methylpentyl, 4-methylpentyl, 2,3-dimethylbutyl, n-heptyl, 2-methylhexyl, 3-methylhexyl, 4-methylhexyl, 5-methylhexyl, 2,3-dimethylpentyl, 2,4-dimethylpentyl, 2,2-dimethylpentyl, 3,3-dimethylpentyl, 2-ethylpentyl, 3-ethylpentyl, n-octyl, 2,3-dimethylhexyl, 2,4-dimethylhexyl, 2,5-dimethylhexyl, 2,2-dimethylhexyl, 3,3-dimethylhexyl, 4,4-dimethylhexyl, 2-ethylhexyl, 3-ethylhexyl, 4-ethylhexyl, 2-methyl-2-ethylpentyl, 2-methyl-3-ethylpentyl or various branched isomers thereof and so on. "$C_{1-10}$ alkyl"

refers to straight or branched alkyl containing 1 to 10 carbon atoms; "$C_{1-4}$ alkyl" refers to straight or branched alkyl containing 1 to 4 carbon atoms; "$C_{1-2}$ alkyl" refers to straight or branched alkyl containing 1 to 2 carbon atoms: "$C_{0-8}$" refers to $C_{0-8}$ alkyl; "$C_{0-4}$" refers to $C_{0-4}$ alkyl; $C_0$ refers to that the number of carbon atom is 0; "$C_{1-4}$" refers to $C_{1-4}$ alkyl; and alkyl is defined as above.

Alkyl may be optionally substituted or unsubstituted, and when it is substituted, the substituent is preferably one or more (preferably, 1, 2, 3 or 4) of the groups independently selected from the group consisting of deuterium, halogen, cyano, nitro, azido, $C_{1-10}$ alkyl, $C_{2-10}$ alkenyl, $C_{2-10}$ alkynyl, $C_{1-10}$ haloalkyl, $C_{1-10}$ deuterioalkyl, $C_{3-10}$ cycloalkyl, 3-10 membered heterocyclyl, $C_{5-10}$ aryl, 5-10 membered heteroaryl, =O, —$C_{0-8}$—S(O)$_r$R$_{21}$, —$C_{0-8}$—O—R$_{22}$, —$C_{0-8}$—C(O)OR$_{22}$, —$C_{0-8}$—C(O)R$_{23}$, —$C_{0-8}$—O—C(O)R$_{23}$, —$C_{0-8}$—NR$_{24}$R$_{25}$, —$C_{0-8}$—C(=NR$_{24}$)R$_{23}$, —$C_{0-8}$—N(R$_{24}$)—C(=NR$_{25}$)R$_{23}$, —$C_{0-8}$—C(O)NR$_{24}$R$_{25}$ or —$C_{0-8}$—N(R$_{24}$)—C(O)R$_{23}$.

"Cycloalkyl" or "carbocycle" refers to a saturated or partially unsaturated monocyclic or polycyclic cyclic hydrocarbon substituent, which may contain one or more (preferably, 1, 2 or 3) double bonds, but none of the rings have a fully conjugated π-electron system. It preferably includes a cycloalkyl containing 3 to 12 or 3 to 8 or 3 to 6 carbon atoms, for example, "$C_{3-12}$ cycloalkyl" means cycloalkyl containing 3 to 12 carbon atoms, "$C_{3-8}$ cycloalkyl" means cycloalkyl containing 3 to 8 carbon atoms, "$C_{3-6}$ cycloalkyl" means cycloalkyl containing 3 to 6 carbon atoms, "$C_{5-8}$ cycloalkyl" means cycloalkyl containing 5 to 8 carbon atoms, and "$C_{5-10}$ cycloalkyl" means cycloalkyl containing 5 to 10 carbon atoms. The cycloalkyl includes monocyclic cycloalkyl and polycyclic cycloalkyl, wherein:

monocyclic cycloalkyl includes, but is not limited to cyclopropyl, cyclobutyl, cyclopentyl, cyclopentenyl, cyclohexyl, cyclohexenyl, cyclohexadienyl, cycloheptyl, cycloheptatrienyl, cyclooctyl and the like;

and polycyclic cycloalkyl includes spiro, fused, and bridged cycloalkyls. "Spirocycloalkyl" refers to a polycyclic group in which a carbon atom (called spiroatom) is shared among monocyclic rings, wherein those rings may contain one or more (preferably, 1, 2 or 3) double bonds, but none of them has a fully conjugated π-electron system. According to the number of the spiro-atoms shared among the rings, the spirocycloalkyl may be monospirocycloalkyl, bispirocycloalkyl or polyspirocycloalkyl, including but not limited to:

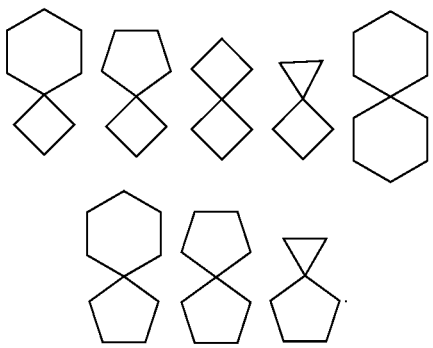

"Fused cycloalkyl" refers to an all-carbon polycyclic group in which each ring shares a pair of adjacent carbon atoms with the other rings in the system, wherein one or more of the rings may contain one or more (preferably, 1, 2 or 3) double bonds, but none of them has a fully conjugated i-electron system. According to the number of formed rings, the fused cycloalkyl may be bicyclic, tricyclic, tetracyclic or polycyclic, including but not limited to:

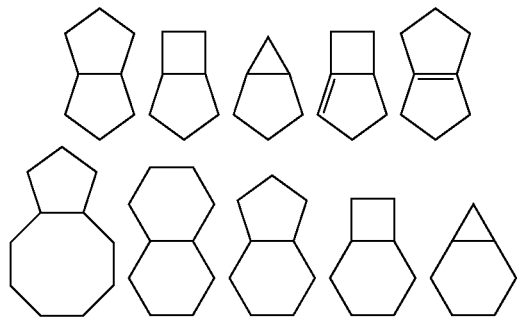

"Bridged cycloalkyl" refers to an all-carbon polycyclic group in which any two rings share two carbon atoms that are not directly connected to each other, wherein these rings may contain one or more (preferably, 1, 2 or 3) double bonds, but none of them has a fully conjugated i-electron system. According to the number of formed rings, the bridged cycloalkyl may be bicyclic, tricyclic, tetracyclic or polycyclic, including but not limited to:

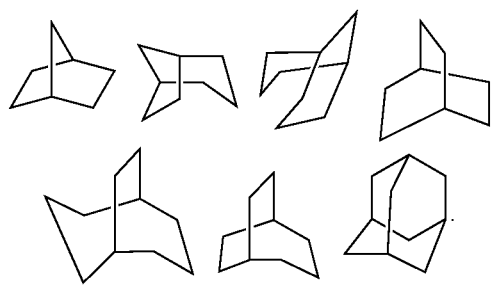

The cycloalkyl ring can be fused to an aryl, heteroaryl or heterocycloalkyl ring, wherein the ring attached to the parent structure is cycloalkyl, which includes, but is not limited to, indanyl, tetrahydronaphthyl, benzocycloheptyl, etc.

Cycloalkyl may be optionally substituted or unsubstituted, and when it is substituted, the substituent is preferably one or more (preferably, 1, 2, 3 or 4) of the following groups independently selected from the group consisting of deuterium, halogen, cyano, nitro, azido, $C_{1-10}$ alkyl, $C_{2-10}$ alkenyl, $C_{2-10}$ alkynyl, $C_{1-10}$ haloalkyl, $C_{1-10}$ deuterioalkyl, $C_{1-10}$ cycloalkyl, 3-10 membered heterocyclyl, $C_{5-10}$ aryl, 5-10 membered heteroaryl, =O, —$C_{0-8}$—S(O)$_r$R$_{21}$, —$C_{0-8}$—O—R$_{22}$, —$C_{0-8}$—C(O)OR$_{22}$, —$C_{0-8}$—C(O)R$_{23}$, —$C_{0-8}$—O—C(O)R$_{23}$, —$C_{0-8}$—NR$_{24}$R$_{25}$, —$C_{0-8}$—C(=NR$_{24}$)R$_{23}$, —$C_{0-8}$—N(R$_{24}$)—C(=NR$_{25}$)R$_{23}$, —$C_{0-8}$—C(O)NR$_{24}$R$_{25}$ or —$C_{0-8}$—N(R$_{24}$)—C(O)R$_{23}$.

"Heterocyclyl" or "heterocycle" refers to a saturated or partially unsaturated monocyclic or polycyclic cyclic hydrocarbon substituent, which may contain one or more (preferably, 1, 2, or 3) double bonds, but none of the rings have a fully conjugated n-electron system, wherein one or more (preferably, 1, 2, 3, or 4) of the ring atoms are heteroatoms selected from nitrogen, oxygen or S(O)$_r$ (wherein r is an integer of 0, 1 or 2), but excluding ring moiety of —O—

O—, —O—S— or —S—S—, and the remaining ring atoms are carbon atoms. Heterocyclyl including 3 to 12 or 3 to 8 or 3 to 6 ring atoms is preferred. For example, "3-6 membered heterocyclyl" refers to cyclyl containing 3 to 6 ring atoms, "3-8 membered heterocyclyl" refers to cyclyl containing 3 to 8 ring atoms, "4-6 membered heterocyclyl" refers to cyclyl containing 4 to 6 ring atoms, and "4-8 membered heterocyclyl" refers to cyclyl containing 4 to 8 ring atoms, "4-10 membered heterocyclyl" refers to cyclyl containing 4 to 10 ring atoms, "5-10 membered heterocyclyl" refers to cyclyl containing 5 to 10 ring atoms, "5-8 membered heterocyclyl" refers to cyclyl containing 5 to 8 ring atoms, "5-6 membered heterocyclyl" refers to cyclyl containing 5 to 6 ring atoms, and "3-12 membered heterocyclyl" refers to cyclyl containing 3 to 12 ring atoms.

Monocyclic heterocyclyl includes, but is not limited to pyrrolidinyl, piperidinyl, piperazinyl, morpholinyl, thiomorpholinyl, homopiperazinyl and the likes.

Polycyclic heterocyclyl includes spiro, fused, and bridged heterocyclyls. "Spiroheterocyclyl" refers to a polycyclic heterocyclyl that shares a carbon atom (called a spiro atom) between the monocyclic rings, wherein one or more (preferably, 1, 2, 3 or 4) of the ring atoms are heteroatoms selected from nitrogen, oxygen or S(O)$_r$ (wherein r is an integer of 0, 1 or 2), and the remaining ring atoms are carbon atoms. These groups may contain one or more (preferably, 1, 2, or 3) double bonds, but none of the rings have a fully conjugated π-electron system. The spiroheterocyclyl may be a monospiroheterocyclyl, a bispiroheterocyclyl or a polyspiroheterocyclyl according to the number of spiro atoms shared between the rings. Spiroheterocyclyl includes, but is not limited to:

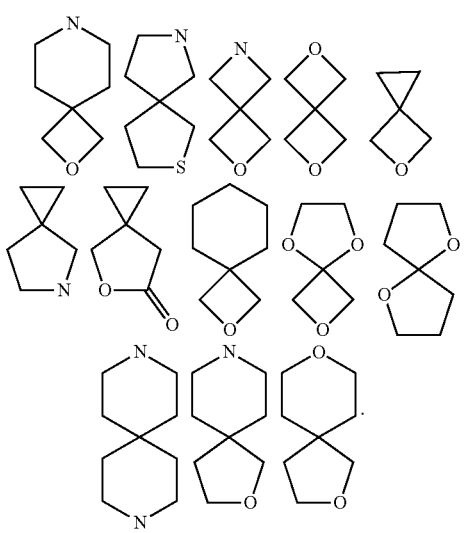

"Fused heterocyclyl" refers to a polycyclic heterocyclyl in which each ring shares an adjacent pair of carbon atoms with other rings in the system, wherein one or more (preferably, 1, 2, 3 or 4) of the rings may contain one or more (preferably, 1, 2 or 3) double bonds, but none of the rings have a fully conjugated n-electron system, wherein one or more (preferably, 1, 2, 3, or 4) of the ring atoms are heteroatoms selected from nitrogen, oxygen or S(O)$_r$ (wherein r is an integer of 0, 1, 2), and the remaining ring atoms are carbon atoms. Depending on the number of rings, it may be bicyclic, tricyclic, tetracyclic or polycyclic, fused heterocyclyl includes, but is not limited to:

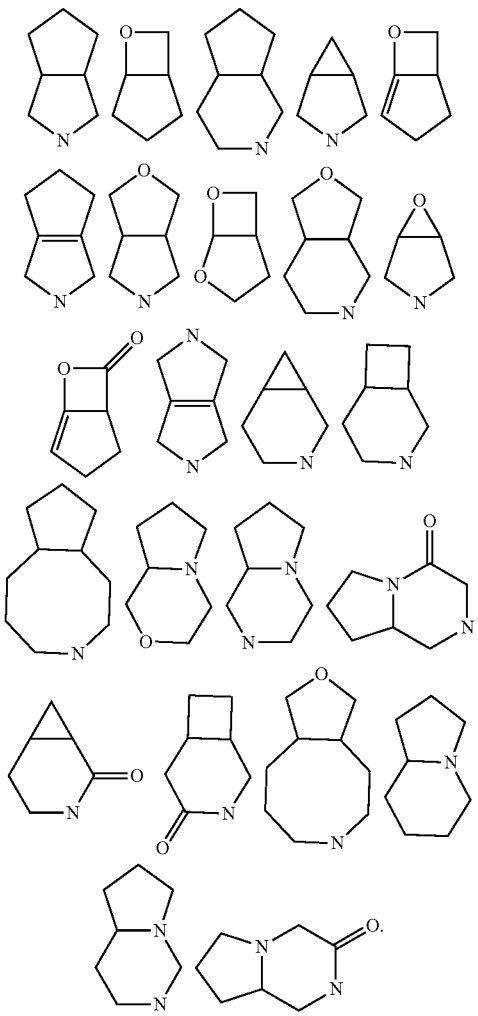

"Bridged heterocyclyl" refers to a polycyclic heterocyclyl in which any two rings share two carbon atoms that are not directly bonded, which may contain one or more (preferably, 1, 2 or 3) double bonds, but none of the rings have a fully conjugated pi-electron system, wherein one or more (preferably, 1, 2, 3 or 4) of the ring atoms are heteroatoms selected from nitrogen, oxygen or S(O)$_r$ (wherein r is an integer of 0, 1, 2), and the remaining ring atoms are carbon atoms. Depending on the number of rings, it may be bicyclic, tricyclic, tetracyclic or polycyclic, bridged heterocyclyl includes, but is not limited to:

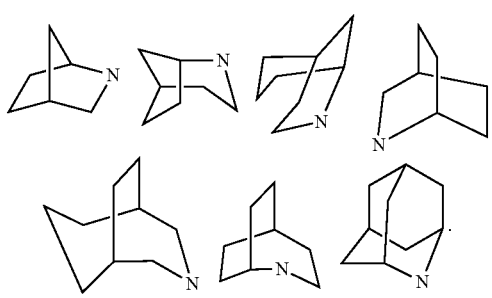

The ring of the heterocyclyl may be fused to a ring of aryl, heteroaryl or cycloalkyl wherein the ring attached to the parent structure is a heterocyclyl, includes, but is not limited to:

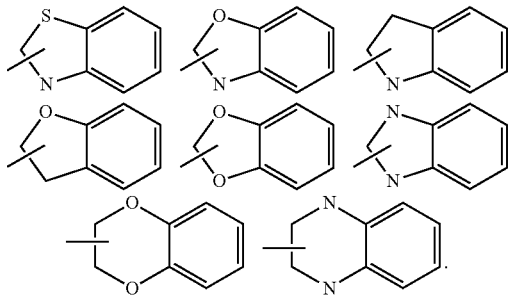

Heterocyclyl may be optionally substituted or unsubstituted, and when it is substituted, the substituent is preferably one or more (preferably, 1, 2, 3 or 4) of the following groups independently selected from the group consisting of deuterium, halogen, cyano, nitro, azido, $C_{1-10}$ alkyl, $C_{2-10}$ alkenyl, $C_{2-10}$ alkynyl, $C_{1-10}$ haloalkyl, $C_{1-10}$ deuterioalkyl, $C_{3-10}$ cycloalkyl, 3-10 member heterocyclyl, $C_{5-100}$ aryl, 5-10 membered heteroaryl, =O, —$C_{0-8}$—S(O)$_r$R$_{21}$, —$C_{0-8}$—O—R$_{22}$, —$C_{0-8}$—C(O)OR$_{22}$, —$C_{0-8}$—C(O)R$_{23}$, —$C_{0-8}$—O—C(O)R$_{23}$, —$C_{0-8}$—NR$_{24}$R$_{25}$, —$C_{0-8}$—C(=NR$_{24}$)R$_{23}$, —$C_{0-8}$—N(R$_{24}$)—C(=NR$_{25}$)R$_{25}$, —$C_{0-8}$—C(O)NR$_{24}$R$_{25}$ or —$C_{0-8}$—N(R$_{24}$)—C(O)R$_{23}$.

"Aryl" or "aromatic ring" refers to an all-carbon monocyclic or fused polycyclic (i.e., a ring that shares a pair of adjacent carbon atoms) group, and a polycyclic group having a conjugated Π-electron system (i.e., a ring with adjacent pairs of carbon atoms). All-carbon aryl containing 6 to 10 or 6 to 8 carbons is preferred. For example, "$C_{6-10}$ aryl" refers to all-carbon aryl containing 6 to 10 carbons, including but not limited to phenyl and naphthyl; and "$C_{6-8}$ aryl" refers to all-carbon aryl containing 6 to 8 carbons, including but not limited to phenyl and naphthyl. An aryl ring may be fused to a ring of heteroaryl, heterocyclyl or cycloalkyl, wherein the ring attached to the parent structure is an aryl ring, includes, but is not limited to:

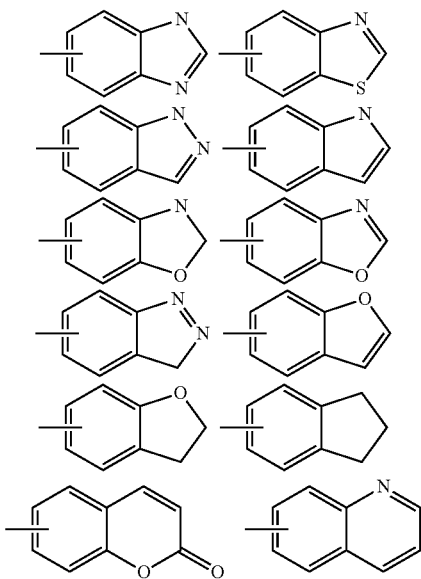

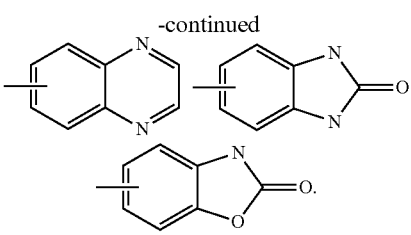

Aryl may be substituted or unsubstituted, and when it is substituted, the substituent is preferably one or more (preferably, 1, 2, 3 or 4) of the following groups independently selected from the group consisting of deuterium, halogen, cyano, nitro, azido, $C_{1-10}$ alkyl, $C_{1-10}$ alkenyl, $C_{2-10}$ alkynyl, $C_{1-10}$ haloalkyl, $C_{1-10}$ deuterioalkyl, $C_{3-10}$ cycloalkyl, 3-10 membered heterocyclyl, $C_{5-10}$ aryl, 5-10 membered heteroaryl, =O, —$C_{0-8}$—S(O)$_r$R$_{21}$, —$C_{0-8}$—O—R$_{22}$, —$C_{0-8}$—C(O)OR$_{22}$, —$C_{0-8}$—C(O)R$_{23}$, —$C_{0-8}$—O—C(O)R$_{23}$, —$C_{0-8}$—NR$_{24}$R$_{25}$, —$C_{0-8}$—C(=NR$_{24}$)R$_{23}$, —$C_{0-8}$—N(R$_{24}$)—C(=NR$_{25}$)R$_{25}$, —$C_{0-8}$—C(O)NR$_{24}$R$_{25}$ or —$C_{0-8}$—N(R$_{24}$)—C(O)R$_{23}$.

"Heteroaryl" or "heteroaromatic ring" refers to a heteroaromatic system containing 1 to 4 heteroatoms including those selected from the group consisting of nitrogen, oxygen or S(O)r (wherein r is an integer of 0, 1, 2). The heteroaromatic system containing 5 to 10 or 5 to 8 or 5 to 6 ring atoms is preferred. For example, 5-8 membered heteroaryl refers to a heteroaromatic system containing 5 to 8 ring atoms, and 5-10 membered heteroaryl refers to a heteroaromatic system containing 5 to 10 ring atoms. Heteroaryl includes, but is not limited to, furyl, thiophenyl, pyridyl, pyrrolyl, N-alkylpyrrolyl, pyrimidinyl, pyrazinyl, imidazolyl, tetrazolyl group, and the likes. The heteroaryl ring may be fused to a ring of aryl, heterocyclyl or cycloalkyl wherein the ring attached to the parent structure is a heteroaryl ring, includes, but is not limited to:

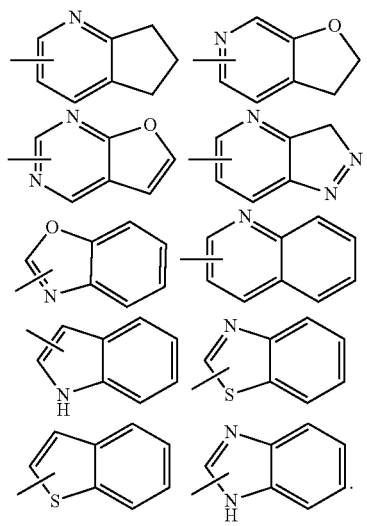

Heteroaryl may be optionally substituted or unsubstituted, and when it is substituted, the substituent is preferably one or more (preferably, 1, 2, 3 or 4) of the following groups, and independently selected from the group consisting of deuterium, halogen, cyano, nitro, azido, $C_{1-10}$ alkyl, $C_{2-10}$ alkenyl, $C_{2-10}$c alkynyl, $C_{2-10}$ haloalkyl, $C_{1-10}$ deuterioalkyl, $C_{3-10}$ cycloalkyl, 3-10 membered heterocyclyl, $C_{5-10}$ aryl, 5-10 membered heteroaryl, $=O$, $-C_{0-8}-S(O)_rR_{21}$, $-C_{0-8}-O-R_{22}$, $-C_{0-8}-C(O)OR_{22}$, $-C_{0-8}-C(O)R_{23}$, $-C_{0-8}-O-C(O)R_{23}$, $-C_{0-8}-NR_{24}R_{25}$, $-C_{0-8}-C(=NR_{24})R_{23}$, $-C_{0-8}-N(R_{24})-C(=NR_{25})R_{23}$, $-C_{0-8}-C(O)NR_{24}R_{25}$ or $-C_{0-8}-N(R_{24})-C(O)R_{23}$.

"Alkenyl" refers to an alkyl group defined as above consisting of at least two carbon atoms and at least one carbon-carbon double bond. For example, $C_{2-10}$ alkenyl refers to straight or branched alkenyl containing 2 to 10 carbons, and $C_{2-4}$ alkenyl refers to straight or branched alkenyl containing 2 to 4 carbons. Alkenyl includes, but is not limited to, vinyl, 1-propenyl, 2-propenyl, 1-, 2- or 3-butenyl, and the likes.

Alkenyl may be substituted or unsubstituted, and when it is substituted, the substituent is preferably one or more (preferably, 1, 2, 3 or 4) of the groups independently selected from the group consisting of deuterium, halogen, cyano, nitro, azido, $C_{1-10}$ alkyl, $C_{2-10}$ alkenyl, $C_{2-10}$ alkynyl, $C_{1-10}$ haloalkyl, $C_{1-10}$ deuterioalkyl, $C_{3-10}$ cycloalkyl, 3-10 membered heterocyclyl, $C_{1-10}$ aryl, 5-10 membered heteroaryl, $=O$, $-C_{0-8}-S(O)_rR_{21}$, $-C_{0-8}-O-R_{22}$, $-C_{0-8}-C(O)OR_{22}$, $-C_{0-8}-C(O)R_{23}$, $-C_{0-8}-O-C(O)R_{23}$, $-C_{0-8}-NR_{24}R_{25}$, $-C_{0-8}-C(=NR_{24})R_{23}$, $-C_{0-8}-N(R_{24})-C(=NR_{25})R_{23}$, $-C_{0-8}-C(O)NR_{24}R_{25}$ or $-C_{0-8}-N(R_{24})-C(O)R_{23}$.

"Alkynyl" refers to an alkyl group defined as above consisting of at least two carbon atoms and at least one carbon-carbon double bond, preferably a straight or branched allkynyl containing 2-10 or 2-4 carbons. For example, $C_{2-10}$ allkynyl refers to a straight or branched allkynyl containing 2 to 10 carbons, and $C_{2-4}$ alkynyl refers to a straight or branched allkynyl containing 2 to 4 carbons. Alkynyl includes, but is not limited to, ethynyl, 1-propynyl, 2-propynyl, 1-, 2- or 3-butynyl, and the likes.

Alkynyl may be substituted or unsubstituted, and when it is substituted, the substituent is preferably one or more (preferably, 1, 2, 3 or 4) of the groups independently selected from the group consisting of deuterium, halogen, cyano, nitro, azido, $C_{1-10}$ alkyl, $C_{2-10}$ alkenyl, $C_{2-10}$ alkynyl, $C_{1-10}$ haloalkyl, $C_{1-10}$ deuterioalkyl, $C_{3-10}$ cycloalkyl, 3-10 membered heterocyclyl, $C_{5-10}$ aryl, 5-10 membered heteroaryl, $=O$, $-C_{0-8}-S(O)R_{21}$, $-C_{0-8}-O-R_{22}$, $-C_{0-8}-C(O)OR_{22}$, $-C_{0-8}-C(O)R_{23}$, $-C_{0-8}-O-C(O)R_{23}$, $-C_{0-8}-NR_{24}R_{25}$, $-C_{0-8}-C(=NR_{24})R_{23}$, $-C_{0-8}-N(R_{24})-C(=NR_{25})R_{23}$, $-C_{0-8}-C(O)NR_{24}R_{25}$ or $-C_{0-8}-N(R_{24})-C(O)R_{23}$.

"Alkoxy" refers to —O-alkyl, wherein alkyl is defined as above. For example, "$C_{1-10}$ alkoxy" refers to alkyloxy containing 1 to 10 carbons, and "$C_{1-4}$ alkoxy" refers to alkyloxy containing 1-4 carbons. Alkoxy includes, but is not limited to, methoxy, ethoxy, propoxy, butoxy, and the likes.

Alkoxy may be optionally substituted or unsubstituted, and when it is substituted, the substituent is preferably one or more (preferably, 1, 2, 3 or 4) of the following groups, and independently selected from the group consisting of deuterium, halogen, cyano, nitro, azido, $C_{1-10}$ alkyl, $C_{2-10}$ alkenyl, $C_{2-10}$ alkynyl, $C_{1-10}$ haloalkyl, $C_{1-10}$ deuterioalkyl, $C_{3-10}$ cycloalkyl, 3-10 membered heterocyclyl, $C_{5-10}$ aryl, 5-10 membered heteroaryl, $=O$, $-C_{0-8}-S(O)_rR_{21}$, $-C_{0-8}-O-R_{22}$, $-C_{0-8}-C(O)OR_{22}$, $-C_{0-8}-C(O)R_{23}$, $-C_{0-8}-O-C(O)R_{23}$, $-C_{0-8}-NR_{24}R_{25}$, $-C_{0-8}-C(=NR_{24})R_{23}$, $-C_{0-8}-N(R_{24})-C(=NR_{25})R_{23}$, $-C_{0-8}-C(O)NR_{24}R_{25}$ or $-C_{0-8}-N(R_{24})-C(O)R_{23}$.

"Cycloalkoxy" or "cycloalkyloxy" refers to —O-cycloalkyl, wherein cycloalkyl is defined as above. For example, "$C_{3-10}$ cycloalkoxy" refers to cycloalkyloxy containing 3 to 10 carbon atoms. Cycloalkoxy includes, but is not limited to, cyclopropyloxy, cyclobutyloxy, cyclopentyloxy, cyclohexyloxy and the likes.

"Cycloalkoxy" or "cycloalkyloxy" may be optionally substituted or unsubstituted, and when it is substituted, the substituent is preferably one or more (preferably, 1, 2, 3 or 4) of the groups independently selected from the group consisting of deuterium, halogen, cyano, nitro, azido, $C_{1-10}$ alkyl, $C_{2-10}$ alkenyl, $C_{2-10}$ alkynyl, $C_{1-10}$ haloalkyl, $C_{1-10}$ deuterioalkyl, $C_{3-10}$ cycloalkyl, 3-10 membered heterocyclyl, $C_{5-10}$ aryl, 5-10 membered heteroaryl, $=O$, $-C_{0-8}-S(O)_rR_{21}$, $-C_{0-8}-O-R_{22}$, $-C_{0-8}-C(O)OR_{22}$, $-C_{0-8}-C(O)R_{23}$, $-C_{0-8}-O-C(O)R_{23}$, $-C_{0-8}-NR_{24}R_{25}$, $-C_{0-8}-C(=NR_{24})R_{23}$, $-C_{0-8}-N(R_{24})-C(=NR_{25})R_{23}$, $-C_{0-8}-C(O)NR_{24}R_{25}$ or $-C_{0-8}-N(R_{24})-C(O)R_{23}$.

"Heterocylooxy" or "heterocyclyloxy" refers to —O-heterocyclyl, wherein heterocyclyl is defined as above, for example, "$C_{3-10}$ heterocylooxy" refers to heterocyclyloxy containing 3 to carbons, including, but not limited to, azacyclobutyloxy, oxacyclobutyloxy, azacyclopentyloxy, nitrogen, oxacyclohexyloxy, etc.

"Heterocylooxy" or "heterocyclyloxy" may be optionally substituted or unsubstituted, and when it is substituted, the substituent is preferably one or more (preferably, 1, 2, 3 or 4) of the groups independently selected from the group consisting of deuterium, halogen, cyano, nitro, azido, $C_{1-10}$ alkyl, $C_{2-10}$ alkenyl, $C_{2-10}$ alkynyl, $C_{1-10}$ haloalkyl, $C_{1-10}$ deuterioalkyl, $C_{3-10}$ cycloalkyl, 3-10 membered heterocyclyl, $C_{5-10}$ aryl, 5-10 membered heteroaryl, $=O$, $-C_{0-8}-S(O)_rR_{21}$, $-C_{0-8}-O-R_{22}$, $-C_{0-8}-C(O)OR_{22}$, $-C_{0-8}-C(O)R_{23}$, $-C_{0-8}-O-C(O)R_{23}$, $-C_{0-8}-NR_{24}R_{25}$, $-C_{0-8}-C(=NR_{24})R_{23}$, $-C_{0-8}-N(R_{24})-C(=NR_{25})R_{23}$, $-C_{0-8}-C(O)NR_{24}R_{25}$ or $-C_{0-8}-N(R_{24})-C(O)R_{23}$.

"$C_{1-10}$ alkanoyl" refers to a monovalent atomic group obtained by removing hydroxy from $C_{1-10}$ alkyl acid, and it is also generally represented as "$C_{0-9}-C(O)-$". For example, "$C_1-C(O)-$" refers to acetyl; "$C_2-C(O)-$" refers to propionyl; and "$C_3-C(O)-$" refers to butyryl or isobutyryl.

"$-C_{0-8}-S(O)R_{21}$" means that the sulfur atom in $-S(O)_rR_{21}$ is bonded to $C_{0-4}$ alkyl, wherein $C_0$ alkyl means that the number of carbon atom is 0, and $C_{1-8}$ alkyl is defined as above.

"$-C_{0-8}-O-R_{22}$" means that the oxygen atom in $-O-R_{22}$ is bonded to $C_{0-8}$ alkyl, wherein $C_0$ alkyl means that the number of carbon atom is 0, and $C_{1-8}$ alkyl is defined as above.

"$-C_{0-8}-C(O)OR_{22}$" means that the carbonyl group in $-C(O)OR_{22}$ is bonded to $C_{0-8}$ alkyl, wherein $C_0$ alkyl means that the number of carbon atom is 0, and $C_{1-8}$ alkyl is defined as above.

"$-C_{0-8}-C(O)R_{23}$" means that the carbonyl group in $-C(O)R_{23}$ is bonded to $C_{0-8}$ alkyl, wherein $C_0$ alkyl mean that the number of carbon atom is 0, and $C_{1-8}$ alkyl is defined as above.

"$-C_{0-8}-O-C(O)R_{23}$" means that the oxygen atom in $-O-C(O)R_{23}$ is bonded to $C_{0-8}$ alkyl, wherein $C_0$ alkyl means that the number of carbon atom is 0, and $C_{1-8}$ alkyl is defined as above.

"$-C_{0-8}-NR_{24}R_{25}$" means that the nitrogen atom in $-NR_{24}R_{25}$ is bonded to $C_{0-8}$ alkyl, wherein $C_0$ alkyl means that the number of carbon atom is 0, and $C_{1-8}$ alkyl is defined as above.

"$-C_{0-8}-C(=NR_{24})R_{23}$," means that the carbon atom in $-C(=NR_{24})R_{23}$ is bonded to $C_{0-8}$ alkyl, wherein $C_0$ alkyl means that the number of carbon atom is 0, and $C_{1-8}$ alkyl is defined as above above.

"—$C_{0-8}$—$N(R_{24})$—$C(=NR_{25})R_{23}$" means that the nitrogen atom in —$N(R_{24})$—$C(=NR_{25})R_{23}$ is bonded to $C_{0-8}$ alkyl, wherein $C_0$ alkyl means that the number of carbon atom is 0, and $C_{1-8}$ alkyl is defined as above.

"—$C_{0-8}$—$C(O)NR_{24}R_{25}$" means that the carbonyl in —$C(O)NR_{24}R_{25}$ is bonded to $C_{0-8}$ alkyl, wherein $C_0$ alkyl means that the number of carbon atom is 0, and $C_{1-8}$ alkyl is defined as above.

"—$C_{0-8}$—$N(R_{24})$—$C(O)R_{23}$" means that the nitrogen atom in —$N(R_{24})$—$C(O)R_{23}$ is bonded to $C_{0-8}$ alkyl, wherein $C_0$ alkyl means that the number of carbon atom is 0, and $C_{1-8}$ alkyl is defined as above.

"$C_{1-10}$ haloalkyl" refers to an alkyl group having 1 to 10 carbon atoms, any hydro gen atom on which is optionally substituted with F, Cl, Br or I atom. It includes, but is not limited to, difluoromethyl, dichloromethyl, dibromomethyl, trifluoromethyl, trichloro methyl, tribromomethyl, and the likes.

"$C_{1-10}$ haloalkoxy" refers to an alkoxy group having 1 to 10 carbon atoms, any hydrogen atom on which is optionally substituted with F, Cl, Br or I atom. It includes, but is not limited to, difluoromethoxy, dichloromethoxy, dibromomethoxy, trifluoromethoxy, trichloromethoxy, tribromomethoxy, and the likes.

"$C_{1-10}$ deuterioalkyl" refers to an alkyl group having 1 to 10 carbon atoms, any hydrogen atom on which is optionally substituted with F, Cl, Br or I atom. It includes, but is not limited to, monodeuterioethoxy, dideuteriomethoxy, trideuteriomethoxy, and the likes.

"Halogen" means F, Cl, Br or I. "PE" means petroleum ether, "EtOAc"/"EA" means ethyl acetate, "MeOH" means methanol, "DMF" means N,N-dimethylformamide, "THF" means tetrahydrofuran, "LiHMDS" means lithium bis (trimethylsilyl)amide, "Dess-Martin reagent" means a Dess-Martin reagent, 1,1,1-triacetoxy-1,1-dihydro-1,2-phenyliodoyl-3-(1H)-one, and "Pd(dppf)Cl$_2$·DCM means a complex of [1,1'-bis(diphenylphosphine)ferrocene]palladium dichloride and dichloromethane.

"Optional" or "optionally" means that the event or environment subsequently described may, but need not, occur, including where the event or environment occurs or does not occur, that is, including both substituted and unsubstituted situations. For example, "heterocyclyl optionally substituted by alkyl" means that an alkyl group may be, but is not necessarily, present, and the description includes the case where the heterocyclyl is substituted with an alkyl and the case where the heterocyclyl is not substituted with an alkyl.

The term "substituted" means that one or more "hydrogen atoms" in the group are each independently substituted by a corresponding number of substituents. It goes without saying that a substituent is only in its possible chemical position, which is consistent with the valence-bond theory of chemistry. Those skilled in the art will be able to determine (by experiments or theories) possible or impossible substitution without undue efforts. For example, it may be unstable that an amino group or a hydroxyl group having a free hydrogen is attached with a carbon atom having an unsaturated bond (such as an olefin).

"Stereoisomer" means an isomer produced due to a different spatial arrangement of atoms in the molecules, and can be classified into either cis-trans isomers and enantiomers, or enantiomers and diastereomers. Stereoisomers resulting from the rotation of a single bond are called conformational stereo-isomers, and sometimes also called rotamers. Stereoisomers induced by reasons such as bond lengths, bond angles, double bonds in molecules and rings are called configuration stereo-isomers, which are classified into two categories. Among them, isomers induced by the double bonds or single bonds of ring-forming carbon atoms that cannot rotate freely are called geometric isomers, also known as cis-trans isomers, which are divided into two configurations including Z and E. For example: cis-2-butene and trans-2-butene are a pair of geometric isomers. Stereoisomers with different optical activities due to the absence of anti-axial symmetry in the molecules are called optical isomers, which are classified into two configurations including R and S. Unless otherwise specified, the "stereoisomer" in the present invention can be understood to include one or several of the above-mentioned enantiomers, configurational isomers and conformational isomers.

"Prodrug", also called pro-drug, drug precursor, precursor drug or the likes, refers to a compound, prepared by modifying the chemical structure of a drug, which is inactive or less active in vitro and exerts a therapeutic effect by releasing the active drug after enzymatic or non-enzymatic transformation in vivo. For example, a compound containing a "ester group" can be liberated to a "carboxyl" compound or "hydroxyl" compound under the action of enzymes.

"Pharmaceutically acceptable salt" in the present invention refers to pharmaceutically acceptable acid addition salt, including inorganic acid salt and organic acid salt, and these salts can be prepared by methods known in the art.

"Pharmaceutical composition" refers to a mixture comprising one or more of the compounds described herein, or a physiologically/pharmaceutically acceptable salt or prodrug thereof, and other chemical components, for example physiological/pharmaceutically acceptable carriers and excipients. The purpose of the pharmaceutical composition is to promote the administration to an organism, which facilitates the absorption of the active ingredient thereby exerting biological activities.

The present invention will be further described in detail below in conjunction with the embodiments which is not intended to limit the present invention. The present invention is also not limited to the contents of the embodiments.

The structure of the compound of the present invention is determined by nuclear magnetic resonance (NMR) or/and liquid chromatography-mass spectrometry (LC-MS). The NMR chemical shift (δ) is given in parts per million (ppm). The NMR determination is conducted by using a Bruker AVANCE-400 or AVANCE-500 nuclear magnetic resonance apparatus, with hexadeuterodimethyl sulfoxide (DMSO-d$_6$), tetradeuteromethanol (CD$_3$OD), deuterium oxide (D$_2$O) and deuterated chloroform (CDCl$_3$) as determination solvents, and tetramethylsilane (TMS) as an internal standard.

The measurement of LC-MS is performed by using an Agilent 6120 mass spectrometer. The measurement of HPLC is performed by using an Agilent 1200 DAD high pressure liquid chromatograph (Sunfire C18 150×4.6 mm column) and a Waters 2695-2996 high pressure liquid chromatograph (Gimini C18 150×4.6 mm column).

The thin layer chromatography silica gel plate is Yantai Yellow Sea HSGF254 or Qingdao GF254 silica gel plate. The specification of TLC is 0.15 mm-0.20 mm, and the specification for thin layer chromatography separation and purification is 0.4 mm-0.5 mm. 200-300 mesh silica gel (Yantai Huanghai silica gel) as a carrier is generally used in column chromatography.

The starting materials in the examples of the present invention are known and commercially available or can be synthesized according to methods known in the art.

Unless otherwise stated, all reactions of the present invention are carried out under continuous magnetic stirring in a dry nitrogen or argon atmosphere, the solvent is a dry solvent, and the unit of the reaction temperature is degrees Celsius (° C.).

I. Preparation of Intermediates

Intermediate A1: Preparation of N-(3-bromo-2-chlorophenyl)-7-isopropyl-5,6,7,8-tetrahydro-2,7-naphthyridine-3-formamide

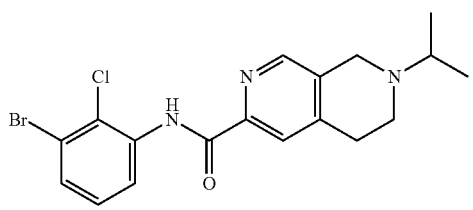 [SMILES: Cc1c(Br)cccc1NC(=O)c1cc2c(cn1)CN(C(C)C)CC2]

Step 1: Synthesis of 2-(tert-butyl) 6-ethyl 3,4-dihydro-2,7-naphthyridine-2,6(1H)-dicarboxylate

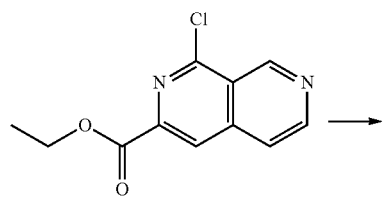

Ethyl 1-chloro-2,7-naphthyridine-3-carboxylate (3.15 g, 13.3 mmol, prepared by referring to the document "*Heterocycl. Commun.*, 2000, 6, 25"), palladium on carbon (500 mg) and anhydrous sodium acetate (1.75 g, 19.5 mmol) were dissolved in absolute methanol (100 mL), and stirred for 24 hours at room temperature in a hydrogen atmosphere. After the reaction was completed, the palladium on carbon was removed by filtering. The filtrate was concentrated and then dissolved in dichloromethane (50 mL); then, Boc acid anhydride (3.27 g, 15 mmol) was added; and the resulting mixture was continuously stirred for 2 hours at room temperature. The mixture was concentrated, and then column chromatographic separation [eluent: petroleum ether-petroleum ether/ethyl acetate (1:1)] was conducted to obtain 2-(tert-butyl) 6-ethyl 3,4-dihydro-2,7-naphthyridine-2,6 (1H)-dicarboxylate (2.8 g, yield: 70.2%). ESI-MS: 307 [M+H]⁺.

Step 2: Synthesis of tert-butyl 6-((3-bromo-2-chlorophenyl) carbamoyl)-3,4-dihydro-2,7-naphthridine-2(1H)-carboxylate

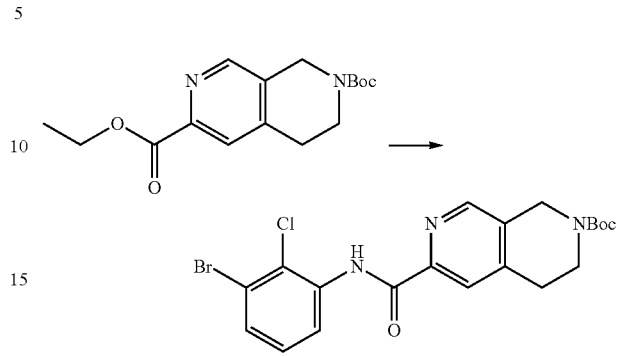

2-(tert-butyl) 6-ethyl 3,4-dihydro-2,7-naphthyridine-2,6 (1H)-dicarboxylate (2.8 g, 9.3 mmol) and 3-bromo-2-chloroaniline (2 g, 9.77 mmol) were dissolved in anhydrous tetrahydrofuran (100 mL), 1M solution of potassium tert-butoxide in tetrahydrofuran (14 mL, 14 mmol) was then dropwise added under an ice bath. After the dropwise addition, the reaction mixture was continuously stirred for 1 hour. The resulting reaction mixture was poured into water (200 mL), and extracted with dichloromethane (100 mL*2); and the organic phase was washed twice with water and saline, dried, filtered and concentrated. Then, column chromatographic separation [eluent: petroleum ether-petroleum ether/ethyl acetate (1:1)] was conducted to obtain tert-butyl 6-((3-bromo-2-chlorophenyl)carbamoyl)-3,4-dihydro-2,7-naphthyridine-2(1H)-carboxylate (2.66 g, yield: 61.5%). ESI-MS: 466 [M+H]⁺.

Step 3: Synthesis of N-(3-bromo-2-chlorophenyl)-7-isopropyl-5,6,7,8-tetrahydro-2,7-naphthyridine-3-formamide

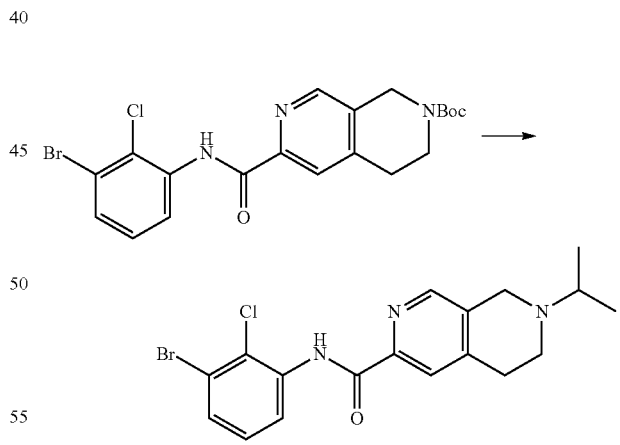

Tert-butyl 6-((3-bromo-2-chlorophenyl)carbamoyl)-3,4-dihydro-2,7-naphthyridine-2(1H)-carboxylate (116 mg, 0.25 mmol) was dissolved in dichloromethane (10 mL), trifluoroacetic acid (1 mL) was then added. The resulting reaction mixture was stirred for 1 hour at room temperature, and then distilled to remove a solvent under reduced pressure. The residue was dissolved in dichloromethane (10 mL) again, triethylamine (1 mL) and sodium triacetoxyborohydride (213 mg, 1 mmol) were then added in sequence. The reaction mixture was continuously stirred for 2 hour. Then, the reaction mixture was poured into water (20 mL), and extracted with ethyl acetate (50 mL*2). Organic phases were combined, dried, filtered and concentrated. Then column chromatographic separation [eluent: petroleum ether-petroleum ether/ethyl acetate (1:1)] was conducted to obtain N-(3-bromo-2-chlorophenyl)-7-isopropyl-5,6,7,8-tetrahydro-2,7-naphthyridine-3-formamide (87 mg, yield: 85%). ESI-MS: 408 [M+H]$^+$.

Intermediates A2-A28 can be prepared by referring to the preparation method for intermediate A1:

| Intermediate No. | Structural Formula | Compound name | [M + H]$^+$ |
|---|---|---|---|
| A2 | | N-(3-bromo-2-chlorophenyl)-7-methyl-5,6,7,8-tetrahydro-2,7-naphthyridine-3-carboxamide | 380 |
| A3 | | N-(3-bromo-2-chlorophenyl)-7-ethyl-5,6,7,8-tetrahydro-2,7-naphthyridine-3-carboxamide | 394 |
| A4 | | N-(3-bromo-2-chlorophenyl)-7-cyclopropyl-5,6,7,8-tetrahydro-2,7-naphthyridine-3-carboxamide | 406 |
| A5 | | N-(3-bromo-2-chlorophenyl)-7-cyclobutyl-5,6,7,8-tetrahydro-2,7-naphthyridine-3-carboxamide | 420 |
| A6 | | N-(3-bromo-2-chlorophenyl)-7-(2,2-difluoroethyl)-5,6,7,8-tetrahydro-2,7-naphthyridine-3-carboxamide | 430 |
| A7 | | N-(3-bromo-2-chlorophenyl)-7-(2-(difluoromethoxy)ethyl)-5,6,7,8-tetrahydro-2,7-naphthyridine-3-carboxamide | 460 |
| A8 | | (R)-N-(3-bromo-2-chlorophenyl)-7-(2-hydroxypropyl)-5,6,7,8-tetrahydro-2,7-naphthyridine-3-carboxamide | 424 |

| Intermediate No. | Compound name | [M + H]⁺ |
|---|---|---|
| A9 | N-(3-bromo-2-chlorophenyl)-7-(3-hydroxypropyl)-5,6,7,8-tetrahydro-2,7-naphthyridine-3-carboxamide | 424 |
| A10 | N-(3-bromo-2-chlorophenyl)-7-((1S,3S)-3-hydroxycyclobutyl)-5,6,7,8-tetrahydro-2,7-naphthyridine-3-carboxamide | 436 |
| A11 | N-(3-bromo-2-chlorophenyl)-7-(oxetan-3-yl)-5,6,7,8-tetrahydro-2,7-naphthyridine-3-carboxamide | 422 |
| A12 | N-(3-bromo-2-chlorophenyl)-7-((1S,4S)-4-hydroxycyclohexyl)-5,6,7,8-tetrahydro-2,7-naphthyridine-3-carboxamide | 464 |
| A13 | N-(3-bromo-2-chlorophenyl)-7-(3-hydroxy-3-methylbutyl)-5,6,7,8-tetrahydro-2,7-naphthyridine-3-carboxamide | 452 |
| A14 | (R)-N-(3-bromo-2-chlorophenyl)-7-(2-fluoro-3-hydroxy-3-methylbutyl)-5,6,7,8-tetrahydro-2,7-naphthyridine-3-carboxamide | 470 |
| A15 | N-(3-bromo-2-chlorophenyl)-7-(5-(dimethylamino)-5-oxopentyl)-5,6,7,8-tetrahydro-2,7-naphthyridine-3-carboxamide | 493 |

-continued

| Intermediate No. | Structural Formula | Compound name | [M + H]+ |
|---|---|---|---|
| A16 | | (1R,4R)-4-(6-((3-bromo-2-chlorophenyl)carbamoyl)-3,4-dihydro-2,7-naphthyridin-2(1H)-yl)-1-methylcyclohexane-1-carboxylic acid | 506 |
| A17 | | N-(3-bromo-2-chlorophenyl)-7-(2-hydroxy-2-methylpropyl)-5,6,7,8-tetrahydro-2,7-naphthyridine-3-carboxamide | 438 |
| A18 | | N-(3-bromo-2-chlorophenyl)-7-isopropyl-8-methyl-5,6,7,8-tetrahydro-2,7-naphthyridine-3-carboxamide | 422 |
| A19 | | N-(3-bromo-2-methylphenyl)-7-isopropyl-5,6,7,8-tetrahydro-2,7-naphthyridine-3-carboxamide | 389 |
| A20 | | N-(3-bromo-2-chlorophenyl)-7-(tetrahydro-2H-pyran-4-yl)-5,6,7,8-tetrahydro-2,7-naphthyridine-3-carboxamide | 450 |
| A21 | | N-(3-bromo-2-chlorophenyl)-7-(2-hydroxyethyl)-5,6,7,8-tetrahydro-2,7-naphthyridine-3-carboxamide | 412 |
| A22 | | N-(3-bromo-2-chlorophenyl)-7-((1-hydroxycyclopropyl)methyl)-5,6,7,8-tetrahydro-2,7-naphthyridine-3-carboxamide | 437 |

-continued

| Intermediate No. | Structural Formula | Compound name | [M + H]+ |
|---|---|---|---|
| A23 | | N-(3-bromo-2-chlorophenyl)-7-((1S,2S)-2-hydroxycyclopentyl)-5,6,7,8-tetrahydro-2,7-naphthyridine-3-carboxamide | 450 |
| A24 | | N-(3-bromo-2-chlorophenyl)-7-((1R,4R)-4-hydroxycyclohexyl)-5,6,7,8-tetrahydro-2,7-naphthyridine-3-carboxamide | 464 |
| A25 | | N-(3-bromo-2-chlorophenyl)-7-cyclopentyl-5,6,7,8-tetrahydro-2,7-naphthyridine-3-carboxamide | 434 |
| A26 | | 4-(6-((3-bromo-2-chlorophenyl)carbamoyl)-3,4-dihydro-2,7-naphthyridin-2(1H)-yl)-1-methylcyclohexane-1-carboxylic acid | 506 |
| A27 | | 4-(2-(6-((3-bromo-2-chlorophenyl)carbamoyl)-3,4-dihydro-2,7-naphthyridin-2(1H)-yl)ethyl)bicyclo[2.2.1]heptane-1-carboxylic acid | 533 |
| A28 | | 4-((6-((3-bromo-2-chlorophenyl)carbamoyl)-3,4-dihydro-2,7-naphthyridin-2(1H)-yl)methyl)bicyclo[2.2.1]heptane-1-carboxylic acid | 519 |

Intermediate B: Preparation of (Z)-2-(2-(2-chloro-3-(methoxymethoxy)phenyl)-1-fluorovinyl)-4,4,5,5-tetramethyl-1,3,2-dioxaborolane

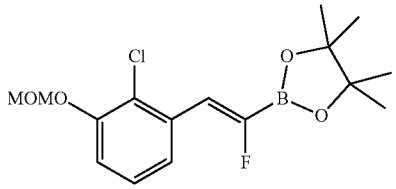

Step 1: Synthesis of 2-chloro-3-(methoxymethoxy)benzaldehyde

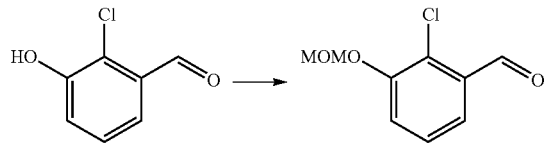

2-chloro-3-hydroxybenzaldehyde (10.0 g, 64.10 mmol) was dissolved in acetonitrile (80 mL), N,N-diisopropylethylamine (16.5 g, 128.20 mmol) and bromo-methoxy-methane (17.9 g, 128.20 mmol) were then added. A tube was sealed and heated to 80° C. to react overnight. After cooling, the resulting mixture was poured into water (150 mL), then extracted with ethyl acetate (100 mL*2), and dried over anhydrous sodium sulfate. After concentrating, column chromatographic separation [eluent: petroleum ether=100%–ethyl acetate=10%] was conducted to obtain 2-chloro-3-(methoxymethoxy)benzaldehyde (12.7 g, yield: 100%).

$^1$H NMR (400 MHz, CDCl$_3$) δ 10.45 (d, J=0.8 Hz, 1H), 7.52 (dd, J=7.7, 1.6 Hz, 1H), 7.35 (dd, J=8.2, 1.6 Hz, 1H), 7.25 (td, J=7.9, 0.8 Hz, 1H), 5.22 (s, 2H), 3.47 (s, 3H).

Step 2: Synthesis of 2-chloro-1-(2,2-difluorovinyl)-3-(methoxymethoxy)benzene

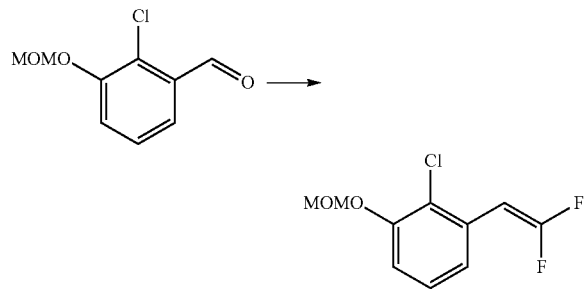

2-chloro-3-(methoxymethoxy)benzaldehyde (18.2 g, 91.0 mmol) was dissolved in N,N-dimethylformamide (182 mL) (i.e., 0.5M aldehyde solution), triphenylphosphine (28.6 g, 109.2 mmol) was then added. The resulting mixture was heated to 100° C. and then added dropwise with the 2M solution of sodium chlorodifluoroacetate (20.8 g, 136.5 mmol) in N,N-dimethylformamide. The reaction mixture was continuously stirred for 1 hour at 1000, poured into water (250 mL), and then extracted with petroleum ether (300 mL*2). The organic phase was washed sequentially with water (100 mL) and saturated saline (100 mL), dried over anhydrous sodium sulfate and concentrated. Then, column chromatographic separation [eluent: petroleum ether] was conducted to obtain 2-chloro-1-(2,2-difluorovinyl)-3-(methoxymethoxy)benzene (13.3 g, yield: 62%).

$^1$H NMR (400 MHz, CDCl$_3$) δ 7.24-7.14 (m, 2H), 7.08 (dd, J=6.8, 3.0 Hz, 1H), 5.72 (dd, J=25.4, 3.9 Hz, 1H), 5.25 (s, 2H), 3.52 (s, 3H).

$^{19}$F NMR (377 MHz, CDCl$_3$) δ −81.31 (d, J=24.9 Hz), −82.22 (d, J=25.0 Hz).

Step 3: Synthesis of (Z)-2-(2-(2-chloro-3-(methoxymethoxy)phenyl)-1-fluorovinyl)-4,4,5,5-tetramethyl-1,3,2-dioxaborolane

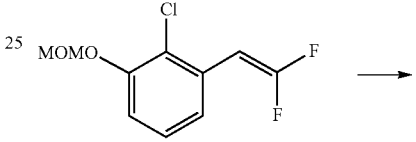

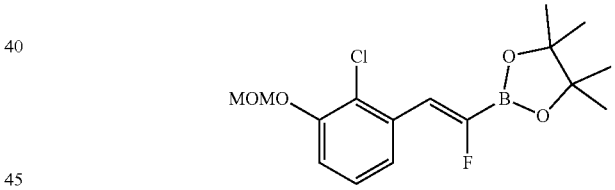

2-chloro-1-(2,2-difluorovinyl)-3-(methoxymethoxy)benzene (4.6 g, 19.65 mmol) was dissolved in tetrahydrofuran (150 mL), bis(pinacolato)diboron (6.0 g, 23.59 mmol), cuprous chloride (20 mg, 0.196 mmol), tricyclohexylphosphine (110 mg, 0.393 mmol) and potassium acetate (5.8 g, 58.97 mmol) were then added. The resulting reaction mixture was stirred for 16 hours at 40° C., poured to water (100 mL), then extracted with ethyl acetate (100 mL*2), dried over anhydrous sodium sulfate, and concentrated. Then, column chromatographic separation [eluent: petroleum ether=100%–ethyl acetate=10%] was conducted to obtain (Z)-2-(2-(2-chloro-3-(methoxymethoxy)phenyl)-1-fluorovinyl)-4,4,5,5-tetramethyl-1,3,2-dioxaborolane (3.7 g, yield: 55%).

$^1$H NMR (400 MHz, CDCl$_3$) δ 7.66 (dd, J=7.8, 1.5 Hz, 1H), 7.22 (t, J=8.0 Hz, 1H), 7.14 (dd, J=8.3, 1.5 Hz, 1H), 6.87 (d, J=45.4 Hz, 1H), 5.27 (s, 2H), 3.54 (s, 3H), 1.37 (s, 12H).

$^{19}$F NMR (377 MHz, CDCl$_3$) δ −122.01.

Intermediate C1: Preparation of (Z)-2-chloro-3-(2-fluoro-2-(7-isopropyl-5,6,7,8-tetrahydro-2,7-naphthyridine-3-yl)vinyl)phenyl trifluoromethanesulfonic acid

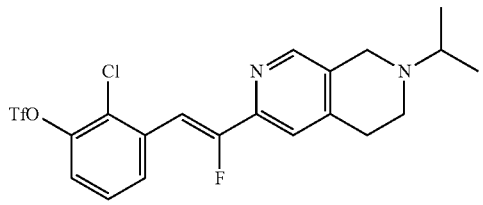 [SMILES: CC(C)N1CCc2cc(/C(F)=C/c3cccc(OS(=O)(=O)C(F)(F)F)c3Cl)ncc2C1]

Step 1: Synthesis of 5-bromo-2-methoxy-4-methylpyridine

5-bromo-2-fluoro-4-methylpyridine (40.0 g, 0.21 mol) and methanol (200 mL) were added to a 1000 mL single-mouth flask, 30% solution of sodium methylate in methanol (75.8 g, 0.42 mol) was then dropwise added. The reaction mixture was heated to reflux overnight. Methanol was removed by reduced-pressure distillation. The residue was added with water (500 mL), and extracted with ethyl acetate (1000 mL*2). The organic phase was washed with saturated saline (500 mL), dried over anhydrous sodium sulfate, filtered and concentrated to obtain 5-bromo-2-methoxy-4-methylpyridine (41.1 g, yield: 97%). ESI-MS: 202.1 [M+H]$^+$.

Step 2: Synthesis of 6-methoxy-4-methylnicotinonitrile

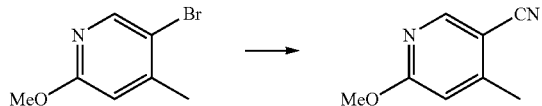

5-bromo-2-methoxy-4-methylpyridine (41.1 g, 0.2 mol), zinc cyanide (47.6 g, 0.4 mol), tetrakis(triphenylphosphine) palladium (10 g, 8.65 mmol) and N, N-dimethylformamide (300 mL) were added to a 500 mL single-mouth flask, and the resulting reaction mixture was reacted at 100° C. overnight. The resulting reaction mixture was cooled to room temperature and then filtered with diatomite, and the filter cake was rinsed with ethyl acetate (300 mL*2). The filtrate was stratified, the aqueous phase extracted with ethyl acetate (300 mL). Organic phases were combined, washed with water, dried over anhydrous sodium sulfate, filtered and concentrated. Then, silica-gel column chromatographic separation (petroleum ether:ethyl acetate=2:1) was conducted to obtain 6-methoxy-4-methylnicotinonitrile (25 g, yield: 84%). ESI-MS: 149.1 [M+H]$^+$.

Step 3: Synthesis of 2-methyl-(5-cyano-2-methoxypyridine-4-yl)acetate

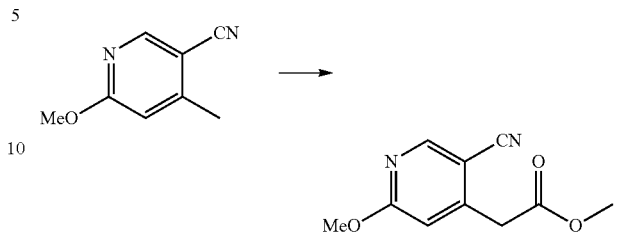

6-methoxy-4-methylnicotinonitrile (25 g, 0.17 mol) and tetrahydrofuran (300 mL) were added to a 1000 mL three-necked flask, 1M LiHMDS (340 mL, 0.34 mol) was then dropwise added under an ice bath; the resulting reaction mixture was brought back to room temperature and stirred for 1 hour; and then, diethyl carbonate (39.9 g, 0.34 mol) was added. The resulting reaction mixture was stirred for 3 hours at room temperature, adjusted to the pH of 8-9 with diluted hydrochloric acid, and extracted with ethyl acetate. The organic phase was washed with saturated saline, dried over anhydrous sodium sulfate, filtered and concentrated. The resulting crude product was separated by silica-gel column chromatography (petroleum ether:ethyl acetate=2:1) to obtain 2-methyl-(5-cyano-2-methoxypyridine-4-yl)acetate (26.2 g, yield: 70%). ESI-MS: 221.2 [M+H]$^+$.

Step 4: Synthesis of 6-methoxy-1,4-dihydro-2,7-naphthyridine-3(2H)-ketone

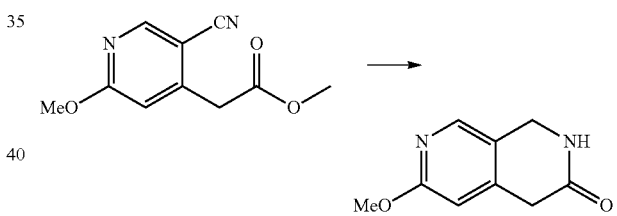

2-methyl-(5-cyano-2-methoxypyridine-4-yl)acetate (12.5 g, 56.8 mmol) was dissolved in ethyl alcohol (300 mL), raney nickel (17.5 g) and ammonia water (30 mL) were then added. The resulting reaction mixture was stirred for 48 hours at 50° C. in the atmosphere of hydrogen. The resulting reaction mixture was cooled to room temperature, and filtered, the filtrate was concentrated to obtain a crude product 6-methoxy-1,4-dihydro-2,7-naphthyridine-3(2H)-ketone (10.5 g, yield: 100%). ESI-MS: 179.0 [M+H]$^+$.

Step 5: Synthesis of 6-methoxy-1,3,4-tetrahydro-2,7-naphthyridine

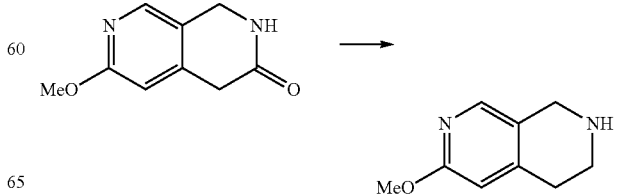

6-methoxy-1,4-dihydro-2,7-naphthyridine-3(2H)-ketone (10.5 g, 60 mmol) was dissolved in tetrahydrofuran (80 mL), 1M borane tetrahydrofuran solution (300 mL, 300 mmol) was then added. The resulting reaction mixture was refluxed and stirred overnight; after the completeness of reaction was demonstrated by LC-MS, the reaction mixture was quenched with methanol and diluted hydrochloric acid, and then concentrated to obtain 6-methoxy-1,2,3,4-tetrahydro-2,7-naphthyridine (crude product), which was directly to be used in the next step. ESI-MS: 165.3 [M+H]+.

Step 6: Synthesis of tert-butyl 6-hydroxy-3,4-dihydro-2,7-naphthyridine-2(1H)-carboxylate

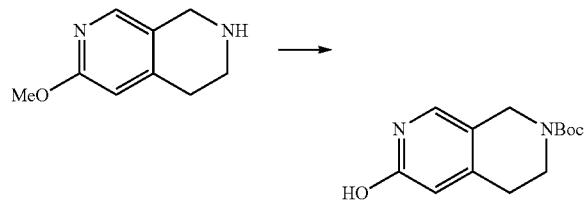

6-methoxy-1,2,3,4-tetrahydro-2,7-naphthyridine (crude product) was dissolved in an aqueous solution of hydrobromic acid (50 mL), and the resulting reaction mixture was stirred at 100° C. overnight. The reaction mixture was concentrated and then dissolved in methanol (150 mL), triethylamine (58.6 g, 58 mmol) and di-tert-butyl dicarbonate (15.4 g, 0.07 mol) were then added. The reaction mixture was stirred for 1 hours at room temperature, methanol was removed by reduced-pressure distillation. The residue was added with water (100 mL) was added, and extracted with ethyl acetate (100 mL*2). The organic phase was washed with saturated saline (50 mL), dried over anhydrous sodium sulfate, filtered and concentrated to obtain tert-butyl 6-hydroxy-3,4-dihydro-2,7-naphthyridine-2(1H)-carboxylate (16.5 g, crude product). ESI-MS: 251.0 [M+H]+.

Step 7: Synthesis of tert-butyl 6-(((trifluoromethyl)sulfonyl)oxy)-3,4-dihydro-2,7-naphthyridine-2(1H)-carboxylate

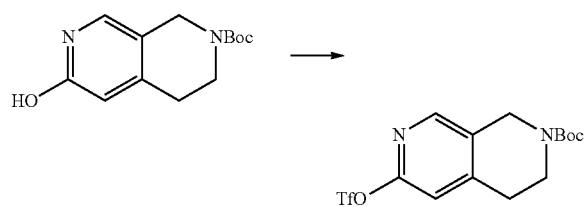

Tert-butyl 6-hydroxy-3,4-dihydro-2,7-naphthyridine-2(1H)-carboxylate (16.5 g, 0.066 mol) was dissolved in dichloromethane (250 mL), triethylamine (20.0 g, 0.2 mmol) and trifluoromethanesulfonic anhydride (24.2 g, 0.086 mol) were then added. The resulting reaction mixture was stirred for 1 hours at room temperature, added with water (100 mL), and extracted with dichloromethane (100 mL*2). The organic phase was washed with saturated saline (100 mL), stratified, dried over anhydrous sodium sulfate, filtered and concentrated to obtain a crude product, which was then separated by silica-gel column chromatography (petroleum ether:ethyl acetate=2:1) to obtain tert-butyl 6-(((trifluoromethyl)sulfonyl)oxy)-3,4-dihydro-2,7-naphthyridine-2(1H)-carboxylate (11.5 g, four-step yield: 53%).

1H NMR (400 MHz, DMSO-d6): δ 8.33 (s, 1H), 7.45 (s, 1H), 4.61 (s, 2H), 3.58 (t, J=5.9 Hz, 2H), 2.91 (t, J=5.9 Hz, 2H), 1.44 (s, 9H). ESI-MS: 383.1 [M+H]+.

Step 8: Synthesis of tert-butyl (Z)-6-(2-(2-chloro-3-(methoxymethoxy)phenyl)-1-fluorovinyl)-3,4-dihydro-2,7-naphthyridine-2(1H)-carboxylate

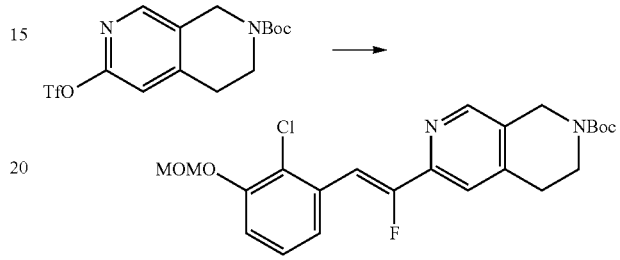

Tert-butyl 6-(((trifluoromethyl)sulfonyl)oxy)-3,4-dihydro-2,7-naphthyridine-2(1H)-carboxy late (1.5 g, 3.93 mmol) was dissolved in tetrahydrofuran (40 mL) and water (20 mL), (Z)-2-(2-(2-chloro-3-(methoxymethoxy)phenyl)-1-fluorovinyl)-4,4,5,5-tetramethyl-1,3,2-dioxaborolane (2.0 g, 5.89 mmol), [(2-di-tert-butylphosphine-2',4',6'-triisopropyl-1,1'-biphenyl)-2-(2'-amino-1,1'-biphenyl)] palladium (II) methanesulfonate] (150 mg) and potassium phosphate (2.0 g, 9.82 mmol) were then added; and the resulting reaction mixture was stirred at 40° C. overnight under the protection of nitrogen. The reaction solution was diluted with water, and extracted with ethyl acetate; and the organic phase was dried and concentrated. Then, column chromatographic separation [eluent: petroleum ether (100%)-ethyl acetate (16%)] was conducted to obtain tert-butyl (Z)-6-(2-(2-chloro-3-(methoxymethoxy)phenyl)-1-fluorovinyl)-3,4-dihydro-2,7-naphthyridine-2(1H)-carboxylate (1.22 g, yield: 69%). ESI-MS: 479 [M+H]+.

Step 9: Synthesis of (Z)-2-chloro-3-(2-fluoro-2-(5,6,7,8-tetrahydro-2,7-naphthyridine-3-yl)vinyl)phenol hydrochloric acid

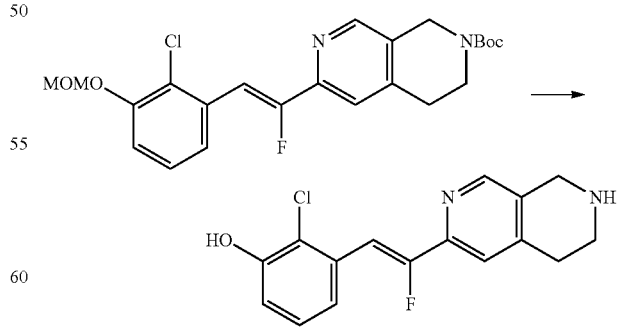

Tert-butyl (Z)-6-(2-(2-chloro-3-(methoxymethoxy)phenyl)-1-fluorovinyl)-3,4-dihydro-2,7-naphthyridine-2(1H)-carboxylate (1.22 g, 2.72 mmol) was dissolved in the mixture of TH F (5 mL) and MeOH (5 mL), and a 4M hydrochloride solution in dioxane (10 mL) was added. The resulting reaction mixture was stirred for 2 hours at room temperature, and then concentrated to obtain (Z)-2-chloro-3-(2-fluoro-2-(5,6,7,8-tetrahydro-2,7-naphthyridine-3-yl)vinyl)phenol hydrochloric acid (crude product). ESI-MS: 305 [M+H]⁺.

Step 10: Synthesis of (Z)-2-chloro-3-(2-fluoro-2-(7-isopropyl-5,6,7,8-tetrahydro-2,7-naphthyridine-3-yl)vinyl)phenol

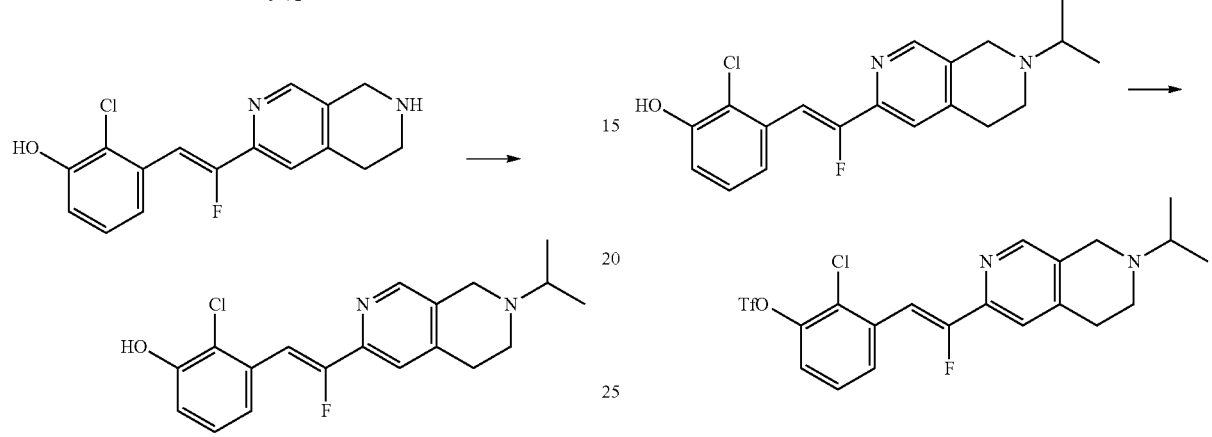

(Z)-2-chloro-3-(2-fluoro-2-(5,6,7,8-tetrahydro-2,7-naphthyridine-3-yl)vinyl)phenol hydrochloric acid (720 mgcrude product, 2.11 mmol) was dissolved in methanol (50 mL), triethylamine (1 mL) and acetone (2 mL) were then added. The resulting reaction mixture was stirred for 1 hour at 40° C., and added with sodium cyanoborohydride (400 mg, 6.35 mmol). The reaction solution was stirred for another 2 hours, and then concentrated, diluted with water, and extracted with ethyl acetate; and the organic phase was dried and concentrated, and then column chromatographic separation [eluent: petroleum ether (100%)-ethyl acetate (50%)] was conducted to obtain (Z)-2-chloro-3-(2-fluoro-2-(7-isopropyl-5,6,7,8-tetrahydro-2,7-naphthyridine-3-yl)vinyl)phenol (386 mg, yield: 53%). ESI-MS: 347 [M+H]⁺.

Step 11: Synthesis of (Z)-2-chloro-3-(2-fluoro-2-(7-isopropyl-5,6,7,8-tetrahydro-2,7-naphthyridine-3-yl)vinyl)phenyl trifluoromethanesulfonic acid

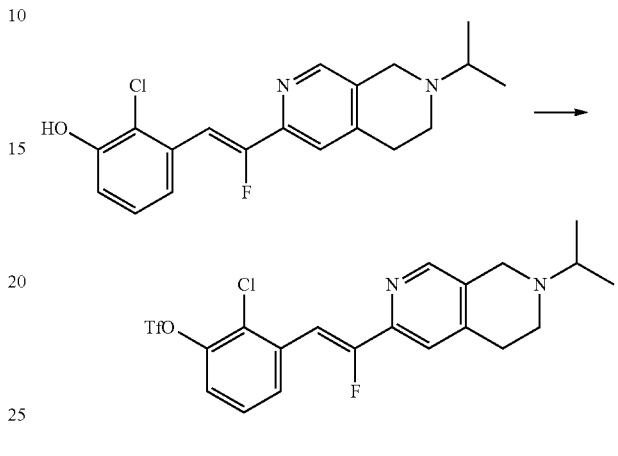

(Z)-2-chloro-3-(2-fluoro-2-(7-isopropyl-5,6,7,8-tetrahydro-2,7-naphthyridine-3-yl)vinyl)phenol (100 mg, 0.29 mmol) was dissolved in anhydrous dichloromethane (12 mL), and triethylamine (86 mg, 0.87 mmol) was added. At 0° C., trifluoromethanesulfonic anhydride (106 mg, 0.376 mmol) was added. The reaction mixture was stirred for 1 hour, then diluted with water, and extracted with ethyl acetate; and the organic phase was dried and concentrated to obtain (Z)-2-chloro-3-(2-fluoro-2-(7-isopropyl-5,6,7,8-tetrahydro-2,7-naphthyridine-3-yl)vinyl)phenyl trifluoromethanesulfonic acid (crude product). ESI-MS: 479 [M+H]⁺.

Intermediates C2-C9 can be prepared by referring to the preparation method for intermediate C1:

| Intermediate No. | Structural Formula | Compound name | [M + H]⁺ |
| --- | --- | --- | --- |
| C2 | | (Z)-2-chloro-3-(2-(7-cyclopropyl-5,6,7,8-tetrahydro-2,7-naphthyridin-3-yl)-2-fluorovinyl)phenyl trifluoromethanesulfonate | 477 |
| C3 | | (R,Z)-2-chloro-3-(2-fluoro-2-(7-(2-hydroxypropyl)-5,6,7,8-tetrahydro-2,7-naphthyridin-3-yl)vinyl)phenyl trifluoromethanesulfonate | 495 |
| C4 | | (Z)-2-chloro-3-(2-fluoro-2-(7-(3-hydroxypropyl)-5,6,7,8-tetrahydro-2,7-naphthyridin-3-yl)vinyl)phenyl trifluoromethanesulfonate | 495 |

-continued

| Intermediate No. | Structural Formula | Compound name | [M + H]+ |
|---|---|---|---|
| C5 | | (Z)-2-chloro-3-(2-fluoro-2-(7-(4-hydroxycyclohexyl)-5,6,7,8-tetrahydro-2,7-naphthyridin-3-yl)vinyl)phenyl trifluoromethanesulfonate | 535 |
| C6 | | (Z)-2-chloro-3-(2-(7-(5-(dimethylamino)-5-oxopentyl)-5,6,7,8-tetrahydro-2,7-naphthyridin-3-yl)-2-fluorovinyl) phenyl trifluoromethanesulfonate | 564 |
| C7 | | (1R,4R)-4-(6-((Z)-2-(2-chloro-3-(((trifluoromethyl)sulfonyl)oxy)phenyl)-1-fluorovinyl)-3,4-dihydro-2,7-naphthyridin-2(1H)-yl)-1-methylcyclohexane-1-carboxylic acid | 577 |
| C8 | | (Z)-4-(2-(6-(2-(2-chloro-3-(((trifluoromethyl)sulfonyl)oxy)phenyl)-1-fluorovinyl)-3,4-dihydro-2,7-naphthyridin-2(1H)-yl)ethyl)bicyclo[2.2.1]heptane-1-carboxylic acid | 603 |
| C9 | | (Z)-4-((6-(2-(2-chloro-3-(((trifluoromethyl)sulfonyl)oxy)phenyl)-1-fluorovinyl)-3,4-dihydro-2,7-naphthyridin-2(1H)-yl)methyl)bicyclo[2.2.1]heptane-1-carboxylic acid | 589 |

Intermediate D: Preparation of methyl 4-(2-oxo-ethyl)bicyclo[2.2.1]heptane-1-carboxylate Step 1: Synthesis of 4-(methoxycarbonyl)bicyclo[2.2.1]heptane-1-carboxylic acid

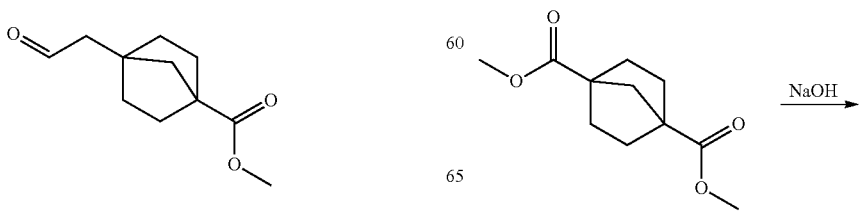

-continued

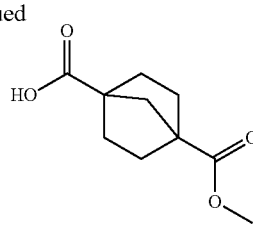

Tetrahydrofuran (180 mL) was added to a single-mouth flask filled with dimethylbicyclo[2.2.1]heptane-1,4-dicarboxylate (5.6 g, 26.4 mmol), a solution of sodium hydroxide (1.06 g, 26.4 mmol) in methanol (11 mL) was then added dropwise by using a constant-pressure dropping funnel. The resulting reaction mixture was stirred overnight at room temperature. The reaction mixture was concentrated to spin-dry the solvent. Solids were washed with petroleum ether and then filtered, and a filter cake was dissolved in water (50 mL). The resulting water solution was acidified to pH=4 with 2M hydrochloric acid and then extracted with ethyl acetate. An organic phase was washed with water and saturated sodium chloride, dried over anhydrous sodium sulfate, filtered, and concentrated to obtain 4-(methoxycarbonyl)bicyclo[2.2.1]heptane-1-carboxylic acid (4.17 g, yield: 80%).

Step 2: Synthesis of methyl 4-(hydroxymethyl)bicyclo[2.2.1]heptane-1-carboxylate

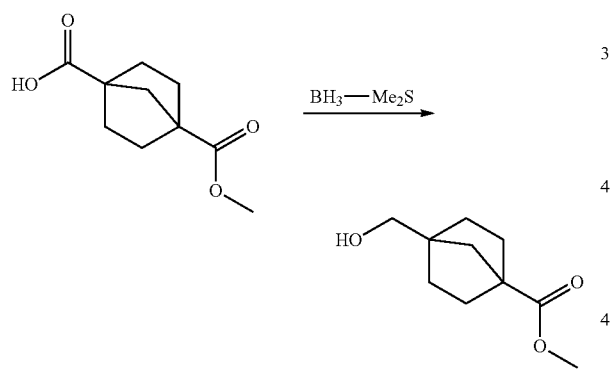

Under an ice bath, dry tetrahydrofuran (100 mL) was added to a single-mouth flask filled with 4-(methoxycarbonyl)bicyclo[2.2.1]heptane-1-carboxylic acid (4.17 g, 21.03 mmol), a borane dimethyl sulfide complex (2.7 mL, 27.35 mmol, 10.0 M) was then slowly added dropwise by using a syringe. After dropwise addition, the resulting mixture was stirred overnight at room temperature. Methanol (10 mL) was added dropwise to the reaction mixture, then the reaction mixture was refluxed for 4 hours and then quenched, extracted with a mixture of ethyl acetate/water. The organic phase was washed with water and saturated sodium chloride, dried over anhydrous sodium sulfate, filtered, and concentrated. Then, column chromatographic separation (petroleum ether/ethyl acetate=3:2) was conducted to obtain methyl 4-(hydroxymethyl)bicyclo[2.2.1]heptane-1-carboxylate (3.53 g, yield: 90%).

$^1$H NMR (400 MHz, CDCl$_3$) δ 3.70 (s, 2H), 3.67 (s, 3H), 2.06-1.93 (m, 2H), 1.73-1.62 (m, 4H), 1.58-1.54 (m, 2H), 1.43-1.34 (m, 2H).

Step 3: Synthesis of methyl 4-formylbicyclo[2.2.1]heptane-1-carboxylate

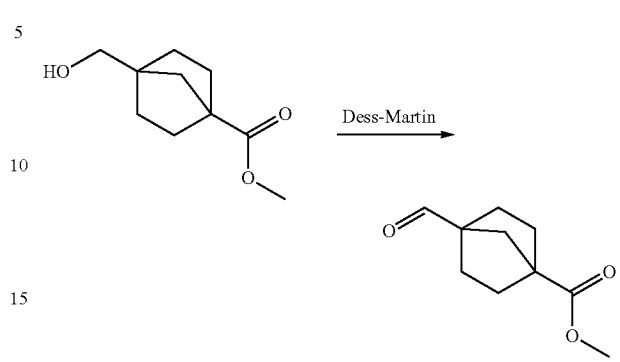

Dichloromethane (180 mL) was added to and dissolved in a single-mouth flask filled with methyl 4-(hydroxymethyl)bicyclo[2.2.1]heptane-1-carboxylate (4.75 g, 25.7 mmol). A Dess-Martin reagent (13.1 g, 30.9 mmol) was added to the resulting solution. The reaction mixture was stirred at room temperature, and the reaction was detected by TLC until starting materials disappeared. The reaction mixture was filtrated with diatomite, the filtrate was concentrated and then subjected to column chromatographic separation (petroleum ether/ethyl acetate=5:1) to obtain methyl 4-formylbicyclo[2.2.1]heptane-1-carboxylate (3.38 g, yield: 72%).

$^1$H NMR (400 MHz, CDCl$_3$) δ 9.81 (s, 1H), 3.70 (s, 3H), 2.13-2.00 (m, 4H), 1.86-1.82 (m, 2H), 1.79-1.68 (m, 2H), 1.60-1.52 (m, 2H).

Step 4: Synthesis of methyl (E/Z)-4-(2-methoxyvinyl)bicyclo[2.2.1]heptane-1-carboxylate

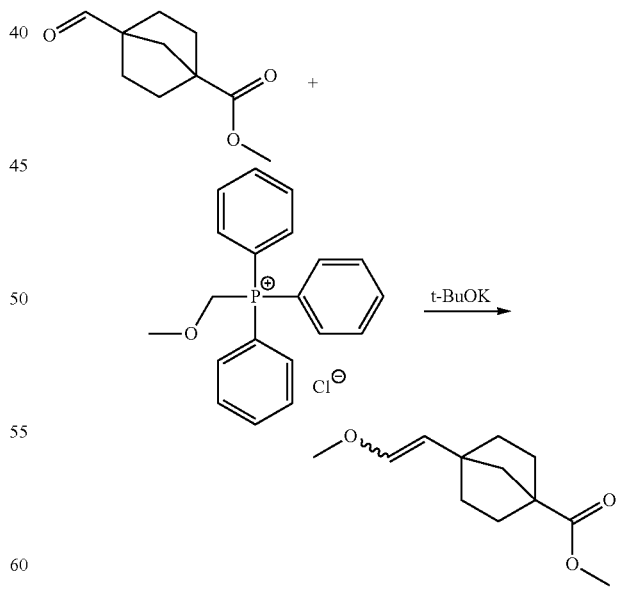

In a nitrogen atmosphere, potassium tert-butoxide (10 mL, 1.0 M) was added dropwise to a suspension of (methoxymethyl)triphenylphosphorus chloride (3.4 g, 9.87 mmol) in dry tetrahydrofuran (45 mL). After dropwise addition, the resulting mixture was stirred for half an hour at room temperature. A solution of methyl 4-formylbicyclo[2.2.1]heptane-1-carboxylate (1.2 g, 6.58 mmol) in tetrahydrofuran (12 mL) was added dropwise to the reaction mixture. After dropwise addition, the reaction mixture was stirred for 3 hours at room temperature, quenched with a saturated ammonium chloride solution, extracted with Ethyl acetate. The organic phase was washed with water and saturated sodium chloride, dried over anhydrous sodium sulfate, filtered, and concentrated. Then, column chromatographic separation (petroleum ether/ethyl acetate=9:1) was conducted to obtain methyl (E/Z)-4-(2-methoxyvinyl)bicyclo[2.2.1]heptane-1-carboxylate (0.74 g, containing little triphenylphosphine).

Step 5: Synthesis of methyl 4-(2-oxoethyl)bicyclo[2.2.1]heptane-1-carboxylate

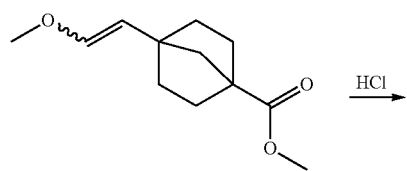 HCl →

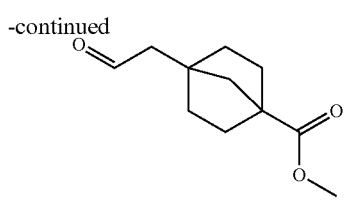

1M HCl (47 mL) was added to a solution of methyl (E/Z)-4-(2-methoxyvinyl)bicyclo[2.2.1]heptane-1-carboxylate (1.0 g, 4.7 mmol) in tetrahydrofuran (30 mL). The resulting reaction mixture was stirred for 2 hours at room temperature, alkalified with saturated sodium bicarbonate, and then extracted with ethyl acetate. The organic phase was washed with water and saturated sodium chloride, dried over anhydrous sodium sulfate, filtered, and concentrated. Then, column chromatographic separation (petroleum ether/ethyl acetate=3:1) was conducted to obtain methyl 4-(2-oxoethyl)bicyclo[2.2.1]heptane-1-carboxylate (0.85 g).

$^1$H NMR (400 MHz, CDCl$_3$) δ 9.80 (t, J=2.7 Hz, 1H), 3.68 (s, 3H), 2.60 (d, J=2.6 Hz, 2H), 2.06-1.95 (m, 2H), 1.69-1.55 (m, 8H).

Intermediates D2-D5 can be prepared by referring to the preparation method for intermediate D1:

| Intermediate No. | Structural Formula | Compound name | [M + H]$^+$ |
|---|---|---|---|
| D2 | | methyl 4-(2-oxoethyl)bicyclo[2.2.2]octane-1-carboxylate | 211 |
| D3 | | methyl 3-(3-oxopropyl)bicyclo[1.1.1]pentane-1-carboxylate | 183 |
| D4 | | methyl (1R,4R)-4-(3-oxopropyl)cyclohexane-1-carboxylate | 199 |
| D5 | | methyl 4-(3-oxopropyl)cubane-1-carboxylate | 219 |

Intermediate E: Preparation of 5-(tert-butyl) 2-methyl 1-methyl-1,4,6,7-tetrahydro-5H-imidazo[4,5-c]pyridine-2,5-dicarboxylate

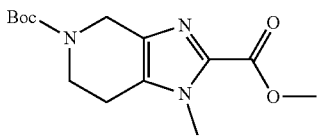 [SMILES: COC(=O)c1nc2c(n1C)CCN(C(=O)OC(C)(C)C)C2]

Step 1: Synthesis of N-methyl-3-nitropyridine-4-amine

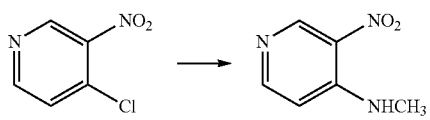 [SMILES: O=[N+]([O-])c1cnccc1Cl ; CNc1ccncc1[N+](=O)[O-]]

4-chloro-3-nitropyridine (25.0 g, 158.22 mmol) was dissolved in dichloromethane (200 mL), methylamine water solution (40%, 78 mL) was then added dropwise under of an ice bath. The resulting reaction mixture was stirred for 3 hours at room temperature, then separated out the organic phase. The aqueous phase was extracted with dichloromethane (200 mL*3). The organic phases were combined, dried over anhydrous sodium sulfate, and concentrated to obtain N-methyl-3-nitropyridine-4-amine (24 g, yield: 96%). ESI-MS: 154 [M+H]$^+$.

Step 2: Synthesis of N$^4$-methylpyridine-3,4-diamine

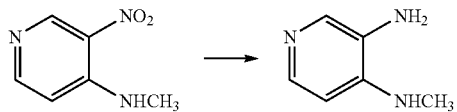 [SMILES: CNc1ccncc1[N+](=O)[O-] ; CNc1ccncc1N]

N-methyl-3-nitropyridine-4-amine (23.7 g) was dissolved in methanol (600 mL), wet powder of palladium on carbon (10% Pd, 4.0 g) was then added. The resulting reaction mixture was stirred overnight at room temperature in the presence of hydrogen. The palladium on carbon was removed by filtering. The filtrate was concentrated to obtain N$^4$-methylpyridine-3,4-diamine (crude product). ESI-MS: 124 [M+H]$^+$.

Step 3: Synthesis of 1-methyl-1H-imidazo[4,5-c]pyridine

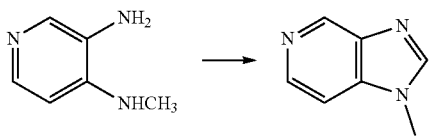

N$^4$-methylpyridine-3,4-diamine (crude product) was dissolved in 98% formic acid (150 mL), and the mixture was heated to 100° C. to react for 48 hours. The resulting reaction mixture was concentrated, dichloromethane (200 mL) was then added. The pH of the reaction mixture was adjusted to 8-10 with 10% sodium hydroxide solution. The aqueous phase was extracted with dichloromethane:methanol=10:1. The organic phases were combined, dried over anhydrous sodium sulfate, and concentrated. Then, column chromatographic separation [eluent: dichloromethane (100%)-methanol (10%)] was conducted to obtain 1-methyl-1H-imidazo[4,5-c]pyridine (16 g). ESI-MS: 134 [M+H]$^+$.

Step 4: Synthesis of 5-(2-(4-methoxyphenyl)-2-oxoethyl)-1-methyl-1H-imidazo[4,5-c]pyridine-5-bromide Positive Ion

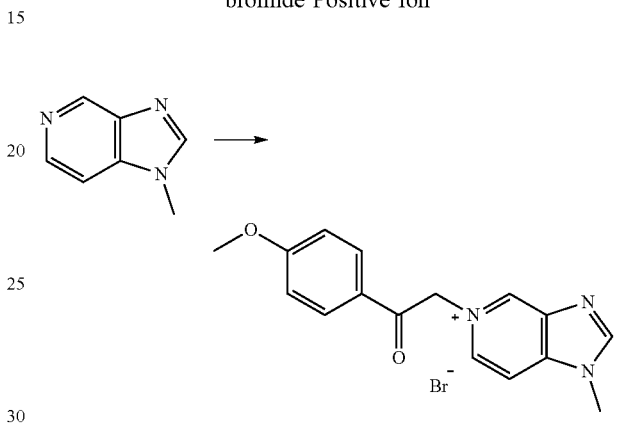

1-methyl-1H-imidazo[4,5-c]pyridine (29.7 g, 223.30 mmol) was dissolved in acetone (400 mL), a solution of 2-bromo-1-(4-methoxyphenyl)ethane-1-ketone (56 g, 245.63 mmol) in acetone (300 mL) was added dropwise. The resulting reaction mixture was stirred for 3 hours at room temperature, and then filtered. The filter cake was dried to obtain 5-(2-(4-methoxyphenyl)-2-oxoethyl)-1-methyl-1H-imidazo[4,5-c]pyridine-5-bromide positive ion (78.5 g, yield: 97%). ESI-MS: 282 [M+H]$^+$.

Step 5: Synthesis of 1-(4-methoxyphenyl)-2-(1-methyl-1,4,6,7-tetrahydro-5H-imidazo[4,5-c]pyridine-5-yl)ethane-1-ol

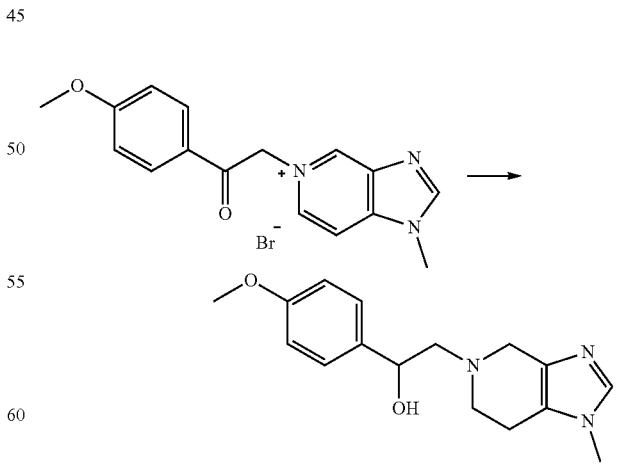

5-(2-(4-methoxyphenyl)-2-oxoethyl)-1-methyl-1H-imidazo[4,5-c]pyridine-5-bromide positive ion (73.5 g, 203.60 mmol) was dissolved in methanol (600 mL), sodium borohydride (23.2 g, 610.80 mmol) was then added portionwise slowly under an ice bath. The resulting reaction mixture was stirred overnight at room temperature. After the reaction mixture was concentrated, water and ethyl acetate were added. The organic phase was separated and dried over anhydrous sodium sulfate, and concentrated to obtain 1-(4-methoxyphenyl)-2-(1-methyl-1,4,6,7-tetrahydro-5H-imidazo[4,5-c]pyridine-5-yl)ethane-1-ol (66 g of crude product). ESI-MS: 288 [M+H]⁺.

Step 6: Synthesis of tert-butyl 1-methyl-1,4,6,7-tetrahydro-5H-imidazo[4,5-c]pyridine-5-carboxylate

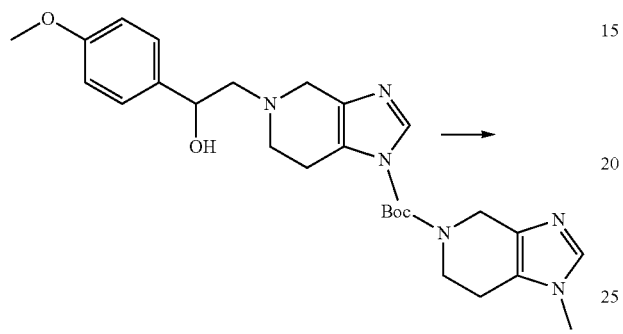

1-(4-methoxyphenyl)-2-(1-methyl-1,4,6,7-tetrahydro-5H-imidazo[4,5-c]pyridine-5-yl)ethane-1-ol (55 g of crude product) was dissolved in ethanol (150 mL), concentrated hydrochloric acid (100 mL) was then added. The resulting reaction mixture was stirred overnight at 110° C. After concentrating, water and ethyl acetate were added, the organic phase was separated. Acetone (150 mL) was added to the aqueous phase, the pH of which was adjusted to 8-9 with potassium carbonate. The di-tert-butyldicarbonate (41.8 g) was added dropwise. The reaction mixture was stirred overnight at room temperature. The acetone was spinned to dryness. The residue was washed with ethyl acetate. The organic phase was dried over anhydrous sodium sulfate, and concentrated. Then, column chromatographic separation [eluent: dichloromethane (100%-methanol (6%))] was conducted to obtain tert-butyl 1-methyl-1,4,6,7-tetrahydro-5H-imidazo[4,5-c]pyridine-5-carboxylate (28 g). ESI-MS: 238 [M+H]⁺.

¹H NMR (400 MHz, CDCl₃) δ 7.27 (s, 1H), 4.38 (s, 2H), 3.67 (d, J=6.1 Hz, 2H), 3.46 (s, 3H), 2.53 (t, J=5.8 Hz, 2H), 1.40 (s, 9H).

Step 7: Synthesis of 5-(tert-butyl) 2-methyl 1-methyl-1,4,6,7-tetrahydro-5H-imidazo[4,5-c]pyridine-2,5-dicarboxylate

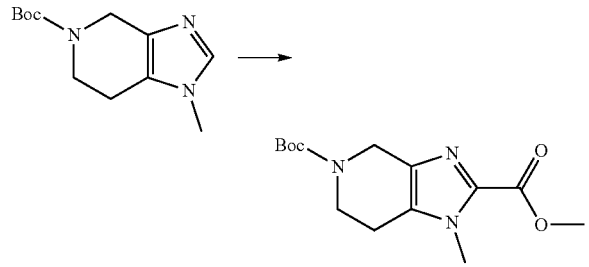

Tert-butyl 1-methyl-1,4,6,7-tetrahydro-5H-imidazo[4,5-c]pyridine-5-carboxylate (3.5 g, 14.77 mmol) was dissolved in anhydrous tetrahydrofuran (40 mL), n-butyllithium (7 mL, 17.72 mmol) was then added dropwise at −78° C. After dropwise addition, the resulting reaction mixture was stirred for 10 minutes at −78° C. Then, the reaction mixture was rapidly added dropwise to ethylchloroformate (1.7 mL, 22.15 mmol) in anhydrous tetrahydrofuran (40 mL). The reaction mixture was stirred for another 30 minutes at −78° C., poured into water, and extracted with ethyl acetate. The organic phase was dried over anhydrous sodium sulfate and concentrated. Then, column chromatographic separation [eluent: dichloromethane (100%)-methanol (6%)] was conducted to obtain 5-(tert-butyl) 2-methyl 1-methyl-1,4,6,7-tetrahydro-5H-imidazo[4,5-c]pyridine-2,5-dicarboxylate (2.6 g, yield: 60%). ESI-MS: 296 [M+H]⁺.

Intermediate F1: Preparation of tert-butyl 2-((2-cloro-3-(4,4,5,5-tetramethyl-1,3,2-dioxaborolan-2-yl)phenyl)carbamoyl)-1-methyl-1,4,6,7-tetrahydro-5H-imidazo[4,5-c]pyridine-5-carboxylate

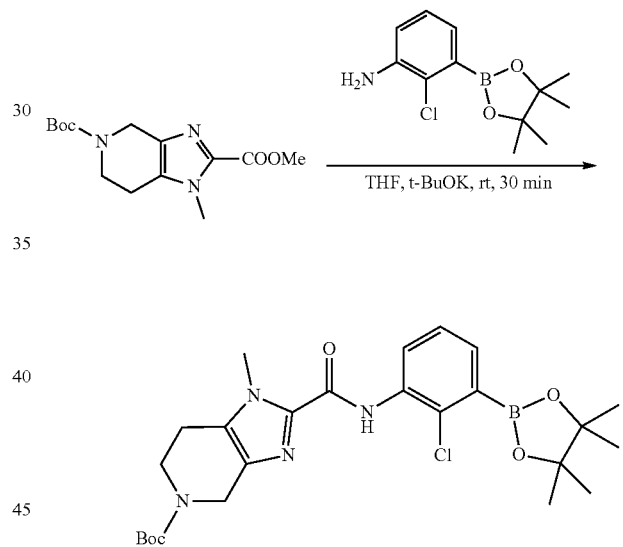

2-chloro-3-(4,4,5,5-tetramethyl-1,3,2-dioxaborolan-2-yl)phenylamine (500 mg, 1.98 mmol) was dissolved in anhydrous tetrahydrofuran (20 mL), 5-(tert-butyl) 2-methyl 1-methyl-1,4,6,7-tetrahydro-5H-imidazo[4,5-c]pyridine-2,5-dicarboxylate (700 mg, 2.37 mmol) was then added. The resulting reaction mixture was stirred for 10 min at room temperature. A 1M solution of potassium tert-butoxide in tetrahydrofuran (4 mL, 3.95 mmol) was added dropwise. The mixture was stirred for half an hour, then diluted with water, and extracted with ethyl acetate. The organic phase was dried and concentrated to obtain a crude product. The crude product was pulped with a mixture of PE:EA=50:1, filtered and dried to obtain tert-butyl 2-((2-chloro-3-(4,4,5,5-tetramethyl-1,3,2-dioxaborolan-2-yl)phenyl)carbamoyl)-1-methyl-1,4,6,7-tetrahydro-5H-imidazo[4,5-c]pyridine-5-carboxylate (540 mg). ESI-MS: 517 [M+H]⁺.

Intermediates F2-F10 can be prepared by referring to the preparation method for intermediate F1:

| Intermediate No. | Structural Formula | Compound name | [M + H]+ |
|---|---|---|---|
| F2 | 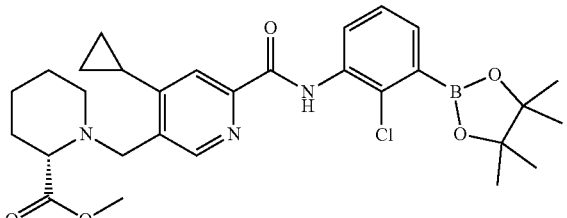 | methyl (S)-1-((6-((2-chloro-3-(4,4,5,5-tetramethyl-1,3,2-dioxaborolan-2-yl)phenyl)carbamoyl)-4-cyclopropylpyridin-3-yl)methyl)piperidine-2-carboxylate | 555 |
| F3 | 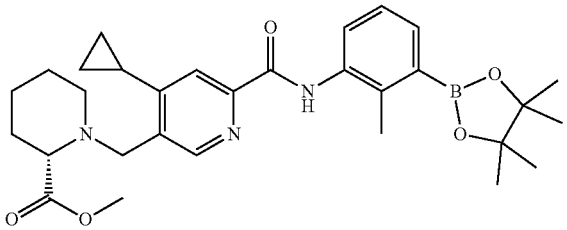 [SMILES: COC(=O)[C@@H]1CCCCN1Cc1cnc(C(=O)Nc2cccc(B3OC(C)(C)C(C)(C)O3)c2C)cc1C1CC1] | methyl (S)-1-((4-cyclopropyl-6-((2-methyl-3-(4,4,5,5-tetramethyl-1,3,2-dioxaborolan-2-yl)phenyl)carbamoyl)pyridin-3-yl)methyl)piperidine-2-carboxylate | 534 |
| F4 | 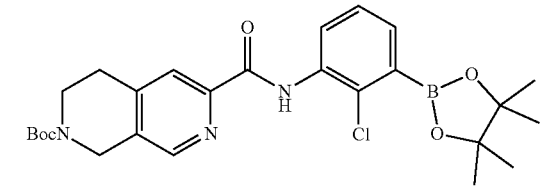 [SMILES: CC(C)(C)OC(=O)N1CCc2cc(C(=O)Nc3cccc(B4OC(C)(C)C(C)(C)O4)c3Cl)ncc2C1] | tert-butyl 6-((2-chloro-3-(4,4,5,5-tetramethyl-1,3,2-dioxaborolan-2-yl)phenyl)carbamoyl)-3,4-dihydro-2,7-naphthyridine-2(1H)-carboxylate | 514 |
| F5 | 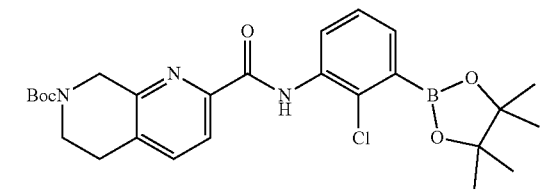 [SMILES: CC(C)(C)OC(=O)N1CCc2ccc(C(=O)Nc3cccc(B4OC(C)(C)C(C)(C)O4)c3Cl)nc2C1] | tert-butyl 2-((2-chloro-3-(4,4,5,5-tetramethyl-1,3,2-dioxaborolan-2-yl)phenyl)carbamoyl)-5,8-dihydro-1,7-naphthyridine-7(6H)-carboxylate | 514 |
| F6 | 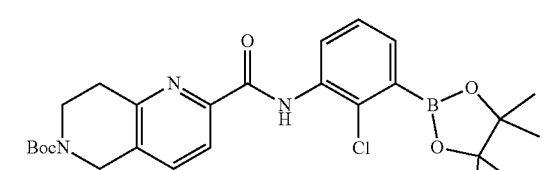 | tert-butyl 2-((2-chloro-3-(4,4,5,5-tetramethyl-1,3,2-dioxaborolan-2-yl)phenyl)carbamoyl)-7,8-dihydro-1,6-naphthyridine-6(5H)-carboxylate | 514 |
| F7 | 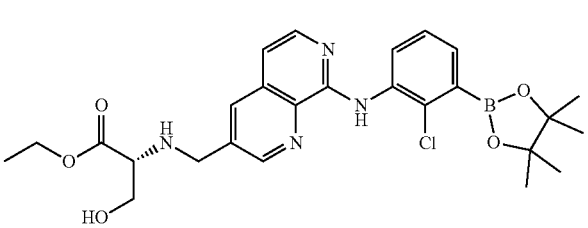 [SMILES: CCOC(=O)[C@@H](CO)NCc1cnc2c(Nc3cccc(B4OC(C)(C)C(C)(C)O4)c3Cl)nccc2c1] | ethyl ((8-((2-chloro-3-(4,4,5,5-tetramethyl-1,3,2-dioxaborolan-2-yl)phenyl)amino)-1,7-naphthyridin-3-yl)methyl)-D-serinate | 527 |
| F8 | 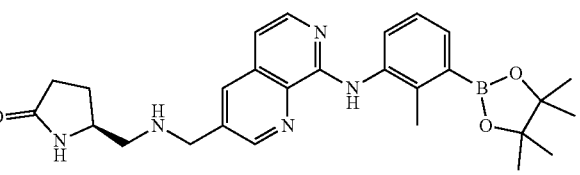 | (S)-5-((((8-((2-methyl-3-(4,4,5,5-tetramethyl-1,3,2-dioxaborolan-2-yl)phenyl)amino)-1,7-naphthyridin-3-yl)methyl)amino)methyl)pyrrolidin-2-one | 488 |

| Intermediate No. | Structural Formula | Compound name | [M + H]+ |
|---|---|---|---|
| F9 | | (S)-5-((((8-((2-chloro-3-(4,4,5,5-tetramethyl-1,3,2-dioxaborolan-2-yl)phenyl)amino)-1,7-naphthyridin-3-yl)methyl)amino)methyl)pyrrolidin-2-one | 508 |
| F10 | | ((8-((2-chloro-3-(4,4,5,5-tetramethyl-1,3,2-dioxaborolan-2-yl)phenyl)amino)-1,7-naphthyridin-3-yl)methyl)-D-serine | 499 |

II. Preparation of Specific Examples

Example 1: Preparation of 4-(2-(2-((2,2'-dichloro-3'-(7-isopropyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid

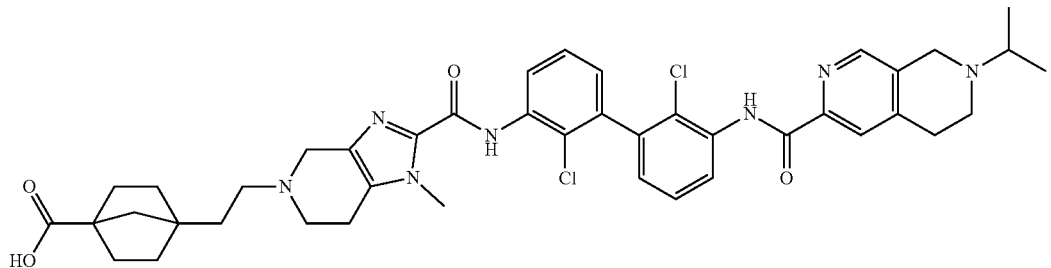 [SMILES: CC(C)N1CCc2cc(C(=O)Nc3cccc(-c4cccc(NC(=O)c5nc6c(n5C)CCN(CCC57CCC(C(=O)O)(CC5)C7)C6)c4Cl)c3Cl)ncc2C1]

Step 1: Synthesis of tert-butyl 2-((2,2'-dichloro-3'-(7-isopropyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-carboxylate

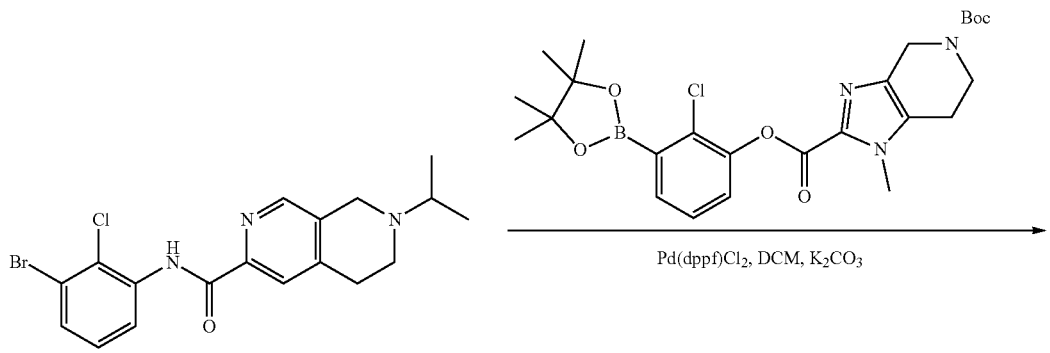

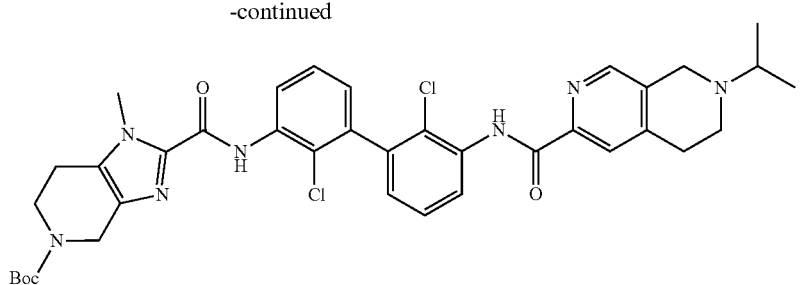

N-(3-bromo-2-chlorophenyl)-7-isopropyl-5,6,7,8-tetrahydro-2,7-naphthyridine-3-formamide (160 mg, 0.39 mmol) was dissolved in a mixture solvent of 1,4-dioxane (8 mL) and water (2 mL); tert-butyl 2-((2-chloro-3-(4,4,5,5-tetramethyl-1,3,2-dioxaborolane-2-yl)phenyl)carbamoyl)-1-methyl-1,4,6,7-tetrahydro-5H-imidazo[4,5-c]pyridin-5-carboxylate (264 mg, 0.51 mmol), Pd(dppf)Cl$_2$·DCM (20 mg) and potassium carbonate (109 mg, 0.79 mmol) were added; and the resulting reaction mixture was stirred at 95° C. overnight under the protection of nitrogen. The reaction solution was diluted with water, and extracted with ethyl acetate; and the organic phase was dried and concentrated. Then, column chromatographic separation [eluent: petroleum ether (100%)-ethyl acetate (100%), then dichloromethane (100%)-methanol (5%)] was conducted to obtain tert-butyl 2-((2,2'-dichloro-3'-(7-isopropyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-carboxylate (108 mg). ESI-MS: 718 [M+H]$^+$.

Step 2: Synthesis of N-(2,2'-dichloro-3'-(1-methyl-4,5,6,7-tetrahydro-1H-imidazo[4,5-c]pyridin-2-carboxamido)-[1,1'-biphenyl]-3-yl)-7-isopropyl-5,6,7,8-tetrahydro-2,7-naphthyridine-3-formamide hydrochloride

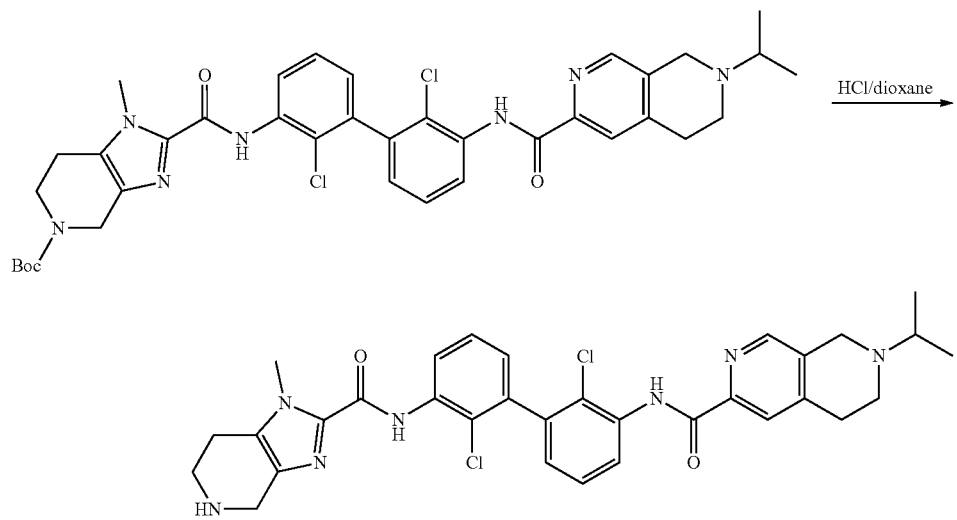

Tert-butyl 2-((2,2'-dichloro-3'-(7-isopropyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-carboxylate (108 mg, 0.15 mmol) was dissolved in a mixture of THF (2 mL) and MeH (2 mL), and a 4M hydrochloride solution in dioxane (2 mL) was added. The resulting reaction mixture was stirred for 2 hours at room temperature, and then concentrated to obtain N-(2,2'-dichloro-3-(1-methyl-4,5,6,7-tetrahydro-1H-imidazo[4,5-c]pyridin-2-carboxamido)-[1,1'-biphenyl]-3-yl)-7-isopropyl-5,6,7,8-tetrahydro-2,7-naphthyridine-3-formamide hydrochloride (crude product). ESI-MS: 309.7 [M/2+H]$^+$.

Step 3: Synthesis of methyl 4-(2-(2-(((2,2'-dichloro-3'-(7-isopropyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylate

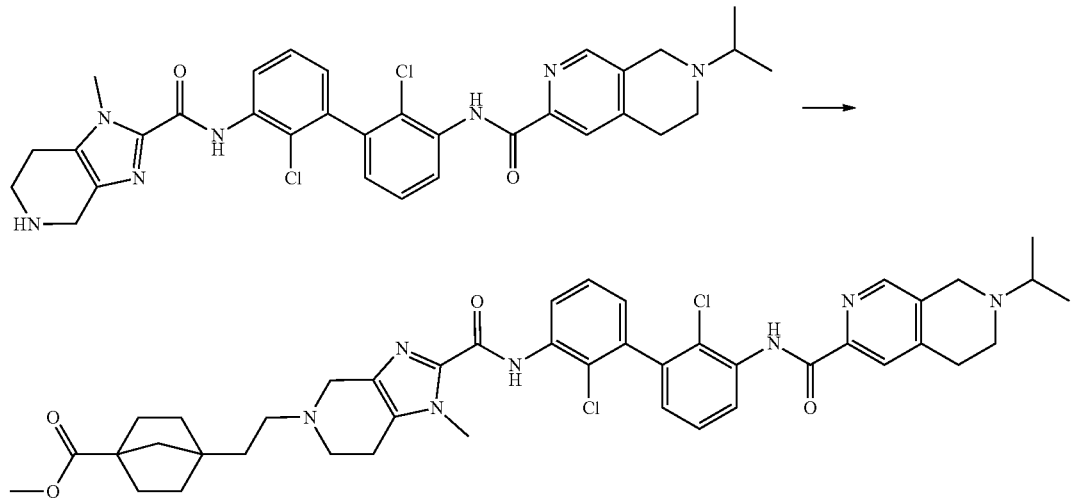

N-(2,2'-dichloro-3'-(1-methyl-4,5,6,7-tetrahydro-1H-imidazo[4,5-c]pyridin-2-carboxamido)-[1,1'-biphenyl]-3-yl)-7-isopropyl-5,6,7,8-tetrahydro-2,7-naphthyridine-3-formamide hydrochloride (crude product, 0.15 mmol) was dissolved in dichloromethane (5 mL), triethylamine (0.3 mL) and methyl 4-(2-oxoethyl)bicyclo[2.2.1]heptane-1-carboxylate (100 mg of crude product) were then added. The resulting reaction mixture was stirred for half an hour at room temperature, and sodium triacetoxyborohydride (96 mg, 0.45 mmol) was added. The reaction solution was stirred for another half an hour at room temperature, diluted with water, and extracted with ethyl acetate; and the organic phase was dried and concentrated, and then column chromatographic separation [eluent: dichloromethane (100%)-methanol (5%)] was conducted to obtain methyl 4-(2-(2-((2,2'-dichloro-3'-(7-isopropyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl) bicyclo[2.2.1]heptane-1-carboxylate. ESI-MS: 399.9 $[M/2+H]^+$.

Step 4: Synthesis of 4-(2-(2-((2,2'-dichloro-3'-(7-isopropyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid

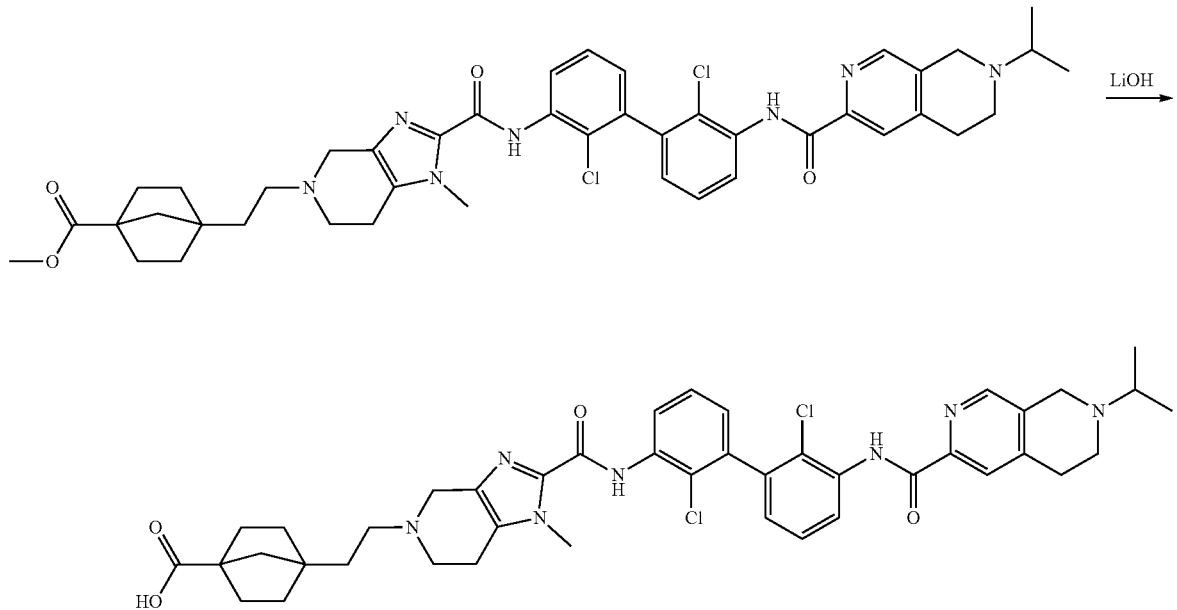

Methyl 4-(2-(2-((2,2'-dichloro-3'-(7-isopropyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl) bicyclo[2.2.1]heptane-1-carboxylate (135 mg, 0.17 mmol) was dissolved in a mixture of THF:MeOH:H$_2$O=1:1:1 (3 mL), lithium hydroxide (100 mg) was then added. The resulting reaction mixture was stirred for 2 hours at room temperature, then filtered and subjected to reversed-phase column chromatographic separation [eluent: water (0.5% formic acid)/acetonitrile, acetonitrile: 0-28%)], and then lyophilized to obtain 4-(2-(2-((2,2'-dichloro-3'-(7-isopropyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl) bicyclo[2.2.1]heptane-1-carboxylic acid (58 mg, yield: 44%). ESI-MS: 392.8 [M/2+H]$^+$.

$^1$H NMR (400 MHz, DMSO-d$_6$) δ 11.94 (s, 1H), 10.71 (s, 1H), 9.90 (s, 1H), 8.55 (dd, J=8.4, 1.5 Hz, 1H), 8.47 (s, 1H), 8.38 (dd, J=8.2, 1.5 Hz, 1H), 7.98 (s, 1H), 7.51 (dt, J=15.8, 8.0 Hz, 2H), 7.16 (td, J=7.8, 1.6 Hz, 2H), 3.90 (s, 3H), 3.77 (s, 2H), 3.42 (s, 2H), 2.93 (d, J=5.6 Hz, 3H), 2.71 (dd, J=32.6, 5.6 Hz, 6H), 2.53 (s, 2H), 1.93-1.67 (m, 4H), 1.57-1.30 (m, 8H), 1.08 (d, J=6.5 Hz, 6H).

Examples 2-78 can be prepared by selecting corresponding starting materials according to complete or partial synthesis method of Example 1.

| Example No. | Compound structure and name | [M + H]$^+$ |
|---|---|---|
| 2 | 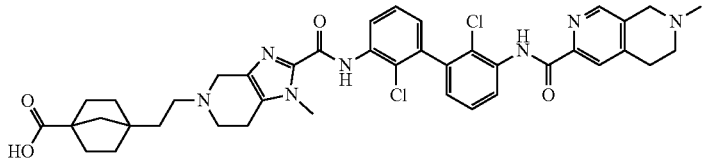 [SMILES: CN1CCc2cc(C(=O)Nc3cccc(-c4cccc(NC(=O)c5nc6c(n5C)CCN(CCC57CCC(C(=O)O)(CC5)C7)C6)c4Cl)c3Cl)ncc2C1]<br>4-(2-(2-((2,2'-dichloro-3'-(7-methyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 756 |
| 3 | 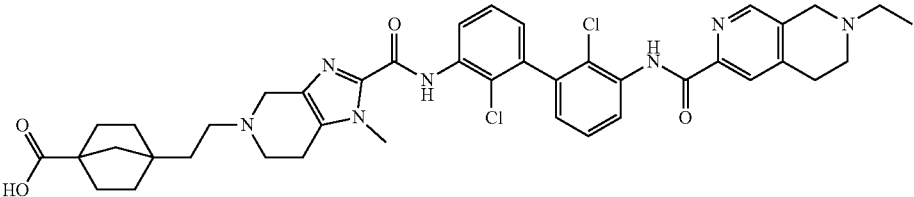 [SMILES: CCN1CCc2cc(C(=O)Nc3cccc(-c4cccc(NC(=O)c5nc6c(n5C)CCN(CCC57CCC(C(=O)O)(CC5)C7)C6)c4Cl)c3Cl)ncc2C1]<br>4-(2-(2-((2,2'-dichloro-3'-(7-ethyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 770 |
| 4 | 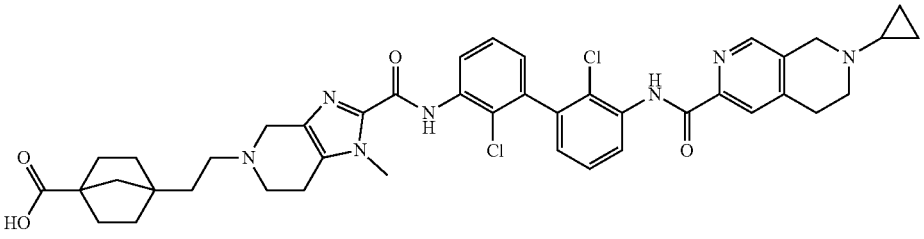 [SMILES: Cn1c(C(=O)Nc2cccc(-c3cccc(NC(=O)c4cc5c(cn4)CN(C4CC4)CC5)c3Cl)c2Cl)nc2c1CCN(CCC13CCC(C(=O)O)(CC1)C3)C2]<br>4-(2-(2-((2,2'-dichloro-3'-(7-cyclopropyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 782 |

| Example No. | Compound structure and name | [M + H]+ |
|---|---|---|
| 5 | 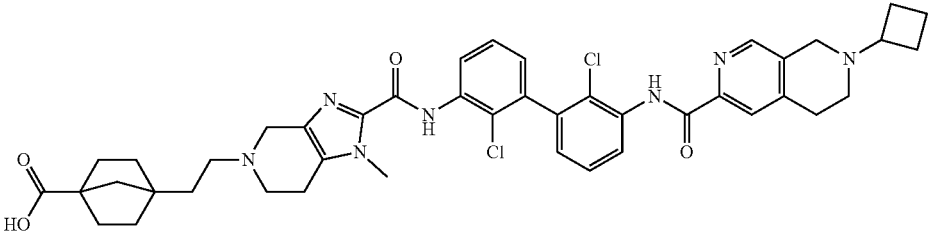 [SMILES: Cn1c(C(=O)Nc2cccc(-c3cccc(NC(=O)c4cc5c(cn4)CN(C4CCC4)CC5)c3Cl)c2Cl)nc2c1CCN(CCC13CCC(C(=O)O)(CC1)C3)C2]<br>4-(2-(2-((2,2'-dichloro-3'-(7-cyclobutyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 796 |
| 6 | 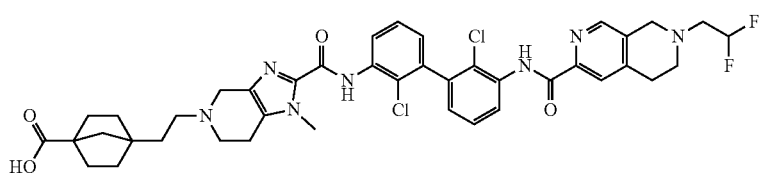 [SMILES: Cn1c(C(=O)Nc2cccc(-c3cccc(NC(=O)c4cc5c(cn4)CN(CC(F)F)CC5)c3Cl)c2Cl)nc2c1CCN(CCC13CCC(C(=O)O)(CC1)C3)C2]<br>4-(2-(2-((2,2'-dichloro-3'-(7-(2,2-difluoroethyl)-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 806 |
| 7 | 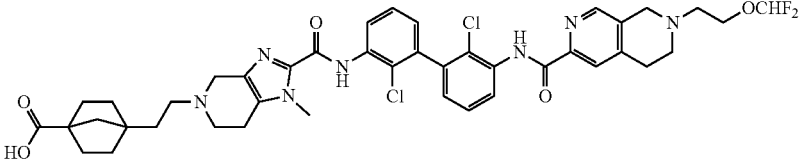 [SMILES: Cn1c(C(=O)Nc2cccc(-c3cccc(NC(=O)c4cc5c(cn4)CN(CCOC(F)F)CC5)c3Cl)c2Cl)nc2c1CCN(CCC13CCC(C(=O)O)(CC1)C3)C2]<br>4-(2-(2-((2,2'-dichloro-3'-(7-(2-(difluoromethoxy)ethyl)-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 836 |
| 8 | 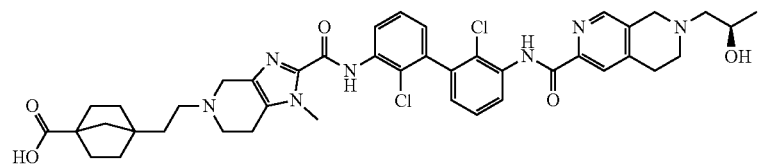 [SMILES: C[C@@H](O)CN1CCc2cc(C(=O)Nc3cccc(-c4cccc(NC(=O)c5nc6c(n5C)CCN(CCC57CCC(C(=O)O)(CC5)C7)C6)c4Cl)c3Cl)ncc2C1]<br>(R)-4-(2-(2-((2,2'-dichloro-3'-(7-(2-hydroxypropyl)-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 800 |
| 9 | 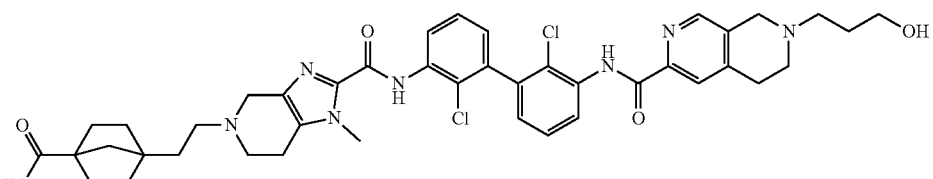<br>4-(2-(2-((2,2'-dichloro-3'-(7-(3-hydroxypropyl)-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 800 |

| Example No. | Compound structure and name | [M + H]+ |
|---|---|---|
| 10 | 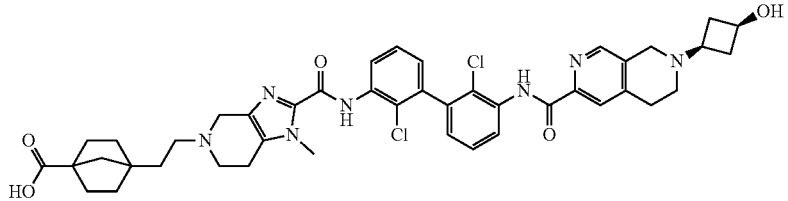 [SMILES: Cn1c(C(=O)Nc2cccc(-c3cccc(NC(=O)c4cc5c(cn4)CN([C@H]4C[C@@H](O)C4)CC5)c3Cl)c2Cl)nc2c1CCN(CCC13CCC(C(=O)O)(CC1)C3)C2]<br>4-(2-(2-((2,2'-dichloro-3'-(7-((1S,3S)-3-hydroxycyclobutyl)-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 812 |
| 11 | 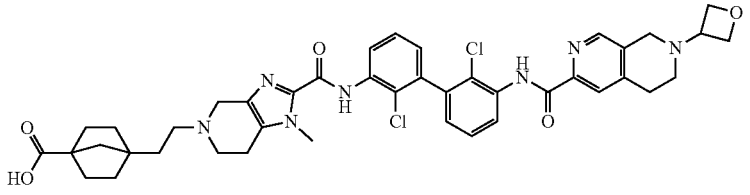 [SMILES: Cn1c(C(=O)Nc2cccc(-c3cccc(NC(=O)c4cc5c(cn4)CN(C4COC4)CC5)c3Cl)c2Cl)nc2c1CCN(CCC13CCC(C(=O)O)(CC1)C3)C2]<br>4-(2-(2-((2,2'-dichloro-3'-(7-(oxetan-3-yl)-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 798 |
| 12 | 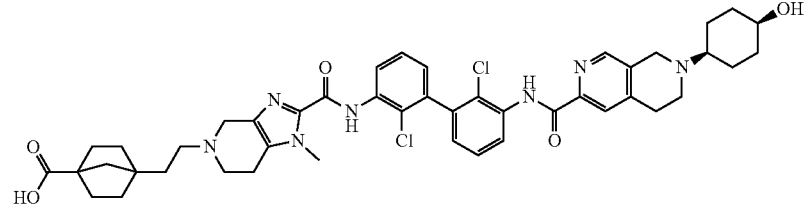 [SMILES: Cn1c(C(=O)Nc2cccc(-c3cccc(NC(=O)c4cc5c(cn4)CN([C@H]4CC[C@@H](O)CC4)CC5)c3Cl)c2Cl)nc2c1CCN(CCC13CCC(C(=O)O)(CC1)C3)C2]<br>4-(2-(2-((2,2'-dichloro-3'-(7-((1S,4S)-4-hydroxycyclohexyl)-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 840 |
| 13 | 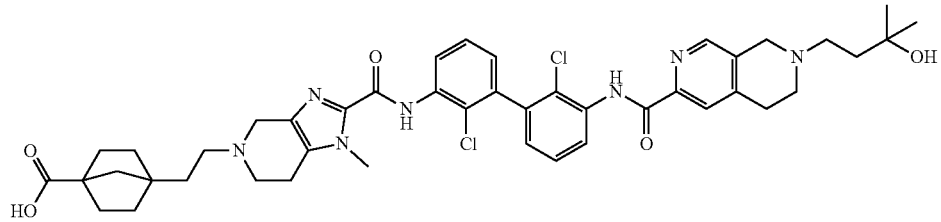 [SMILES: Cn1c(C(=O)Nc2cccc(-c3cccc(NC(=O)c4cc5c(cn4)CN(CCC(C)(C)O)CC5)c3Cl)c2Cl)nc2c1CCN(CCC13CCC(C(=O)O)(CC1)C3)C2]<br>4-(2-(2-((2,2'-dichloro-3'-(7-(3-hydroxy-3-methylbutyl)-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 828 |

| Example No. | Compound structure and name | [M + H]+ |
|---|---|---|
| 14 | 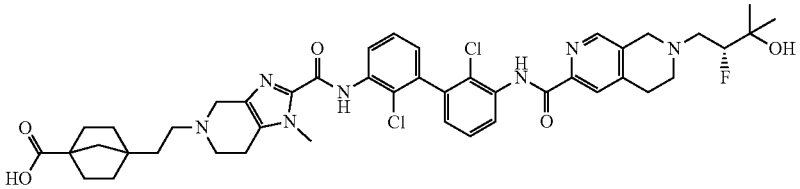 [SMILES: Cn1c(C(=O)Nc2cccc(-c3cccc(NC(=O)c4cc5c(cn4)CN(C[C@@H](F)C(C)(C)O)CC5)c3Cl)c2Cl)nc2c1CCN(CCC13CCC(C(=O)O)(CC1)C3)C2]<br>(R)-4-(2-(2-((2,2'-dichloro-3'-(7-(2-fluoro-3-hydroxy-3-methylbutyl)-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 846 |
| 15 | 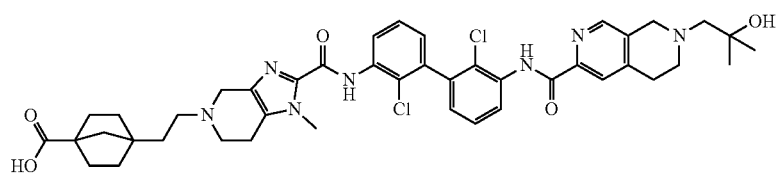 [SMILES: Cn1c(C(=O)Nc2cccc(-c3cccc(NC(=O)c4cc5c(cn4)CN(CC(C)(C)O)CC5)c3Cl)c2Cl)nc2c1CCN(CCC13CCC(C(=O)O)(CC1)C3)C2]<br>4-(2-(2-((2,2'-dichloro-3'-(7-(2-hydroxy-2-methylpropyl)-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 814 |
| 16 | 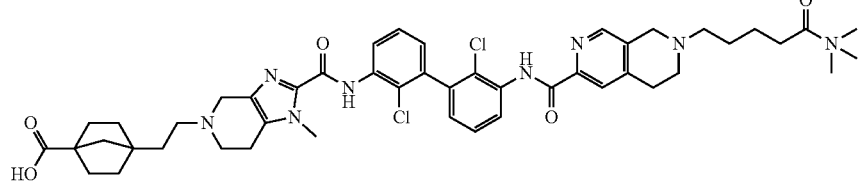<br>4-(2-(2-((2,2'-dichloro-3'-(7-(5-(dimethylamino)-5-oxopentyl)-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 869 |
| 17 | 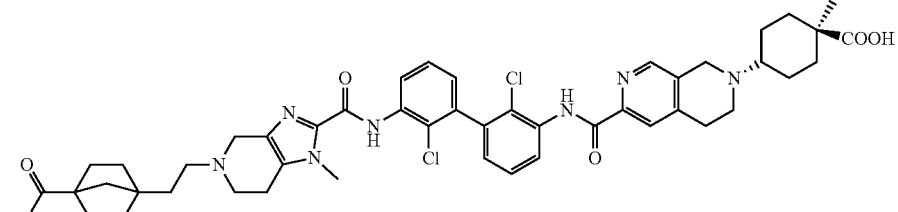<br>4-(2-(2-((3'-(7-((1R,4R)-4-carboxy-4-methylcyclohexyl)-5,6,7,8-tetrahydro-2,7-naphthyridine-3-carboxamido)-2,2'-dichloro-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 882 |
| 18 | 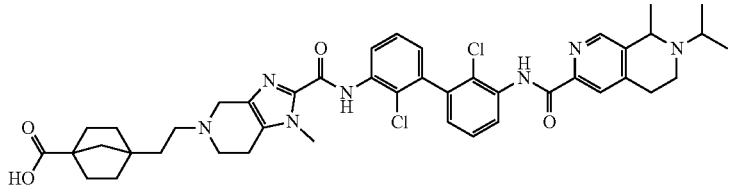 [SMILES: CC(C)N1CCc2cc(C(=O)Nc3cccc(-c4cccc(NC(=O)c5nc6c(n5C)CCN(CCC57CCC(C(=O)O)(CC5)C7)C6)c4Cl)c3Cl)ncc2C1C]<br>4-(2-(2-((2,2'-dichloro-3'-(7-isopropyl-8-methyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 798 |

| Example No. | Compound structure and name | [M + H]+ |
|---|---|---|
| 19 | 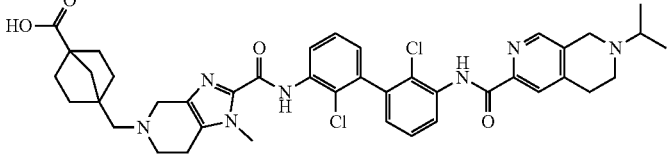
4-((2-((2,2'-dichloro-3'-(7-isopropyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)methyl)bicyclo[2.2.1]heptane-1-carboxylic acid | 770 |
| 20 | 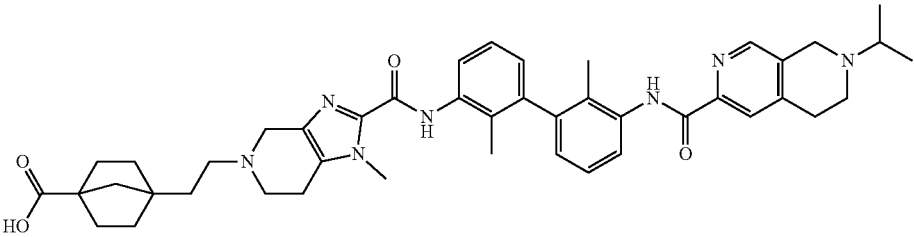
4-(2-(2-((3'-(7-isopropyl-5,6,7,8-tetrahydro-2,7-naphthyridine-3-carboxamido)-2,2'-dimethyl-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 744 |
| 21 | 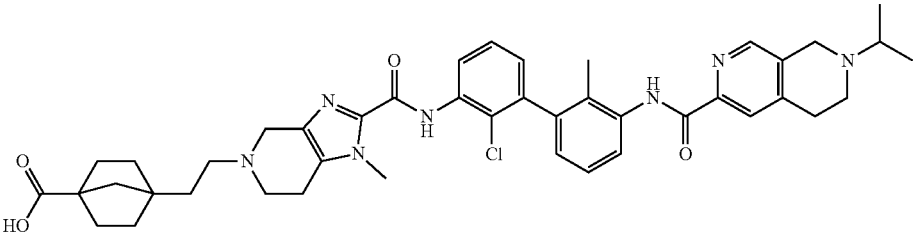 [SMILES: Cc1c(NC(=O)c2cc3c(cn2)CN(C(C)C)CC3)cccc1-c1cccc(NC(=O)c2nc3c(n2C)CCN(CCC24CCC(C(=O)O)(CC2)C4)C3)c1Cl]
4-(2-(2-((2-chloro-3'-(7-isopropyl-5,6,7,8-tetrahydro-2,7-naphthyridine-3-carboxamido)-2'-methyl-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 764 |
| 22 | 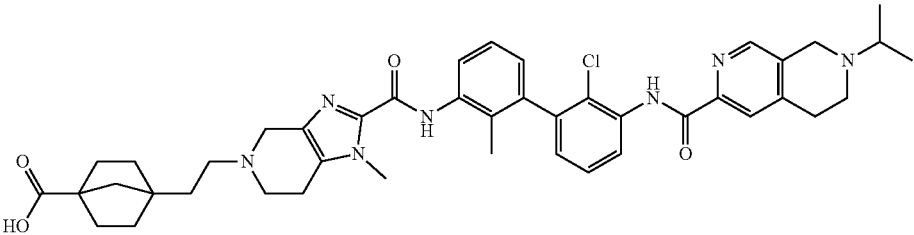 [SMILES: Cc1c(NC(=O)c2nc3c(n2C)CCN(CCC24CCC(C(=O)O)(CC2)C4)C3)cccc1-c1cccc(NC(=O)c2cc3c(cn2)CN(C(C)C)CC3)c1Cl]
4-(2-(2-((2'-chloro-3'-(7-isopropyl-5,6,7,8-tetrahydro-2,7-naphthyridine-3-carboxamido)-2-methyl-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 764 |

| Example No. | Compound structure and name | [M + H]+ |
|---|---|---|
| 23 | 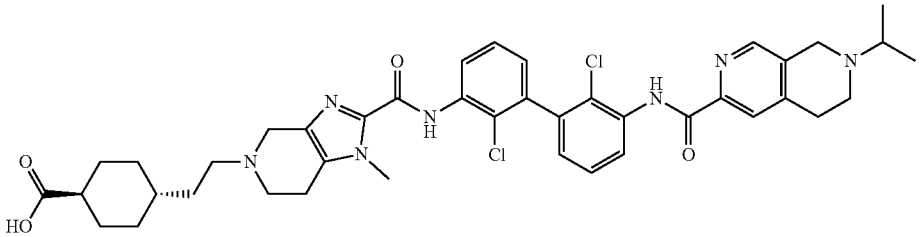 [SMILES: CC(C)N1CCc2cc(C(=O)Nc3cccc(-c4cccc(NC(=O)c5nc6c(n5C)CCN(CC[C@H]5CC[C@H](C(=O)O)CC5)C6)c4Cl)c3Cl)ncc2C1]<br>(1R,4R)-4-(2-(2-((2,2'-dichloro-3'-(7-isopropyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)cyclohexane-1-carboxylic acid | 772 |
| 24 | 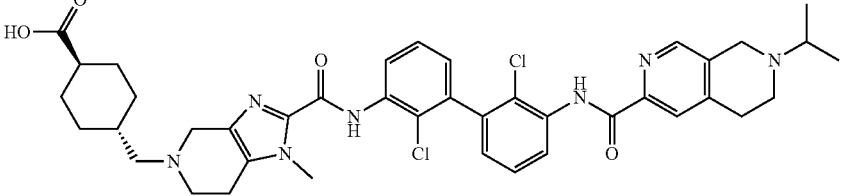<br>(1R,4R)-4-((2-((2,2'-dichloro-3'-(7-isopropyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)methyl)cyclohexane-1-carboxylic acid | 758 |
| 25 | 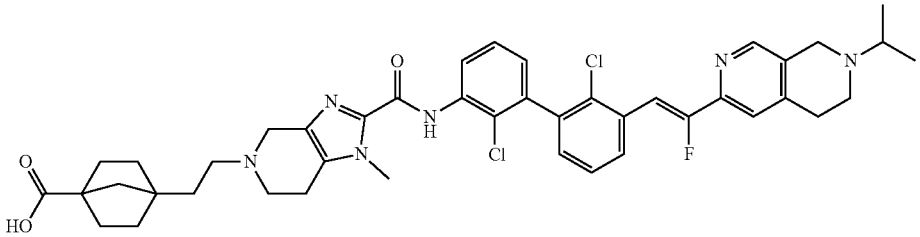 [SMILES: CC(C)N1CCc2cc(/C(F)=C/c3cccc(-c4cccc(NC(=O)c5nc6c(n5C)CCN(CCC57CCC(C(=O)O)(CC5)C7)C6)c4Cl)c3Cl)ncc2C1]<br>(Z)-4-(2-(2-((2,2'-dichloro-3'-(2-fluoro-2-(7-isopropyl-5,6,7,8-tetrahydro-2,7-naphthyridin-3-yl)vinyl)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 785 |
| 26 | 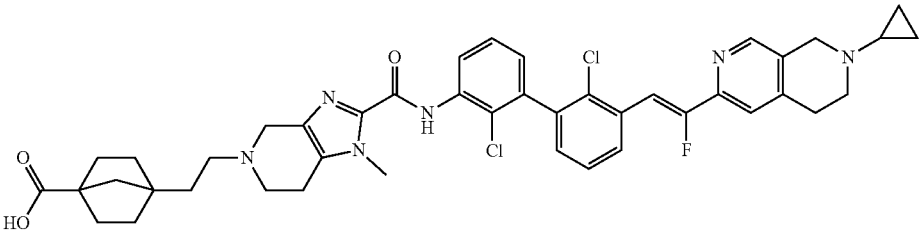 [SMILES: Cn1c(C(=O)Nc2cccc(-c3cccc(/C=C(\F)c4cc5c(cn4)CN(C4CC4)CC5)c3Cl)c2Cl)nc2c1CCN(CCC13CCC(C(=O)O)(CC1)C3)C2]<br>(Z)-4-(2-(2-((2,2'-dichloro-3'-(2-(7-cyclopropyl-5,6,7,8-tetrahydro-2,7-naphthyridin-3-yl)-2-fluorovinyl)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 783 |

| Example No. | Compound structure and name | [M + H]+ |
|---|---|---|
| 27 | 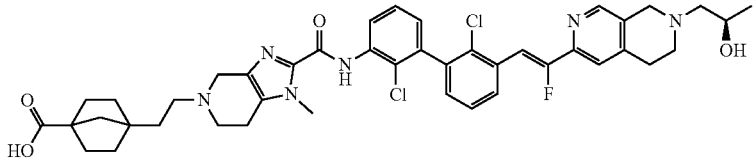 [SMILES: C[C@@H](O)CN1CCc2cc(/C(F)=C/c3cccc(-c4cccc(NC(=O)c5nc6c(n5C)CCN(CCC57CCC(C(=O)O)(CC5)C7)C6)c4Cl)c3Cl)ncc2C1]<br>(R,Z)-4-(2-(2-((2,2'-dichloro-3'-(2-fluoro-2-(7-(2-hydroxypropyl)-5,6,7,8-tetrahydro-2,7-naphthyridin-3-yl)vinyl)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 801 |
| 28 | 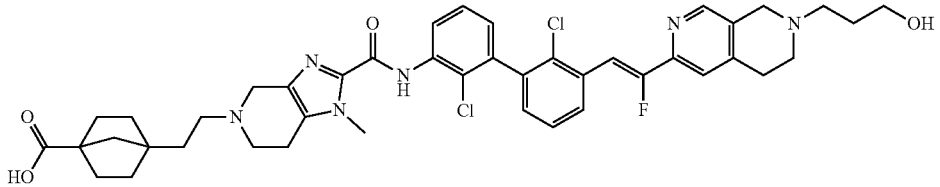 [SMILES: Cn1c(C(=O)Nc2cccc(-c3cccc(/C=C(\F)c4cc5c(cn4)CN(CCCO)CC5)c3Cl)c2Cl)nc2c1CCN(CCC13CCC(C(=O)O)(CC1)C3)C2]<br>(Z)-4-(2-(2-((2,2'-dichloro-3'-(2-fluoro-2-(7-(3-hydroxypropyl)-5,6,7,8-tetrahydro-2,7-naphthyridin-3-yl)vinyl)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 801 |
| 29 | 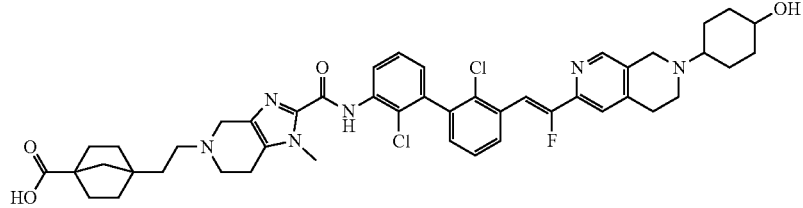 [SMILES: Cn1c(C(=O)Nc2cccc(-c3cccc(/C=C(\F)c4cc5c(cn4)CN(C4CCC(O)CC4)CC5)c3Cl)c2Cl)nc2c1CCN(CCC13CCC(C(=O)O)(CC1)C3)C2]<br>(Z)-4-(2-(2-((2,2'-dichloro-3'-(2-fluoro-2-(7-(4-hydroxycyclohexyl)-5,6,7,8-tetrahydro-2,7-naphthyridin-3-yl)vinyl)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 841 |
| 30 | 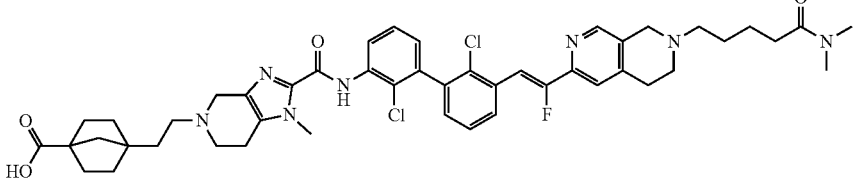<br>(Z)-4-(2-(2-((2,2'-dichloro-3'-(2-(7-(5-(dimethylamino)-5-oxopentyl)-5,6,7,8-tetrahydro-2,7-naphthyridin-3-yl)-2-fluorovinyl)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 870 |
| 31 | 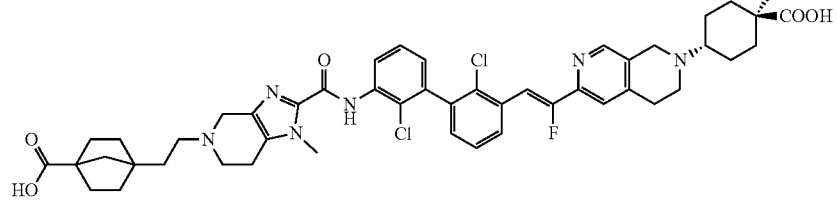<br>4-(2-(2-((3'-((Z)-2-(7-((1R,4R)-4-carboxy-4-methylcyclohexyl)-5,6,7,8-tetrahydro-2,7-naphthyridin-3-yl)-2-fluorovinyl)-2,2'-dichloro-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 883 |

| Example No. | Compound structure and name | [M + H]+ |
|---|---|---|
| 32 | 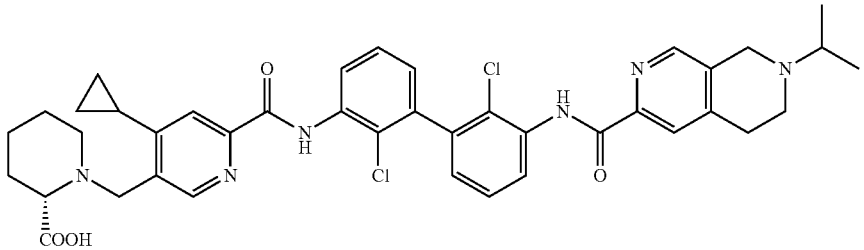 [SMILES: CC(C)N1CCc2cc(C(=O)Nc3cccc(-c4cccc(NC(=O)c5cc(C6CC6)c(CN6CCCC[C@H]6C(=O)O)cn5)c4Cl)c3Cl)ncc2C1]<br>(S)-1-((4-cyclopropyl-6-((2,2'-dichloro-3'-(7-isopropyl-5,6,7,8-tetrahydro-2,7-naphthyridine-3-carboxamido)-[1,1'-biphenyl]-3-yl)carbamoyl)pyridin-3-yl)methyl)piperidine-2-carboxylic acid | 742 |
| 33 | 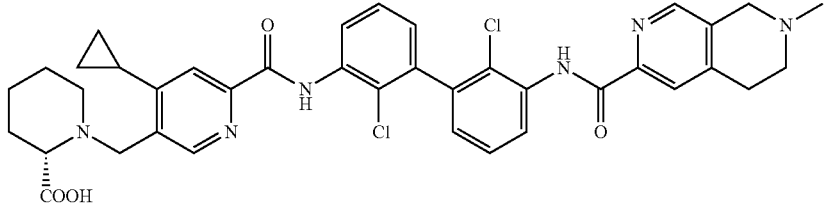 [SMILES: CN1CCc2cc(C(=O)Nc3cccc(-c4cccc(NC(=O)c5cc(C6CC6)c(CN6CCCC[C@H]6C(=O)O)cn5)c4Cl)c3Cl)ncc2C1]<br>(S)-1-((4-cyclopropyl-6-((2,2'-dichloro-3'-(7-methyl-5,6,7,8-tetrahydro-2,7-naphthyridine-3-carboxamido)-[1,1'-biphenyl]-3-yl)carbamoyl)pyridin-3-yl)methyl)piperidine-2-carboxylic acid | 713 |
| 34 | 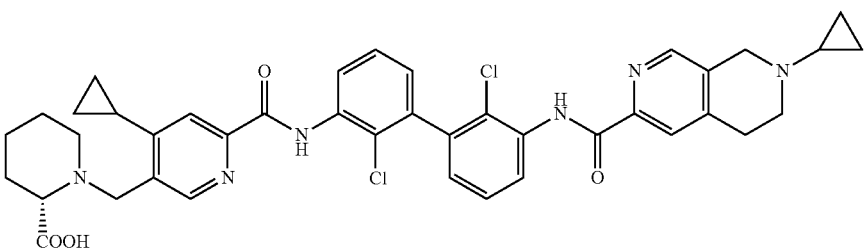 [SMILES: O=C(Nc1cccc(-c2cccc(NC(=O)c3cc(C4CC4)c(CN4CCCC[C@H]4C(=O)O)cn3)c2Cl)c1Cl)c1cc2c(cn1)CN(C1CC1)CC2]<br>(S)-1-((4-cyclopropyl-6-((2,2'-dichloro-3'-(7-cyclopropyl-5,6,7,8-tetrahydro-2,7-naphthyridine-3-carboxamido)-[1,1'-biphenyl]-3-yl)carbamoyl)pyridin-3-yl)methyl)piperidine-2-carboxylic acid | 739 |
| 35 | 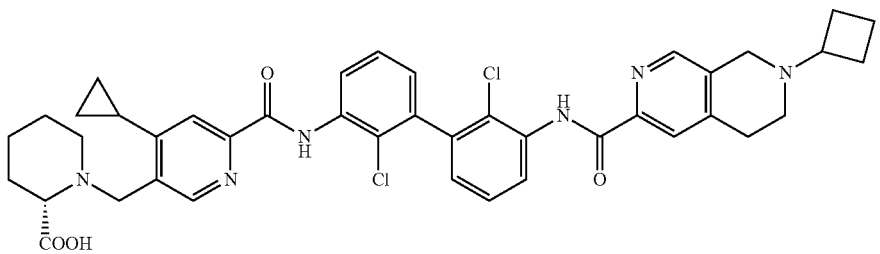 [SMILES: O=C(Nc1cccc(-c2cccc(NC(=O)c3cc(C4CC4)c(CN4CCCC[C@H]4C(=O)O)cn3)c2Cl)c1Cl)c1cc2c(cn1)CN(C1CCC1)CC2]<br>(S)-1-((4-cyclopropyl-6-((2,2'-dichloro-3'-(7-cyclobutyl-5,6,7,8-tetrahydro-2,7-naphthyridine-3-carboxamido)-[1,1'-biphenyl]-3-yl)carbamoyl)pyridin-3-yl)methyl)piperidine-2-carboxylic acid | 753 |

-continued

| Example No. | Compound structure and name | [M + H]+ |
|---|---|---|
| 36 | 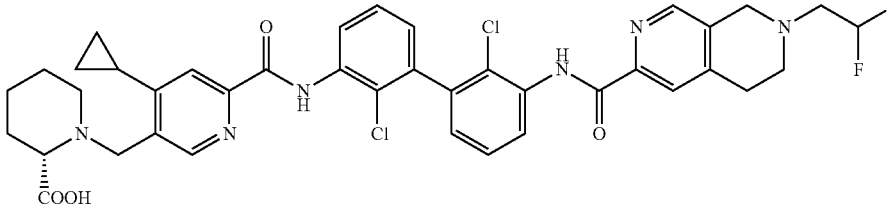<br>(S)-1-((4-cyclopropyl-6-((2,2'-dichloro-3'-(7-(2,2-difluoroethyl)-5,6,7,8-tetrahydro-2,7-naphthyridine-3-carboxamido)-[1,1'-biphenyl]-3-yl)carbamoyl)pyridin-3-yl)methyl)piperidine-2-carboxylic acid | 763 |
| 37 | 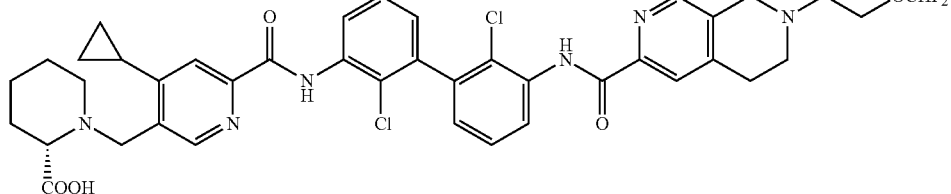<br>(S)-1-((4-cyclopropyl-6-((2,2'-dichloro-3'-(7-(2-(difluoromethoxy)ethyl)-5,6,7,8-tetrahydro-2,7-naphthyridine-3-carboxamido)-[1,1'-biphenyl]-3-yl)carbamoyl)pyridin-3-yl)methyl)piperidine-2-carboxylic acid | 793 |
| 38 | 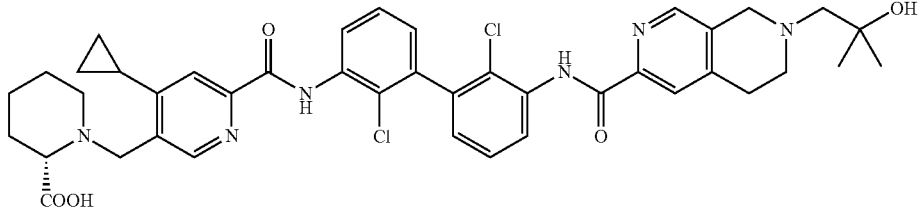 [SMILES: CC(C)(O)CN1CCc2cc(C(=O)Nc3cccc(-c4cccc(NC(=O)c5cc(C6CC6)c(CN6CCCC[C@H]6C(=O)O)cn5)c4Cl)c3Cl)ncc2C1]<br>(S)-1-((4-cyclopropyl-6-((2,2'-dichloro-3'-(7-(2-hydroxy-2-methylpropyl)-5,6,7,8-tetrahydro-2,7-naphthyridine-3-carboxamido)-[1,1'-biphenyl]-3-yl)carbamoyl)pyridin-3-yl)methyl)piperidine-2-carboxylic acid | 771 |
| 39 | 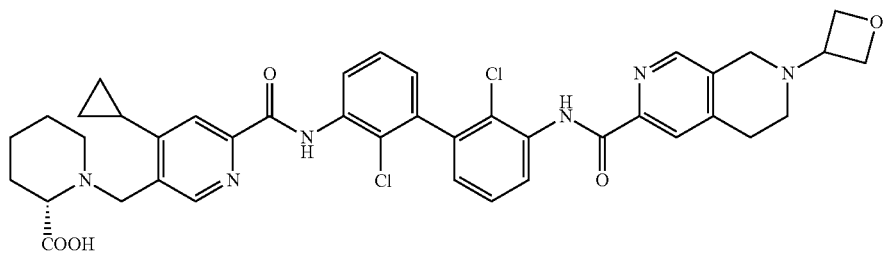 [SMILES: O=C(Nc1cccc(-c2cccc(NC(=O)c3cc(C4CC4)c(CN4CCCC[C@H]4C(=O)O)cn3)c2Cl)c1Cl)c1cc2c(cn1)CN(C1COC1)CC2]<br>(S)-1-((4-cyclopropyl-6-((2,2'-dichioro-3'-(7-(oxetan-3-yl)-5,6,7,8-tetrahydro-2,7-naphthyridine-3-carboxamido)-[1,1'-biphenyl]-3-yl)carbamoyl)pyridin-3-yl)methyl)piperidine-2-carboxylic acid | 755 |

-continued

| Example No. | Compound structure and name | [M + H]+ |
|---|---|---|
| 40 | 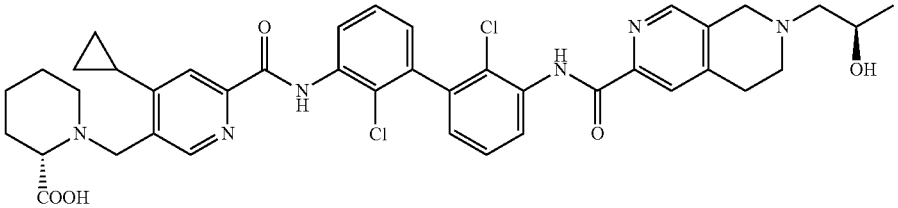 [SMILES: C[C@@H](O)CN1CCc2cc(C(=O)Nc3cccc(-c4cccc(NC(=O)c5cc(C6CC6)c(CN6CCCC[C@H]6C(=O)O)cn5)c4Cl)c3Cl)ncc2C1]<br>(S)-1-((4-cyclopropyl-6-((2,2'-dichloro-3'-(7-((R)-2-hydroxypropyl)-5,6,7,8-tetrahydro-2,7-naphthyridine-3-carboxamido)-[1,1'-biphenyl]-3-yl)carbamoyl)pyridin-3-yl)methyl)piperidine-2-carboxylic acid | 757 |
| 41 | 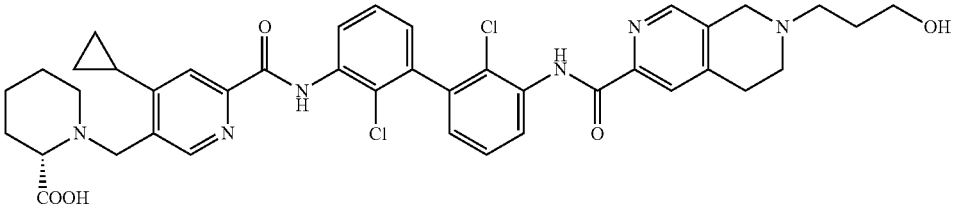 [SMILES: O=C(Nc1cccc(-c2cccc(NC(=O)c3cc(C4CC4)c(CN4CCCC[C@H]4C(=O)O)cn3)c2Cl)c1Cl)c1cc2c(cn1)CN(CCCO)CC2]<br>(S)-1-((4-cyclopropyl-6-((2,2'-dichloro-3'-(7-(3-hydroxypropyl)-5,6,7,8-tetrahydro-2,7-naphthyridine-3-carboxamido)-[1,1'-biphenyl]-3-yl)carbamoyl)pyridin-3-yl)methyl)piperidine-2-carboxylic acid | 757 |
| 42 | 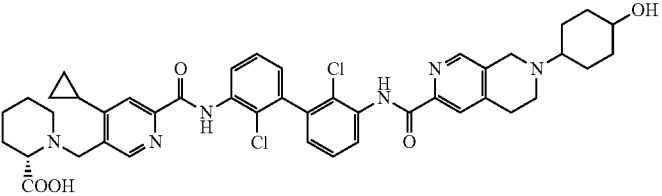 [SMILES: O=C(Nc1cccc(-c2cccc(NC(=O)c3cc(C4CC4)c(CN4CCCC[C@H]4C(=O)O)cn3)c2Cl)c1Cl)c1cc2c(cn1)CN(C1CCC(O)CC1)CC2]<br>(S)-1-((4-cyclopropyl-6-((2,2'-dichloro-3'-(7-(4-hydroxycyclohexyl)-5,6,7,8-tetrahydro-2,7-naphthyridine-3-carboxamido)-[1,1'-biphenyl]-3-yl)carbamoyl)pyridin-3-yl)methyl)piperidine-2-carboxylic acid | 797 |
| 43 | 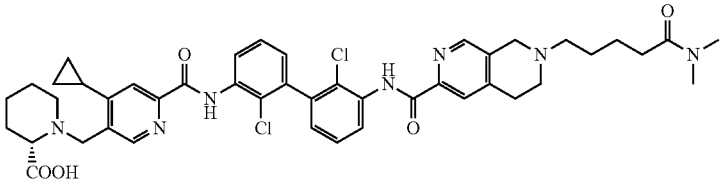 [SMILES: CN(C)C(=O)CCCCN1CCc2cc(C(=O)Nc3cccc(-c4cccc(NC(=O)c5cc(C6CC6)c(CN6CCCC[C@H]6C(=O)O)cn5)c4Cl)c3Cl)ncc2C1]<br>(S)-1-((4-cyclopropyl-6-((2,2'-dichloro-3'-(7-(5-(dimethylamino)-5-oxopentyl)-5,6,7,8-tetrahydro-2,7-naphthyridine-3-carboxamido)-[1,1'-biphenyl]-3-yl)carbamoyl)pyridin-3-yl)methyl)piperidine-2-carboxylic acid | 826 |
| 44 | 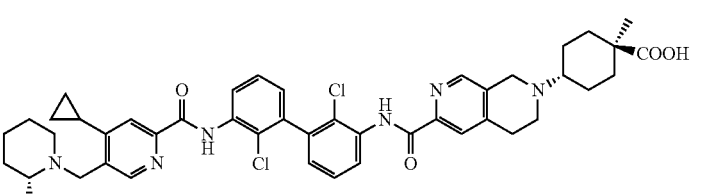<br>(S)-1-((6-((3'-(7-((1R,4R)-4-carboxy-4-methylcyclohexyl)-5,6,7,8-tetrahydro-2,7-naphthyridine-3-carboxamido)-2,2'-dichloro-[1,1'-biphenyl]-3-yl)carbamoyl)-4-cyclopropylpyridin-3-yl)methyl)piperidine-2-carboxylic acid | 839 |

| Example No. | Compound structure and name | [M+H]+ |
|---|---|---|
| 45 | (S)-1-((6-((3'-(7-(2-(4-carboxybicyclo[2.2.1]heptan-1-yl)ethyl)-5,6,7,8-tetrahydro-2,7-naphthyridine-3-carboxamido)-2,2'-dichloro-[1,1'-biphenyl]-3-yl)carbamoyl)-4-cyclopropylpyridin-3-yl)methyl)piperidine-2-carboxylic acid | 865 |
| 46 | (S,Z)-1-((4-cyclopropyl-6-((2,2'-dichloro-3'-(2-fluoro-2-(7-methyl-5,6,7,8-tetrahydro-2,7-naphthyridin-3-yl)vinyl)-[1,1'-biphenyl]-3-yl)carbamoyl)pyridin-3-yl)methyl)piperidine-2-carboxylic acid | 714 |
| 47 | (S,Z)-1-((4-cyclopropyl-6-((2,2'-dichloro-3'-(2-fluoro-2-(7-isopropyl-5,6,7,8-tetrahydro-2,7-naphthyridin-3-yl)vinyl)-[1,1'-biphenyl]-3-yl)carbamoyl)pyridin-3-yl)methyl)piperidine-2-carboxylic acid | 742 |
| 48 | (S,Z)-1-((4-cyclopropyl-6-((2,2'-dichloro-3'-(2-(7-cyclopropyl-5,6,7,8-tetrahydro-2,7-naphthyridin-3-yl)-2-fluorovinyl)-[1,1'-biphenyl]-3-yl)carbamoyl)pyridin-3-yl)methyl)piperidine-2-carboxylic acid | 740 |

| Example No. | Compound structure and name | [M + H]⁺ |
|---|---|---|
| 49 | 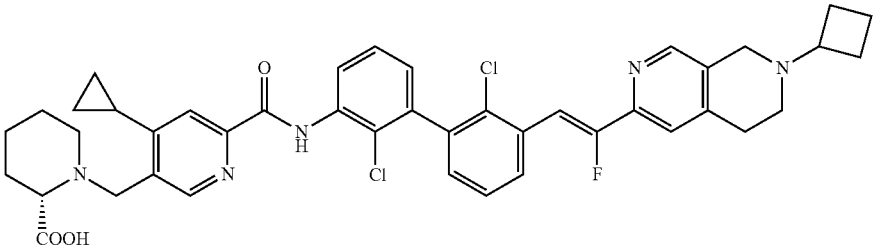 [SMILES: O=C(Nc1cccc(-c2cccc(/C=C(\F)c3cc4c(cn3)CN(C3CCC3)CC4)c2Cl)c1Cl)c1cc(C2CC2)c(CN2CCCC[C@H]2C(=O)O)cn1]<br>(S,Z)-1-((4-cyclopropyl-6-((2,2'-dichloro-3'-(2-(7-cyclobutyl-5,6,7,8-tetrahydro-2,7-naphthyridin-3-yl)-2-fluorovinyl)-[1,1'-biphenyl]-3-yl)carbamoyl)pyridin-3-yl)methyl)piperidine-2-carboxylic acid | 754 |
| 50 | 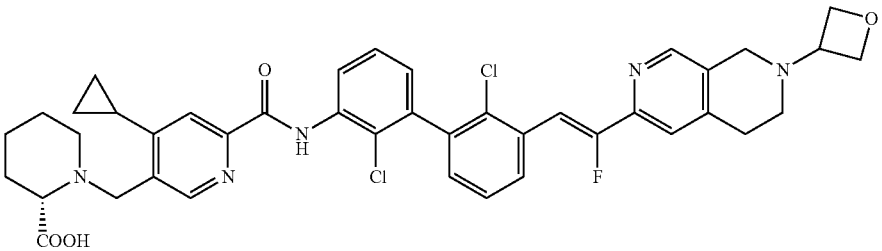 [SMILES: O=C(Nc1cccc(-c2cccc(/C=C(\F)c3cc4c(cn3)CN(C3COC3)CC4)c2Cl)c1Cl)c1cc(C2CC2)c(CN2CCCC[C@H]2C(=O)O)cn1]<br>(S,Z)-1-((4-cyclopropyl-6-((2,2'-dichloro-3'-(2-fluoro-2-(7-(oxetan-3-yl)-5,6,7,8-tehahydro-2,7-naphthyridin-3-yl)vinyl)-[1,1'-biphenyl]-3-yl)carbamoyl)pyridin-3-yl)methyl)piperidine-2-carboxylic acid | 756 |
| 51 | 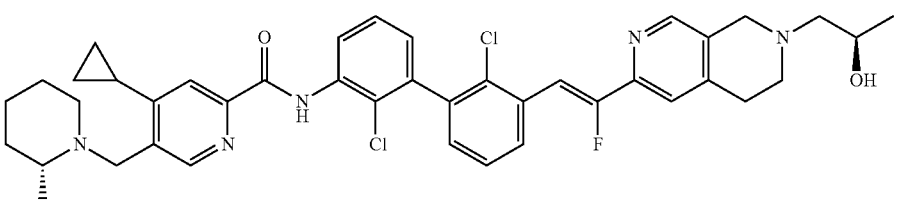<br>(S)-1-((4-cyclopropyl-6-((2,2'-dichloro-3'-((Z)-2-fluoro-2-(7-((R)-2-hydroxypropyl)-5,6,7,8-tetrahydro-2,7-naphthyridin-3-yl)vinyl)-[1,1'-biphenyl]-3-yl)carbamoyl)pyridin-3-yl)methyl)piperidine-2-carboxylic acid | 758 |
| 52 | 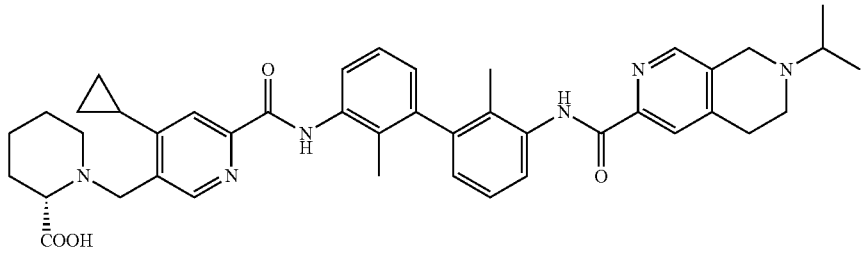 [SMILES: Cc1c(NC(=O)c2cc3c(cn2)CN(C(C)C)CC3)cccc1-c1cccc(NC(=O)c2cc(C3CC3)c(CN3CCCC[C@H]3C(=O)O)cn2)c1C]<br>(S)-1-((4-cyclopropyl-6-((3'-(7-isopropyl-5,6,7,8-tetrahydro-2,7-naphthyridine-3-carboxamido)-2,2'-dimethyl-[1,1'-biphenyl]-3-yl)carbamoyl)pyridin-3-yl)methyl)piperidine-2-carboxylic acid | 701 |

-continued

| Example No. | Compound structure and name | [M + H]⁺ |
|---|---|---|
| 53 | (S)-1-((6-((2'-chloro-3'-(7-isopropyl-5,6,7,8-tetrahydro-2,7-naphthyridine-3-carboxamido)-2-methyl-[1,1'-biphenyl]-3-yl)carbamoyl)-4-cyclopropylpyridin-3-yl)methyl)piperidine-2-carboxylic acid | 722 |
| 54 | (S)-1-((6-((2'-chloro-3'-(7-cyclopropyl-5,6,7,8-tetrahydro-2,7-naphthyridine-3-carboxamido)-2-methyl-[1,1'-biphenyl]-3-yl)carbamoyl)-4-cyclopropylpyridin-3-yl)methyl)piperidine-2-carboxylic acid | 720 |
| 55 | (S)-1-((6-((2'-chloro-2-methyl-3'-(7-(tetrahydro-2H-pyran-4-yl)-5,6,7,8-tetrahydro-2,7-naphthyridine-3-carboxamido)-[1,1'-biphenyl]-3-yl)carbamoyl)-4-cyclopropylpyridin-3-yl)methyl)piperidine-2-carboxylic acid | 764 |
| 56 | (S)-1-((6-((2'-chloro-3'-(7-(2-hydroxyethyl)-5,6,7,8-tetrahydro-2,7-naphthyridine-3-carboxamido)-2-methyl-[1,1'-biphenyl]-3-yl)carbamoyl)-4-cyclopropylpyridin-3-yl)methyl)piperidine-2-carboxylic acid | 724 |

-continued

| Example No. | Compound structure and name | [M + H]+ |
|---|---|---|
| 57 | 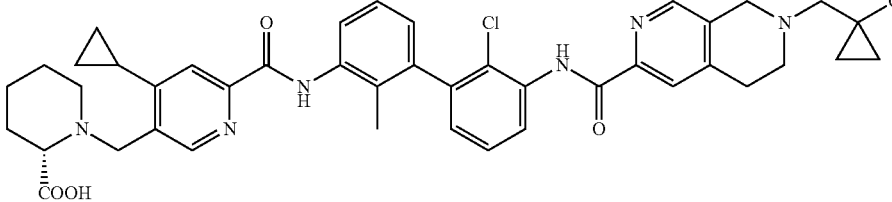<br>(S)-1-((6-((2'-chloro-3'-(7-((1-hydroxycyclopropyl)methyl)-5,6,7,8-tetrahydro-2,7-naphthyridine-3-carboxamido)-2-methyl-[1,1'-biphenyl]-3-yl)carbamoyl)-4-cyclopropylpyridin-3-yl)methyl)piperidine-2-carboxylic acid | 750 |
| 58 | 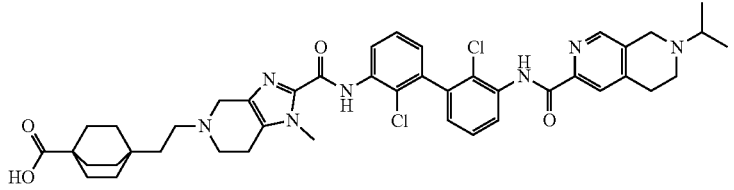 [SMILES: CC(C)N1CCc2cc(C(=O)Nc3cccc(-c4cccc(NC(=O)c5nc6c(n5C)CCN(CCC57CCC(C(=O)O)(CC5)CC7)C6)c4Cl)c3Cl)ncc2C1]<br>4-(2-(2-((2,2'-dichloro-3'-(7-isopropyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.2]octane-1-carboxylic acid | 798 |
| 59 | 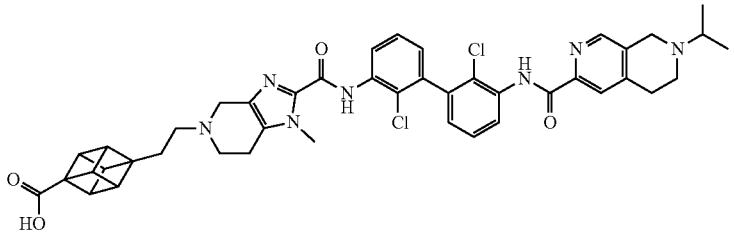 [SMILES: CC(C)N1CCc2cc(C(=O)Nc3cccc(-c4cccc(NC(=O)c5nc6c(n5C)CCN(CCC57C8C9C5C5C7C8C95C(=O)O)C6)c4Cl)c3Cl)ncc2C1]<br>4-(2-(2-((2,2'-dichloro-3'-(7-isopropyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)cubane-1-carboxylic acid | 792 |
| 60 | 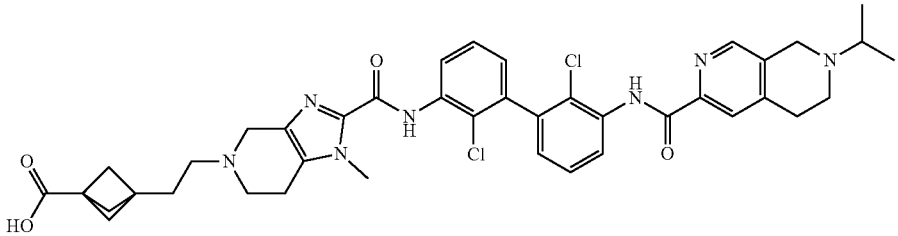 [SMILES: CC(C)N1CCc2cc(C(=O)Nc3cccc(-c4cccc(NC(=O)c5nc6c(n5C)CCN(CCC57CC(C(=O)O)(C5)C7)C6)c4Cl)c3Cl)ncc2C1]<br>3-(2-(2-((2,2'-dichloro-3'-(7-isopropyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[1.1.1]pentane-1-carboxylic acid | 756 |

-continued

| Example No. | Compound structure and name | [M + H]+ |
|---|---|---|
| 61 | 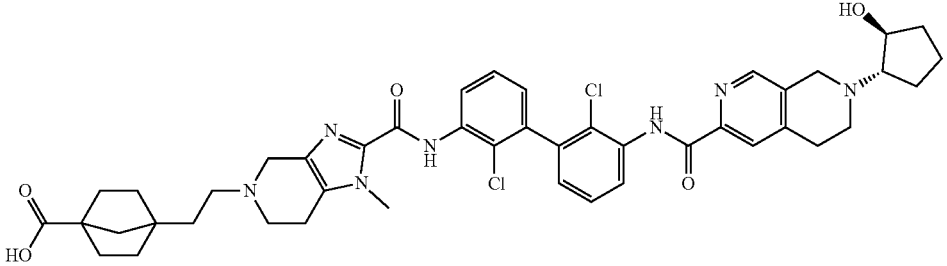 [SMILES: Cn1c(C(=O)Nc2cccc(-c3cccc(NC(=O)c4cc5c(cn4)CN([C@H]4CCC[C@@H]4O)CC5)c3Cl)c2Cl)nc2c1CCN(CCC13CCC(C(=O)O)(CC1)C3)C2]

4-(2-(2-((2,2'-dichloro-3'-(7-((1S,2S)-2-hydroxycyclopentyl)-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 826 |
| 62 | 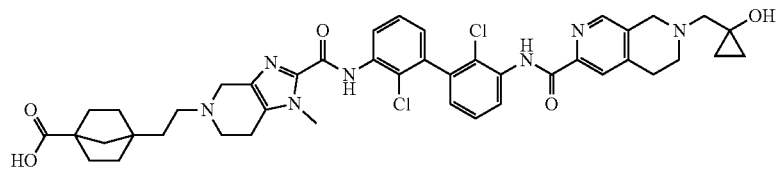 [SMILES: Cn1c(C(=O)Nc2cccc(-c3cccc(NC(=O)c4cc5c(cn4)CN(CC4(O)CC4)CC5)c3Cl)c2Cl)nc2c1CCN(CCC13CCC(C(=O)O)(CC1)C3)C2]

4-(2-(2-((2,2'-dichloro-3'-(7-((1-hydroxycyclopropyl)methyl)-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 812 |
| 63 | 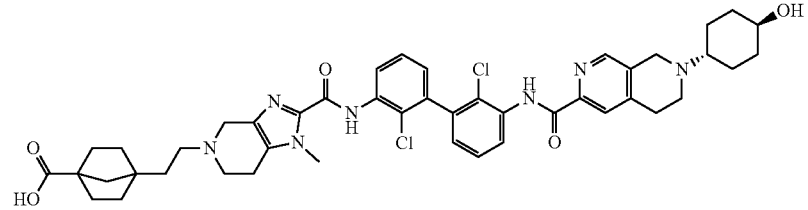 [SMILES: Cn1c(C(=O)Nc2cccc(-c3cccc(NC(=O)c4cc5c(cn4)CN([C@H]4CC[C@H](O)CC4)CC5)c3Cl)c2Cl)nc2c1CCN(CCC13CCC(C(=O)O)(CC1)C3)C2]

4-(2-(2-((2,2'-dichloro-3'-(7-((1R,4R)-4-hydroxycyclohexyl)-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 840 |
| 64 | 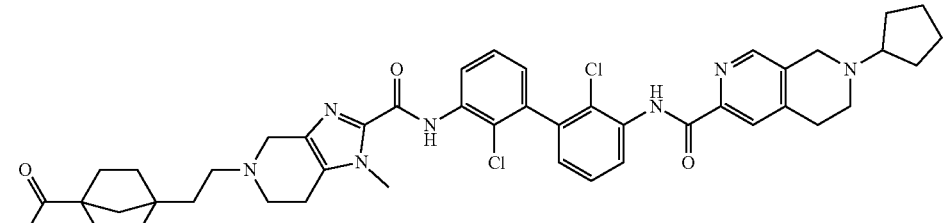

4-(2-(2-((2,2'-dichloro-3'-(7-cyclopentyl-5,6,7,8-tetrahydro-2,7-naphthyridine-3-carboxamido)-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 810 |

| Example No. | Compound structure and name | [M + H]+ |
|---|---|---|
| 65 | 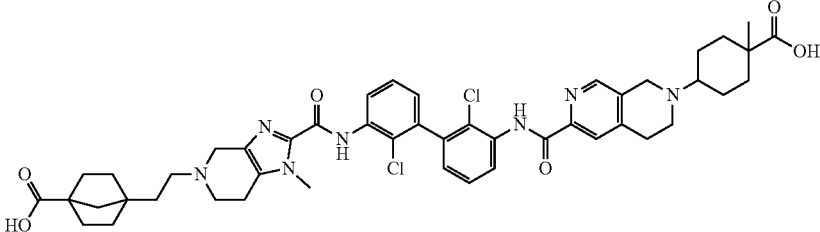 [SMILES: Cn1c(C(=O)Nc2cccc(-c3cccc(NC(=O)c4cc5c(cn4)CN(C4CCC(C)(C(=O)O)CC4)CC5)c3Cl)c2Cl)nc2c1CCN(CCC13CCC(C(=O)O)(CC1)C3)C2]  4-(2-(2-((3'-(7-(4-carboxy-4-methylcyclohexyl)-5,6,7,8-tetrahydro-2,7-naphthyridine-3-carboxamido)-2,2'-dichloro-[1,1'-biphenyl]-3-yl)carbamoyl)-1-methyl-1,4,6,7-tetrahydro-5H-imidazo[4,5-c]pyridin-5-yl)ethyl)bicyclo[2.2.1]heptane-1-carboxylic acid | 882 |
| 66 | 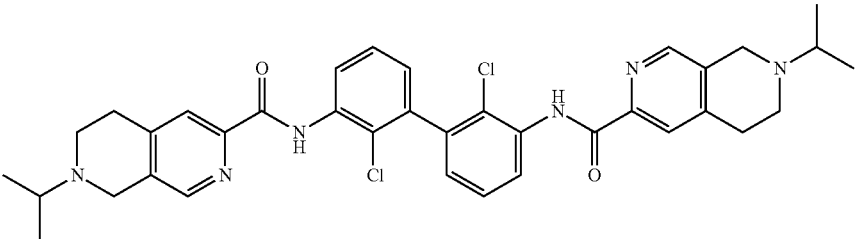 [SMILES: CC(C)N1CCc2cc(C(=O)Nc3cccc(-c4cccc(NC(=O)c5cc6c(cn5)CN(C(C)C)CC6)c4Cl)c3Cl)ncc2C1]  N,N'-(2,2'-dichloro-1,1'-biphenyl]-3,3'-diyl)bis(7-isopropyl-5,6,7,8-tetrahydro-2,7-naphthyridine-3-carboxamide) | 657 |
| 67 | 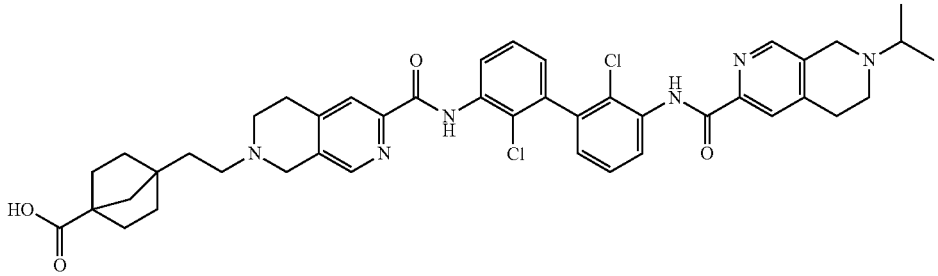 [SMILES: CC(C)N1CCc2cc(C(=O)Nc3cccc(-c4cccc(NC(=O)c5cc6c(cn5)CN(CCC57CCC(C(=O)O)(CC5)C7)CC6)c4Cl)c3Cl)ncc2C1]  4-(2-(6-((2,2'-dichloro-3'-(7-isopropyl-5,6,7,8-tetrahydro-2,7-naphthyridine-3-carboxamido)-[1,1'-biphenyl]-3-yl)carbamoyl)-3,4-dihydro-2,7-naphthyridin-2(1H)-yl)ethyl)bicyclo[2.2.1]heptane-1-carboxylic acid | 781 |
| 68 | 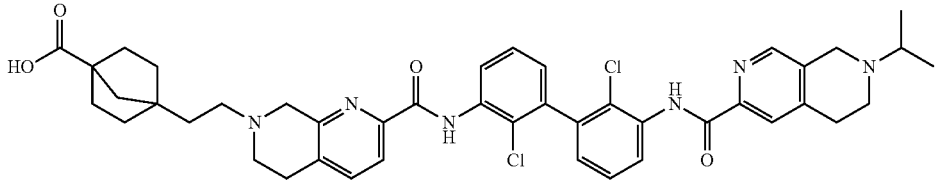 [SMILES: CC(C)N1CCc2cc(C(=O)Nc3cccc(-c4cccc(NC(=O)c5ccc6c(n5)CN(CCC57CCC(C(=O)O)(CC5)C7)CC6)c4Cl)c3Cl)ncc2C1]  4-(2-(2-((2,2'-dichloro-3'-(7-isopropyl-5,6,7,8-tetrahydro-2,7-yridine-3-carboxamido)-[1,1'-biphenyl]-3-yl)carbamoyl)-5,8-dihydro-1,7-naphthyridin-7(6H)-yl)ethyl)bicyclo[2.2.1]heptane-1-carboxylic acid | 781 |

| Example No. | Compound structure and name | [M + H]⁺ |
|---|---|---|
| 69 | 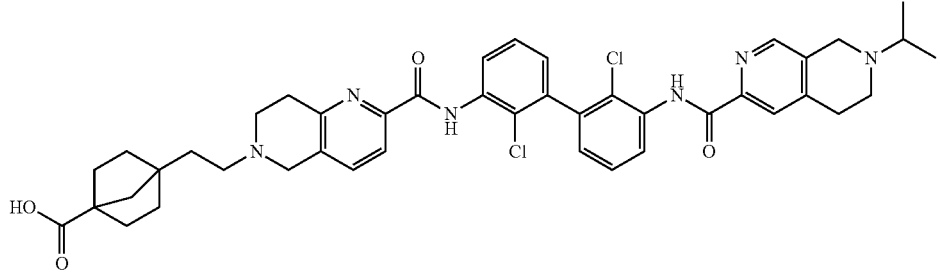 [SMILES: CC(C)N1CCc2cc(C(=O)Nc3cccc(-c4cccc(NC(=O)c5ccc6c(n5)CCN(CCC57CCC(C(=O)O)(CC5)C7)C6)c4Cl)c3Cl)ncc2C1]<br>4-(2-(2-((2,2'-dichloro-3'-(7-isopropyl-5,6,7,8-tetrahydro-2,7-naphthyridine-3-carboxamido)-[1,1'-biphenyl]-3-yl)carbamoyl)-7,8-dihydro-1,6-naphthyridin-6(5H)-yl)ethyl)bicyclo[2.2.1]heptane-1-carboxylic acid | 781 |
| 70 | 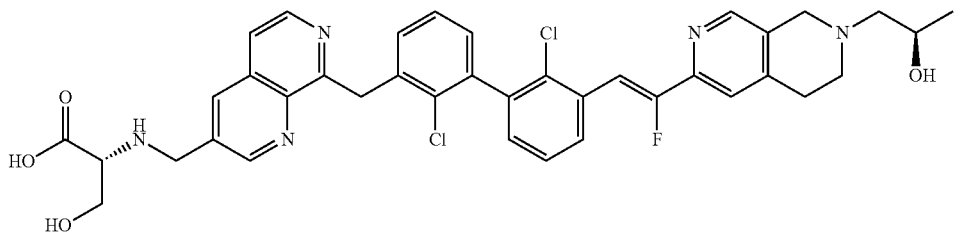 [SMILES: C[C@@H](O)CN1CCc2cc(/C(F)=C/c3cccc(-c4cccc(Cc5nccc6cc(CN[C@H](CO)C(=O)O)cnc56)c4Cl)c3Cl)ncc2C1]<br>((8-((2,2'-dichloro-3'-((Z)-2-fluoro-2-(7-((R)-2-hydroxypropyl)-5,6,7,8-tetrahydro-2,7-naphthyridin-3-yl)vinyl)-[1,1'-biphenyl]-3-yl)amino)-1,7-naphthyridin-3-yl)methyl)-D-serine | 717 |
| 71 | 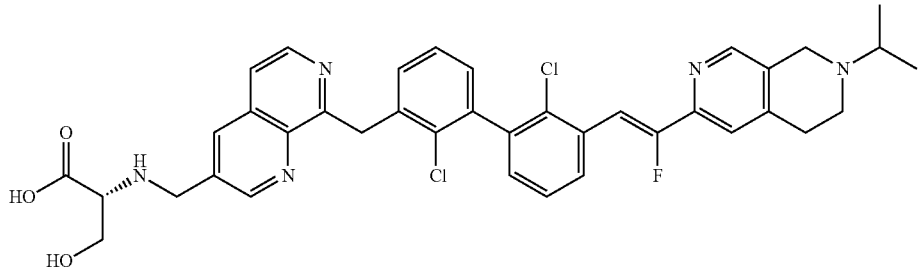 [SMILES: CC(C)N1CCc2cc(/C(F)=C/c3cccc(-c4cccc(Cc5nccc6cc(CN[C@H](CO)C(=O)O)cnc56)c4Cl)c3Cl)ncc2C1]<br>(Z)-((8-((2,2'-dichloro-3'-(2-fluoro-2-(7-isopropyl-5,6,7,8-tetrahydro-2,7-naphthyridin-3-yl)vinyl)-[1,1'-biphenyl]-3-yl)amino)-1,7-naphthyridin-3-yl)methyl)-D-serine | 701 |
| 72 | 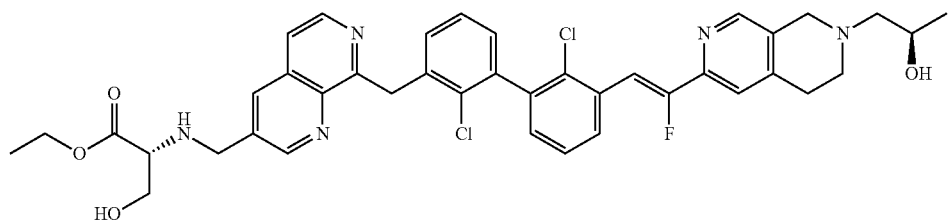 [SMILES: CCOC(=O)[C@@H](CO)NCc1cnc2c(Cc3cccc(-c4cccc(/C=C(\F)c5cc6c(cn5)CN(C[C@@H](C)O)CC6)c4Cl)c3Cl)nccc2c1]<br>ethyl ((8-((2,2'-dichloro-3'-((Z)-2-fluoro-2-(7-((R)-2-hydroxypropyl)-5,6,7,8-tetrahydro-2,7-naphthyridin-3-yl)vinyl)-[1,1'-biphenyl]-3-yl)amino)-1,7-naphthyridin-3-yl)methyl)-D-serinate | 745 |

-continued

| Example No. | Compound structure and name | [M + H]+ |
|---|---|---|
| 73 | ethyl (Z)-((8-((2,2'-dichloro-3'-(2-fluoro-2-(7-isopropyl-5,6,7,8-tetrahydro-2,7-naphthyridin-3-yl)vinyl)-[1,1'-biphenyl]-3-yl)amino)-1,7-naphthyridin-3-yl)methyl)-D-serinate | 729 |
| 74 | (S,Z)-4-(2-(6-(2-(2,2'-dimethyl-3'-((3-(((((5-oxopyrrolidin-2-yl)methyl)amino)methyl)-1,7-naphthyridin-8-yl)amino)-[1,1'-biphenyl]-3-yl)-1-fluorovinyl)-3,4-dihydro-2,7-naphthyridin-2(1H)-yl)ethyl)bicyclo[2.2.1]heptane-1-carboxylic acid | 794 |
| 75 | (S,Z)-4-(2-(6-(2-(2,2'-dichloro-3'-((3-(((((5-oxopyrrolidin-2-yl)methyl)amino)methyl)-1,7-naphthyridin-8-yl)amino)-[1,1'-biphenyl]-3-yl)-1-fluorovinyl)-3,4-dihydro-2,7-naphthyridin-2(1H)-yl)ethyl)bicyclo[2.2.1]heptane-1-carboxylic acid | 834 |
| 76 | (S,Z)-4-((6-(2-(2,2'-dichloro-3'-((3-(((((5-oxopyrrolidin-2-yl)methyl)amino)methyl)-1,7-naphthyridin-8-yl)amino)-[1,1'-biphenyl]-3-yl)-1-fluorovinyl)-3,4-dihydro-2,7-naphthyridin-2(1H)-yl)methyl)bicyclo[2.2.1]heptane-1-carboxylic acid | 820 |
| 77 | (S)-4-(2-(6-((2,2'-dichloro-3'-((3-(((((5-oxopyrrolidin-2-yl)methyl)amino)methyl)-1,7-naphthyridin-8-yl)amino)-[1,1'-biphenyl]-3-yl)carbamoyl)-3,4-dihydro-2,7-naphthyridin-2(1H)-yl)ethyl)bicyclo[2.2.1]heptane-1-carboxylic acid | 833 |

| Example No. | Compound structure and name | [M + H]⁺ |
|---|---|---|
| 78 | 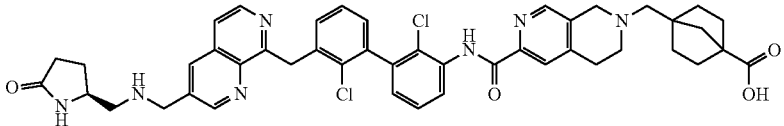 [SMILES: O=C1CC[C@@H](CNCc2cnc3c(Cc4cccc(-c5cccc(NC(=O)c6cc7c(cn6)CN(CC68CCC(C(=O)O)(CC6)C8)CC7)c5Cl)c4Cl)nccc3c2)N1]<br><br>(S)-4-((6-((2,2'-dichloro-3'-((3-((((5-oxopyrrolidin-2-yl)methyl)amino)methyl)-1,7-naphthyridin-8-yl)amino)-[1,1'-biphenyl]-3-yl)carbamoyl)-3,4-dihydro-2,7-naphthyridin-2(1H)-yl)methyl)bicyclo[2.2.1]heptane-1-carboxylic acid | 819 |

The Magnetic Resonance Imaging Data of the Compound Prepared from the Above Example was as Follows:

| Example No. | ¹H NMR |
|---|---|
| 2 | ¹H NMR (400 MHz, DMSO-d₆) δ 11.93 (s, 1H), 10.71 (s, 1H), 9.89 (s, 1H), 8.55 (dd, J = 8.3, 1.6 Hz, 1H), 8.46 (s, 1H), 8.38 (dd, J = 8.3, 1.5 Hz, 1H), 8.00 (s, 1H), 7.51 (dt, J = 16.2, 8.0 Hz, 2H), 7.16 (ddd, J = 9.1, 7.5, 1.5 Hz, 2H), 3.90 (s, 3H), 3.61 (s, 2H), 3.41 (s, 2H), 2.98 (t, J = 5.9 Hz, 2H), 2.74 (d, J = 5.6 Hz, 2H), 2.69-2.64 (m, 4H), 2.55 (s, 2H), 2.39 (s, 3H), 1.84 (d, J = 11.8 Hz, 2H), 1.72 (t, J = 7.8 Hz, 2H), 1.50 (d, J = 10.8 Hz, 4H), 1.43 (s, 2H), 1.37 (d, J = 11.3 Hz, 2H). |
| 3 | ¹HNMR (400 MHz, DMSO-d₆) δ 10.64 (s, 1H), 9.82 (s, 1H), 8.52-8.45 (m, 1H), 8.41 (s, 1H), 8.31 (d, J = 8.3 Hz, 1H), 7.92 (s, 1H), 7.44 (dt, J = 15.9, 7.9 Hz, 2H), 7.17-7.05 (m, 2H), 3.83 (s, 3H), 3.61 (s, 2H), 3.37 (s, 2H), 2.90 (t, J = 5.9 Hz, 2H), 2.73-2.58 (m, 7H), 2.55-2.49 (m, 3H), 1.85-1.75 (m, 2H), 1.66 (t, J = 7.7 Hz, 2H), 1.50-1.40 (m, 4H), 1.50-1.28 (m, 4H), 1.05 (t, J = 7.1 Hz, 3H). |
| 5 | ¹H NMR(400 MHz, DMSO-d₆) δ 10.63 (s, 1H), 9.82 (s, 1H), 8.48 (d, J = 8.3 Hz, 1H), 8.41 (s, 1H), 8.36-8.25 (m, 1H), 7.92 (s, 1H), 7.44 (dt, J = 15.9, 8.0 Hz, 2H), 7.09 (td, J = 8.1, 1.5 Hz, 2H), 3.83 (s, 3H), 3.49 (s, 2H), 3.37 (s, 2H), 2.88 (t, J = 5.7 Hz, 4H), 2.71 (s, 2H), 2.61 (d, J = 5.7 Hz, 2H), 2.50 (q, J = 5.8 Hz, 3H), 2.01 (dd, J = 7.5, 3.8 Hz, 2H), 1.84-1.78 (m, 4H), 1.68-1.61 (m, 4H), 1.53-1.40 (m, 4H), 1.37-1.29 (m, 4H). |
| 8 | ¹H NMR (400 MHz, DMSO-d₆) δ 11.79 (s, 1H), 10.64 (s, 1H), 9.83 (s, 1H), 8.48 (dd, J = 8.2, 1.5 Hz, 1H), 8.39 (s, 1H), 8.31 (dd, J = 8.4, 1.5 Hz, 1H), 7.92 (s, 1H), 7.45 (dt, J = 15.9, 7.9 Hz, 2H), 7.10 (td, J = 7.7, 1.5 Hz, 2H), 4.37 (s, 1H), 3.83 (s, 3H), 3.69 (s, 2H), 3.39 (s, 2H), 2.90 (t, J = 5.9 Hz, 2H), 2.80-2.65 (m, 4H), 2.65-2.59 (m, 2H), 2.50 (s, 2H), 2.50-2.28 (m, 2H), 1.78 (dt, J = 11.5, 7.2 Hz, 2H), 1.67 (t, J = 7.8 Hz, 2H), 1.52-1.40 (m, 4H), 1.39-1.22 (m, 4H), 1.02 (d, J = 6.2 Hz, 3H). |
| 9 | ¹H NMR (400 MHz, DMSO-d₆) δ 10.71 (s, 1H), 9.89 (s, 1H), 8.55 (dd, J = 8.4, 1.5 Hz, 1H), 8.47 (s, 1H), 8.38 (dd, J = 8.2, 1.5 Hz, 1H), 7.99 (s, 1H), 7.51 (dt, J = 16.1, 7.9 Hz, 2H), 7.16 (ddd, J = 9.0, 7.5, 1.5 Hz, 2H), 3.90 (s, 3H), 3.67 (s, 2H), 3.48 (t, J = 6.3 Hz, 2H), 3.41 (s, 2H), 2.96 (t, J = 5.9 Hz, 2H), 2.80-2.62 (m, 6H), 2.60-2.52 (m, 4H), 1.85 (td, J = 12.2, 4.6 Hz, 2H), 1.76-1.64 (m, 4H), 1.52 (q, J = 10.3, 7.4 Hz, 4H), 1.43 (s, 2H), 1.37 (t, J = 6.6 Hz, 2H). |
| 11 | ¹H NMR (400 MHz, Methanol-d₄) δ 8.52 (dd, J = 8.3, 1.5 Hz, 1H), 8.37 (dd, J = 8.3, 1.5 Hz, 1H), 8.33 (s, 1H), 7.96 (s, 1H), 7.37 (dt, J = 11.4, 7.9 Hz, 2H), 7.03 (ddd, J = 7.4, 5.5, 1.5 Hz, 2H), 4.70 (t, J = 6.7 Hz, 2H), 4.62 (t, J = 6.2 Hz, 2H), 3.89 (s, 3H), 3.68 (p, J = 6.4 Hz, 1H), 3.56 (d, J = 15.7 Hz, 4H), 2.98 (t, J = 6.0 Hz, 2H), 2.90 (t, J = 5.8 Hz, 2H), 2.72 (t, J = 5.7 Hz, 2H), 2.68-2.62 (m, 4H), 1.94-1.84 (m, 2H), 1.82-1.74 (m, 2H), 1.62-1.44 (m, 6H), 1.42-1.38 (m, 2H). |
| 12 | ¹H NMR (400 MHz, DMSO-d₆) δ 11.93 (s, 1H), 10.70 (s, 1H), 9.89 (s, 1H), 8.55 (dd, J = 8.2, 1.6 Hz, 1H), 8.44 (s, 1H), 8.38 (dd, J = 8.2, 1.6 Hz 1H), 7.97 (s, 1H), 7.51 (dt, J = 15.7, 7.9 Hz, 2H), 7.16 (td, J = 7.9, 1.6 Hz, 2H), 4.50 (d, J = 4.2 Hz, 1H), 3.90 (s, 3H), 3.80 (s, 2H), 3.45-3.30 (m, 3H), 2.91 (d, J = 5.8 Hz, 2H), 2.83-2.72 (m, 4H), 2.67 (d, J = 5.3 Hz, 2H), 2.57-2.52 (m, 2H), 2.50-2.44 (m, 1H), 1.93-1.76 (m, 6H), 1.72 (t, J = 7.8 Hz, 2H), 1.52 (q, J = 10.3, 7.6 Hz, 4H), 1.46-1.30 (m, 6H), 1.19 (q, J = 11.6 Hz, 2H). |
| 13 | ¹H NMR (400 MHz, DMSO-d₆) δ 10.64 (s, 1H), 9.83 (s, 1H), 8.48 (dd, J = 8.3, 1.6 Hz, 1H), 8.41 (s, 1H), 8.32 (dd, J = 8.3, 1.6 Hz, 1H), 7.92 (s, 1H), 7.44 (dt, J = 16.0, 7.9 Hz, 2H), 7.18-7.03 (m, 2H), 3.83 (s, 3H), 3.62 (s, 2H), 3.34 (s, 2H), 2.89 (t, J = 5.9 Hz, 2H), 2.67-2.52 (m, 4H), 2.62-2.51 (m, 4H), 2.50-2.47 (m, 2H), 1.85-1.74 (m, 2H), 1.68-1.61 (m, 4H), 1.50-1.38 (m, 4H), 1.38-1.23 (m, 4H), 1.06 (s, 6H). |

-continued

| Example No. | ¹H NMR |
|---|---|
| 16 | ¹H NMR (400 MHz, DMSO-$d_6$) δ 11.95 (s, 1H), 10.70 (s, 1H), 9.89 (s, 1H), 8.55 (dd, J = 8.3, 1.5 Hz, 1H), 8.47 (s, 1H), 8.38 (dd, J = 8.2, 1.4 Hz, 1H), 7.99 (s, 1H), 7.51 (dt, J = 16.1, 7.9 Hz, 2H), 7.23-7.10 (m, 2H), 3.90 (s, 3H), 3.66 (s, 2H), 3.41 (s, 2H), 2.97-2.95 (m, 5H), 2.79 (s, 3H), 2.75 (t, J = 5.8 Hz, 2H), 2.78-2.65 (m, 6H), 2.54 (d, J = 10.4 Hz, 2H), 2.31 (t, J = 6.5 Hz, 2H), 1.92-1.80 (m, 2H), 1.72 (t, J = 7.7 Hz, 2H), 1.59-1.46 (m, 8H), 1.43 (s, 2H), 1.43-1.30 (m, 2H). |
| 18 | ¹H NMR(400 MHz, DMSO-$d_6$) δ 11.81 (s, 1H), 10.64 (s, 1H), 9.83 (s, 1H), 8.53-8.43 (m, 2H), 8.31 (dd, J = 8.3, 1.5 Hz, 1H), 7.89 (s, 1H), 7.44 (dt, J = 15.8, 8.0 Hz, 2H), 7.19-7.02 (m, 2H), 4.14 (s, 1H), 3.83 (s, 3H), 3.37 (s, 2H), 2.96-2.67 (m, 7H), 2.65-2.57 (m, 2H), 2.50-2.48 (m, 2H), 1.85-1.75 (m, 2H), 1.66 (t, J = 7.8 Hz, 2H), 1.50-1.34 (m, 6H), 1.32-1.25 (m, 5H), 1.03 (d, J = 6.4 Hz, 3H), 0.98 (d, J = 6.4 Hz, 3H). |
| 19 | ¹H NMR (400 MHz, DMSO-$d_6$) δ 11.95 (s, 1H), 10.71 (s, 1H), 9.89 (s, 1H), 8.55 (dd, J = 8.4, 1.5 Hz, 1H), 8.47 (s, 1H), 8.38 (dd, J = 8.3, 1.5 Hz, 1H), 7.98 (s, 1H), 7.51 (dt, J = 15.9, 7.9 Hz, 2H), 7.16 (td, J = 7.6, 1.6 Hz, 2H), 3.90 (s, 3H), 3.76 (s, 2H), 3.49 (s, 2H), 2.93 (q, J = 6.2 Hz, 3H), 2.77 (dt, J = 26.5, 5.8 Hz, 4H), 2.67 (d, J = 5.4 Hz, 2H), 2.61 (s, 2H), 1.91-1.79 (m, 2H), 1.69-1.45 (m, 6H), 1.32 (s, 2H), 1.07 (d, J = 6.5 Hz, 6H). |
| 23 | ¹H NMR (400 MHz, DMSO-$d_6$) δ 11.89 (s, 1H), 10.71 (s, 1H), 9.89 (s, 1H), 8.56 (d, J = 8.2 Hz, 1H), 8.47 (s, 1H), 8.39 (d, J = 8.2 Hz, 1H), 7.98 (s, 1H), 7.52 (dt, J = 15.8, 7.9 Hz, 2H), 7.17 (t, J = 7.9 Hz, 2H), 3.90 (s, 3H), 3.77 (s, 2H), 3.40 (s, 2H), 2.94 (q, J = 6.3 Hz, 4H), 2.75 (t, J = 6.1 Hz, 4H), 2.68 (d, J = 5.5 Hz, 2H), 2.54 (s, 1H), 2.10 (ddd, J = 15.3, 10.0, 4.2 Hz, 1H), 1.88 (d, J = 1.6 Hz, 2H), 1.77 (d, J = 1.2 Hz, 2H), 1.41 (q, J = 7.2 Hz, 2H), 1.34-1.18 (m, 3H), 1.08 (d, J = 6.5 Hz, 6H), 0.94 (td, J = 13.2, 12.8, 6.2 Hz, 2H). |
| 25 | ¹H NMR (400 MHz, DMSO-$d_6$) δ 11.95 (s, 1H), 9.89 (s, 1H), 8.43-8.34 (m, 2H), 8.01 (dd, J = 7.9, 1.6 Hz, 1H), 7.56-7.39 (m, 4H), 7.33 (dd, J = 7.6, 1.6 Hz, 1H), 7.14 (dd, J = 7.6, 1.5 Hz, 1H), 3.90 (s, 3H), 3.71 (s, 2H), 3.41 (s, 2H), 2.89 (dt, J = 12.5, 6.3 Hz, 3H), 2.77-2.63 (m, 6H), 2.55 (s, 2H), 1.84 (d, J = 12.3 Hz, 2H), 1.72 (t, J = 7.8 Hz, 2H), 1.56-1.32 (m, 8H), 1.07 (d, J = 6.5 Hz, 6H). ¹⁹F NMR (377 MHz, DMSO-$d_6$) δ −121.23. |
| 32 | ¹H NMR (400 MHz, DMSO-$d_6$) δ 10.72 (d, J = 7.6 Hz, 2H), 8.62-8.50 (m, 3H), 8.47 (s, 1H), 7.98 (s, 1H), 7.63 (s, 1H), 7.54 (t, J = 8.0 Hz, 2H), 7.19 (d, J = 7.5 Hz, 2H), 4.03 (d, J = 13.8 Hz, 1H), 3.76 (s, 2H), 3.70 (d, J = 13.8 Hz, 1H), 3.19 (d, J = 5.6 Hz, 2H), 2.94 (t, J = 6.2 Hz, 3H), 2.86-2.81 (m, 1H), 2.74 (t, J = 5.8 Hz, 2H), 2.45 (dd, J = 8.4, 5.2 Hz, 1H), 2.24 (dt, J = 10.4, 4.7 Hz, 1H), 1.77 (q, J = 5.3 Hz, 2H), 1.45 (dd, J = 10.9, 5.5 Hz, 3H), 1.13 (dd, J = 8.3, 2.5 Hz, 2H), 1.07 (d, J = 6.5 Hz, 6H), 0.96-0.88 (m, 1H), 0.84-0.75 (m, 1H). |
| 58 | ¹H NMR (400 MHz, DMSO-$d_6$) δ 11.90 (s, 1H), 10.71 (s, 1H), 9.89 (s, 1H), 8.56 (dd, J = 8.3, 1.6 Hz, 1H), 8.46 (s, 1H), 8.38 (dd, J = 8.3, 1.6 Hz, 1H), 7.98 (s, 1H), 7.51 (dt, J = 16.1, 8.0 Hz, 2H), 7.16 (ddd, J = 8.8, 7.6, 1.6 Hz, 2H), 3.89 (s, 3H), 3.76 (s, 2H), 3.38 (s, 2H), 2.93 (q, J = 6.3 Hz, 3H), 2.73 (q, J = 5.7 Hz, 4H), 2.65 (d, J = 5.6 Hz, 2H), 2.46 (d, J = 8.0 Hz, 2H), 1.72-1.58 (m, 6H), 1.44-1.28 (m, 8H), 1.07 (d, J = 6.5 Hz, 6H). |
| 59 | ¹H NMR (400 MHz, DMSO-$d_6$) δ 10.71 (s, 1H), 9.90 (s, 1H), 8.55 (dd, J = 8.3, 1.5 Hz, 1H), 8.47 (s, 1H), 8.37 (dd, J = 8.3, 1.5 Hz, 1H), 7.98 (s, 1H), 7.51 (dt, J = 15.9, 8.0 Hz, 2H), 7.16 (td, J = 7.4, 1.5 Hz, 2H), 3.98 (t, J = 4.8 Hz, 3H), 3.90 (s, 3H), 3.76 (s, 2H), 3.72 (t, J = 4.8 Hz, 3H), 3.42 (s, 2H), 2.94 (t, J = 6.1 Hz, 3H), 2.76 (dt, J = 11.2, 6.0 Hz, 4H), 2.67 (d, J = 5.3 Hz, 2H), 2.55 (t, J = 7.3 Hz, 2H), 1.82 (t, J = 7.3 Hz, 2H), 1.07 (d, J = 6.5 Hz, 6H). |
| 60 | ¹H NMR (400 MHz, DMSO-$d_6$) δ 10.70 (s, 1H), 9.89 (s, 1H), 8.55 (dd, J = 8.3, 1.5 Hz, 1H), 8.47 (s, 1H), 8.37 (dd, J = 8.3, 1.5 Hz, 1H), 7.98 (s, 1H), 7.51 (dt, J = 15.9, 8.0 Hz, 2H), 7.16 (td, J = 7.5, 1.6 Hz, 2H), 3.90 (s, 3H), 3.76 (s, 2H), 3.39 (s, 2H), 2.94 (t, J = 6.1 Hz, 3H), 2.74 (t, J = 5.8 Hz, 4H), 2.66 (t, J = 5.7 Hz, 2H), 2.48 (d, J = 6.7 Hz, 2H), 1.83 (s, 6H), 1.67 (t, J = 7.5 Hz, 2H), 1.07 (d, J = 6.5 Hz, 6H). |
| 61 | ¹H NMR (400 MHz, DMSO-$d_6$) δ 11.91 (s, 1H), 10.70 (s, 1H), 9.89 (s, 1H), 8.55 (d, J = 8.2 Hz, 1H), 8.45 (s, 1H), 8.38 (d, J = 8.2 Hz, 1H), 7.97 (s, 1H), 7.51 (dt, J = 15.8, 8.0 Hz, 2H), 7.16 (t, J = 8.1 Hz, 2H), 4.67 (s, 1H), 4.03 (d, J = 6.5 Hz, 1H), 3.90 (s, 3H), 3.80 (s, 2H), 3.41 (s, 2H), 2.93 (d, J = 6.9 Hz, 4H), 2.80-2.56 (m, 6H), 2.54 (d, J = 9.1 Hz, 1H), 1.97-1.76 (m, 4H), 1.72 (t, J = 7.7 Hz, 2H), 1.65-1.32 (m, 12H). |
| 62 | ¹H NMR (400 MHz, DMSO-$d_6$) δ 11.96 (s, 1H), 10.70 (s, 1H), 9.89 (s, 1H), 8.55 (dd, J = 8.3, 1.5 Hz, 1H), 8.47 (s, 1H), 8.38 (dd, J = 8.3, 1.5 Hz, 1H), 7.99 (s, 1H), 7.51 (dt, J = 16.1, 8.0 Hz, 2H), 7.16 (ddd, J = 9.2, 7.6, 1.5 Hz, 2H), 5.10 (s, 1H), 3.90 (s, 3H), 3.83 (s, 2H), 3.41 (s, 2H), 2.98 (d, J = 5.9 Hz, 2H), 2.85 (t, J = 5.9 Hz, 2H), 2.74 (d, J = 5.5 Hz, 2H), 2.64 (d, J = 15.2 Hz, 4H), 2.54 (d, J = 7.9 Hz, 2H), 1.92-1.80 (m, 2H), 1.72 (t, J = 7.7 Hz, 2H), 1.56-1.33 (m, 8H), 0.63 (q, J = 4.6 Hz, 2H), 0.51-0.43 (m, 2H). |

-continued

| Example No. | ¹H NMR |
|---|---|
| 63 | ¹H NMR (400 MHz, DMSO-$d_6$) δ 11.94 (s, 1H), 10.71 (s, 1H), 9.89 (s, 1H), 8.56 (dd, J = 8.3, 1.5 Hz, 1H), 8.48 (s, 1H), 8.38 (dd, J = 8.4, 1.5 Hz, 1H), 7.97 (s, 1H), 7.51 (dt, J = 16.0, 7.9 Hz, 2H), 7.16 (td, J = 7.6, 1.6 Hz, 2H), 4.30 (s, 1H), 3.90 (s, 3H), 3.81 (s, 2H), 3.75 (s, 1H), 3.41 (s, 2H), 2.93 (d, J = 5.7 Hz, 2H), 2.84-2.70 (m, 4H), 2.67 (d, J = 5.3 Hz, 2H), 2.54-2.50 (m, 2H), 2.48-2.44 (m, 1H), 1.93-1.62 (m, 8H), 1.59-1.30 (m, 12H). |
| 64 | ¹H NMR (400 MHz, Methanol-$d_4$) δ 8.52 (dd, J = 8.5, 1.5 Hz, 1H), 8.38 (dd, J = 8.3, 1.5 Hz, 1H), 8.34 (s, 1H), 7.95 (s, 1H), 7.40-7.32 (m, 2H), 7.03 (ddd, J = 7.2, 5.1, 1.5 Hz, 2H), 3.89 (s, 3H), 3.78 (s, 2H), 3.55 (s, 2H), 2.97 (t, J = 6.1 Hz, 2H), 2.91 (t, J = 5.8 Hz, 2H), 2.84 (t, J = 6.0 Hz, 2H), 2.81-2.76 (m, 1H), 2.72 (t, J = 5.9 Hz, 2H), 2.68-2.62 (m, 2H), 1.99-1.84 (m, 4H), 1.81-1.74 (m, 2H), 1.73-1.64 (m, 2H), 1.60-1.43 (m, 10H), 1.42-1.33 (m, 2H). |
| 65 | ¹H NMR (400 MHz, DMSO-$d_6$) δ 11.84 (s, 2H), 10.63 (s, 1H), 9.82 (s, 1H), 8.48 (dd, J = 8.4, 1.6 Hz, 1H), 8.40 (s, 1H), 8.31 (dd, J = 8.2, 1.6 Hz, 1H), 7.91 (s, 1H), 7.44 (dt, J = 15.6, 8.0 Hz, 2H), 7.09 (td, J = 7.5, 1.6 Hz, 2H), 3.83 (s, 3H), 3.77 (s, 2H), 3.37 (s, 2H), 2.87 (d, J = 5.7 Hz, 2H), 2.75 (t, J = 11.4 Hz, 4H), 2.64-2.58 (m, 2H), 2.47 (s, 3H), 1.85-1.74 (m, 2H), 1.72-1.40 (m, 14H), 1.38-1.30 (m 5H), 1.08 (s, 3H). |
| 66 | ¹H NMR (400 MHz, DMSO-$d_6$) δ 10.69 (s, 2H), 8.53 (d, J = 13.9 Hz, 4H), 8.07 (s, 2H), 7.55 (s, 2H), 7.20 (s, 2H), 4.36-3.97 (m, 4H), 3.19 (s, 8H), 1.26 (s, 12H). |
| 67 | ¹H NMR (400 MHz, DMSO-$d_6$) δ 10.71 (s, 2H), 8.56 (dd, J = 8.2, 1.6 Hz, 2H), 8.47 (s, 2H), 7.99 (d, J = 3.8 Hz, 2H), 7.54 (t, J = 8.0 Hz, 2H), 7.19 (dd, J = 7.7, 1.5 Hz, 2H), 3.76 (s, 2H), 3.67 (s, 2H), 2.99-2.90 (m, 6H), 2.73 (dd, J = 13.7, 6.5 Hz, 5H), 1.86 (d, J = 13.4 Hz, 2H), 1.76 (s, 2H), 1.44 (t, J = 27.8 Hz, 8H), 1.07 (d, J = 6.5 Hz, 6H). |
| 68 | ¹H NMR (400 MHz, DMSO-$d_6$) δ 11.94 (s, 1H), 10.70 (d, J = 5.0 Hz, 2H), 8.53 (ddd, J = 18.2, 8.3, 1.5 Hz, 2H), 8.46 (s, 1H), 8.06-7.93 (m, 2H), 7.84 (d, J = 8.0 Hz, 1H), 7.53 (td, J = 8.0, 1.6 Hz, 2H), 7.19 (d, J = 7.6 Hz, 2H), 3.76 (s, 2H), 3.68 (s, 2H), 2.93 (q, J = 6.9, 6.5 Hz, 5H), 2.73 (q, J = 6.9, 6.4 Hz, 4H), 2.54 (d, J = 7.5 Hz, 2H), 1.90-1.80 (m, 2H), 1.74 (t, J = 7.8 Hz, 2H), 1.52 (td, J = 12.4, 11.4, 5.0 Hz, 4H), 1.43 (s, 2H), 1.37 (d, J = 11.2 Hz, 2H), 1.07 (d, J = 6.5 Hz, 6H). |
| 69 | ¹H NMR (400 MHz, DMSO-$d_6$) δ 10.69 (s, 2H), 8.62 (s, 1H), 8.49 (ddd, J = 11.0, 8.4, 1.5 Hz, 2H), 8.25-8.09 (m, 2H), 7.98 (d, J = 8.1 Hz, 1H), 7.56 (t, J = 7.9 Hz, 2H), 7.22 (dd, J = 7.6, 1.5 Hz, 2H), 4.86-4.62 (m, 3H), 4.53 (d, J = 17.3 Hz, 2H), 3.88 (s, 1H), 3.82-3.71 (m, 2H), 3.55 (s, 1H), 2.08-1.85 (m, 4H), 1.67-1.47 (m, 6H), 1.37 (d, J = 6.5 Hz, 8H). |
| 70 | ¹H NMR (400 MHz, DMSO-$d_6$) δ 9.89 (s, 1H), 9.14 (dd, J = 8.4, 1.6 Hz, 1H), 8.97 (d, J = 2.0 Hz, 1H), 8.39 (s, 1H), 8.31 (d, J = 2.0 Hz, 1H), 8.20 (d, J = 5.8 Hz, 1H), 8.02 (dd, J = 7.9, 1.6 Hz, 1H), 7.57-7.29 (m, 6H), 7.04 (dd, J = 7.5, 1.6 Hz, 1H), 4.42 (s, 1H), 4.14 (d, J = 14.6 Hz, 1H), 3.99 (d, J = 14.5 Hz, 1H), 3.89 (q, J = 6.2 Hz, 1H), 3.73-3.59 (m, 4H), 3.25 (s, 2H), 2.90 (t, J = 5.8 Hz, 2H), 2.76 (t, J = 6.0 Hz, 2H), 2.47-2.36 (m, 2H), 1.08 (d, J = 6.1 Hz, 3H). |
| 71 | ¹H NMR (400 MHz, DMSO-$d_6$) δ 9.90 (s, 1H), 9.17-9.11 (m, 1H), 8.97 (d, J = 2.0 Hz, 1H), 8.41 (s, 1H), 8.30 (d, J = 1.9 Hz, 1H), 8.20 (d, J = 5.8 Hz, 1H), 8.04-7.99 (m, 1H), 7.57-7.32 (m, 7H), 7.04 (dd, J = 7.5, 1.6 Hz, 1H), 4.13 (d, J = 14.7 Hz, 1H), 3.98 (d, J = 14.5 Hz, 1H), 3.71 (s, 2H), 3.64-3.58 (m, 2H), 2.89 (dt, J = 11.9, 6.2 Hz, 4H), 2.73 (t, J = 5.7 Hz, 2H), 1.07 (d, J = 6.5 Hz, 6H). |
| 72 | ¹H NMR (400 MHz, DMSO-$d_6$) δ 9.89 (s, 1H), 9.14 (dd, J = 8.4, 1.5 Hz, 1H), 8.94 (d, J = 2.0 Hz, 1H), 8.39 (s, 1H), 8.26 (d, J = 1.9 Hz, 1H), 8.19 (d, J = 5.8 Hz, 1H), 8.02 (dd, J = 7.9, 1.6 Hz, 1H), 7.61-7.30 (m, 6H), 7.04 (dd, J = 7.6, 1.6 Hz, 1H), 4.84 (t, J = 5.8 Hz, 1H), 4.41 (d, J = 4.2 Hz, 1H), 4.06 (q, J = 7.1 Hz, 3H), 3.97-3.83 (m, 2H), 3.69 (s, 2H), 3.62 (t, J = 5.6 Hz, 2H), 2.90 (t, J = 5.9 Hz, 2H), 2.76 (d, J = 5.7 Hz, 2H), 2.46-2.31 (m, 2H), 1.17 (t, J = 7.1 Hz, 3H), 1.08 (d, J = 6.2 Hz, 3H). |
| 73 | ¹H NMR (400 MHz, DMSO-$d_6$) δ 9.90 (s, 1H), 9.14 (dd, J = 8.4, 1.5 Hz, 1H), 8.94 (d, J = 2.0 Hz, 1H), 8.41 (s, 1H), 8.26 (d, J = 1.9 Hz, 1H), 8.19 (d, J = 5.8 Hz, 1H), 8.02 (dd, J = 7.8, 1.6 Hz, 1H), 7.59-7.31 (m, 6H), 7.04 (dd, J = 7.5, 1.6 Hz, 1H), 4.84 (t, J = 5.8 Hz, 1H), 4.06 (q, J = 6.9 Hz, 3H), 3.90 (d, J = 15.1 Hz, 1H), 3.71 (s, 2H), 3.62 (t, J = 5.5 Hz, 2H), 2.89 (dt, J = 11.7, 6.1 Hz, 4H), 2.73 (t, J = 5.8 Hz, 2H), 1.17 (t, J = 7.1 Hz, 3H), 1.07 (d, J = 6.6 Hz, 6H). |
| 74 | ¹H NMR (400 MHz, DMSO-$d_6$) δ 9.24 (s, 1H), 8.84 (d, J = 2.0 Hz, 1H), 8.41 (dd, J = 8.3, 1.2 Hz, 1H), 8.31 (s, 1H), 8.13 (d, J = 2.0 Hz, 1H), 8.00 (d, J = 5.8 Hz, 1H), 7.68 (d, J = 7.7 Hz, 1H), 7.62 (s, 1H), 7.39 (d, J = 1.8 Hz, 1H), 7.31-7.21 (m, 2.5H), 7.15 (s, 0.5H), 7.09 (d, J = 5.8 Hz, 1H), 7.05 (dd, J = 7.6, 1.3 Hz, 1H), 6.81 (dd, J = 7.6, 1.3 Hz, 1H), 3.88 (d, J = 4.8 Hz, 2H), 3.55 (d, J = 11.1 Hz, 3H), 2.80 (d, J = 6.0 Hz, 2H), 2.61 (t, J = 5.8 Hz, 2H), 2.50-2.44 (m, 4H), 2.12-1.95 (m, 9H), 1.88-1.74 (m, 2H), 1.73-1.57 (m, 3H), 1.53-1.41 (m, 4H), 1.40-1.35 (m, 4H). |

-continued

| Example No. | $^1$H NMR |
|---|---|
| 75 | $^1$H NMR (400 MHz, DMSO-$d_6$) δ 9.84 (s, 1H), 9.08 (dd, J = 8.4, 1.6 Hz, 1H), 8.91 (d, J = 2.0 Hz, 1H), 8.34 (s, 1H), 8.21 (d, J = 1.9 Hz, 1H), 8.13 (d, J = 5.8 Hz, 1H), 7.95 (dd, J = 8.0, 1.6 Hz, 1H), 7.59 (s, 1H), 7.53-7.40 (m, 3.5H), 7.35 (s, 0.5H), 7.31 (dd, J = 7.6, 1.6 Hz, 1H), 7.26 (d, J = 5.8 Hz, 1H), 6.97 (dd, J = 7.6, 1.6 Hz, 1H), 3.91 (d, J = 4.1 Hz, 2H), 3.57 (d, J = 5.2 Hz, 3H), 2.82 (d, J = 5.9 Hz, 2H), 2.64 (s, 2H), 2.50 (d, J = 6.7 Hz, 4H), 2.08-1.98 (m, 3H), 1.86-1.75 (m, 2H), 1.73-1.58 (m, 3H), 1.52-1.42 (m, 4H), 1.45-1.35 (m, 4H). |
| 76 | $^1$H NMR (400 MHz, DMSO-$d_6$) δ 9.24 (s, 1H), 8.84 (d, J = 2.0 Hz, 1H), 8.40 (d, J = 8.1 Hz, 1H), 8.30 (d, J = 3.9 Hz, 3H), 8.13 (d, J = 1.9 Hz, 1H), 8.00 (d, J = 5.8 Hz, 1H), 7.69 (d, J = 7.8 Hz, 1H), 7.62 (s, 1H), 7.39 (s, 1H), 7.32-7.14 (m, 3H), 7.09 (d, J = 5.8 Hz, 1H), 7.05 (d, J = 7.4 Hz, 1H), 6.81 (d, J = 7.4 Hz, 1H), 3.88 (d, J = 4.7 Hz, 2H), 3.62 (s, 3H), 2.82 (t, J = 5.8 Hz, 2H), 2.68 (t, J = 5.8 Hz, 2H), 2.54 (s, 2H), 2.48 (d, J = 6.2 Hz, 2H), 2.10-1.95 (m, 9H), 1.80 (dt, J = 11.4, 7.2 Hz, 2H), 1.67-1.40 (m, 7H), 1.35-1.25 (m, 2H). |
| 77 | $^1$H NMR (400 MHz, DMSO-$d_6$) δ 10.72 (s, 1H), 9.91 (s, 1H), 9.16 (dd, J = 8.4, 1.5 Hz, 1H), 8.97 (d, J = 2.0 Hz, 1H), 8.56 (dd, J = 8.3, 1.6 Hz, 1H), 8.47 (s, 1H), 8.27 (d, J = 1.9 Hz, 1H), 8.20 (d, J = 5.8 Hz, 1H), 7.99 (s, 1H), 7.66 (s, 1H), 7.54 (td, J = 8.0, 6.1 Hz, 2H), 7.33 (d, J = 5.8 Hz, 1H), 7.21 (dd, J = 7.6, 1.6 Hz, 1H), 7.04 (dd, J = 7.6, 1.6 Hz, 1H), 4.03-3.90 (m, 2H), 3.65 (d, J = 16.5 Hz, 3H), 3.34 (s, 1H), 2.95 (d, J = 6.0 Hz, 2H), 2.75-2.65 (m, 2H), 2.55 (dd, J = 5.9, 2.1 Hz, 2H), 2.19-2.03 (m, 3H), 1.86 (d, J = 12.7 Hz, 2H), 1.82-1.63 (m, 3H), 1.52 (d, J = 10.8 Hz, 4H), 1.41 (d, J = 26.2 Hz, 4H). |
| 78 | $^1$H NMR (400 MHz, DMSO-$d_6$) δ 10.66 (s, 1H), 9.84 (s, 1H), 9.09 (dd, J = 8.4, 1.5 Hz, 1H), 8.90 (d, J = 2.0 Hz, 1H), 8.50 (dd, J = 8.3, 1.5 Hz, 1H), 8.41 (d, J = 7.7 Hz, 1H), 8.21 (d, J = 1.9 Hz, 1H), 8.13 (d, J = 5.8 Hz, 1H), 7.92 (s, 1H), 7.62 (s, 1H), 7.51-7.42 (m, 2H), 7.26 (d, J = 5.8 Hz, 1H), 7.15 (dd, J = 7.6, 1.6 Hz, 1H), 6.98 (dd, J = 7.6, 1.6 Hz, 1H), 3.95-3.84 (m, 2H), 3.68 (s, 2H), 3.56 (t, J = 6.6 Hz, 1H), 2.89 (t, J = 5.9 Hz, 2H), 2.70 (t, J = 5.8 Hz, 2H), 2.55 (s, 2H), 2.48 (dd, J = 6.1, 2.0 Hz, 2H), 2.09-1.98 (m, 3H), 1.85-1.75 (m, 2H), 1.65-1.54 (m, 3H), 1.45 (d, J = 15.1 Hz, 4H), 1.30 (d, J = 9.8 Hz, 2H). |

Biological Test Evaluation

I. PD1-PDL1 HTRF Binding Activity Test

The effect of compounds of the examples of the present invention on the interaction between PD-1 and PD-L1 was determined by the PD-1/PD-L1 binding assay kit from Cisbio (#64ICP01PEG or 64ICP01PEH). The detailed experimental process was as follows:
1) Pre-diluted compound solution, 4 μL of Tag1-PD-L1 and 4 μL of Tag2-PD1 were added to each well of a 384-well plate:
2) After the mixture was incubated at room temperature for 15 min, 5 μL of anti-Tag1-Eu3+ antibody and 5 μL of anti-Tag2-XL665 antibody were then added;
3) After incubated for 2 hrs at room temperature or overnight at 4° C., plates were read on Envision of Pelkin Elmer; and readings at 665 nm and 620 nm were recorded, and the ratio of the two readings was taken as a reading for each well;
4) The reading of each well after compound treatment was compared with the reading of DMSO treated wells to obtain the percent inhibition of the compound;
5) $IC_{50}$ values of compounds and positive compounds of the examples of the present invention were determined by non-linear regression analysis of percent inhibition at different compound concentrations. The specific experimental results were shown in Table 1.

II. Jurkat Reporter Gene Cellular Assay

The effect of compounds of the examples of the present invention and positive compounds on the interaction between PD-1 and PD-L1 expressed on cell surfaces, and the related influence on T cell functions, were determined by a Jurkat reporter gene cellular assay.

Briefly, the reporter gene plasmid of NF-κB-luc and the plasmid of human PD-1 were transfected into Jurkat cells to establish a stably transfected cell line capable of stably expressing both PD-1 and NF-κB-Luc reporter genes; the expression level of PD-1 on the cell surface was confirmed by flow cytometry; and the expression of the reporter gene was confirmed via the response of the reporter gene stimulated by OKT-3 and Raiji cells.

In addition, the plasmid of human PD-L1 was transfected into Raji cells to obtain a cell line capable of stably expressing PD-L1. Jurkat/NF-κB-luc/PD1 cells and Raji-PD-L1 cells were then cocultured and stimulated with OKT-3. On this basis, the compounds were added, and the enhancement of the signal pathway of T cell activation by the inhibitory effect of the compounds on the interaction between PD-1 and PD-L1 was evaluated by readings of reporter gene responses. The specific experimental process was as follows:
1) 30 μL of compound or antibody solution was added to each well of a white 96-well plate (coming, 3610) at different diluted concentrations, and 10 μL of OKT3 (Biolegend, 317326) was then added (the final concentration of OKT3: 1 μg/mL);
2) 20 μL of Raji-PD-L1 cell suspension was added to each well with 5*10$^4$ cells for each well, and was incubated in an incubator for 20 min:
3) 20 μL of Jurkat/NF-κb-luc/PD-1 cell suspension was added to each well with 5*10$^4$ cells for each well, and well mixed, and 6 hrs later, Bright-glo (Promega, E2620) was applied and plates were read on Envision;
4) The reading of each well treated with the compound was compared with the reading of each well treated with DMSO to obtain the activation fold of the compound;

5) $EC_{50}$ values of compounds and positive compounds of the examples of the present invention were determined by non-linear regression analysis of activation folds at different compound concentrations. The specific experimental results were shown in Table 1:

TABLE 1

Biological test results

| Example No. | PD1-PDL1 HTRF Binding Activity $IC_{50}$/nM | Cell Activity $EC_{50}$/nM |
|---|---|---|
| 1 | 0.73 | 53.8 |
| 2 | 0.1784 | 50 |
| 3 | 0.174 | 47.6 |
| 4 | NT | NT |
| 5 | NT | 107.7 |
| 6 | NT | NT |
| 7 | NT | NT |
| 8 | NT | 59.8 |
| 9 | NT | 177 |
| 10 | NT | NT |
| 11 | 0.109 | 54.4 |
| 12 | NT | 114.4 |
| 13 | NT | 78.9 |
| 14 | NT | NT |
| 15 | NT | NT |
| 16 | NT | 83.5 |
| 17 | NT | NT |
| 18 | NT | 90.7 |
| 19 | NT | 58.8 |
| 20 | NT | NT |
| 21 | NT | NT |
| 22 | NT | NT |
| 23 | NT | 60.7 |
| 24 | NT | NT |
| 25 | 0.3585 | 86.3 |
| 26 | NT | NT |
| 27 | NT | NT |
| 28 | NT | NT |
| 29 | NT | NT |
| 30 | NT | NT |
| 31 | NT | NT |
| 32 | 0.6609 | 25 |
| 33 | NT | NT |
| 34 | NT | NT |
| 35 | NT | NT |
| 36 | NT | NT |
| 37 | NT | NT |
| 38 | NT | NT |
| 39 | NT | NT |
| 40 | NT | NT |
| 41 | NT | NT |
| 42 | NT | NT |
| 43 | NT | NT |
| 44 | NT | NT |
| 45 | NT | NT |
| 46 | NT | NT |
| 47 | NT | NT |
| 48 | NT | NT |
| 49 | NT | NT |
| 50 | NT | NT |
| 51 | NT | NT |
| 52 | NT | NT |
| 53 | NT | NT |
| 54 | NT | NT |
| 55 | NT | NT |
| 56 | NT | NT |
| 57 | NT | NT |
| 58 | 0.73 | 53.46 |
| 59 | 0.9037 | 33.8 |
| 60 | 0.2528 | 29.4 |
| 61 | NT | 83.2 |
| 62 | NT | 76.3 |
| 63 | NT | 104 |
| 64 | NT | 155 |
| 65 | NT | 121.8 |
| 66 | NT | >10000 |
| 67 | NT | 1657 |
| 68 | NT | 177.5 |
| 69 | NT | 380.9 |
| 70 | NT | 945.9 |
| 71 | NT | 771.6 |
| 72 | NT | 1433 |
| 73 | NT | 7644 |
| 74 | NT | 1397 |
| 75 | NT | 1130 |
| 76 | NT | 1190 |
| 77 | NT | 356.1 |
| 78 | NT | 504.3 |

Note
"NT", i.e., "Not Tested", means that the compound was not tested.

The bioactivity data of the compounds of the specific examples indicates that the series of compounds of the present invention have a strong inhibitory effect on the interaction between PD-1 and PD-L1, and moreover, such an inhibitory effect can enhance or recover the activation of T cells at the cellular level.

III. Pharmacokinetic Assay in Mice

1. Purpose of Study

The purpose of this study was to study the pharmacokinetic behaviors of some compounds of the present invention, and administration routes were: per oral administration (PO) to ICR mice at a dose of 10 mg/kg.

2. Testing Scheme 2.1 Tested Drug

The compounds used in this test came from the compounds of the specific examples of the present invention.

2.2 Tested Animal

ICR mice, male, N=3, with the original source of Shanghai Sippr-BK Laboratory Animal Co. Ltd.

2.3 Preparation and Administration of Drug

The compounds were weighed, and dissolved in a solvent of 0.5% SDS+0.5% CMCNa. The mixture solutions were mixed well by shaking and ultrasonic treatment to obtain colorless clear solutions. The solutions were orally administered to nine mice after an overnight fast. The dosage of administration was 10 mg/kg.

2.4 Sampling

1) With about 90 μL/time point, blood was drawn from the submaxillary vein, and heparin sodium was added for anticoagulation. The blood samples were placed onto the ice, and were centrifuged (centrifugation conditions: 8000 r/min, 6 min, 2-8° C.) within 1 hr to obtain plasmas.

2) The time points for blood sampling were at 0 hr, 0.25 hr, 0.5 hr, 1 hr, 2 hrs, 4 hrs, 6 hrs, 8 hrs and 24 hrs after administration. The samples were stored in a refrigerator at −20° C.

3) 40 μL of plasma sample was added to 160 μL of cold acetonitrile containing an internal standard, and the mixture solution was vortexed for 3 min and centrifuged at 11,000 r/min for 5 min.

4) 100 μL of supernate was taken and added to 100 μL of water, and 5 μL of the sample was taken and analyzed by LC/MS/MS.

The compounds from some representative examples of the present invention were administered and tested according to the above method, and their prototype compounds were detected. The experimental results are shown in Table 2.

TABLE 2

PK Results for Per Oral Administration (PO) of 10 mg/kg of Compounds to Mice

| Detected compound | $C_{max}$ (ng/mL) | $T_{max}$ (h) | $AUC_{last}$ (hr*ng/mL) | $T_{1/2}$ (h) | MRT (h) |
|---|---|---|---|---|---|
| Example 1 | 2846 | 0.5 | 18354 | 3.6 | 4.9 |
| Example 2 | 2320 | 0.083 | 1823 | 4 | 1.8 |
| Example 32 | 2567 | 0.5 | 10170 | 1.3 | 2.9 |
| Example 58 | 1633 | 1 | 13877 | 3.8 | 5.7 |
| Example 59 | 616 | 0.5 | 2304 | 1.2 | 2.4 |
| Example 60 | 2420 | 0.5 | 4252 | 1.6 | 2 |

All documents mentioned in the present application are hereby incorporated by reference in their entirety, just as each document is cited separately as a reference. In addition, it should be understood that various modifications and changes may be made by those skilled in the art after reading the above teachings of the present invention and these equivalent forms also fall within the scope defined by the claims appended hereto.

The invention claimed is:
1. A compound of formula (I), a stereoisomer, prodrug or pharmaceutically acceptable salt thereof:

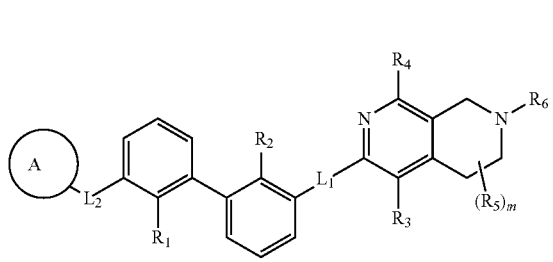

(I)

wherein, m is 0, 1, 2, 3 or 4;
$L_1$ and $L_2$ are each independently —$CR_7$=$CR_8$—, —NH—C(O)—, —$NR_9$—C($R_{10}R_{11}$)—, —$NR_{12}$— or a bond;
ring A is

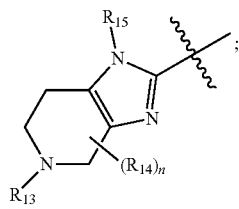

$R_1$ and $R_2$ are each independently selected from the group consisting of hydrogen, deuterium, halogen, cyano, hydroxy, carboxyl, $C_{1-10}$ alkyl, $C_{3-10}$ cycloalkyl and $C_{1-10}$ alkoxy, above groups are optionally further substituted by one or more substituents selected from the group consisting of deuterium, halogen, cyano, cyclopropyl, hydroxy and $C_{1-4}$ alkoxy;
$R_3$ and $R_4$ are each independently selected from the group consisting of hydrogen, deuterium, halogen, cyano, hydroxy, carboxyl, $C_{1-10}$ alkyl, $C_{3-10}$ cycloalkyl, 3-10 membered heterocyclyl, $C_{1-10}$ alkoxy and $C_{3-10}$ cycloalkoxy, above groups are optionally further substituted by one or more substituents selected from the group consisting of deuterium, halogen, cyano, cyclopropyl, hydroxy and $C_{1-4}$ alkoxy;
each $R_5$ is independently selected from the group consisting of hydrogen, deuterium, halogen, cyano, hydroxy, carboxyl, $C_{1-10}$ alkyl, $C_{3-10}$ cycloalkyl and $C_{1-10}$ alkoxy, or, when m≥2, two of $R_5$, together with the carbon atom directly attached thereto, form carbonyl, $C_{3-10}$ cycloalkyl or 3-10 membered heterocyclyl, above groups are optionally further substituted by one or more substituents selected from the group consisting of deuterium, halogen, cyano, cyclopropyl, hydroxy and $C_{1-4}$ alkoxy;
$R_6$ is selected from the group consisting of hydrogen, deuterium, hydroxy, $C_{1-10}$ alkyl, $C_{2-10}$ alkenyl, $C_{2-10}$ alkynyl, $C_{3-10}$ cycloalkyl, 3-10 membered heterocyclyl, $C_{5-10}$ aryl and 5-10 membered heteroaryl, above groups are optionally further substituted by one or more substituents selected from the group consisting of deuterium, halogen, cyano, nitro, azido, $C_{1-10}$ alkyl, $C_{2-10}$ alkenyl, $C_{2-10}$ alkynyl, $C_{1-10}$ haloalkyl, $C_{1-10}$ deuterioalkyl, $C_{3-10}$ cycloalkyl, 3-10 membered heterocyclyl, $C_{5-10}$ aryl, 5-10 membered heteroaryl, =O, —$C_{0-8}$—S(O)$_r R_{21}$, —$C_{0-8}$—O—$R_{22}$, —$C_{0-8}$—C(O)O$R_{22}$, —$C_{0-8}$—C(O)$R_{23}$, —$C_{0-8}$—O—C(O)$R_{23}$, —$C_{0-8}$—N$R_{24}R_{25}$, —$C_{0-8}$—C(=N$R_{24}$)$R_{23}$, —$C_{0-8}$—N($R_{24}$)—C(=N$R_{25}$)$R_{23}$, —$C_{0-8}$—C(O)N$R_{24}R_{25}$ and —$C_{0-8}$—N($R_{24}$)—C(O)$R_{23}$, above groups are optionally more further substituted by one or more substituents selected from the group consisting of deuterium, halogen, cyano, nitro, azido, $C_{1-10}$ alkyl, $C_{2-10}$ alkenyl, $C_{2-10}$ alkynyl, $C_{1-10}$ haloalkyl, $C_{1-10}$ deuterioalkyl, $C_{3-10}$ cycloalkyl, 3-10 membered heterocyclyl, $C_{5-10}$ aryl, 5-10 membered heteroaryl, =O, —$C_{0-8}$—S(O)$_r R_{21}$, —$C_{0-8}$—O—$R_{22}$, —$C_{0-8}$—C(O)O$R_{22}$, —$C_{0-8}$—C(O)$R_{23}$, —$C_{0-8}$—O—C(O)$R_{23}$, —$C_{0-8}$—N$R_{24}R_{25}$, —$C_{0-8}$—C(=N$R_{24}$)$R_{23}$, —$C_{0-8}$—N($R_{24}$)—C(=N$R_{25}$)$R_{23}$, —$C_{0-8}$—C(O)N$R_{24}R_{25}$ and —$C_{0-8}$—N($R_{24}$)—C(O)$R_{23}$;
$R_7$ and $R_8$ are each independently selected from the group consisting of hydrogen, deuterium, fluorine, cyano, hydroxy, $C_{1-10}$ alkyl and $C_{3-10}$ cycloalkyl, above groups are optionally further substituted by one or more substituents selected from the group consisting of deuterium, halogen, cyano, cyclopropyl, hydroxy and $C_{1-4}$ alkoxy;
$R_9$ and $R_{12}$ are each independently selected from the group consisting of hydrogen, deuterium, hydroxy, $C_{1-10}$ alkyl and $C_{3-10}$ cycloalkyl, above groups are optionally further substituted by one or more substituents selected from the group consisting of deuterium, halogen, cyano, cyclopropyl, hydroxy and $C_{1-4}$ alkoxy;
$R_{10}$ and $R_{11}$ are each independently selected from the group consisting of hydrogen, deuterium, halogen, cyano, nitro, azido, $C_{1-10}$ alkyl, $C_{2-10}$ alkenyl, $C_{2-10}$ alkynyl, $C_{3-12}$ cycloalkyl, 3-12 membered heterocyclyl, $C_{5-10}$ aryl, 5-10 membered heteroaryl, —$C_{0-8}$—S(O)$_r R_{21}$, —$C_{0-8}$—O—$R_{22}$, —$C_{0-8}$—C(O)O$R_{22}$, —$C_{0-8}$—C(O)$R_{23}$, —$C_{0-8}$—O—C(O)$R_{23}$, —$C_{0-8}$—N$R_{24}R_{25}$, —$C_{0-8}$—C(=N$R_{24}$)$R_{23}$, —$C_{0-8}$—N($R_{24}$)—C(=N$R_{25}$)$R_{23}$, —$C_{0-8}$—C(O)N$R_{24}R_{25}$ and —$C_{0-8}$—N($R_{24}$)—C(O)$R_{23}$, or, $R_{10}$ and $R_{11}$, together with the carbon atom directly attached thereto, form 3-12 membered cycloalkyl or 3-12 membered heterocyclyl, above groups are optionally further substituted by one or more substituents selected from the group consisting of deuterium, halogen, cyano, nitro, azido, $C_{1-10}$ alkyl, $C_{1-10}$ haloalkyl, $C_{1-10}$ deuterioalkyl, $C_{2-10}$ alkenyl, $C_{2-10}$ alkynyl, $C_{3-12}$ cycloalkyl, 3-12 membered heterocyclyl, $C_{5-10}$ aryl, 5-10 membered heteroaryl, —O, —$C_{0-8}$—S(O)$_r$R$_{21}$, —$C_{0-8}$—O—R$_{22}$, —$C_{0-8}$—C(O)OR$_{22}$, —$C_{0-8}$—C(O)R$_{23}$, —$C_{0-8}$—O—C(O)R$_{23}$, —$C_{0-8}$—NR$_{24}$R$_{25}$, —$C_{0-8}$—C(=NR$_{24}$)R$_{23}$, —$C_{0-8}$—N(R$_{24}$)—C(=NR$_{25}$)R$_{23}$, —$C_{0-8}$—C(O)NR$_{24}$R$_{25}$ and —$C_{0-8}$—N(R$_{24}$)—C(O)R$_{23}$;

R$_{13}$ is selected from the group consisting of hydrogen, deuterium, hydroxy, $C_{1-10}$ alkyl, $C_{2-10}$ alkenyl, $C_{2-10}$ alkynyl, $C_{3-10}$ cycloalkyl, 3-10 membered heterocyclyl, $C_{5-10}$ aryl and 5-10 membered heteroaryl, above groups are optionally further substituted by one or more substituents selected from the group consisting of deuterium, halogen, cyano, nitro, azido, $C_{1-10}$ alkyl, $C_{2-10}$ alkenyl, $C_{2-10}$ alkynyl, $C_{3-10}$ cycloalkyl, 3-10 membered heterocyclyl, $C_{5-10}$ aryl, 5-10 membered heteroaryl, =O, —$C_{0-8}$—S(O)$_r$R$_{21}$, —$C_{0-8}$—O—R$_{22}$, —$C_{0-8}$—C(O)OR$_{22}$, —$C_{0-8}$—C(O)R$_{23}$, —$C_{0-8}$—O—C(O)R$_{23}$, —$C_{0-8}$—NR$_{24}$R$_{25}$, —$C_{0-8}$—C(=NR$_{24}$)R$_{23}$, —$C_{0-8}$—N(R$_{24}$)—C(=NR$_{25}$)R$_{23}$, —$C_{0-8}$—C(O)NR$_{24}$R$_{25}$ and —$C_{0-8}$—N(R$_{24}$)—C(O)R$_{23}$, above groups are optionally more further substituted by one or more substituents selected from the group consisting of deuterium, halogen, cyano, nitro, azido, $C_{1-10}$ alkyl, $C_{2-10}$ alkenyl, $C_{2-10}$ alkynyl, $C_{1-10}$ haloalkyl, $C_{1-10}$ deuterioalkyl, $C_{3-10}$ cycloalkyl, 3-10 membered heterocyclyl, $C_{5-10}$ aryl, 5-10 membered heteroaryl, =O, —$C_{0-8}$—S(O)$_r$R$_{21}$, —$C_{0-8}$—O—R$_{22}$, —$C_{0-8}$—C(O)OR$_{22}$, —$C_{0-8}$—C(O)R$_{23}$, —$C_{0-8}$—O—C(O)R$_{23}$, —$C_{0-8}$—NR$_{24}$R$_{25}$, —$C_{0-8}$—C(=NR$_{24}$)R$_{23}$, —$C_{0-8}$—N(R$_{24}$)—C(=NR$_{25}$)R$_{23}$, —$C_{0-8}$—C(O)NR$_{24}$R$_{25}$ and —$C_{0-8}$—N(R$_{24}$)—C(O)R$_{23}$;

n is 0, 1, 2, 3 or 4;

each R$_{14}$ is independently selected from the group consisting of hydrogen, deuterium, halogen, cyano, hydroxy, carboxyl, $C_{1-10}$ alkyl, $C_{3-10}$ cycloalkyl and $C_{1-10}$ alkoxy, or, when n≥2, two of R$_{14}$, together with the carbon atom directly attached thereto, form carbonyl, $C_{3-10}$ cycloalkyl or 3-10 membered heterocyclyl, above groups are optionally further substituted by one or more substituents selected from the group consisting of deuterium, halogen, cyano, cyclopropyl, hydroxy and $C_{1-4}$ alkoxy;

R$_{15}$ is selected from the group consisting of hydrogen, deuterium, hydroxy, $C_{1-10}$ alkyl, $C_{2-10}$ alkenyl, $C_{2-10}$ alkynyl, $C_{3-10}$ cycloalkyl, 3-10 membered heterocyclyl, $C_{5-10}$ aryl and 5-10 membered heteroaryl, above groups are optionally further substituted by one or more substituents selected from the group consisting of deuterium, halogen, cyano, cyclopropyl, hydroxy and $C_{1-4}$ alkoxy;

each R$_{21}$ is independently selected from the group consisting of hydrogen, deuterium, hydroxy, $C_{1-10}$ alkyl, $C_{2-10}$ alkenyl, $C_{3-10}$ cycloalkyl, 3-10 membered heterocyclyl, $C_{5-10}$ aryl, 5-10 membered heteroaryl and —NR$_{24}$R$_{25}$, above groups are optionally further substituted by one or more substituents selected from the group consisting of deuterium, halogen, hydroxy, carbonyl, cyano, $C_{1-10}$ alkyl, $C_{1-10}$ alkoxy, $C_{3-10}$ cycloalkyl, $C_{3-10}$ cycloalkoxy, 3-10 membered heterocyclyl, 3-10 membered heterocyclyloxy, $C_{5-10}$ aryl, $C_{5-10}$ aryloxy, 5-10 membered heteroaryl, 5-10 membered heteroaryloxy and —NR$_{24}$R$_{25}$;

each R$_{22}$ is independently selected from the group consisting of hydrogen, deuterium, $C_{1-10}$ alkyl, $C_{2-10}$ alkenyl, $C_{3-10}$ cycloalkyl, 3-10 membered heterocyclyl, $C_{5-10}$ aryl and 5-10 membered heteroaryl, above groups are optionally further substituted by one or more substituents selected from the group consisting of deuterium, halogen, hydroxy, carbonyl, cyano, $C_{1-10}$ alkyl, $C_{1-10}$ alkoxy, $C_{3-10}$ cycloalkyl, $C_{3-10}$ cycloalkoxy, 3-10 membered heterocyclyl, 3-10 membered heterocyclyloxy, $C_{5-10}$ aryl, $C_{5-10}$ aryloxy, 5-10 membered heteroaryl, 5-10 membered heteroaryloxy and —NR$_{24}$R$_{25}$;

each R$_{23}$ is independently selected from the group consisting of hydrogen, deuterium, hydroxy, $C_{1-10}$ alkyl, $C_{1-10}$ alkoxy, $C_{2-10}$ alkenyl, $C_{2-10}$ alkynyl, $C_{3-10}$ cycloalkyl, $C_{3-10}$ cycloalkoxy, 3-10 membered heterocyclyl, 3-10 membered heterocyclyloxy, $C_{5-10}$ aryl, $C_{5-10}$ aryloxy, 5-10 membered heteroaryl, 5-10 membered heteroaryloxy and —NR$_{24}$R$_{25}$, above groups are optionally further substituted by one or more substituents selected from the group consisting of deuterium, halogen, hydroxy, cyano, $C_{1-10}$ alkyl, $C_{1-10}$ alkoxy, $C_{3-10}$ cycloalkyl, $C_{3-10}$ cycloalkoxy, 3-10 membered heterocyclyl, 3-10 membered heterocyclyloxy, $C_{5-10}$ aryl, $C_{5-10}$ aryloxy, 5-10 membered heteroaryl, 5-10 membered heteroaryloxy and —NR$_{24}$R$_{25}$;

each R$_{24}$ and each R$_{25}$ are independently selected from the group consisting of hydrogen, deuterium, hydroxy, $C_{1-10}$ alkyl, $C_{2-10}$ alkenyl, $C_{2-10}$ alkynyl, $C_{3-10}$ cycloalkyl, 3-10 membered heterocyclyl, $C_{5-10}$ aryl, 5-10 membered heteroaryl, sulfonyl, methylsulfonyl, isopropylsulfonyl, cyclopropylsulfonyl, p-toluenesulfonyl, amino, monoalkylamino, dialkylamino and $C_{1-10}$ alkanoyl, above groups are optionally further substituted by one or more substituents selected from the group consisting of deuterium, halogen, hydroxy, $C_{1-8}$ alkyl, $C_{1-10}$ alkoxy, $C_{3-10}$ cycloalkyl, $C_{3-10}$ cycloalkoxy, 3-10 membered heterocyclyl, 3-10 membered heterocyclyloxy, $C_{5-10}$ aryl, $C_{5-10}$ aryloxy, 5-10 membered heteroaryl, 5-10 membered heteroaryloxy, amino, monoalkylamino, dialkylamino and $C_{1-10}$ alkanoyl;

or, R$_{24}$ and R$_{25}$, together with the nitrogen atom directly attached thereto, form 4-10 membered heterocyclyl, above group is optionally further substituted by one or more substituents selected from the group consisting of deuterium, halogen, hydroxy, $C_{1-10}$ alkyl, $C_{1-10}$ alkoxy, $C_{3-10}$ cycloalkyl, $C_{3-10}$ cycloalkoxy, 3-10 membered heterocyclyl, 3-10 membered heterocyclyloxy, $C_{5-10}$ aryl, $C_{5-10}$ aryloxy, 5-10 membered heteroaryl, 5-10 membered heteroaryloxy, amino, monoalkylamino, dialkylamino and $C_{1-10}$ alkanoyl; and each r is independently 0, 1 or 2.

2. The compound of formula (I), the stereoisomer, prodrug or pharmaceutically acceptable salt thereof according to claim 1, wherein, L$_1$ and L$_2$ are each independently —CR$_7$=CR$_8$—, —NH— or —NH—C(O)—;

R$_1$ and R$_2$ are each independently selected from the group consisting of hydrogen, deuterium, halogen, cyano, hydroxy, carboxyl, $C_{1-4}$ alkyl, $C_{3-6}$ cycloalkyl and $C_{1-4}$ alkoxy, above groups are optionally further substituted by one or more substituents selected from the group consisting of deuterium, halogen, cyano, cyclopropyl, hydroxy and $C_{1-4}$ alkoxy; and R$_3$ and R$_4$ are each independently selected from the group consisting of hydrogen, deuterium, halogen, cyano, hydroxy, carboxyl, $C_{1-4}$ alkyl, $C_{3-6}$ cycloalkyl, 3-6 membered heterocyclyl, $C_{1-4}$ alkoxy and $C_{3-6}$ cycloalkoxy, above groups are optionally further substituted by one or more substituents selected from the group consisting of deuterium, halogen, cyano, cyclopropyl, hydroxy and $C_{1-4}$ alkoxy.

3. The compound of formula (I), the stereoisomer, prodrug or pharmaceutically acceptable salt thereof according to claim 1, wherein, each $R_5$ is independently selected from the group consisting of hydrogen, deuterium, halogen, cyano, hydroxy, carboxyl, $C_{1-4}$ alkyl, $C_{3-6}$ cycloalkyl and $C_{1-4}$ alkoxy, or, when m≥2, two of $R_5$, together with the carbon atom directly attached thereto, form carbonyl, $C_{3-6}$ cycloalkyl or 3-6 membered heterocyclyl, above groups are optionally further substituted by one or more substituents selected from the group consisting of deuterium, halogen, cyano, cyclopropyl, hydroxy and $C_{1-4}$ alkoxy.

4. The compound of formula (I), the stereoisomer, prodrug or pharmaceutically acceptable salt thereof according to claim 1, wherein, $R_6$ is selected from the group consisting of hydrogen, deuterium, hydroxy, $C_{1-4}$ alkyl, $C_{2-4}$ alkenyl, $C_{2-4}$ alkynyl, $C_{3-6}$ cycloalkyl, 3-6 membered heterocyclyl, $C_{5-8}$ aryl and 5-8 membered heteroaryl, above groups are optionally further substituted by one or more substituents selected from the group consisting of deuterium, halogen, cyano, $C_{1-4}$ alkyl, $C_{2-4}$ alkenyl, $C_{2-4}$ alkynyl, $C_{1-4}$ haloalkyl, $C_{1-4}$ deuterioalkyl, $C_{3-8}$ cycloalkyl, 3-6 membered heterocyclyl, $C_{5-8}$ aryl, 5-8 membered heteroaryl, =O, —$C_{0-4}$—S(O)$_r$R$_{21}$, —$C_{0-4}$—O—R$_{22}$, —$C_{0-4}$—C(O)OR$_{22}$, —$C_{0-4}$—C(O)R$_{23}$, —$C_{0-4}$—O—C(O)R$_{23}$, —$C_{0-4}$—NR$_{24}$R$_{25}$, —$C_{0-4}$—C(=NR$_{24}$)R$_{23}$, —$C_{0-4}$—N(R$_{24}$)—C(=NR$_{25}$)R$_{23}$, —$C_{0-4}$—C(O)NR$_{24}$R$_{25}$ and —$C_{0-4}$—N(R$_{24}$)—C(O)R$_{23}$, above groups are optionally more further substituted by one or more substituents selected from the group consisting of deuterium, halogen, cyano, $C_{1-4}$ alkyl, $C_{2-4}$ alkenyl, $C_{2-4}$ alkynyl, $C_{1-4}$ haloalkyl, $C_{1-4}$ deuterioalkyl, $C_{3-6}$ cycloalkyl, 3-6 membered heterocyclyl, $C_{5-8}$ aryl, 5-8 membered heteroaryl, =O, —$C_{0-4}$—S(O)$_r$R$_{21}$, —$C_{0-4}$—O—R$_{22}$, —$C_{0-4}$—C(O)OR$_{22}$, —$C_{0-4}$—C(O)R$_{23}$, —$C_{0-4}$—O—C(O)R$_{23}$, —$C_{0-4}$—NR$_{24}$R$_{25}$, —$C_{0-4}$—C(=NR$_{24}$)R$_{23}$, —$C_{0-4}$—N(R$_{24}$)—C(=NR$_{25}$)R$_{23}$, —$C_{0-4}$—C(O)NR$_{24}$R$_{25}$ and —$C_{0-4}$—N(R$_{24}$)—C(O)R$_{23}$.

5. The compound of formula (I), the stereoisomer, prodrug or pharmaceutically acceptable salt thereof according to claim 1,
wherein, $R_{13}$ is selected from the group consisting of hydrogen, deuterium, hydroxy, $C_{1-4}$ alkyl, $C_{2-4}$ alkenyl, $C_{2-4}$ alkynyl, $C_{3-6}$ cycloalkyl, 3-6 membered heterocyclyl, $C_{5-8}$ aryl and 5-8 membered heteroaryl, above groups are optionally further substituted by one or more substituents selected from the group consisting of deuterium, halogen, cyano, $C_{1-4}$ alkyl, $C_{3-8}$ cycloalkyl, 3-6 membered heterocyclyl, $C_{5-8}$ aryl, 5-8 membered heteroaryl, =O, —$C_{0-4}$—S(O)$_r$R$_{21}$, —$C_{0-4}$—O—R$_{22}$, —$C_{0-4}$—C(O)OR$_{22}$, —$C_{0-4}$—C(O)R$_{23}$, —$C_{0-4}$—O—C(O)R$_{23}$, —$C_{0-4}$—NR$_{24}$R$_{25}$, —$C_{0-4}$—C(=NR$_{24}$)R$_{23}$, —$C_{0-4}$—N(R$_{24}$)—C(=NR$_{25}$)R$_{23}$, —$C_{0-4}$—C(O)NR$_{24}$R$_{25}$ and —$C_{0-4}$—N(R$_{24}$)—C(O)R$_{23}$, above groups are optionally more further substituted by one or more substituents selected from the group consisting of deuterium, halogen, cyano, $C_{1-4}$ alkyl, $C_{2-4}$ alkenyl, $C_{2-4}$ alkynyl, $C_{1-4}$ haloalkyl, $C_{1-4}$ deuterioalkyl, $C_{3-6}$ cycloalkyl, 3-6 membered heterocyclyl, $C_{5-8}$ aryl, 5-8 membered heteroaryl, =O, —$C_{0-4}$—S(O)$_r$R$_{21}$, —$C_{0-4}$—O—R$_{22}$, —$C_{0-4}$—C(O)OR$_{22}$, —$C_{0-4}$—C(O)R$_{23}$, —$C_{0-4}$—O—C(O)R$_{23}$, —$C_{0-4}$—NR$_{24}$R$_{25}$, —$C_{0-4}$—C(=NR$_{24}$)R$_{23}$, —$C_{0-4}$—N(R$_{24}$)—C(=NR$_{25}$)R$_{23}$, —$C_{0-4}$—C(O)NR$_{24}$R$_{25}$ and —$C_{0-4}$—N(R$_{24}$)—C(O)R$_{23}$;

each $R_{14}$ is independently selected from the group consisting of hydrogen, deuterium, halogen, cyano, hydroxy, carboxyl, $C_{1-4}$ alkyl, $C_{3-6}$ cycloalkyl and $C_{1-4}$ alkoxy, or, when n≥2, two of $R_{14}$, together with the carbon atom directly attached thereto, form carbonyl, $C_{3-6}$ cycloalkyl or 3-6 membered heterocyclyl, above groups are optionally further substituted by one or more substituents selected from the group consisting of deuterium, halogen, cyano, cyclopropyl, hydroxy and $C_{1-4}$ alkoxy; and $R_{15}$ is selected from the group consisting of hydrogen, deuterium, hydroxy, $C_{1-4}$ alkyl, $C_{2-4}$ alkenyl, $C_{2-4}$ alkynyl, $C_{3-6}$ cycloalkyl, 3-6 membered heterocyclyl, $C_{5-8}$ aryl and 5-8 membered heteroaryl, above groups are optionally further substituted by one or more substituents selected from the group consisting of deuterium, halogen, cyano, cyclopropyl, hydroxy and $C_{1-4}$ alkoxy.

6. The compound of formula (I), the stereoisomer, prodrug or pharmaceutically acceptable salt thereof according to claim 1, wherein, the compound of formula (I) is a compound of formula (IIa):

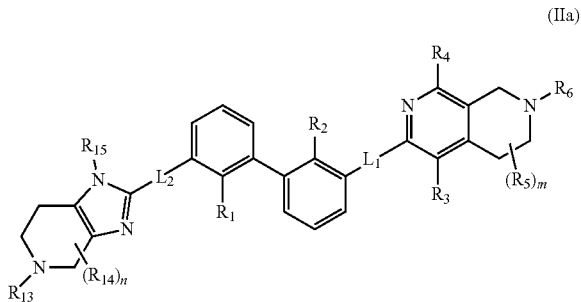

(IIa)

wherein, $L_1$ and $L_2$ are each independently —CR$_7$=CR$_8$— or —NH—C(O)—;

each $R_1$ and each $R_2$ are independently selected from the group consisting of hydrogen, deuterium, halogen, cyano, hydroxy, carboxyl, $C_{1-4}$ alkyl, $C_{1-4}$ haloalkyl, $C_{1-4}$ deuterioalkyl, $C_{3-6}$ cycloalkyl and $C_{1-4}$ alkoxy;

each $R_3$ and each $R_4$ are independently selected from the group consisting of hydrogen, deuterium, halogen, cyano, hydroxy, carboxyl, $C_{1-4}$ alkyl, $C_{1-4}$ haloalkyl, $C_{1-4}$ deuterioalkyl, $C_{3-6}$ cycloalkyl, 3-6 membered heterocyclyl, $C_{1-4}$ alkoxy and $C_{3-6}$ cycloalkoxy;

each $R_5$ is independently selected from the group consisting of hydrogen, deuterium, halogen, cyano, hydroxy, carboxyl, $C_{1-4}$ alkyl, $C_{3-6}$ cycloalkyl and $C_{1-4}$ alkoxy, above groups are optionally further substituted by one or more substituents selected from the group consisting of deuterium, halogen, cyano, cyclopropyl, hydroxy and $C_{1-4}$ alkoxy;

$R_6$ is selected from hydrogen, deuterium, hydroxy, $C_{1-4}$ alkyl, $C_{3-6}$ cycloalkyl and 3-6 membered heterocyclyl, above groups are optionally further substituted by one or more substituents selected from the group consisting of deuterium, halogen, cyano, $C_{1-4}$ alkyl, $C_{1-4}$ haloalkyl, $C_{1-4}$ deuterioalkyl, $C_{3-8}$ cycloalkyl, 3-6 membered heterocyclyl, =O, —O—R$_{22}$, —C(O)OR$_{22}$, —C(O)R$_{23}$, —O—C(O)R$_{23}$, —NR$_{24}$R$_{25}$, —C(O)NR$_{24}$R$_{25}$ and —N(R$_{24}$)—C(O)R$_{23}$, above groups are optionally more further substituted by one or more substituents selected from the group consisting of deuterium, halogen, cyano, $C_{1-4}$ alkyl, $C_{2-4}$ alkenyl, $C_{2-4}$ alkynyl, $C_{1-4}$ haloalkyl, $C_{1-4}$ deuterioalkyl, $C_{3-6}$ cycloalkyl, 3-6 membered heterocyclyl, $C_{5-8}$ aryl, 5-8 membered heteroaryl, =O, —O—R$_{22}$, —C(O)OR$_{22}$, —C(O)R$_{23}$, —O—C(O)R$_{23}$, —NR$_{24}$R$_{25}$, —C(O)NR$_{24}$R$_{25}$ and —N(R$_{24}$)—C(O)R$_{23}$;

$R_7$ and $R_8$ are each independently selected from the group consisting of hydrogen, deuterium, fluorine, cyano, hydroxy, $C_{1-4}$ alkyl, $C_{1-4}$ haloalkyl, $C_{1-4}$ deuterioalkyl and $C_{3-6}$ cycloalkyl;

$R_{13}$ is selected from hydrogen, deuterium, hydroxy, $C_{1-4}$ alkyl, $C_{3-6}$ cycloalkyl and 3-6 membered heterocyclyl, above groups are optionally further substituted by one or more substituents selected from the group consisting of deuterium, halogen, cyano, $C_{1-4}$ alkyl, $C_{3-8}$ cycloalkyl, 3-6 membered heterocyclyl, —O, —O—$R_{22}$, —C(O)O$R_{22}$, —C(O)$R_{23}$, —O—C(O)$R_{23}$ and —N$R_{24}R_{25}$, above groups are optionally more further substituted by one or more substituents selected from the group consisting of deuterium, halogen, cyano, $C_{1-4}$ alkyl, $C_{1-4}$ haloalkyl, $C_{1-4}$ deuterioalkyl, $C_{3-6}$ cycloalkyl, 3-6 membered heterocyclyl, =O, —O—$R_{22}$, —C(O)O$R_{22}$, —C(O)$R_{23}$, —O—C(O)$R_{23}$ and —N$R_{24}R_{25}$;

each $R_{14}$ is independently selected from the group consisting of hydrogen, deuterium, halogen, cyano, hydroxy, carboxyl, $C_{1-4}$ alkyl, $C_{3-6}$ cycloalkyl and $C_{1-4}$ alkoxy, above groups are optionally further substituted by one or more substituents selected from the group consisting of deuterium, halogen, cyano, cyclopropyl, hydroxy and $C_{1-4}$ alkoxy; and $R_{15}$ is selected from the group consisting of hydrogen, deuterium, hydroxy, $C_{1-4}$ alkyl, $C_{3-6}$ cycloalkyl, $C_{1-4}$ haloalkyl, $C_{1-4}$ deuterioalkyl, 3-6 membered heterocyclyl, $C_{5-8}$ aryl and 5-8 membered heteroaryl.

7. The compound of formula (I), the stereoisomer, prodrug or pharmaceutically acceptable salt thereof according to claim 1, wherein, the compound of formula (I) is a compound of formula (IIIa):

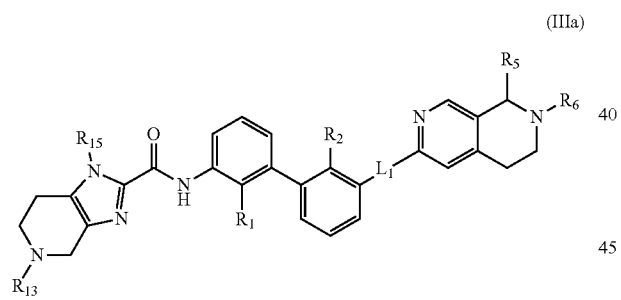

(IIIa)

wherein, $L_1$ is —CH=CF— or —NH—C(O)—;

each $R_1$ and each $R_2$ are independently selected from the group consisting of hydrogen, deuterium, fluorine, chlorine, cyano, hydroxy, carboxyl, $C_{1-4}$ alkyl, $C_{1-4}$ haloalkyl, $C_{1-4}$ deuterioalkyl, $C_{3-6}$ cycloalkyl and $C_{1-4}$ alkoxy;

$R_5$ is selected from the group consisting of hydrogen, deuterium, halogen, cyano, hydroxy, carboxyl, $C_{1-4}$ alkyl, $C_{1-4}$ haloalkyl, $C_{1-4}$ deuterioalkyl, $C_{3-6}$ cycloalkyl and $C_{1-4}$ alkoxy;

$R_6$ is selected from the group consisting of hydrogen, deuterium, hydroxy, $C_{1-4}$ alkyl, $C_{3-6}$ cycloalkyl and 3-6 membered heterocyclyl, above groups are optionally further substituted by one or more substituents selected from the group consisting of deuterium, halogen, cyano, $C_{1-4}$ alkyl, $C_{1-4}$ haloalkyl, $C_{1-4}$ deuterioalkyl, $C_{3-8}$ cycloalkyl, 3-6 membered heterocyclyl, =O, —O—$R_{22}$, —C(O)O$R_{22}$, —C(O)$R_{23}$, —O—C(O)$R_{23}$, —N$R_{24}R_{25}$, —C(O)N$R_{24}R_{25}$ and —N($R_{24}$)—C(O)$R_{23}$, above groups are optionally more further substituted by one or more substituents selected from the group consisting of deuterium, halogen, cyano, $C_{1-4}$ alkyl, $C_{2-4}$ alkenyl, $C_{2-4}$ alkynyl, $C_{1-4}$ haloalkyl, $C_{1-4}$ deuterioalkyl, $C_{3-6}$ cycloalkyl, 3-6 membered heterocyclyl, $C_{5-8}$ aryl, 5-8 membered heteroaryl, =O, —O—$R_{22}$, —C(O)O$R_{22}$, —C(O)$R_{23}$, —O—C(O)$R_{23}$, —N$R_{24}R_{25}$, —C(O)N$R_{24}R_{25}$ and —N($R_{24}$)—C(O)$R_{23}$;

$R_{13}$ is selected from hydrogen, deuterium, hydroxy, $C_{1-4}$ alkyl, $C_{3-6}$ cycloalkyl or 3-6 membered heterocyclyl, above groups are optionally further substituted by one or more substituents selected from the group consisting of deuterium, halogen, cyano, $C_{1-4}$ alkyl, $C_{3-8}$ cycloalkyl, 3-6 membered heterocyclyl, =O, —O—$R_{22}$, —C(O)O$R_{22}$, —C(O)$R_{23}$, —O—C(O)$R_{23}$ and —N$R_{24}R_{25}$, above groups are optionally more further substituted by one or more substituents selected from the group consisting of deuterium, halogen, cyano, $C_{1-4}$ alkyl, $C_{1-4}$ haloalkyl, $C_{1-4}$ deuterioalkyl, $C_{3-6}$ cycloalkyl, 3-6 membered heterocyclyl, =O, —O—$R_{22}$, —C(O)O$R_{22}$, —C(O)$R_{23}$, —O—C(O)$R_{23}$ and —N$R_{24}R_{25}$; and $R_{15}$ is selected from the group consisting of hydrogen, deuterium, hydroxy, $C_{1-4}$ alkyl, $C_{3-6}$ cycloalkyl, $C_{1-4}$ haloalkyl, $C_{1-4}$ deuterioalkyl, 3-6 membered heterocyclyl, $C_{5-8}$ aryl and 5-8 membered heteroaryl.

8. The compound of formula (I), the stereoisomer, prodrug or pharmaceutically acceptable salt thereof according to claim 7, wherein, each $R_{22}$ is independently selected from the group consisting of hydrogen, deuterium, $C_{1-4}$ alkyl, $C_{2-4}$ alkenyl, $C_{3-6}$ cycloalkyl, 3-6 membered heterocyclyl, $C_{5-8}$ aryl and 5-8 membered heteroaryl, above groups are optionally further substituted by one or more substituents selected from the group consisting of deuterium, halogen, hydroxy, carbonyl, cyano, $C_{1-4}$ alkyl, $C_{1-4}$ alkoxy, $C_{3-6}$ cycloalkyl, $C_{3-6}$ cycloalkoxy, 3-6 membered heterocyclyl, 3-6 membered heterocyclyloxy, $C_{5-8}$ aryl, $C_{5-8}$ aryloxy, 5-8 membered heteroaryl, 5-8 membered heteroaryloxy and —N$R_{24}R_{25}$;

each $R_{23}$ is independently selected from the group consisting of hydrogen, deuterium, hydroxy, $C_{1-4}$ alkyl, $C_{1-4}$ alkoxy, $C_{2-4}$ alkenyl, $C_{2-4}$ alkynyl, $C_{3-6}$ cycloalkyl, $C_{3-6}$ cycloalkoxy, 3-6 membered heterocyclyl, 3-6 membered heterocyclyloxy, $C_{5-8}$ aryl, $C_{5-8}$ aryloxy, 5-8 membered heteroaryl, 5-8 membered heteroaryloxy and —N$R_{24}R_{25}$, above groups are optionally further substituted by one or more substituents selected from the group consisting of deuterium, halogen, hydroxy, cyano, $C_{1-4}$ alkyl, $C_{1-4}$ alkoxy, $C_{3-6}$ cycloalkyl, $C_{3-6}$ cycloalkoxy, 3-6 membered heterocyclyl, 3-6 membered heterocyclyloxy, $C_{5-8}$ aryl, $C_{5-8}$ aryloxy, 5-8 membered heteroaryl, 5-8 membered heteroaryloxy and —N$R_{24}R_{25}$;

each $R_{24}$ and each $R_{25}$ are independently selected from the group consisting of hydrogen, deuterium, hydroxy, $C_{1-4}$ alkyl, $C_{2-4}$ alkenyl, $C_{2-4}$ alkynyl, $C_{3-6}$ cycloalkyl, 3-6 membered heterocyclyl, $C_{5-8}$ aryl, 5-8 membered heteroaryl, sulfonyl, methylsulfonyl, isopropylsulfonyl, cyclopropylsulfonyl, p-toluenesulfonyl, amino, monoalkylamino, dialkylamino and $C_{1-4}$ alkanoyl, above groups are optionally further substituted by one or more substituents selected from the group consisting of deuterium, halogen, hydroxy, $C_{1-4}$ alkyl, $C_{1-4}$ alkoxy, $C_{3-6}$ cycloalkyl, $C_{3-6}$ cycloalkoxy, 3-6 membered heterocyclyl, 3-6 membered heterocyclyloxy, $C_{5-8}$ aryl, $C_{5-8}$ aryloxy, 5-8 membered heteroaryl, 5-8 membered heteroaryloxy, amino, monoalkylamino, dialkylamino and C$_{1-4}$ alkanoyl;

or, R$_{24}$ and R$_{25}$, together with the nitrogen atom directly attached thereto, form 4-8 membered heterocyclyl, above group is optionally further substituted by one or more substituents selected from the group consisting of deuterium, halogen, hydroxy, C$_{1-4}$ alkyl, C$_{1-4}$ alkoxy, C$_{3-6}$ cycloalkyl, C$_{3-6}$ cycloalkoxy, 3-6 membered heterocyclyl, 3-6 membered heterocyclyloxy, C$_{5-8}$ aryl, C$_{5-8}$ aryloxy, 5-8 membered heteroaryl, 5-8 membered heteroaryloxy, amino, monoalkylamino, dialkylamino and C$_{1-4}$ alkanoyl.

9. The compound of formula (I), the stereoisomer, prodrug or pharmaceutically acceptable salt thereof according to claim 1, wherein the compound is selected from the group consisting of:

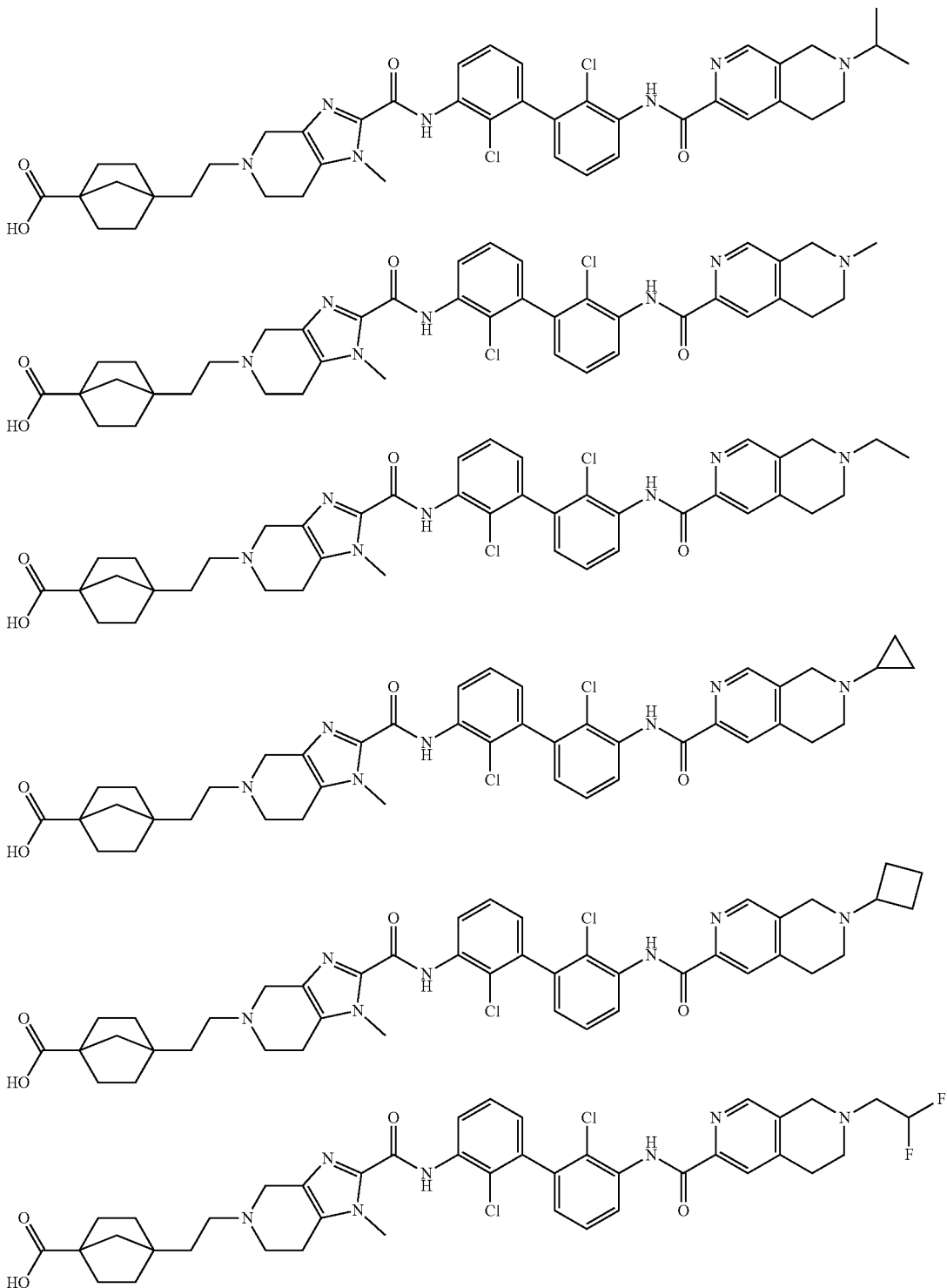

-continued
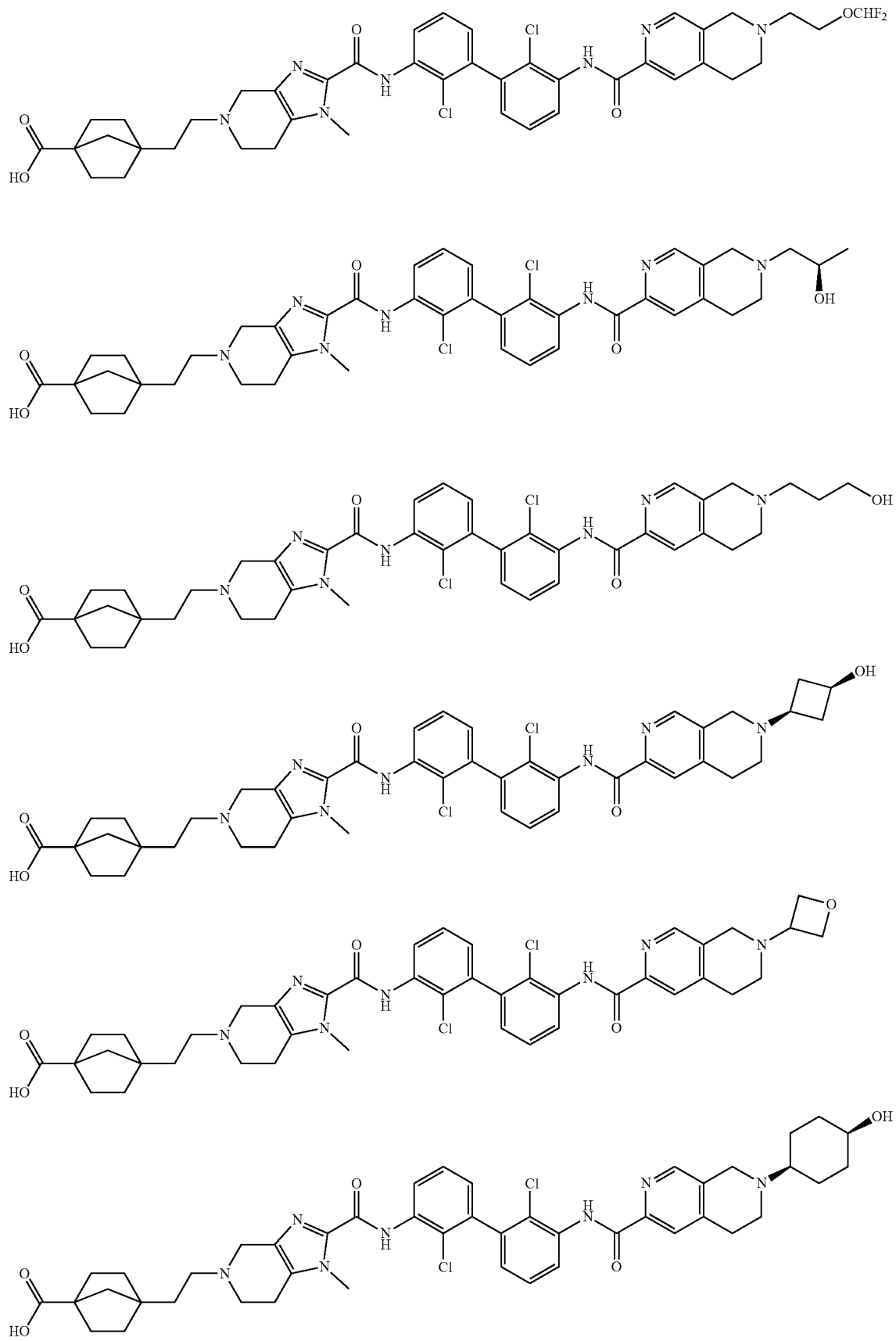

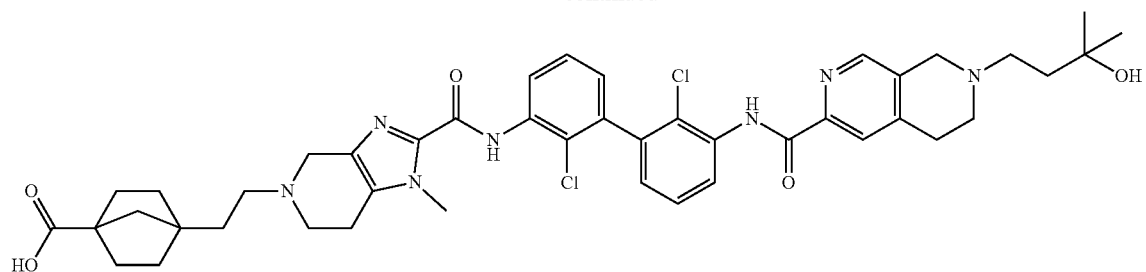
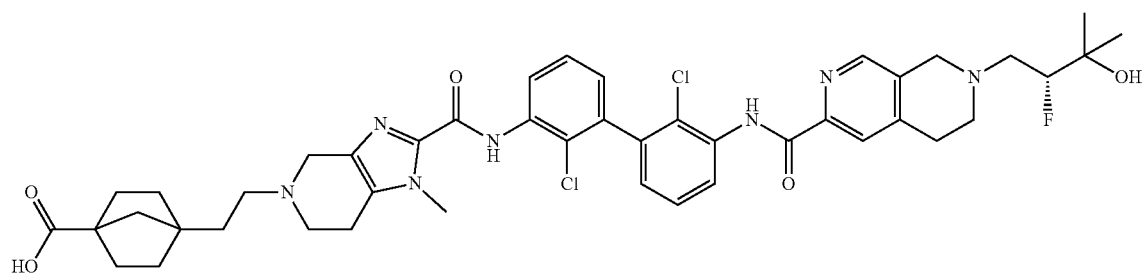
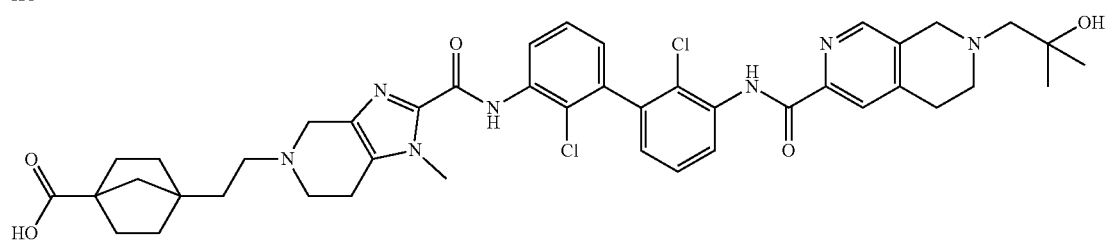
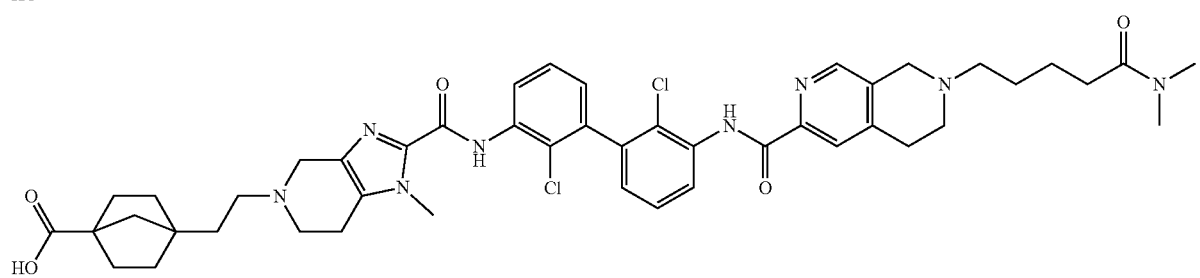
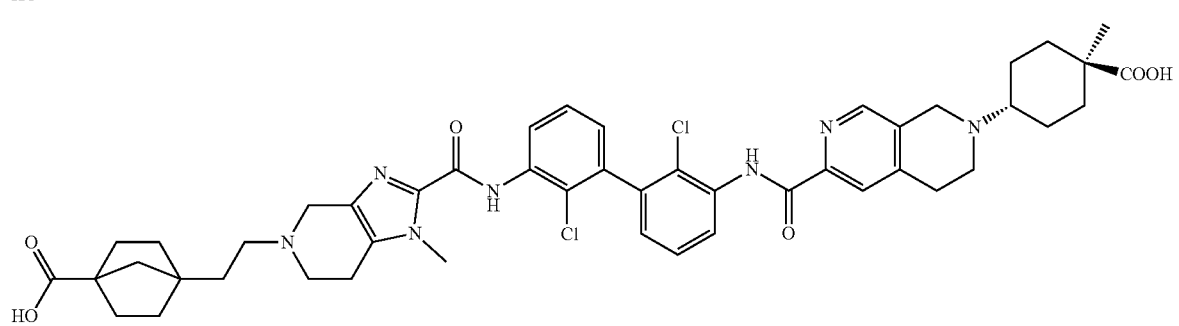
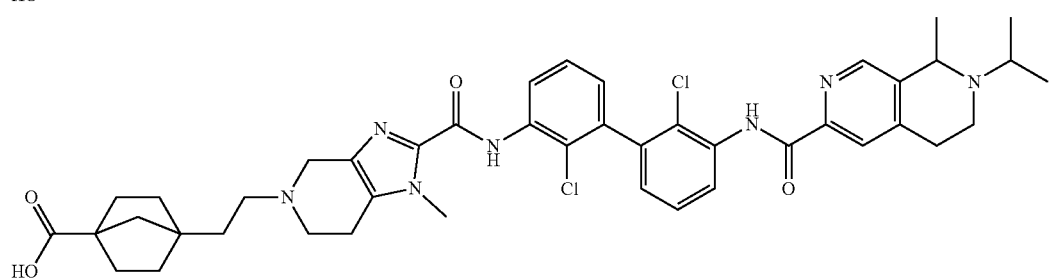

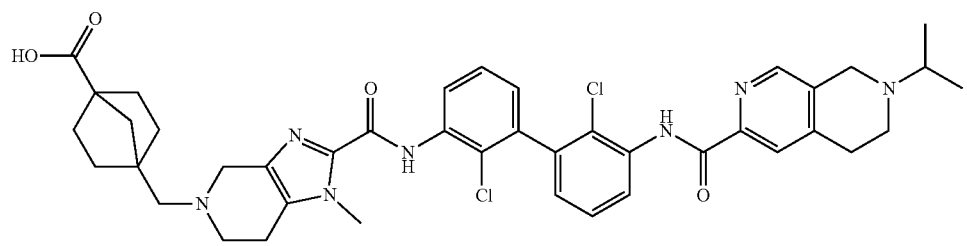
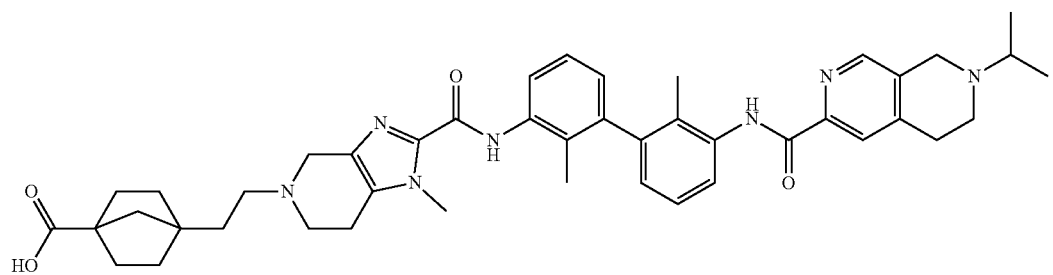
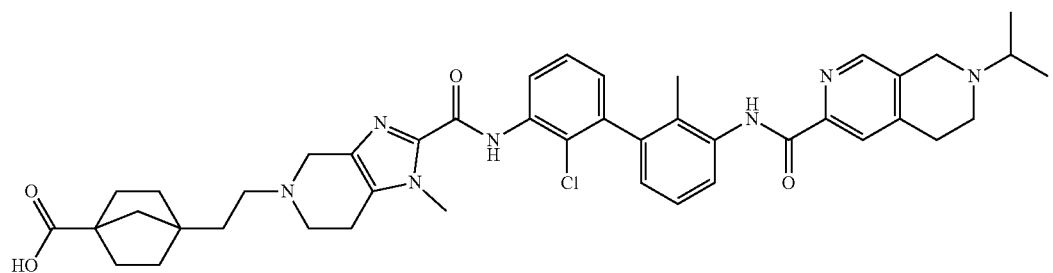
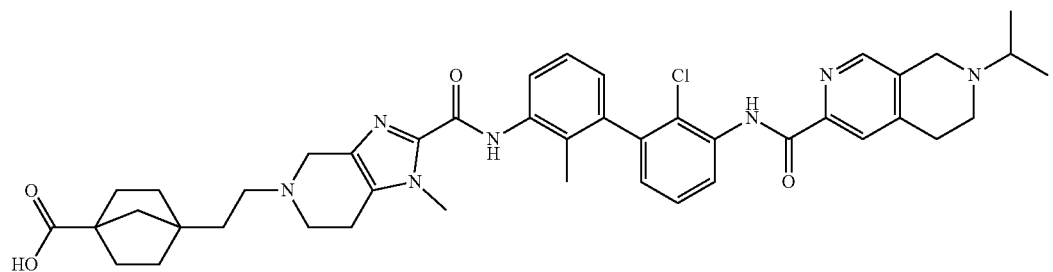
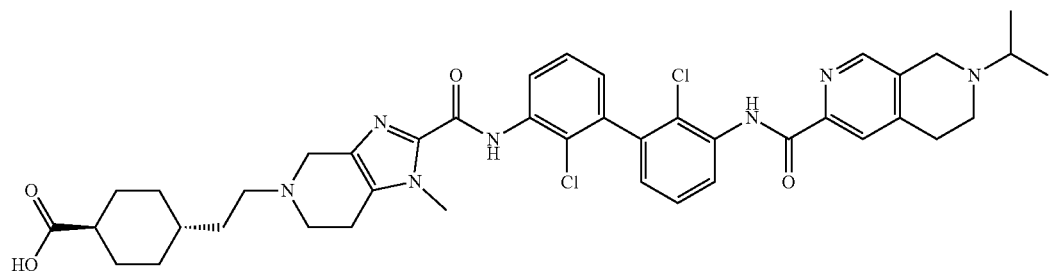
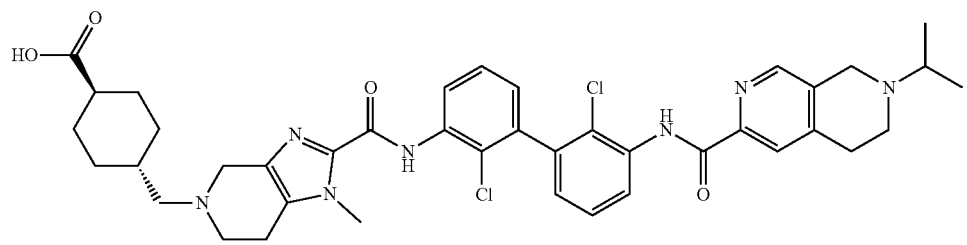

153 154
-continued
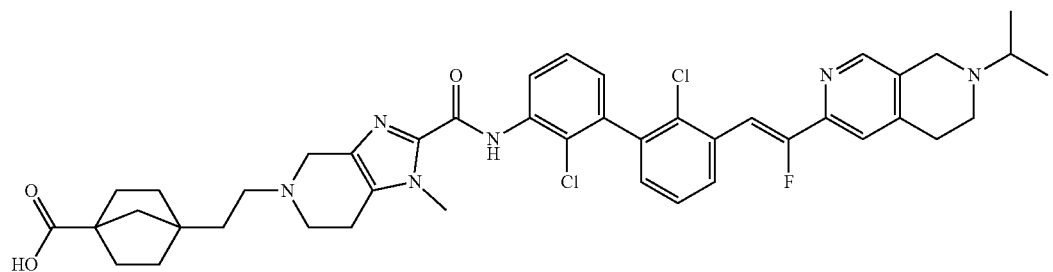
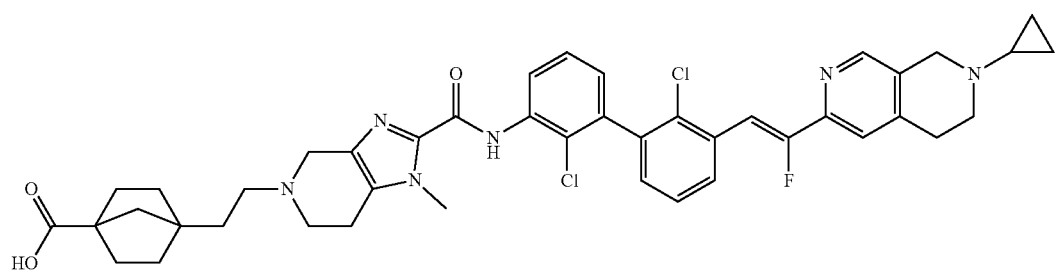
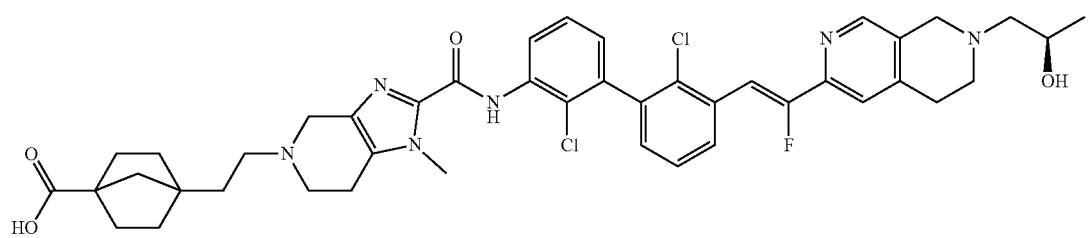
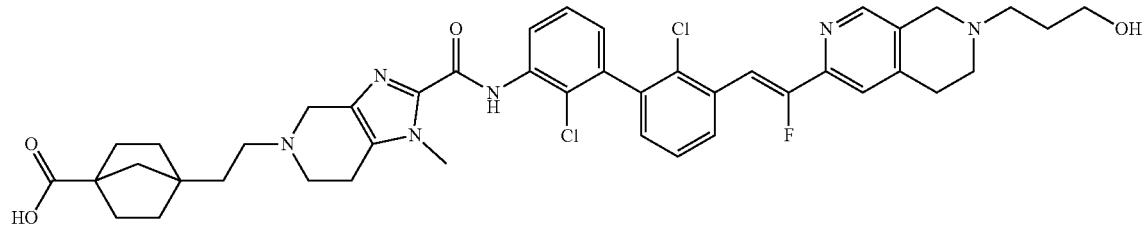
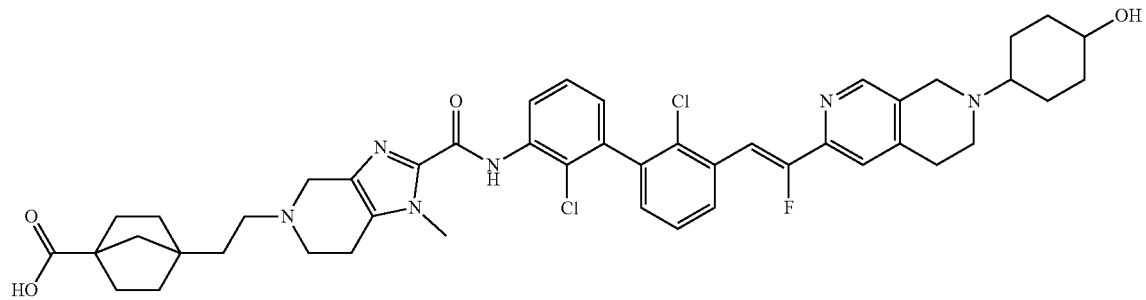
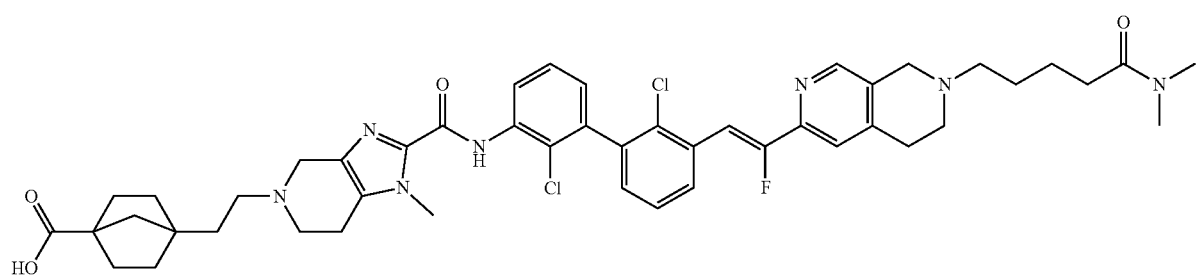

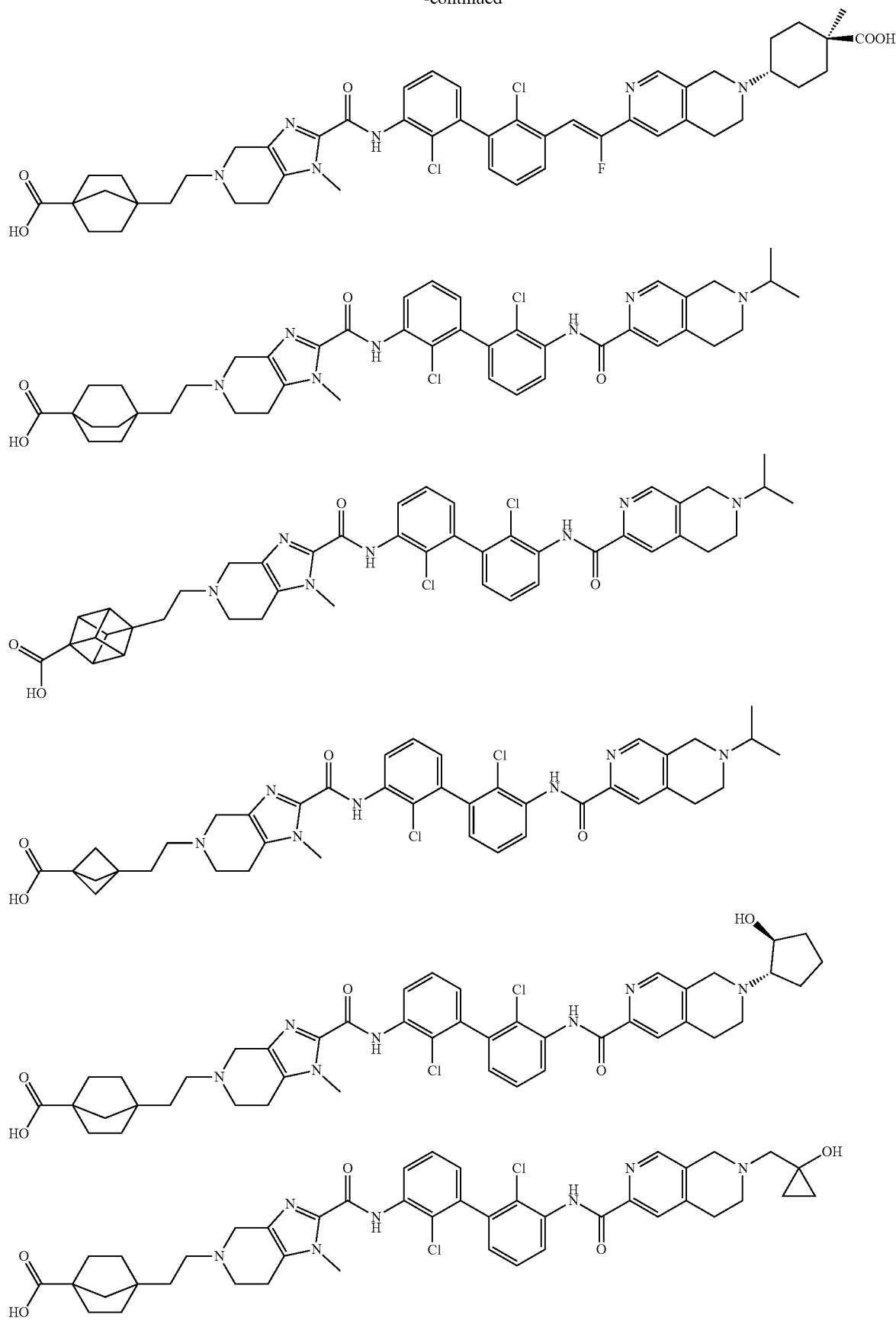

-continued
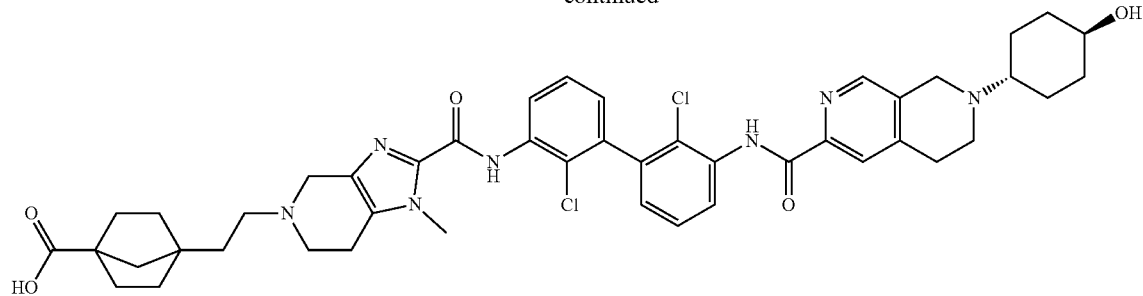
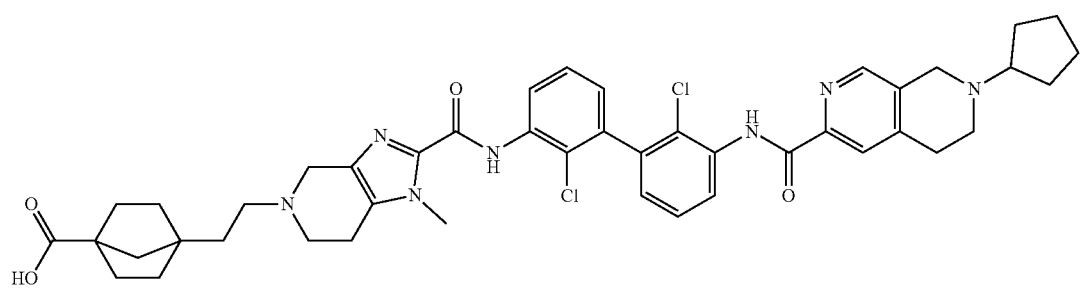
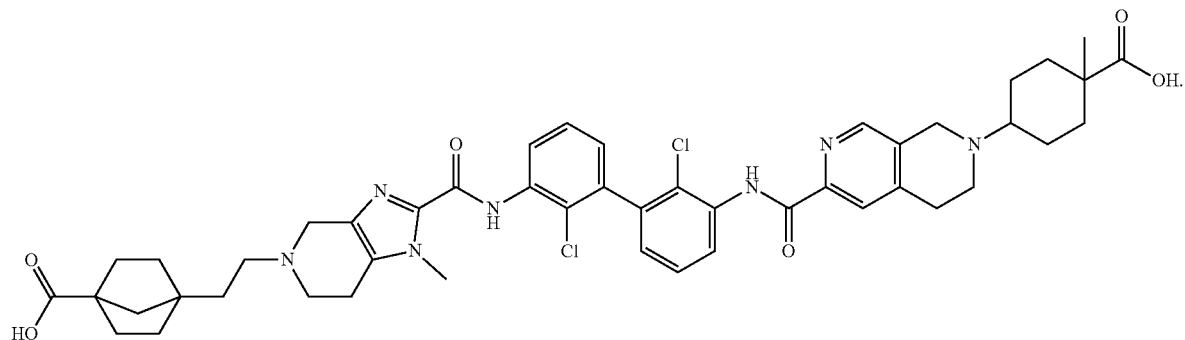
10. A process for preparing the compound of formula (I), the stereoisomer, prodrug or pharmaceutically acceptable salt thereof according to claim 1, comprising the following step:
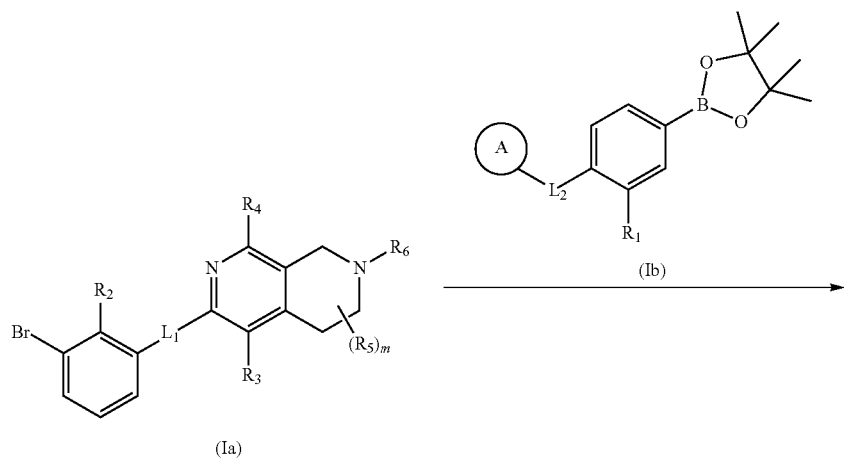

-continued
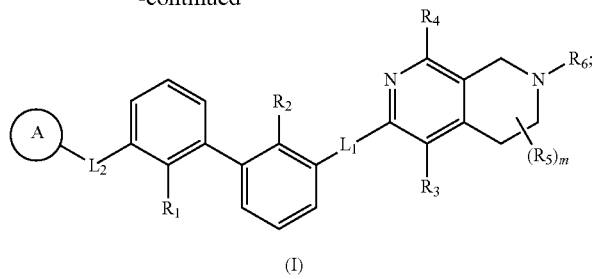
(I)
optionally, a further reaction is carried out according to the different substituents to obtain the corresponding compound of formula (I).
11. A pharmaceutical composition, comprising the compound of formula (I), the stereoisomer, prodrug or pharmaceutically acceptable salt thereof according to claim 1, and a pharmaceutically acceptable carrier.
* * * * *